United States Patent [19]

Reynolds

[11] E Re. 30,441

[45] Reissued Dec. 2, 1980

[54] BOWLING SCORING APPARATUS AND PROGRAMMING SYSTEM THEREFOR

[75] Inventor: Eugene E. Reynolds, Skokie, Ill.

[73] Assignee: Brunswick Corporation, Chicago, Ill.

[21] Appl. No.: 974,627

[22] Filed: Dec. 29, 1978

Related U.S. Patent Documents

Reissue of:

[64] Patent No.: 3,488,055
Issued: Jan. 6, 1970
Appl. No.: 243,525
Filed: Dec. 10, 1962

U.S. Applications:

[63] Continuation of Ser. No. 243,525, Dec. 10, 1962, abandoned.

[51] Int. Cl.[3] ..... A63D 5/04; G06F 15/44

[52] U.S. Cl. ..... 273/54 C; 235/92 GA; 340/323 B; 364/411

[58] Field of Search ..... 273/54 C; 235/92 GA; 340/323 B; 364/410, 411

[56] References Cited

U.S. PATENT DOCUMENTS

| | | | |
|---|---|---|---|
| 457,298 | 8/1891 | Blickensderfer | 197/55 |
| 2,072,933 | 3/1937 | Williams | 273/54 C UX |
| 2,590,444 | 3/1952 | Millman et al. | 273/54 C UX |
| 2,648,497 | 8/1953 | Boyden | 273/54 C UX |
| 2,846,043 | 8/1958 | Hickerson | 197/55 |
| 3,010,647 | 11/1961 | Boyden et al. | 235/60.13 |
| 3,017,081 | 1/1962 | Scozzafara et al. | 235/60.13 |
| 3,093,374 | 6/1963 | Rothberg et al. | 273/54 C UX |
| 3,124,355 | 3/1964 | Mentzer et al. | 273/54 C |
| 3,184,583 | 5/1965 | Bawtinkeimer | 273/54 C X |
| 3,212,779 | 10/1965 | Gruss et al. | 273/54 D |

FOREIGN PATENT DOCUMENTS

| | | | |
|---|---|---|---|
| 162602 | 9/1905 | Fed. Rep. of Germany | 273/54 C |
| 555216 | 7/1932 | Fed. Rep. of Germany | 273/54 C |

*Primary Examiner*—Anton O. Oechsle
*Attorney, Agent, or Firm*—Wegner, Stellman, McCord, Wiles & Wood

EXEMPLARY CLAIM

1. A machine for calculating and printing score information of a bowling game wherein balls are bowled to knock down pins during each of a succession of scoring frames comprising: a plurality of accumulators, each corresponding to a bowler, adapted to receive, accumulate and store score values for the corresponding bowlers; a plurality of groups of elements positionable to represent score information, each group corresponding to a bowler; predetermined ones of said elements in each said group adapted to selectively enter score values into the accumulator for the corresponding bowler; means for printing score information and score values including a plurality of positionable printing members each carrying a plurality of score indicia adapted to be selectively positioned; means for selectively entering into the printing means score information from the elements to position the corresponding printing members to print corresponding score information; means for entering into the printing means score values from the accumulator to position the corresponding printing members to print score values; and means for actuating said printing means for printing the score information and score values entered in said printing means.

33 Claims, 66 Drawing Figures

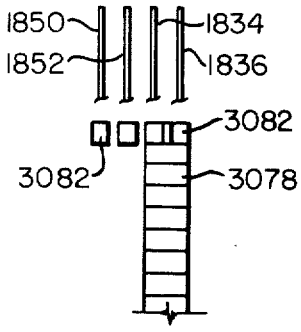
FIG. 40
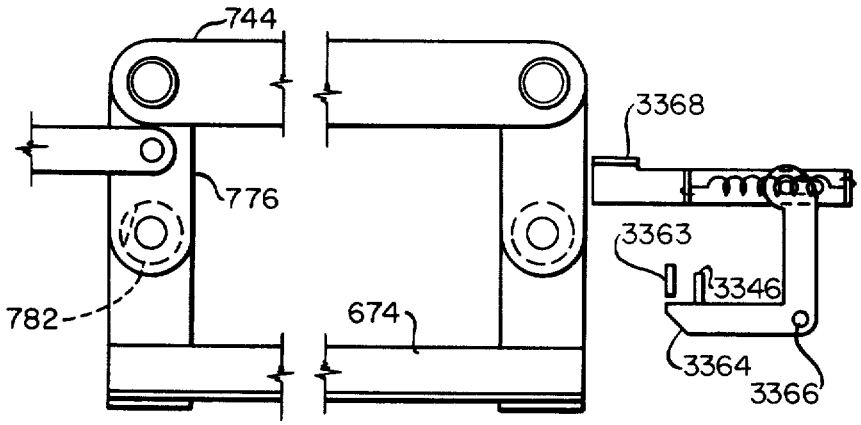
FIG. 47
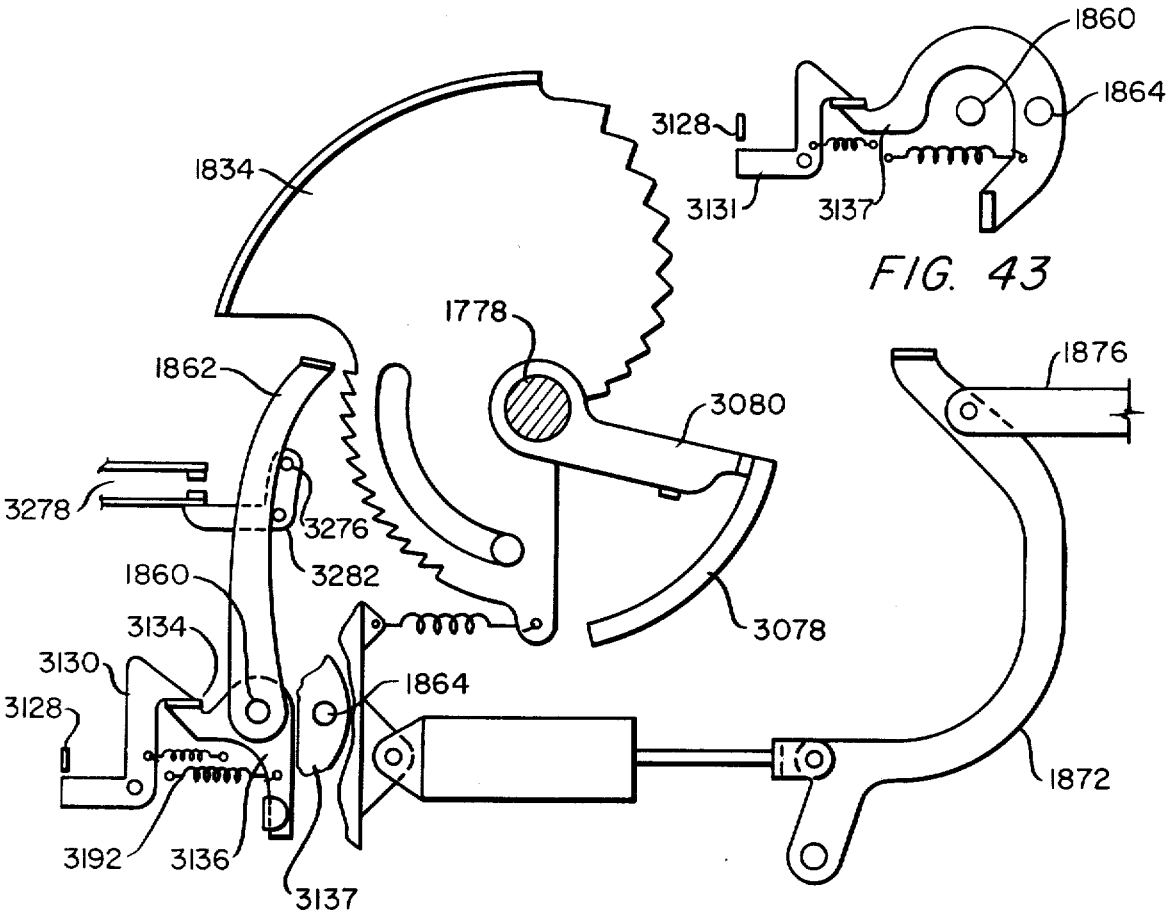
FIG. 43
FIG. 41

FIG. 54
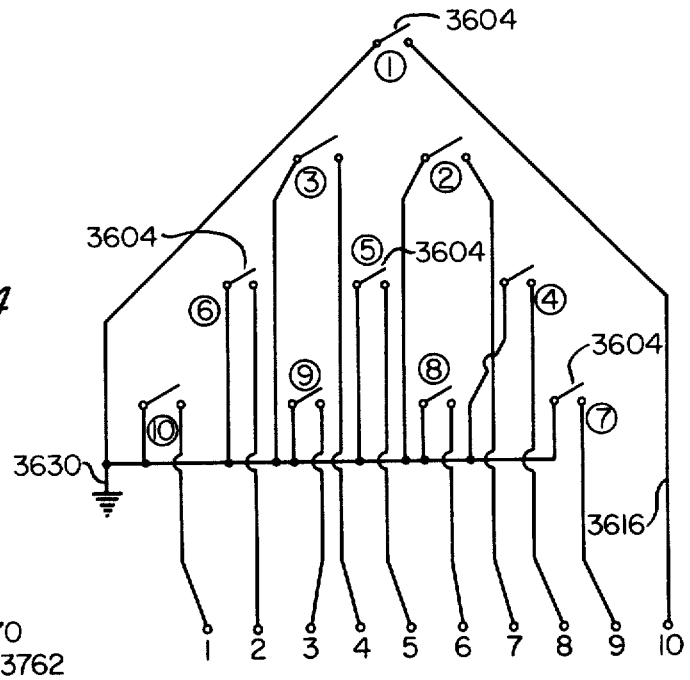
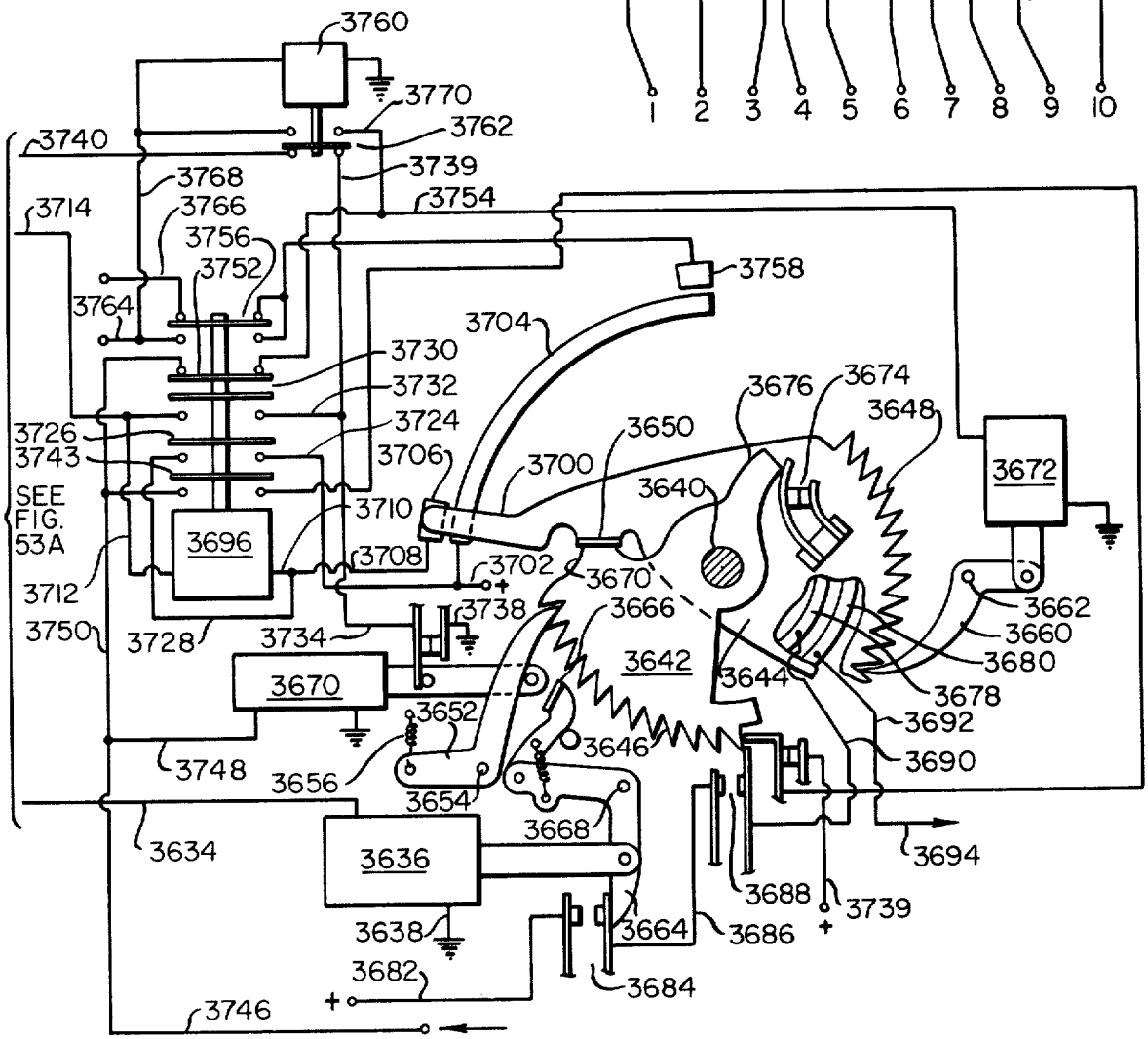
FIG. 53B

BOWLING SCORING APPARATUS AND PROGRAMMING SYSTEM THEREFOR

Matter enclosed in heavy brackets [ ] appears in the original patent but forms no part of this reissue specification; matter printed in italics indicates the additions made by reissue.

This invention relates generally to a bowling scoring apparatus for progressively computing, registering and/or printing scores in the game of bowling and to apparatus for programming one or more scoring apparatus so that it may be used for individual, group or team scoring and is a continuation of my copending application entitled, "Bowling Scoring Apparatus and Programming System Therefor," filed Dec. 10, 1962, Ser. No. 243,525, now abandoned.

In my application Ser. No. 697,632, filed Nov. 20, 1957, entitled "Automatic Bowling Scoring Device," now abandoned but continued in copending application Ser. No. 196,039, filed May 16, 1962, there is described a bowling scoring apparatus for progressively computing and/or printing scores scored in the game of bowling.

The apparatus described is an electro-mechanical apparatus which responds to either manual entry of pin information or to signals indicative of pin information derived at the pit. The apparatus is automatically cycled progressively and keeps the score of bowling games for an individual, a group or a team. For team bowling, there is described a control mechanism for assuring that the information for a team is entered in the correct apparatus, that is, there is provided a cross lane control which serves to alternately provide the information from one alley or the other to one team's scoring apparatus. The apparatus described in said copending application further serves to print score values on a score sheet having a format substantially similar to that presently used. The machine includes a mechanism for continuously printing total score values, pin information and special marks.

The present apparatus employs an adding machine type computer which is adapted to register and compute bowling scores. In the embodiment of the machine described, there is presented a score sheet in which the scores of bowlers are arranged in columns and a special printing mechanism is disposed on a carriage to be associated with a particular bowler's position. The invention includes cross lane control for assuring entry of scores of team individuals into the correct apparatus and, in addition, includes a programming system which controls operation of the machine for individual, group or team bowling.

It is a general object of the present invention to provide an improved bowling scoring apparatus.

It is another object of the present invention to provide a programming system for bowling scoring apparatus.

It is a further object of the present invention to provide a bowling scoring apparatus which prints information required for verifying a printed score value.

It is another object of the present invention to provide a bowling scoring apparatus in which a single print assembly is selectively associated with a plurality of bowler positions to print scoring information for each of said bowlers.

It is another object of the present invention to provide a bowling scoring apparatus which undergoes a sensing cycle with the bowling of each ball and selectively subtotals, prints and adds in response to information obtained during the sensing cycle.

It is a further object of the present invention to provide a programming unit for use, in systems where scoring apparatus is employed in separate alleys, during team bowling whereby team play can progress with automatic entry into the correct apparatus.

It is another object of the present invention to provide a programming unit for use in systems where scoring apparatus is employed in separate alleys in which a late team bowler can catch up while bowling in the appropriate alley for each frame.

It is a further object of the present invention to provide an apparatus in which handicap scores may be entered.

It is a further object of the present invention to provide a scoring apparatus in which there is provided a printed record of marks and first and second ball information.

It is a further object of the present invention to provide a bowling scoring apparatus and programming system therefor in which the apparatus may be preset to bypass a given bowler's position and to seek said position upon return of the bowler.

It is a further object of the present invention to provide a programming system for bowling scoring apparatus which indicates the alley in which an individual is to bowl.

It is a further object of the present invention to provide a bowling scoring apparatus which resumes its normal sequence of operation upon completion of an out-of-sequence operation.

These and other objects of the invention will become more clearly apparent from the following description when taken in conjunction with the accompanying drawing.

Referring to the drawing.

Figure 7A:
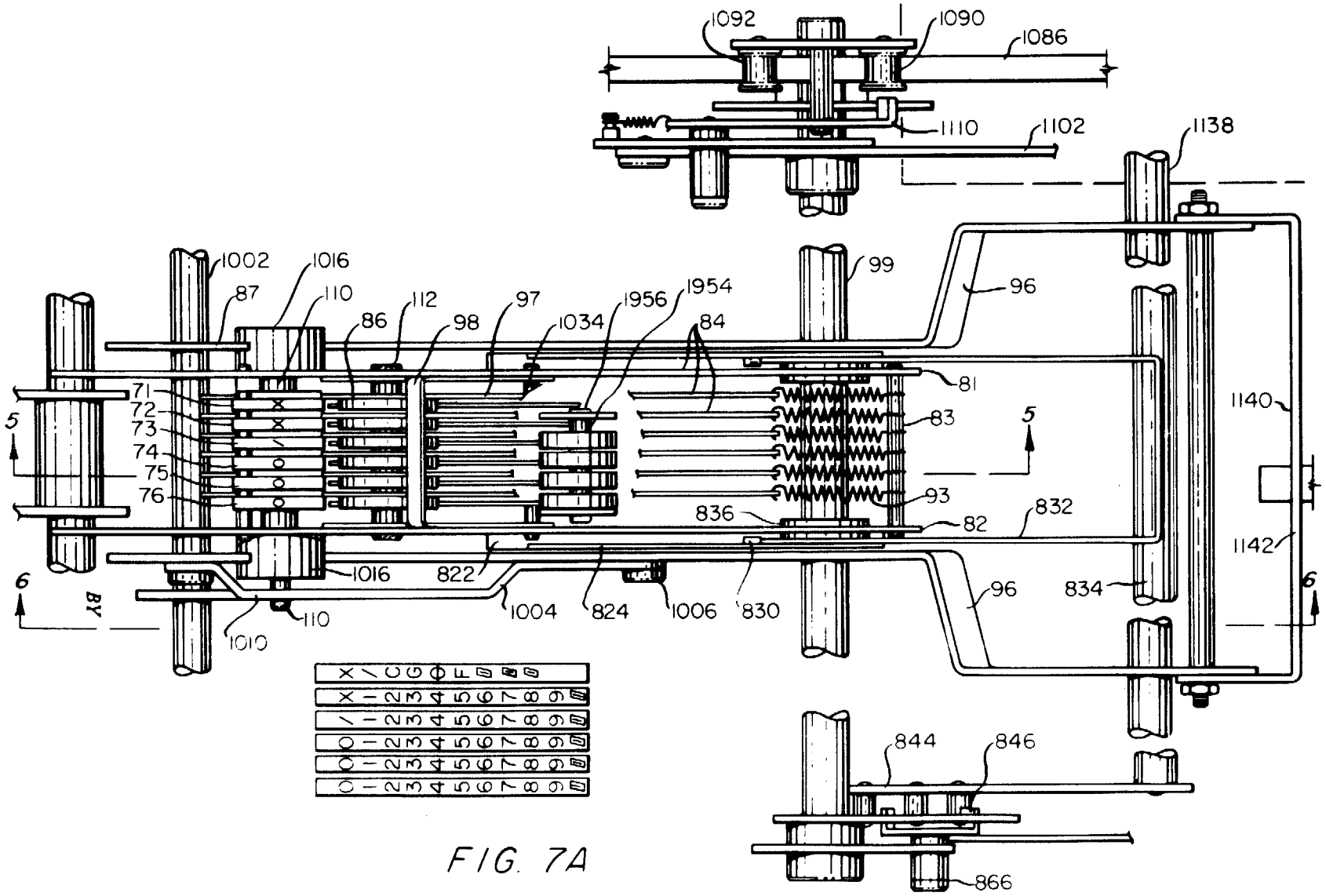
FIGS. 7A and 7B are a plan view of the machine showing as an inset in FIG. 7A, directly over the figure legend, an enlarged view of the printing wheels.
Figure 7B:
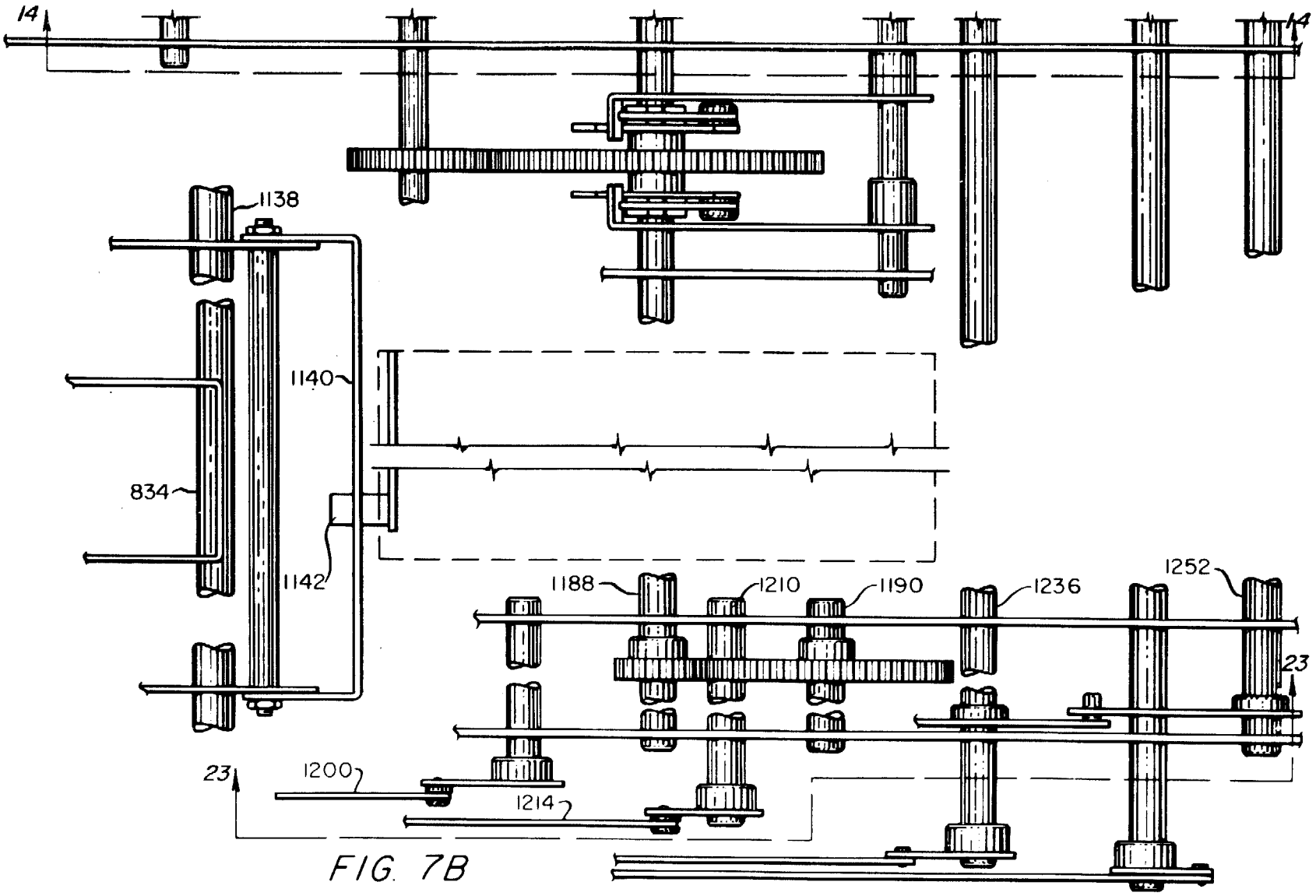
Figure 12:
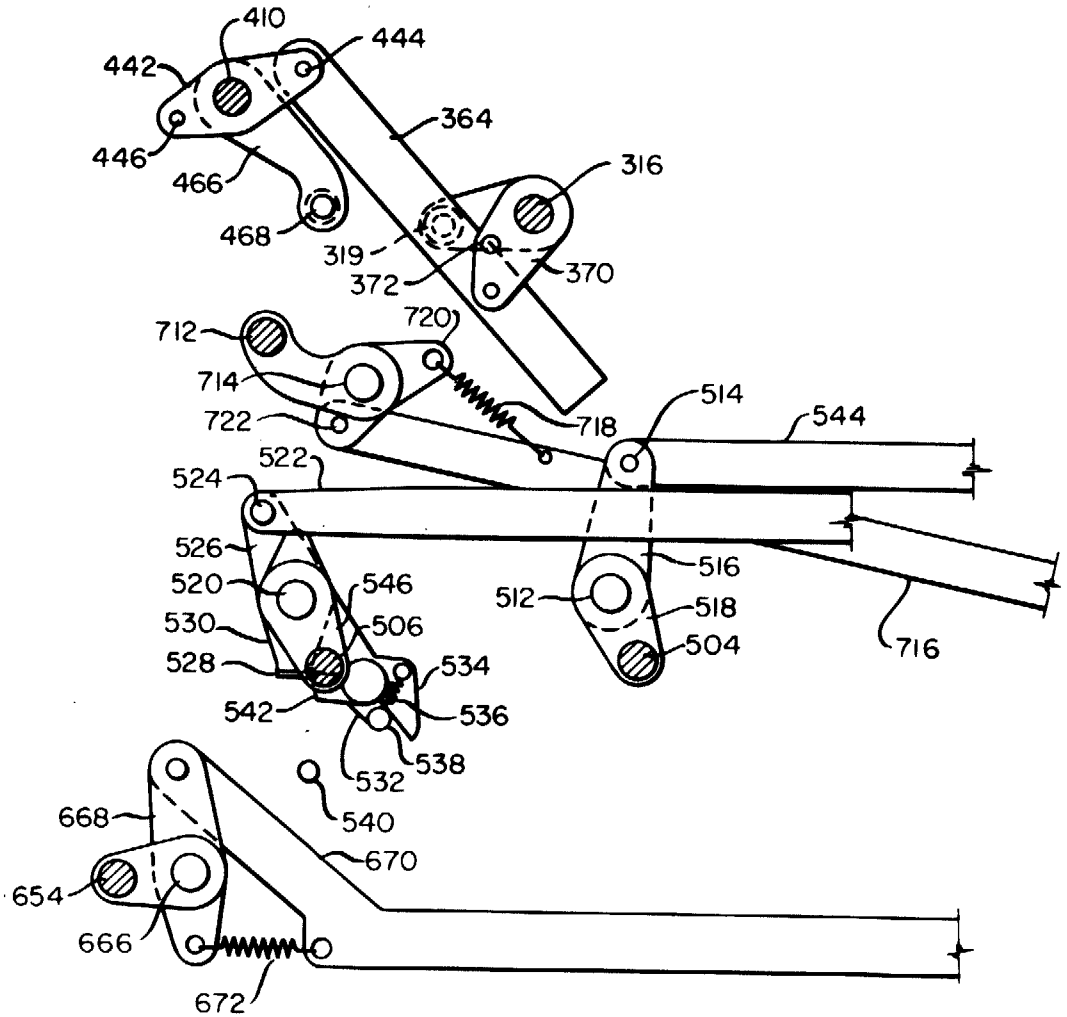
FIG. 12 shows an assembly for releasing the tens stop and spare latch, taken substantially along the line 12—12 of FIG. 17.
Figure 13:
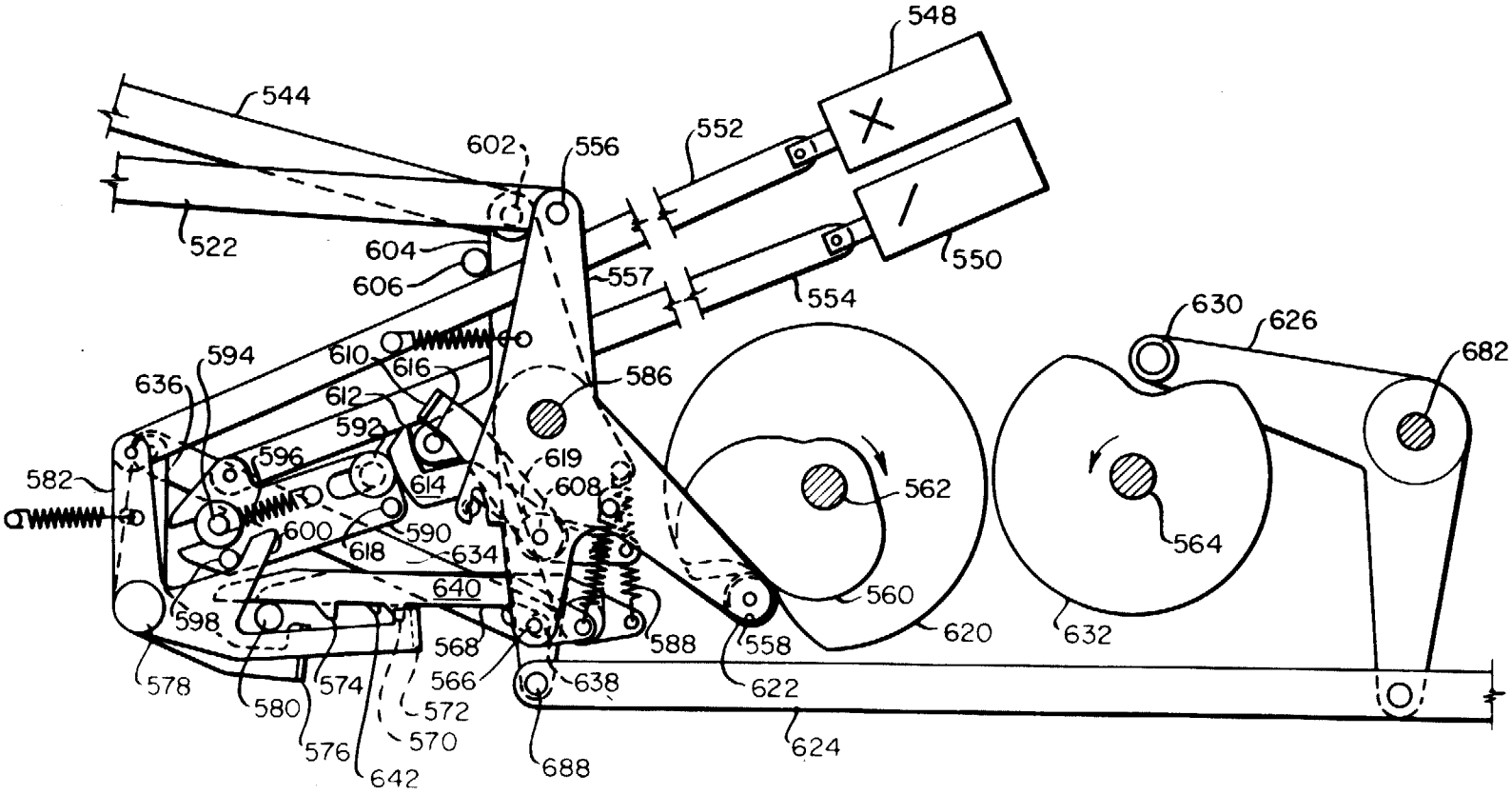
FIG. 13 shows another portion of the assembly for releasing the tens stop and spare latch.
Figure 14:
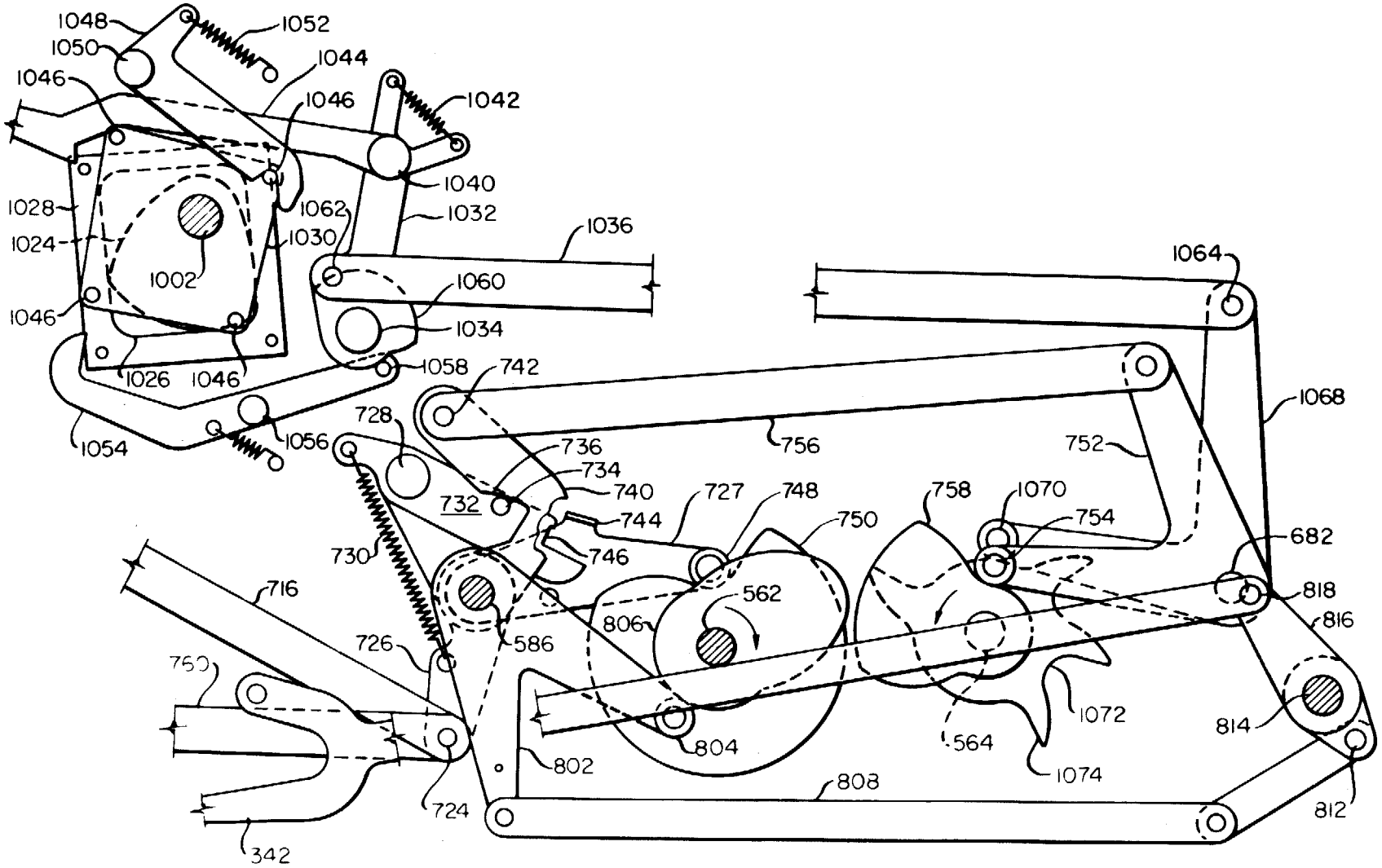
Figure 15:
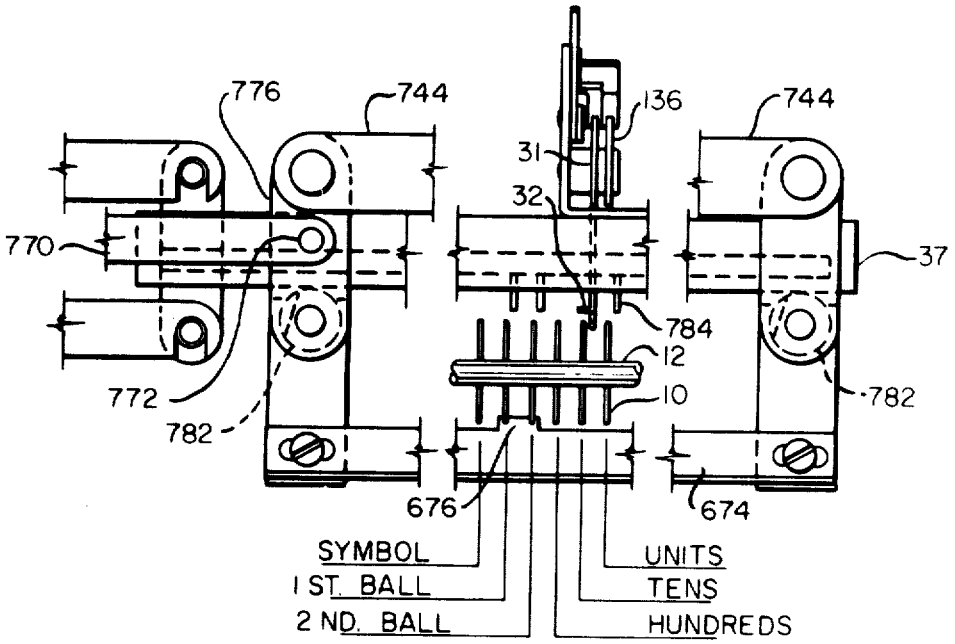
Figure 18:
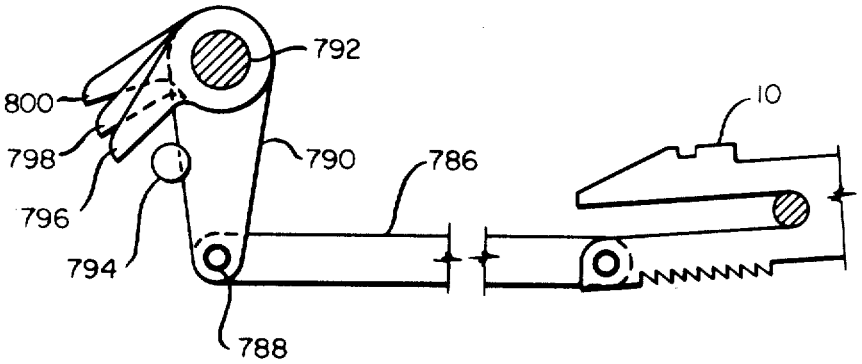
Figure 16:
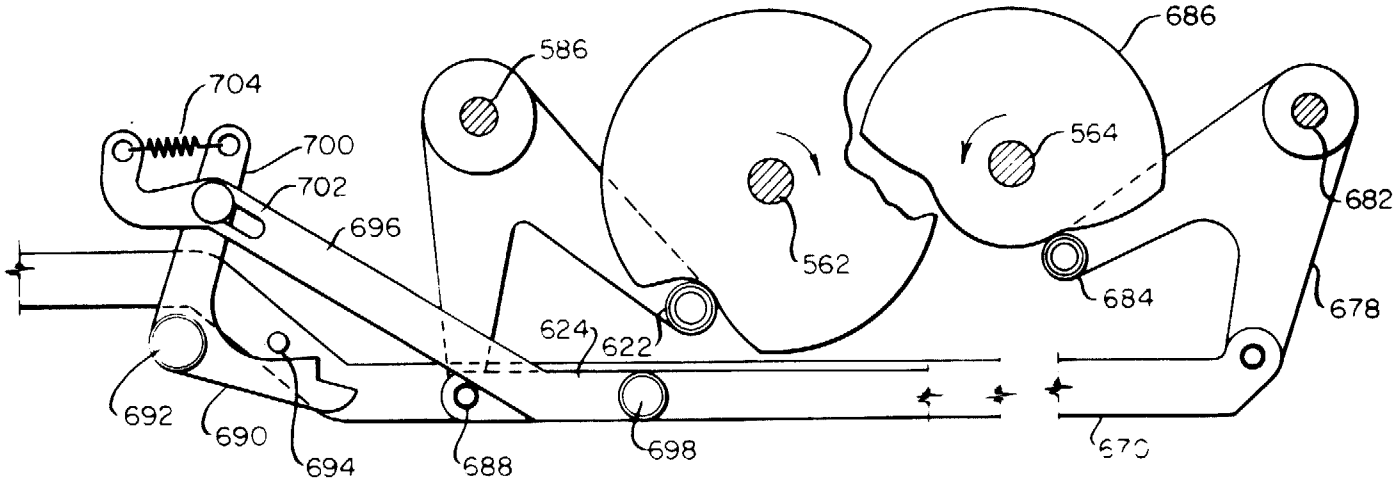
Figure 17:
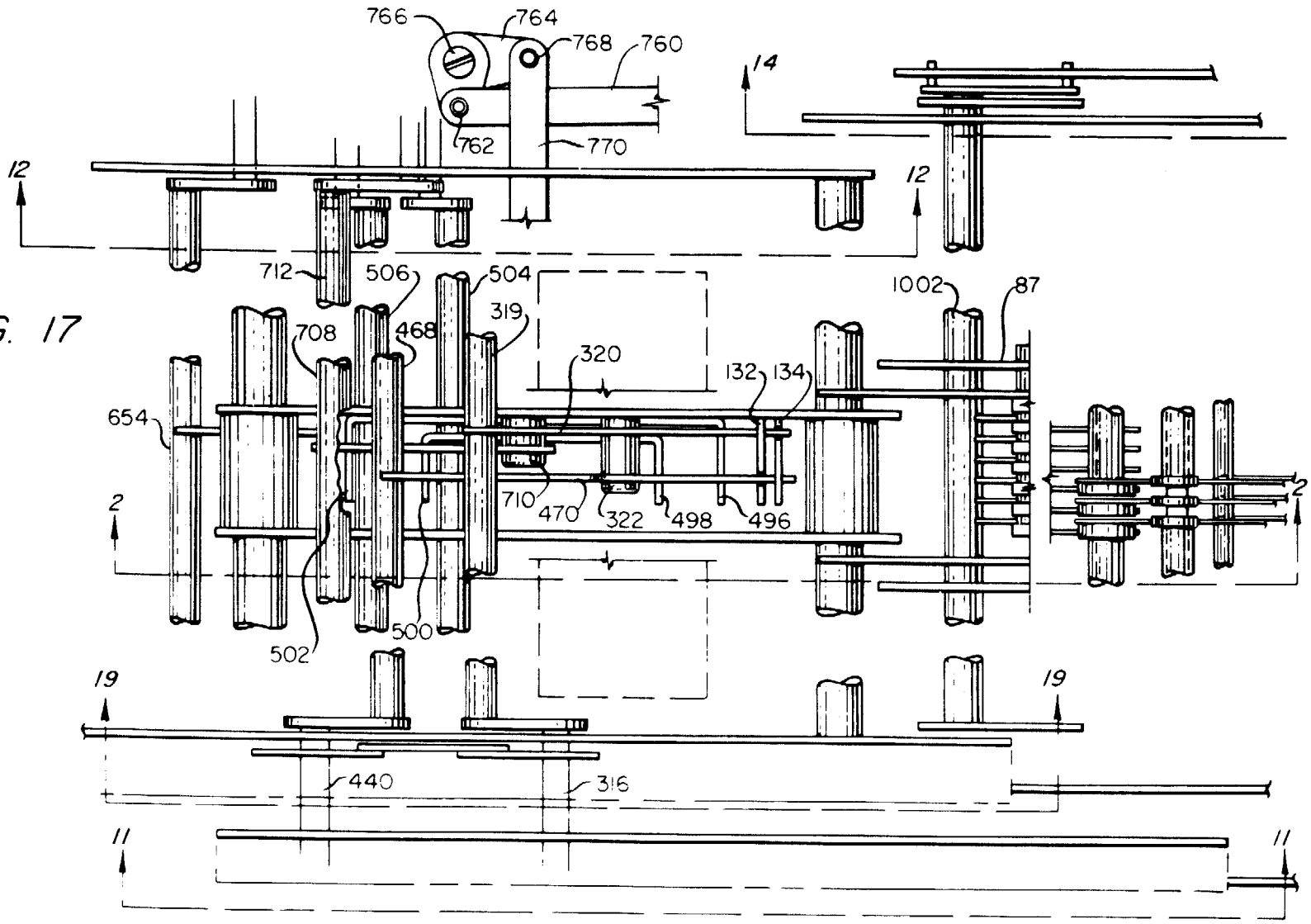
Figure 19:
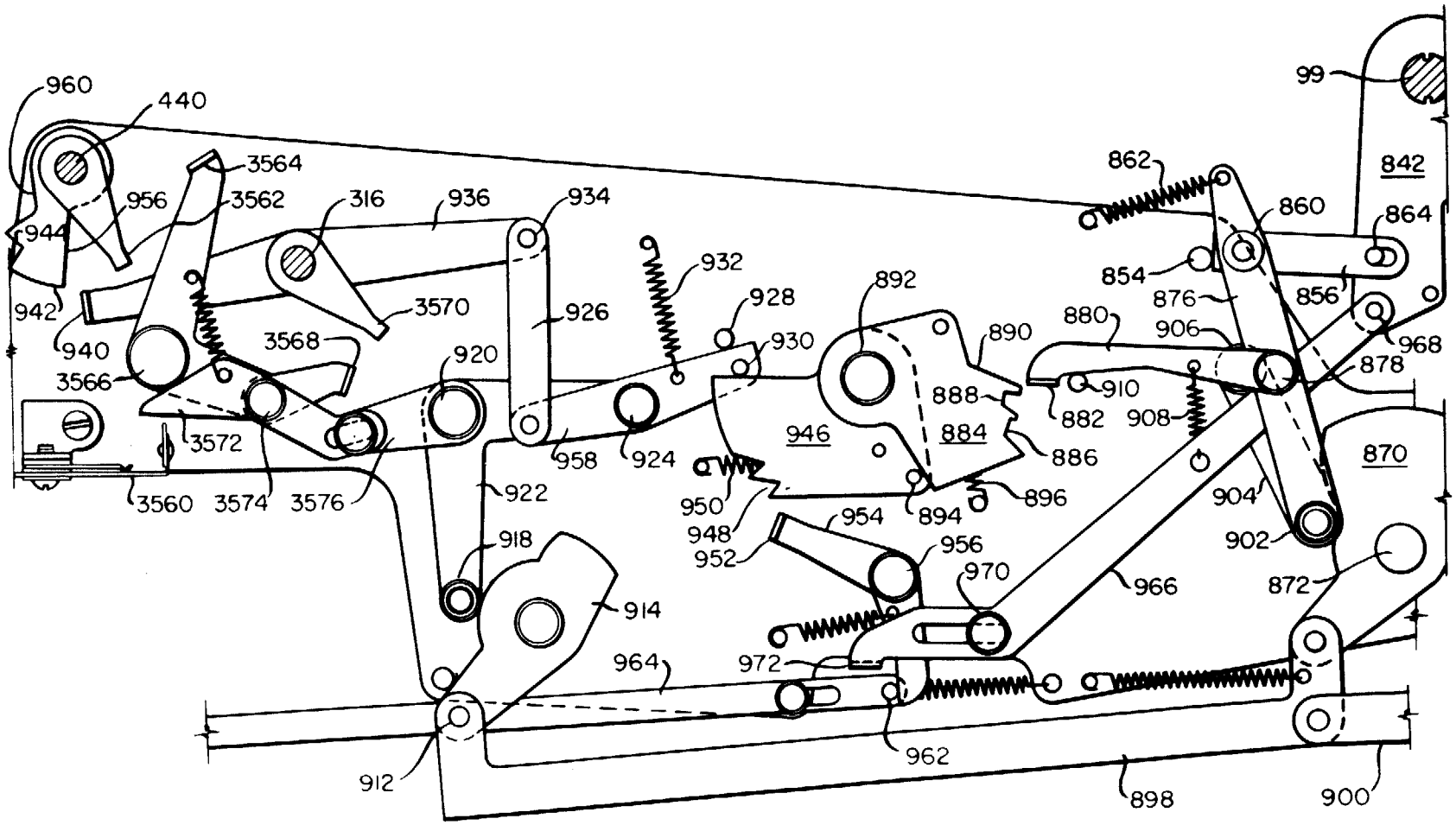
Figure 20:
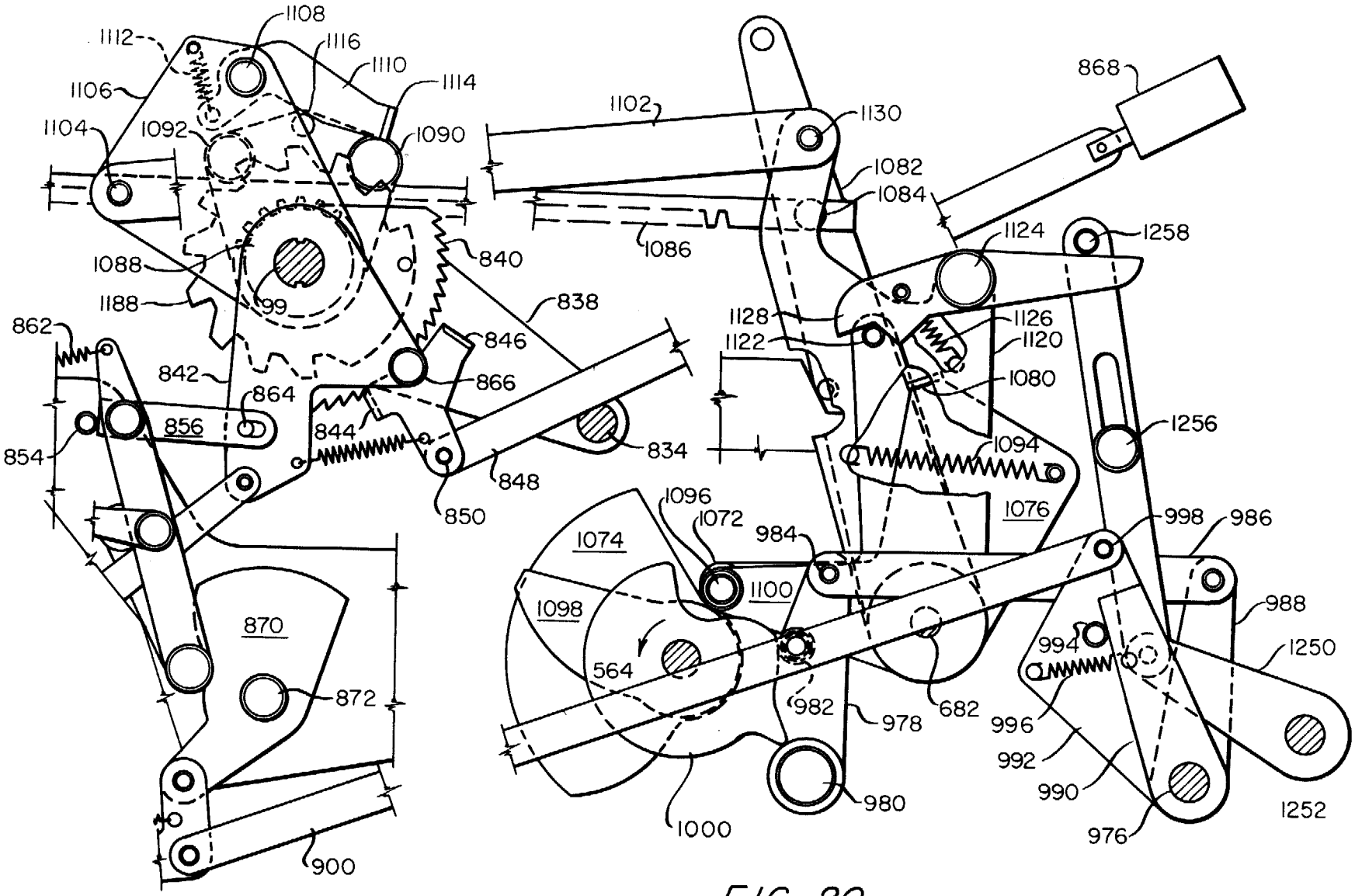
Figure 21:
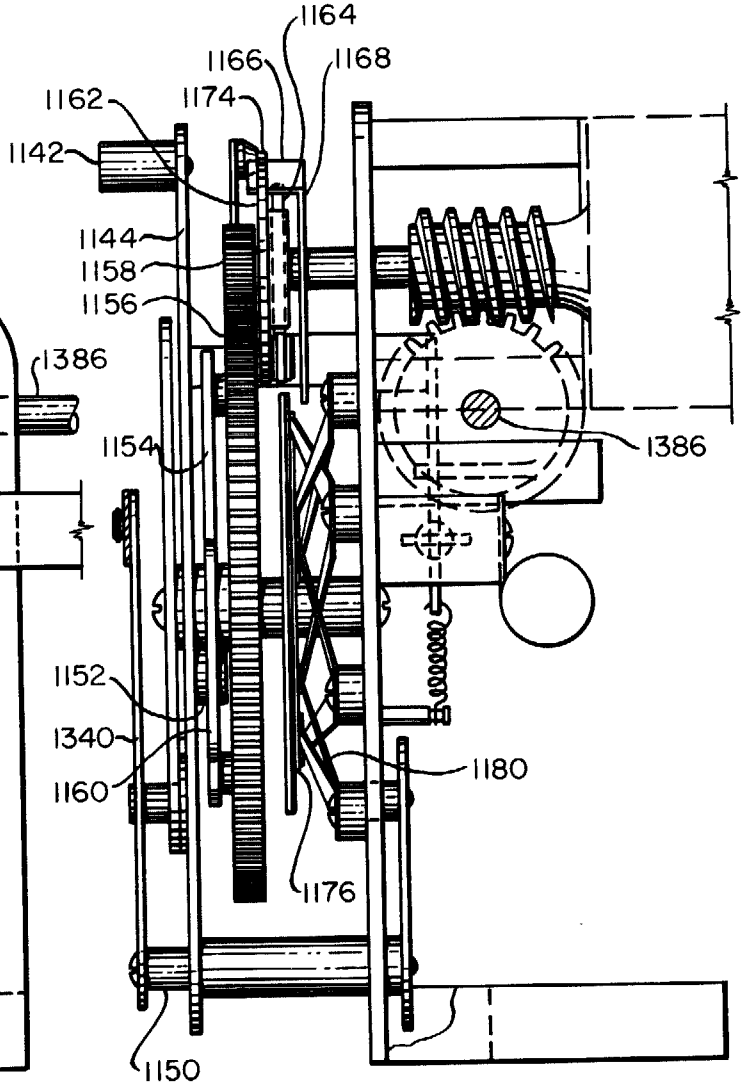
Figure 22:
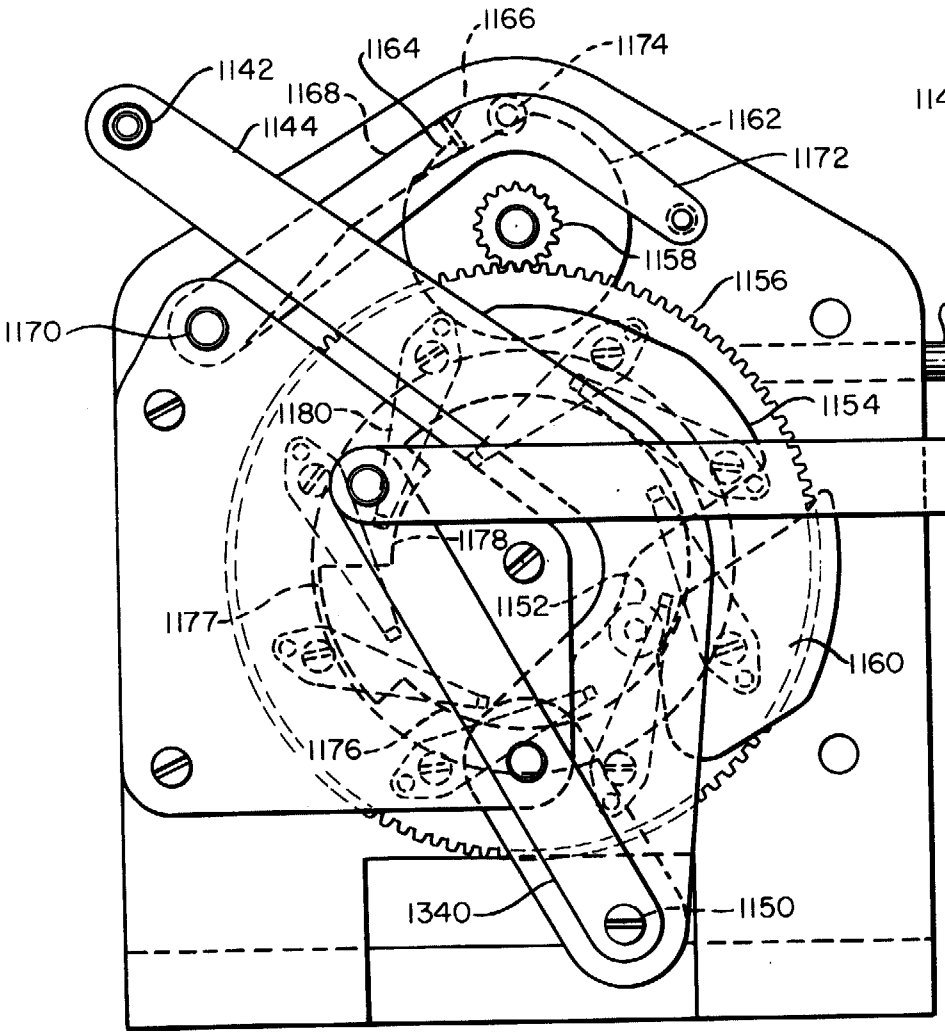
Figure 23:
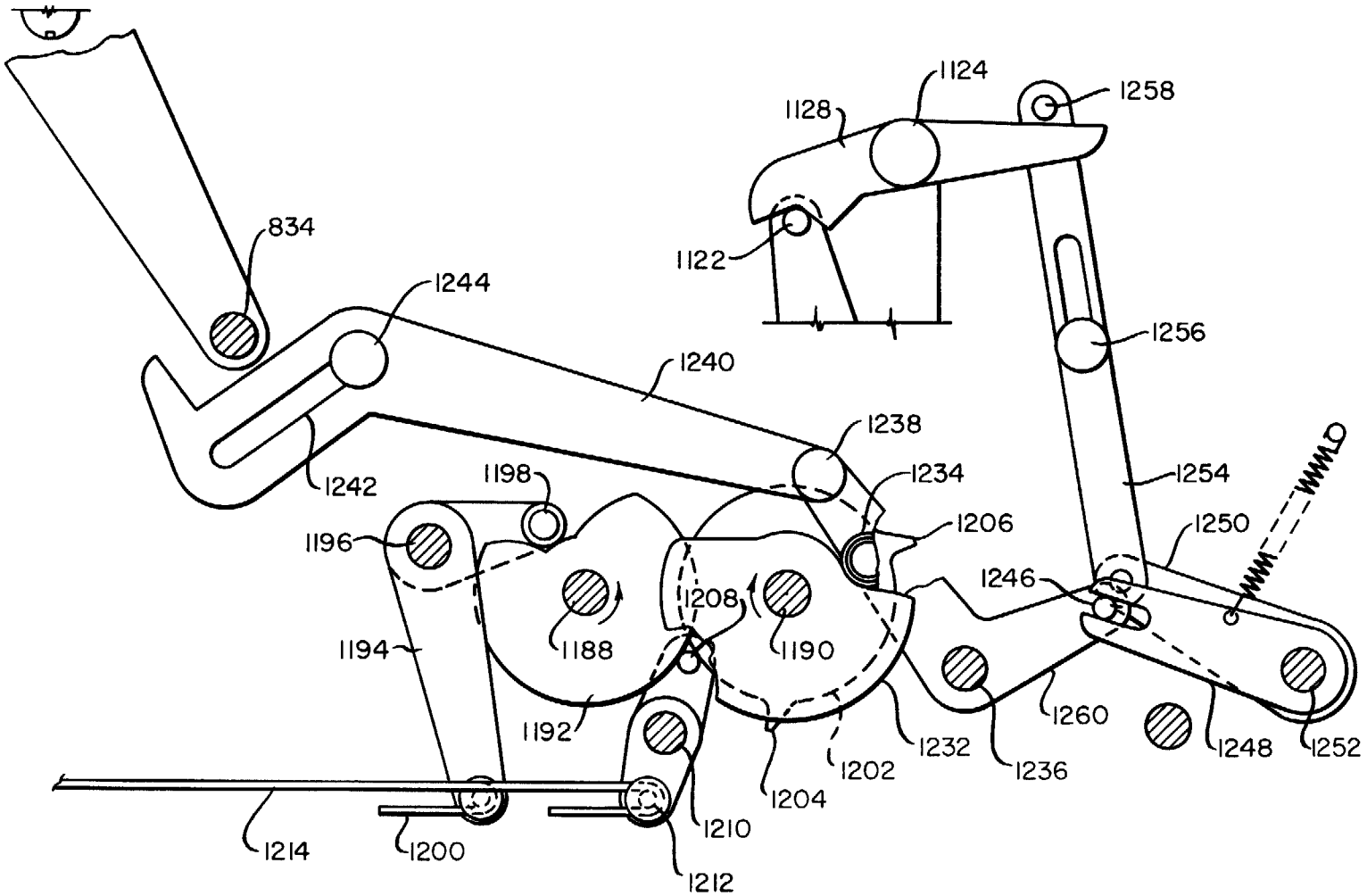
Figure 24A:
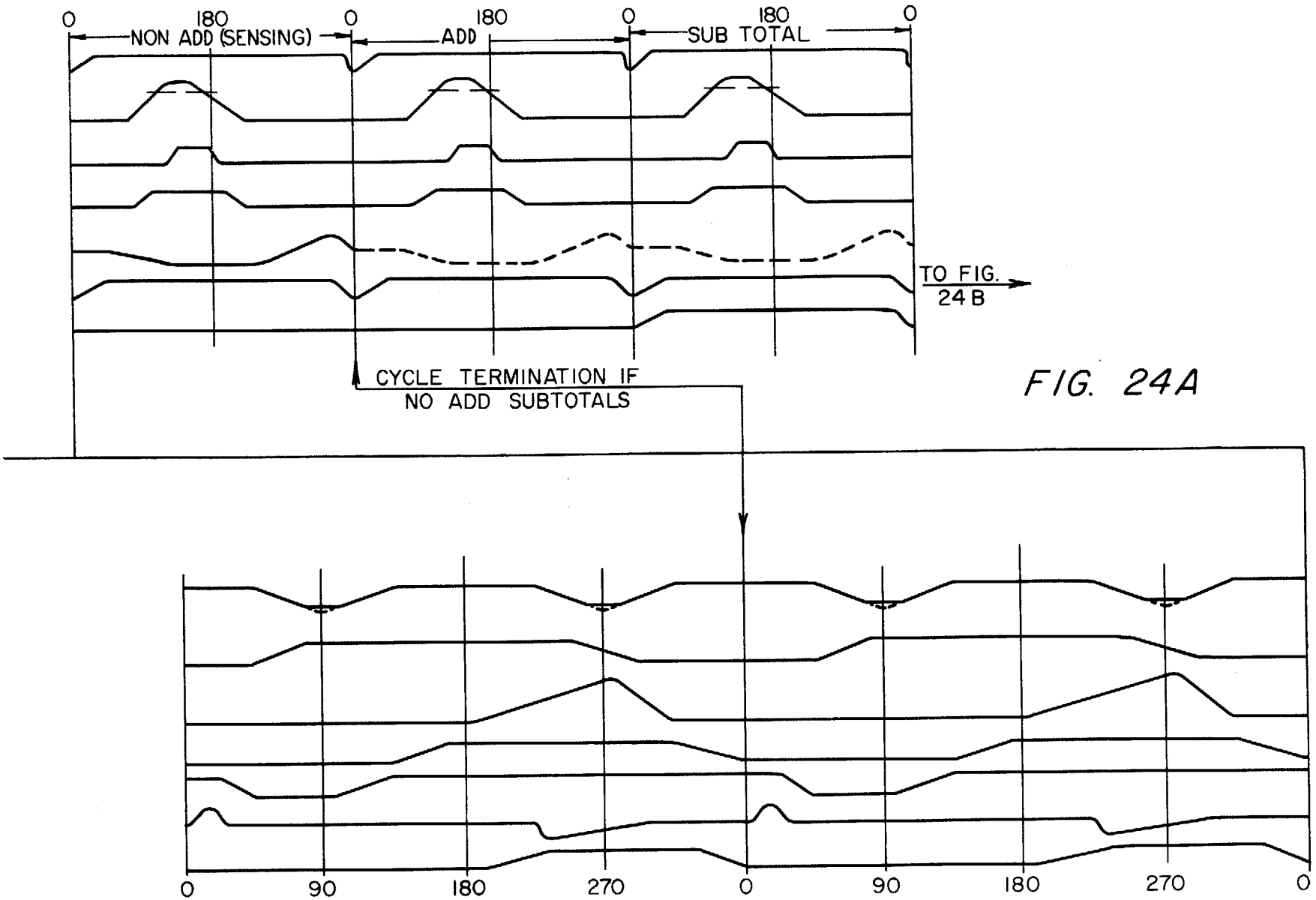
Figure 24B:
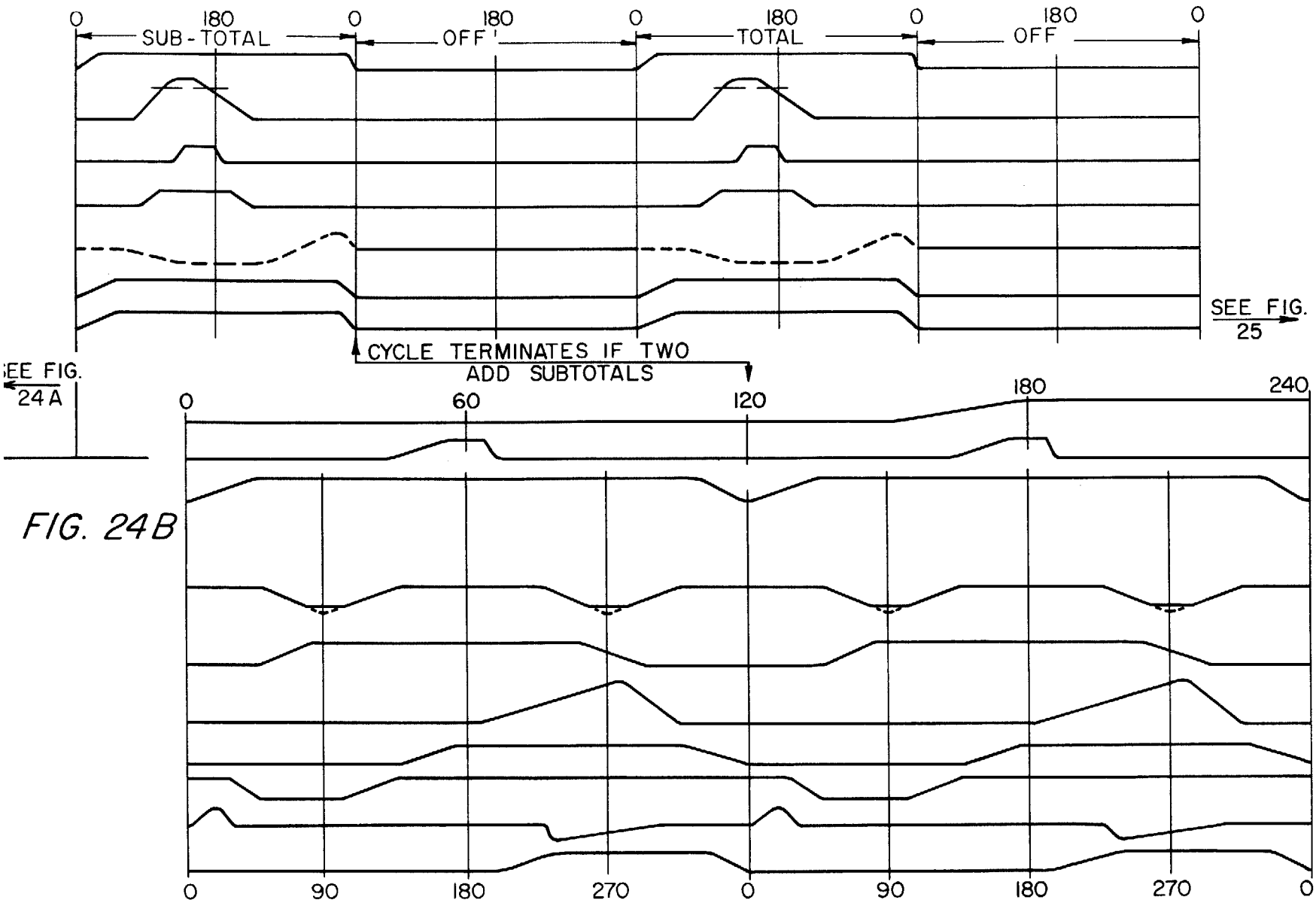
Figure 25:
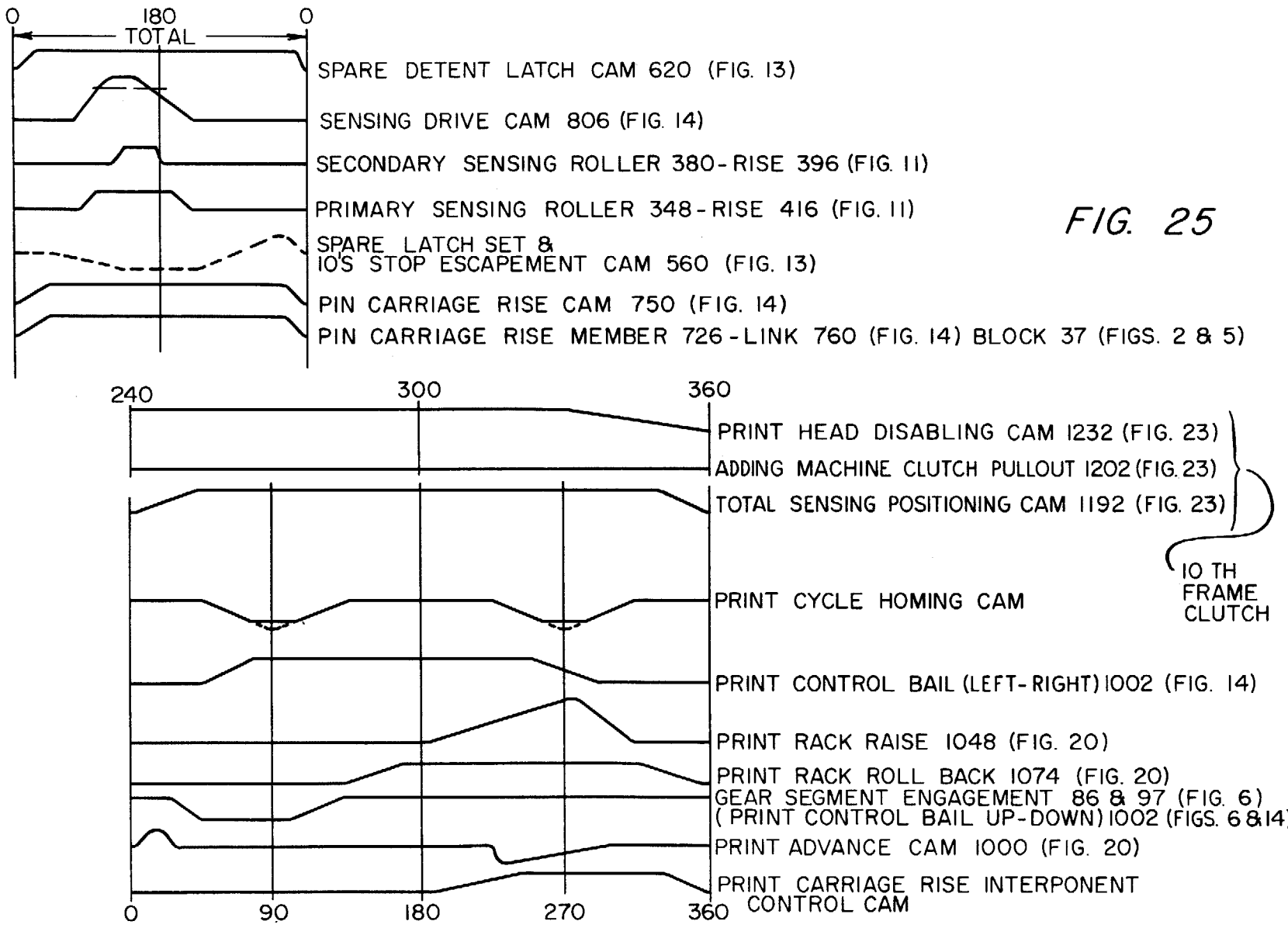
Figure 26:
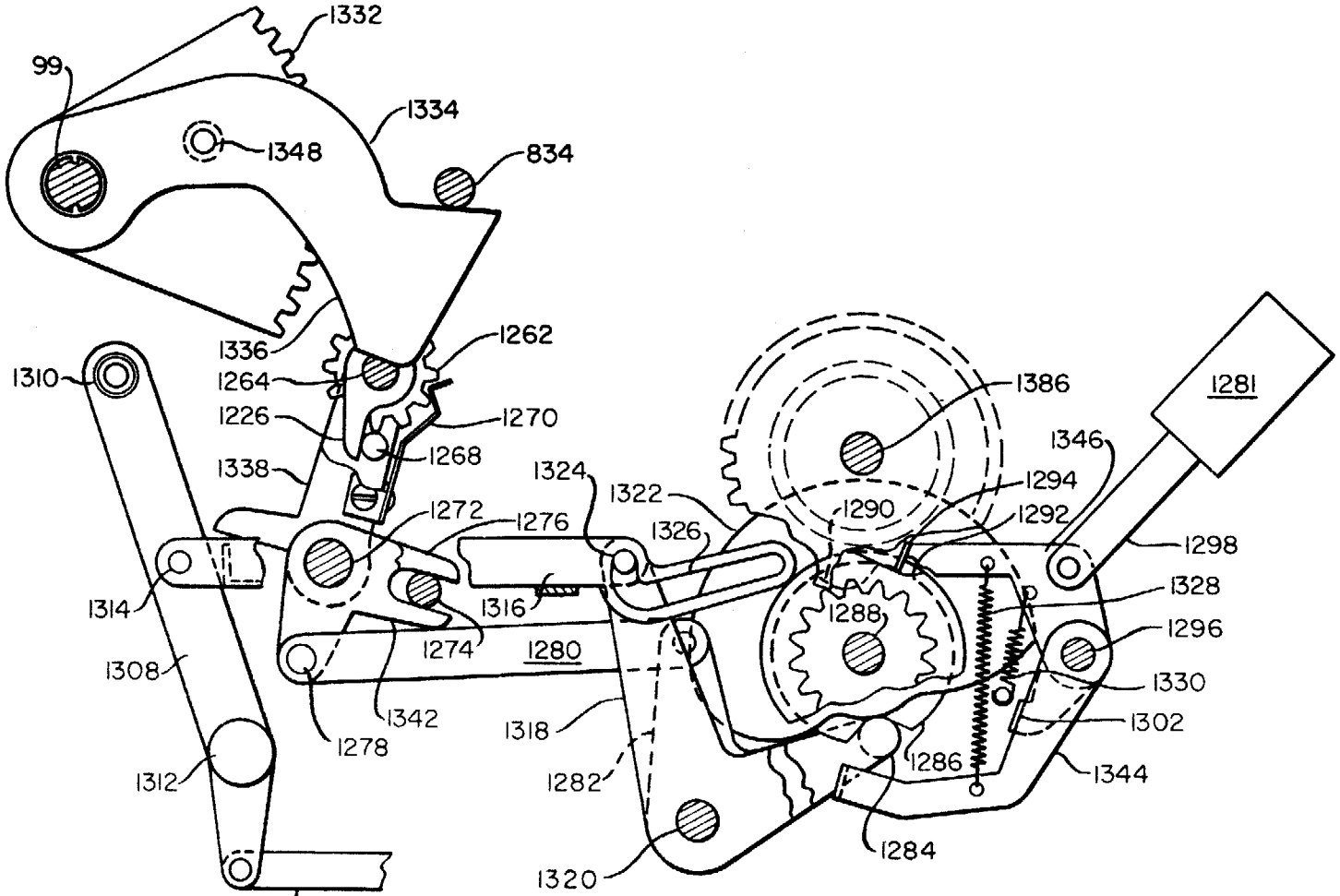
Figure 28:
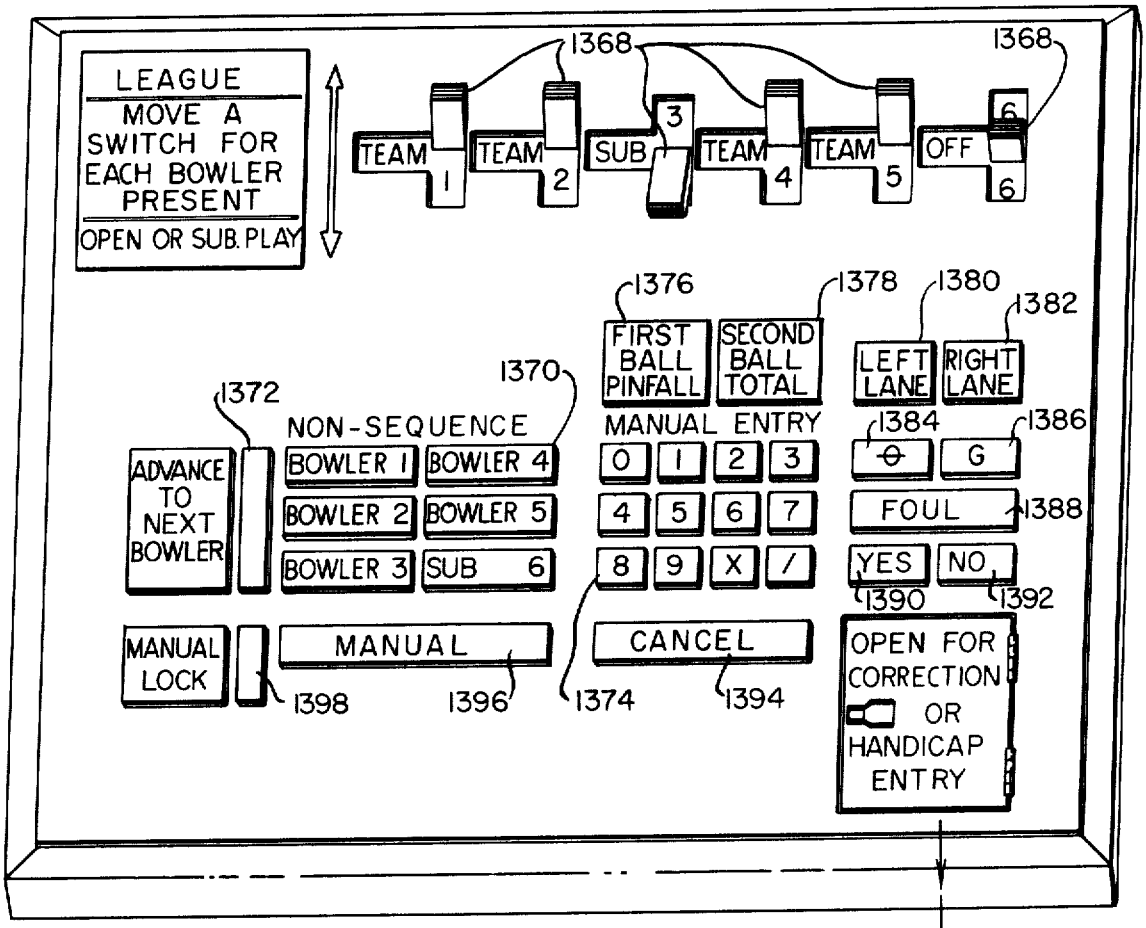
Figure 27:
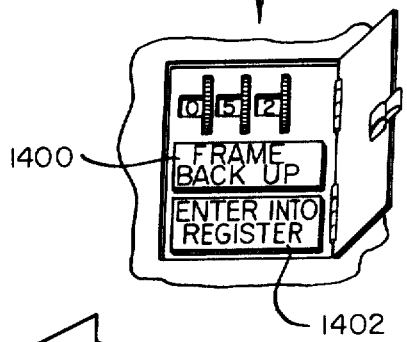
Figure 27:
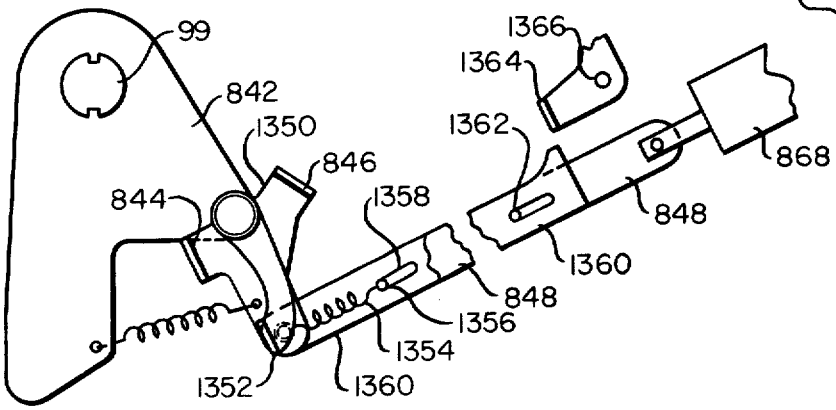
Figure 29A:
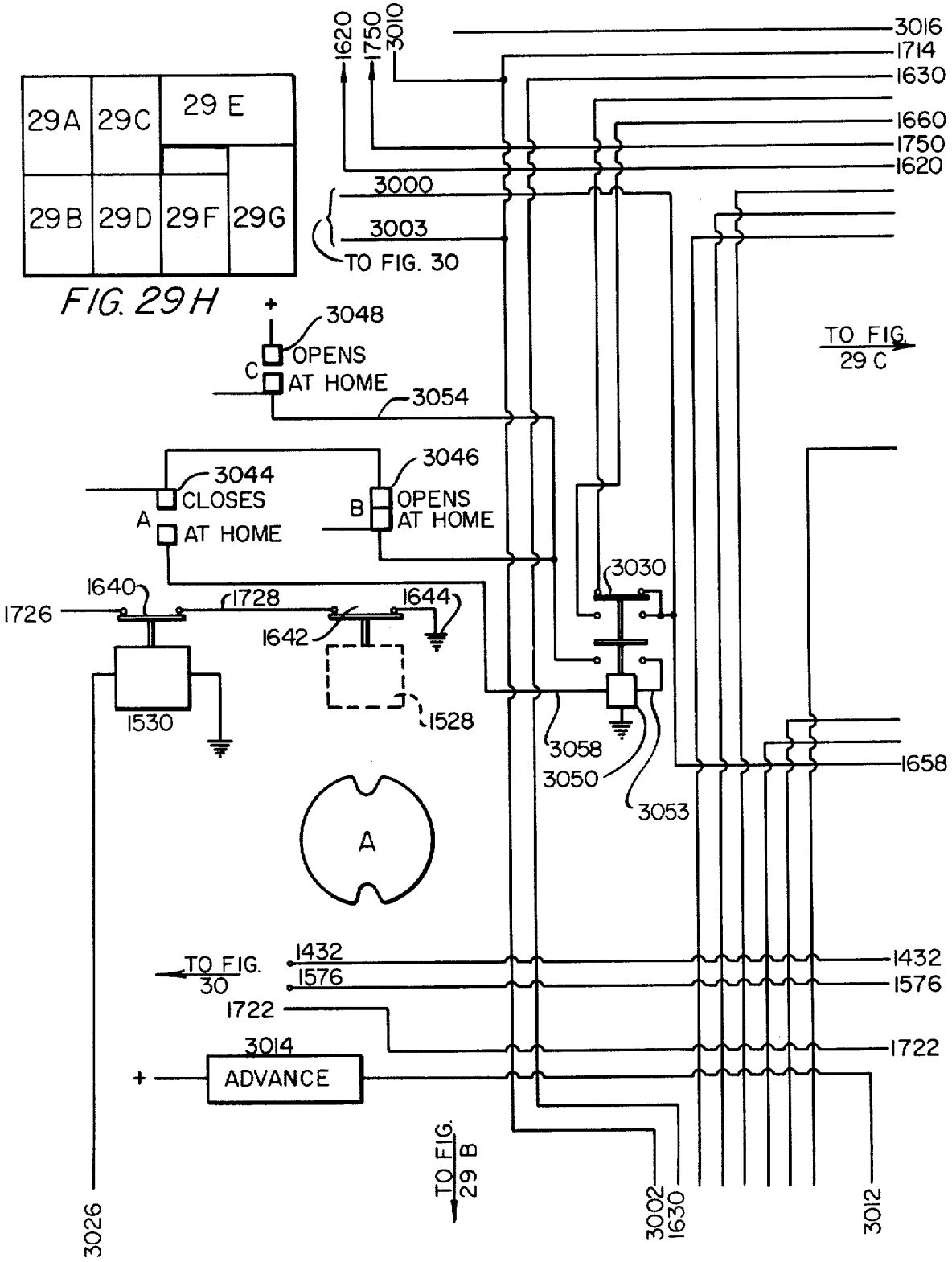
Figure 30:
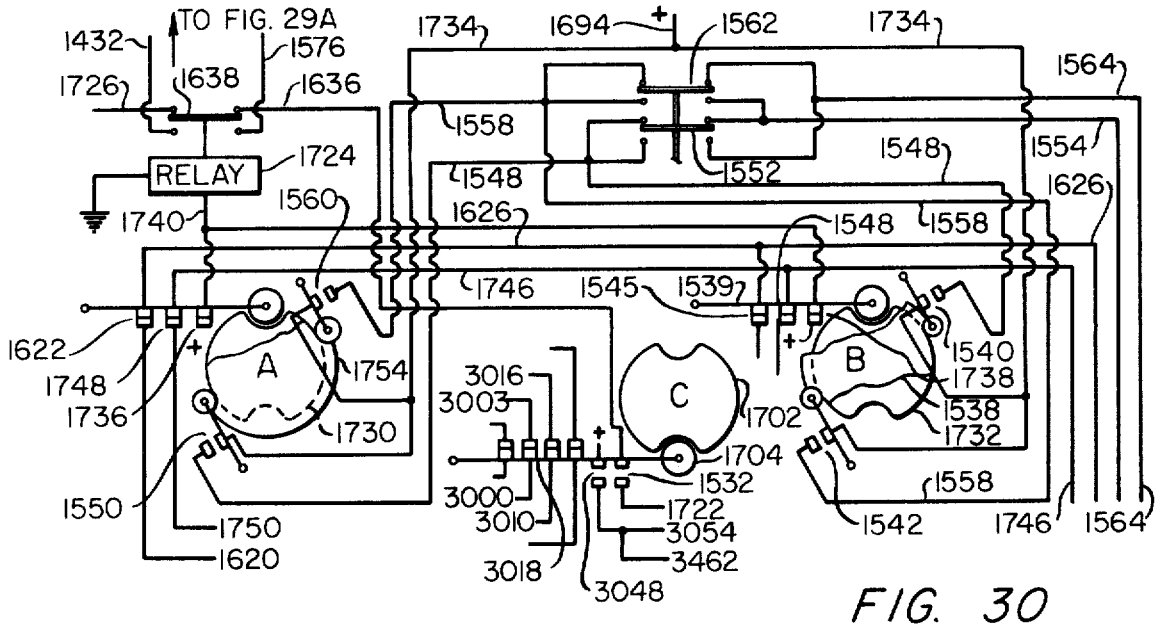
Figure 36:
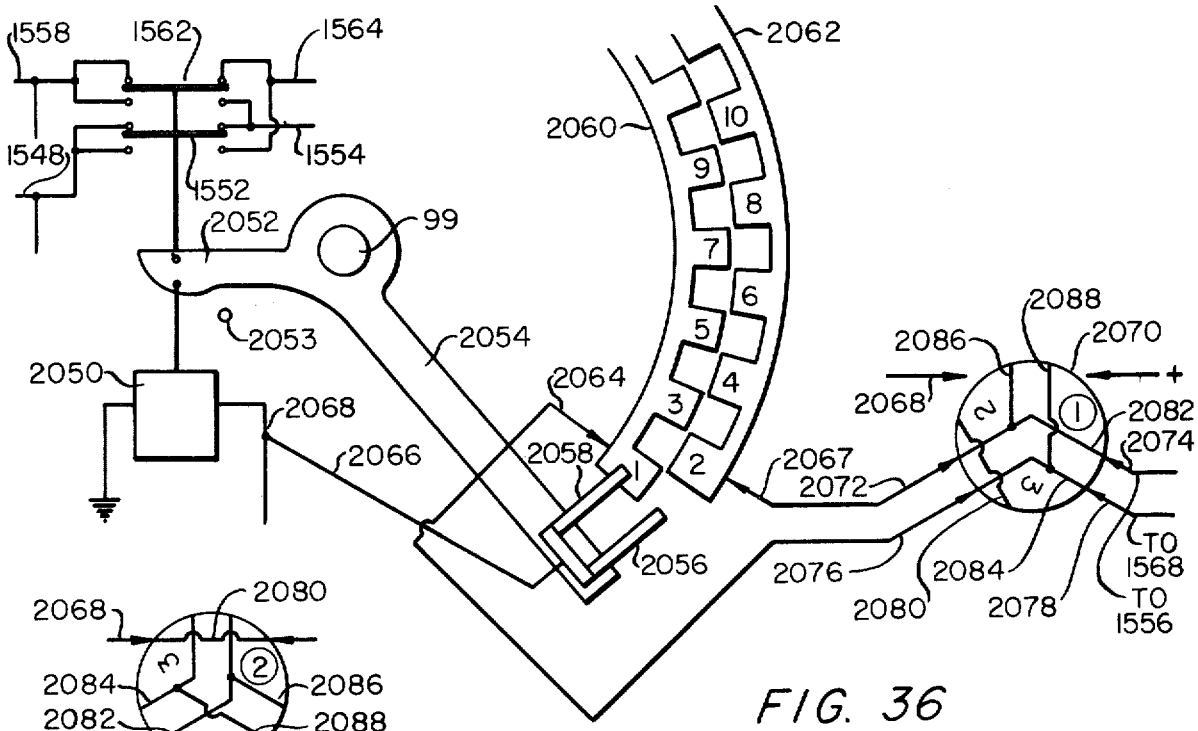
Figure 37:
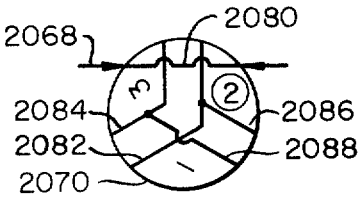
Figure 38:
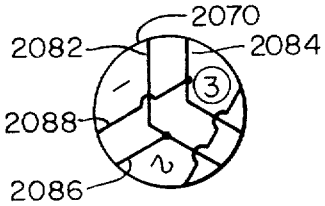
Figure 31:
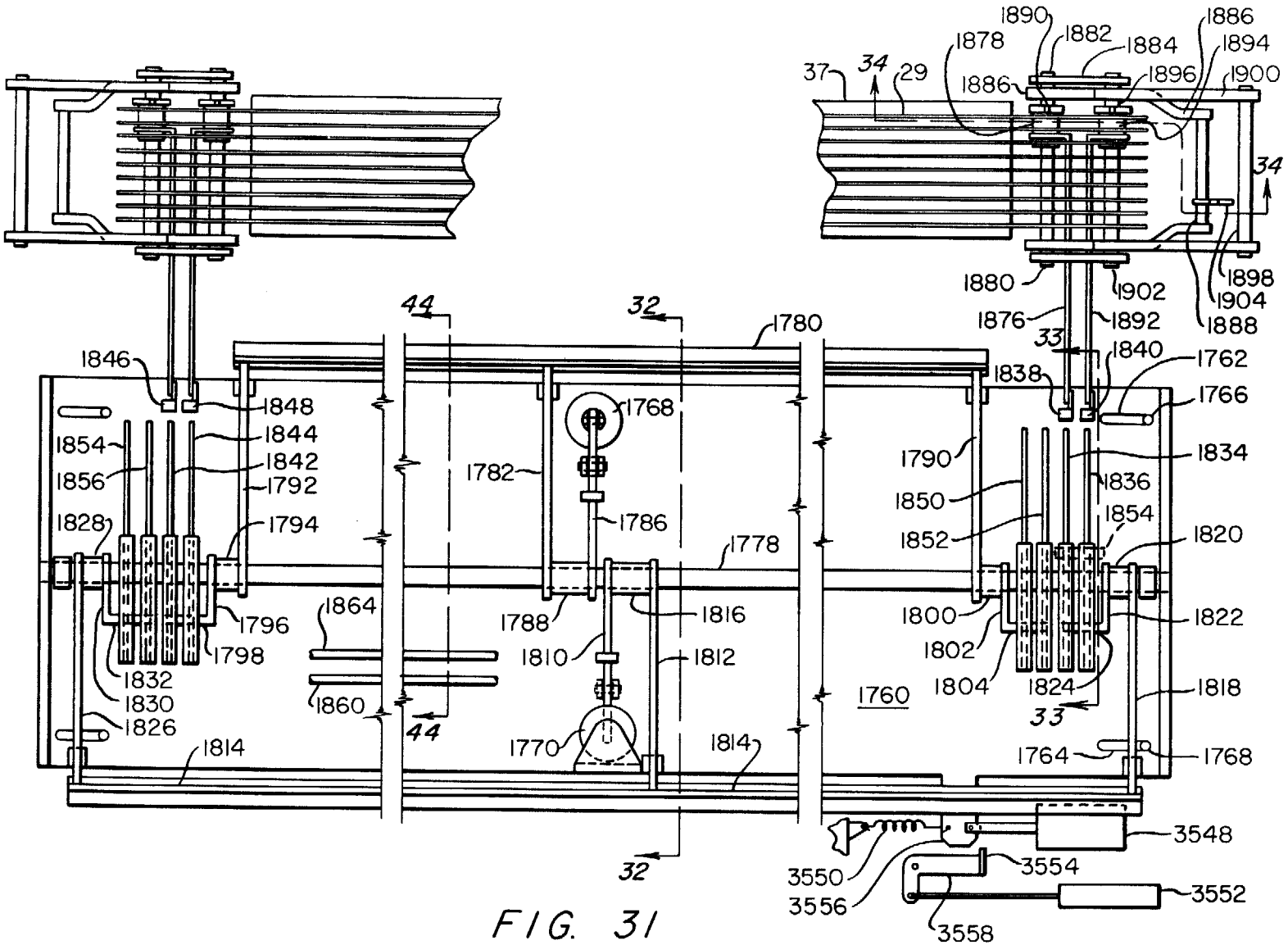
Figure 32:
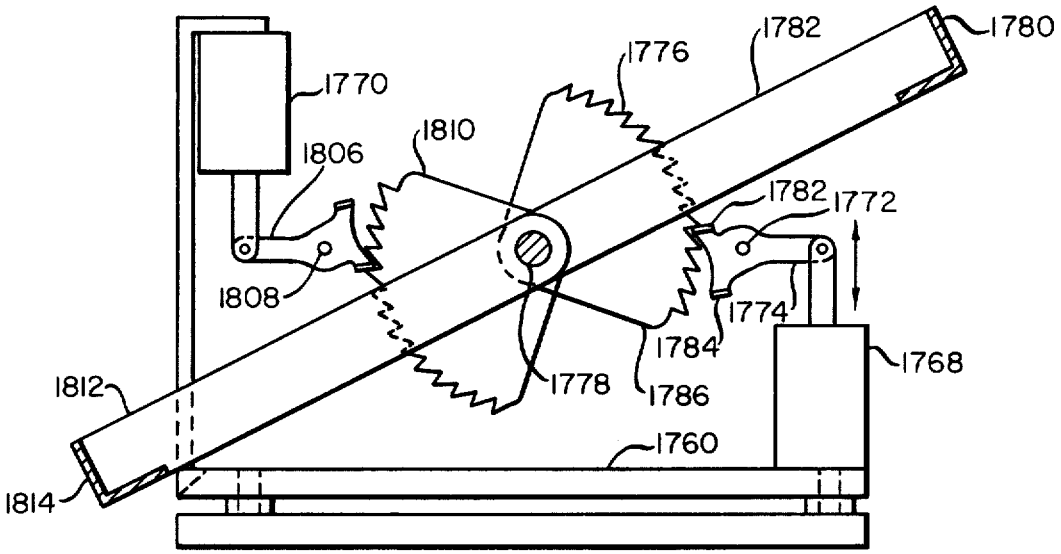
Figure 33:
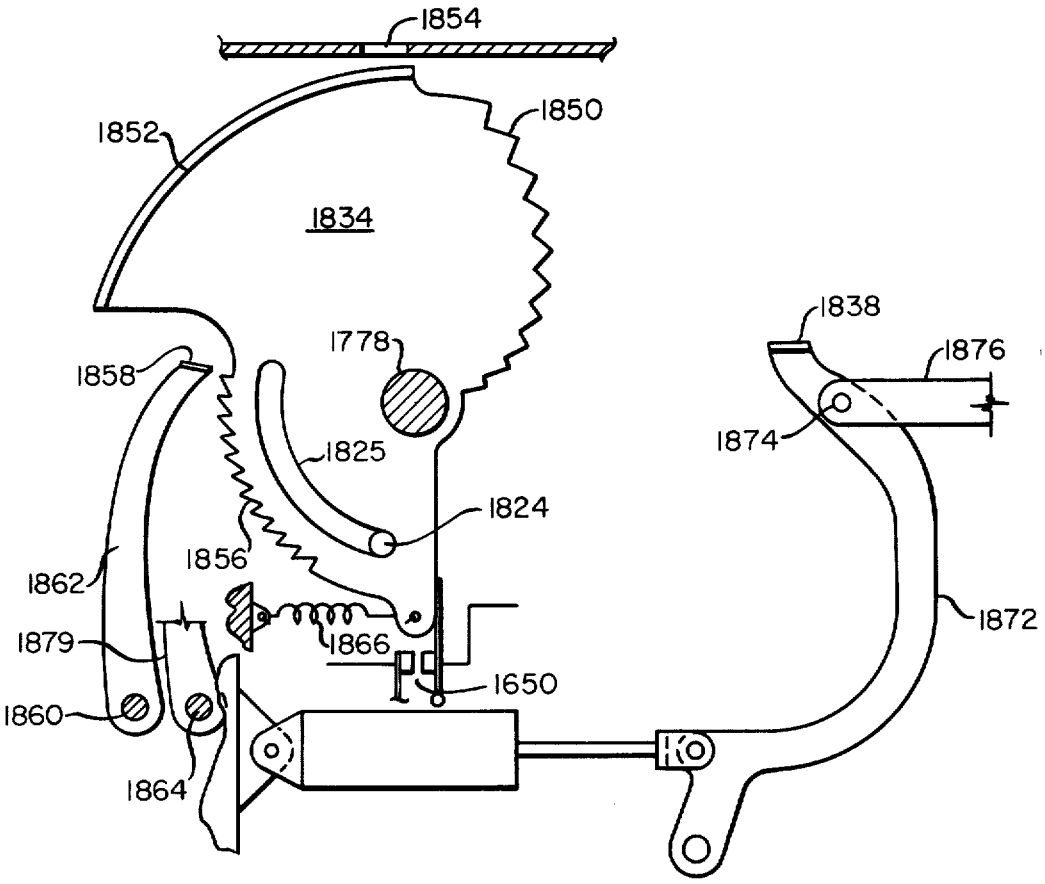
Figure 34:
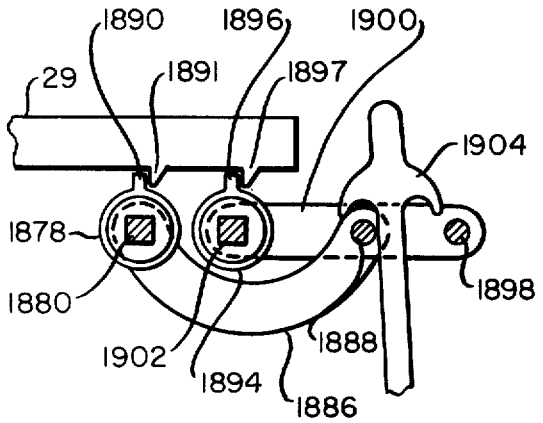
Figure 35:
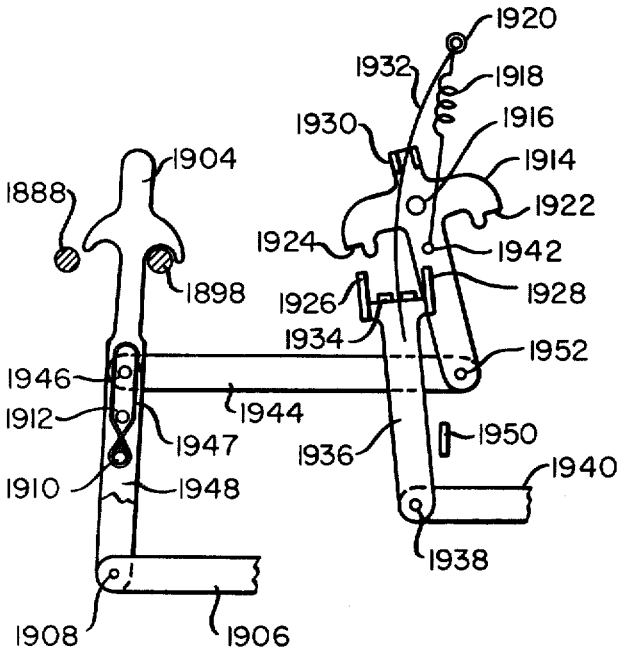
Figure 42:
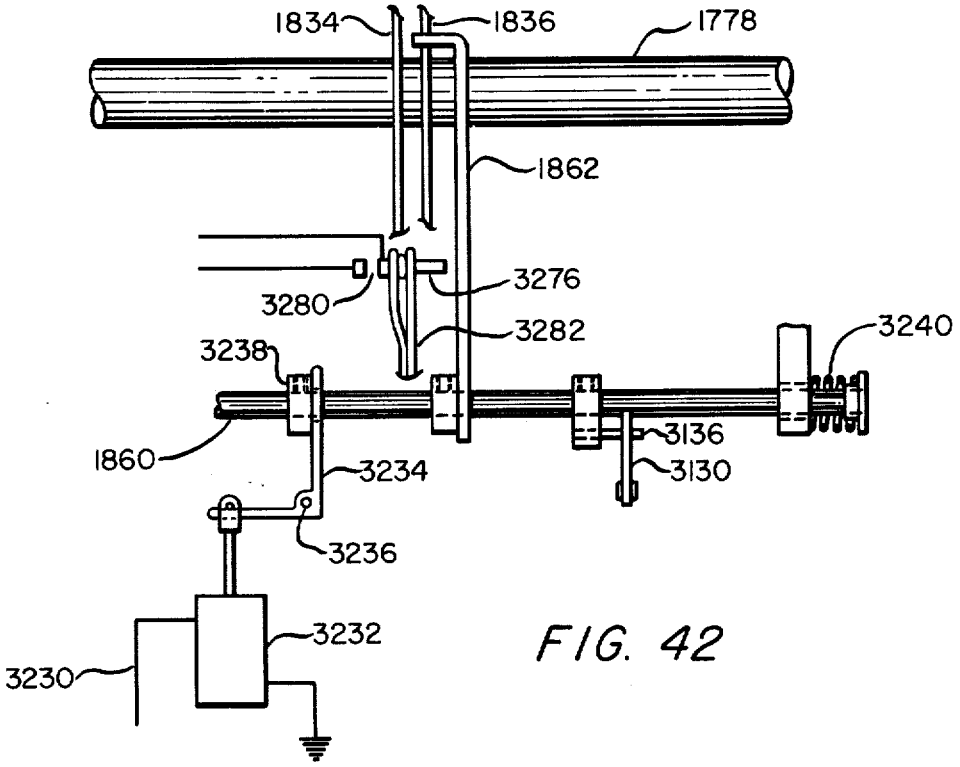
Figure 44:
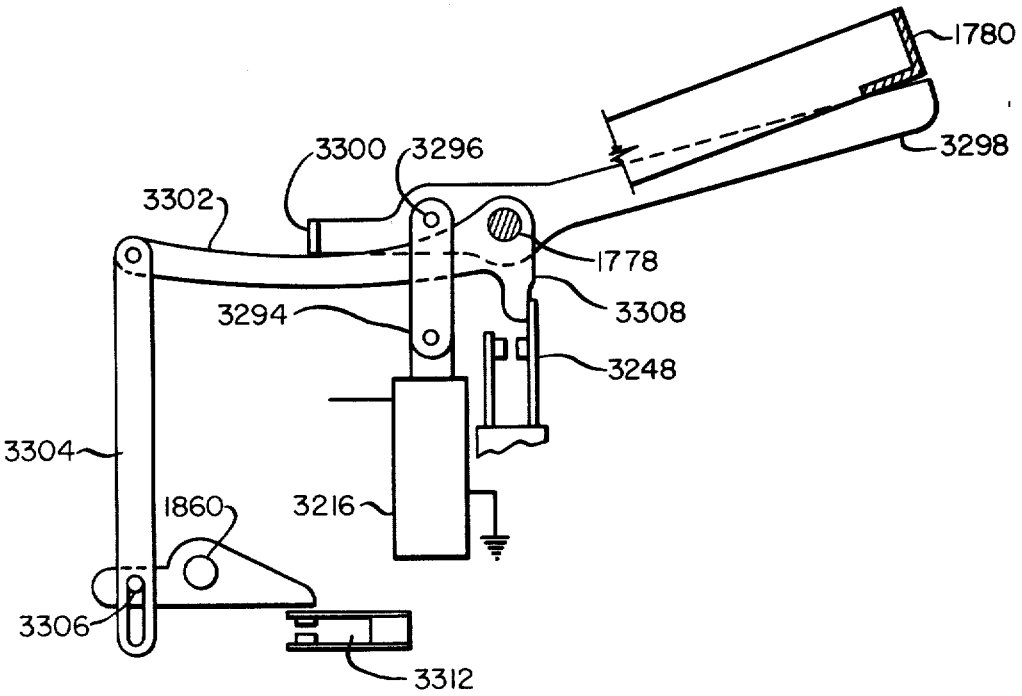
Figure 45:
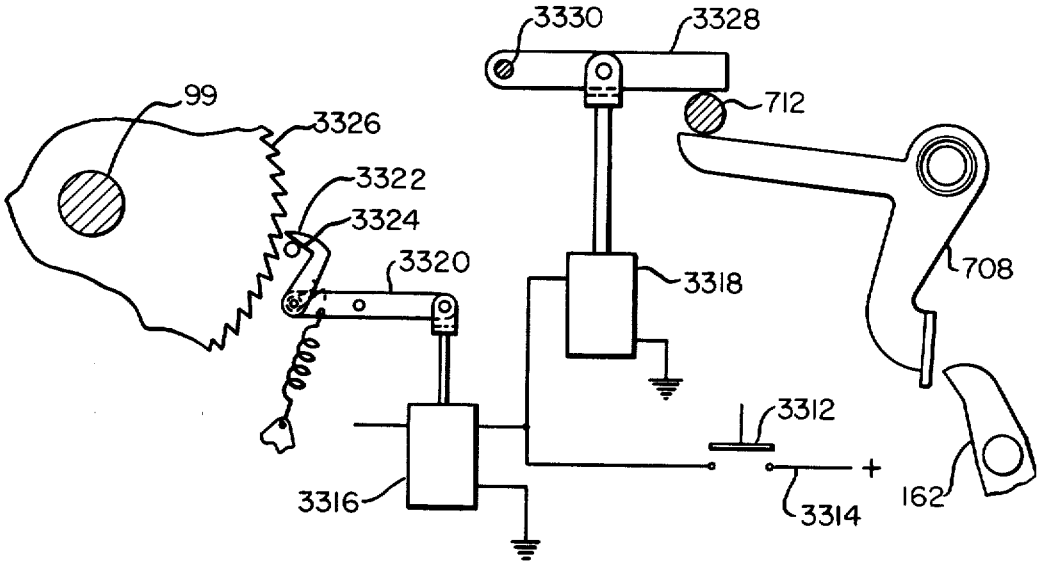
Figure 46:
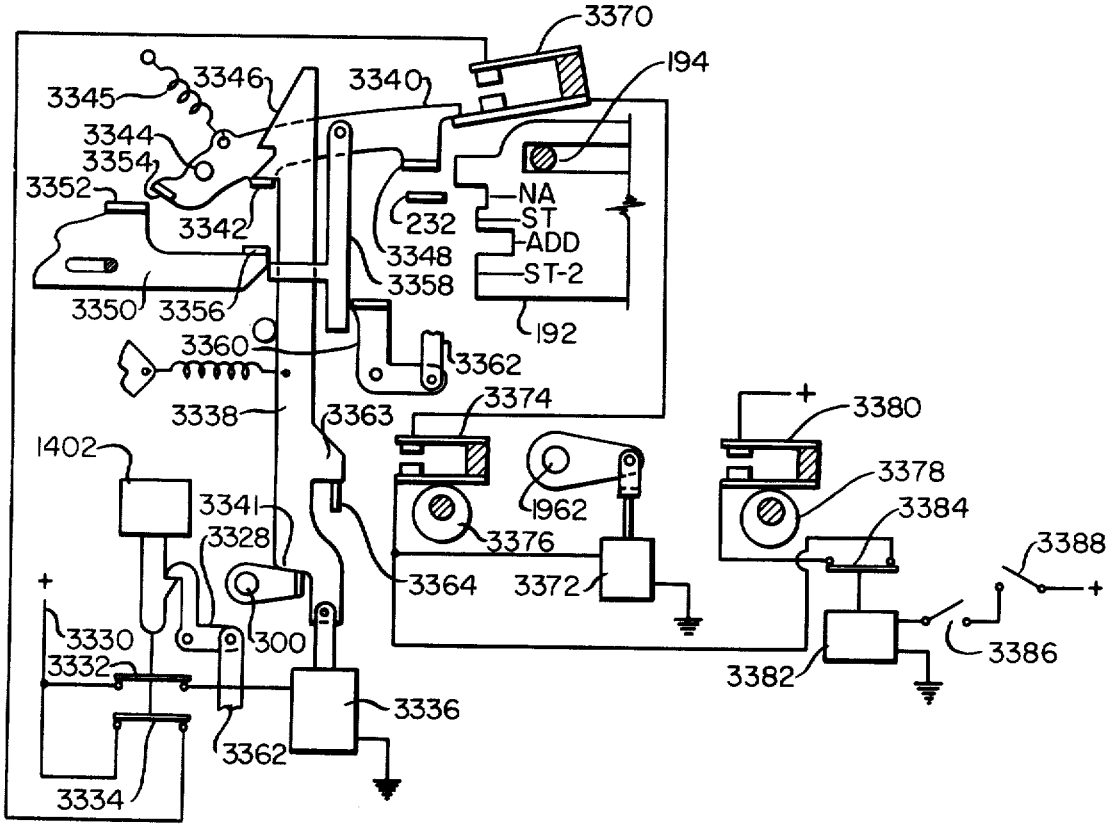
Figure 48:
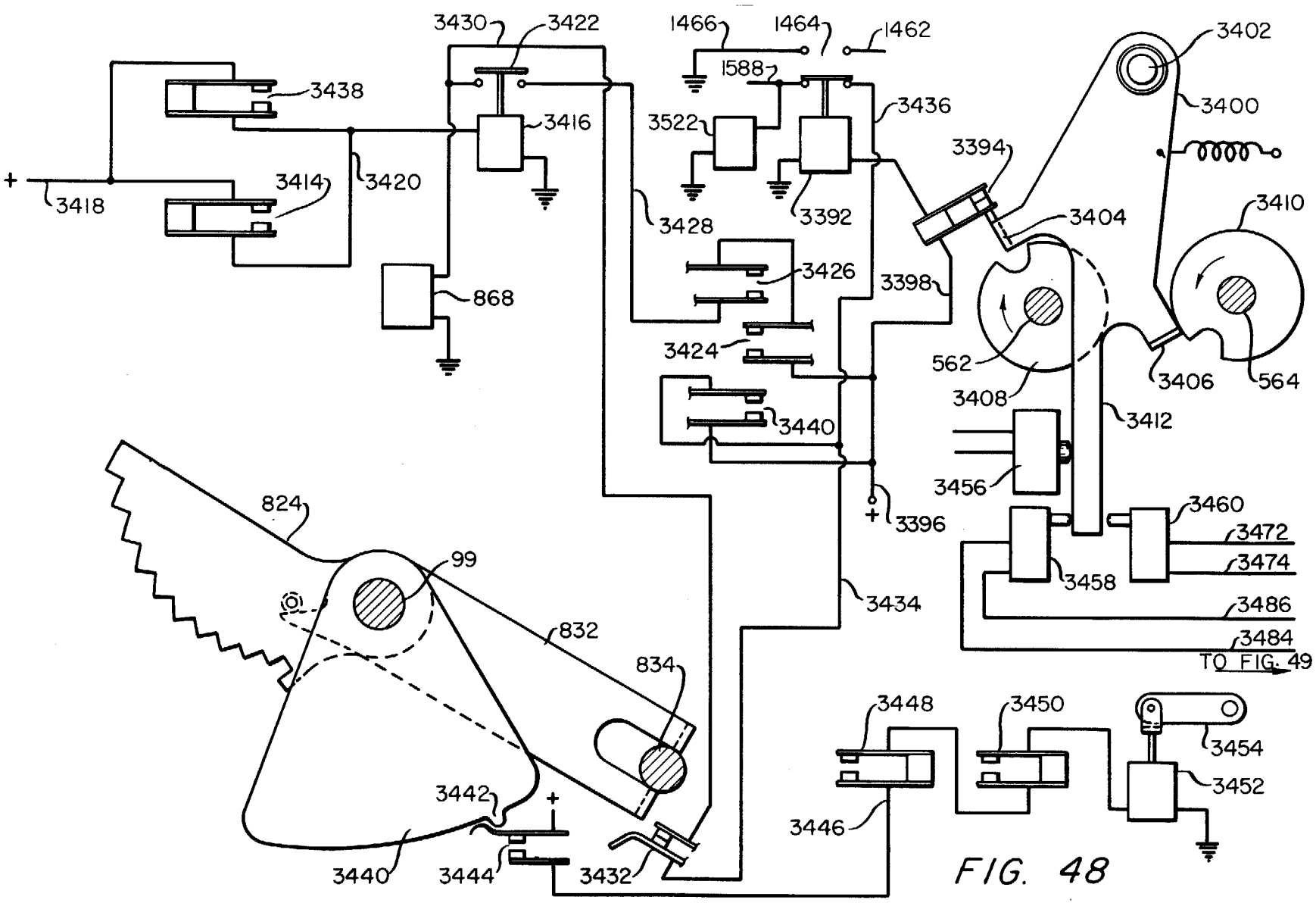
Figure 49:
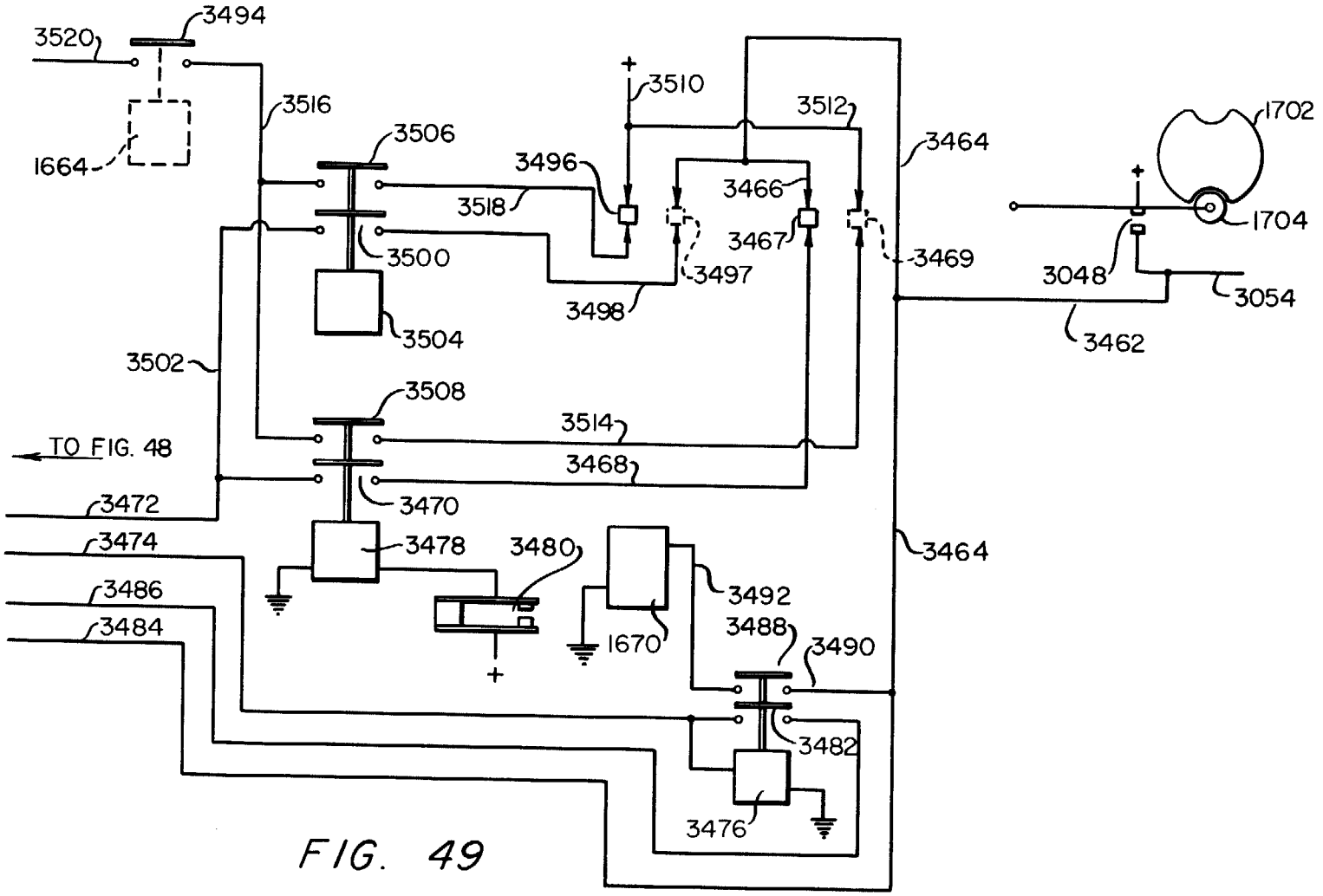
Figure 50:
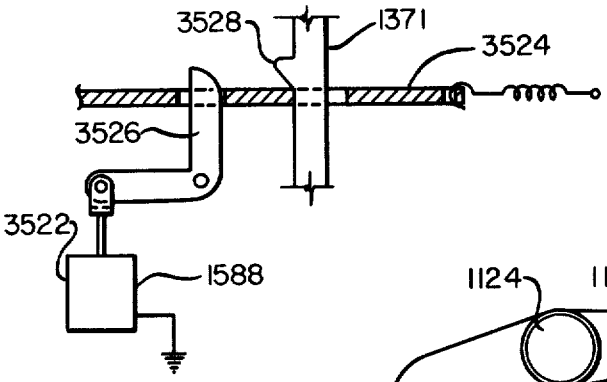
Figure 51:
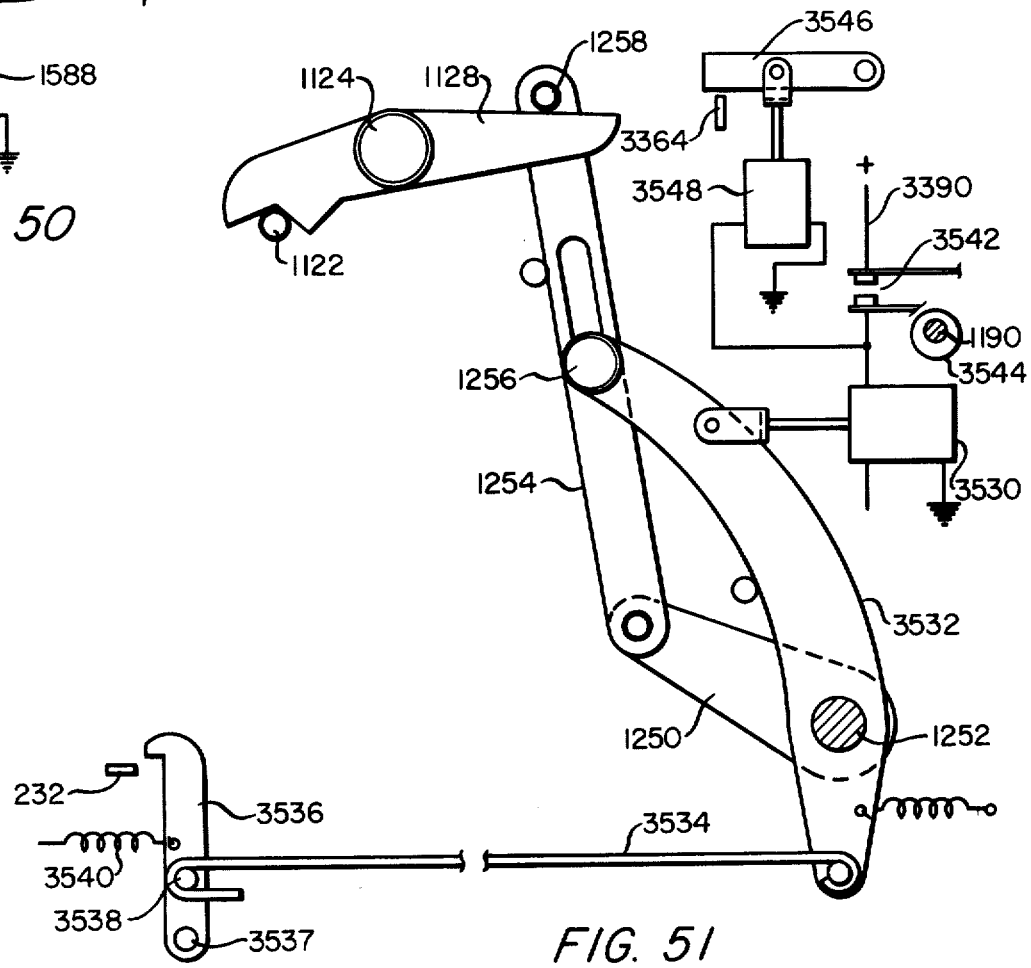
Figure 52:
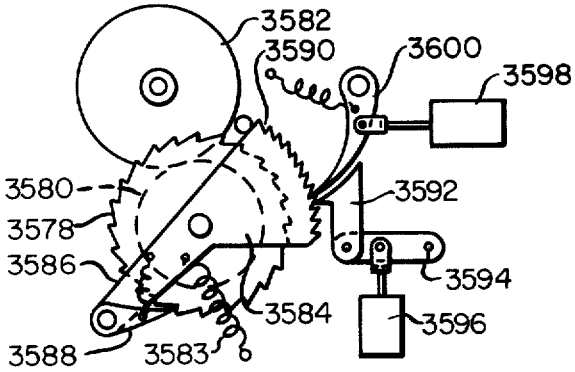
Figure 53A:
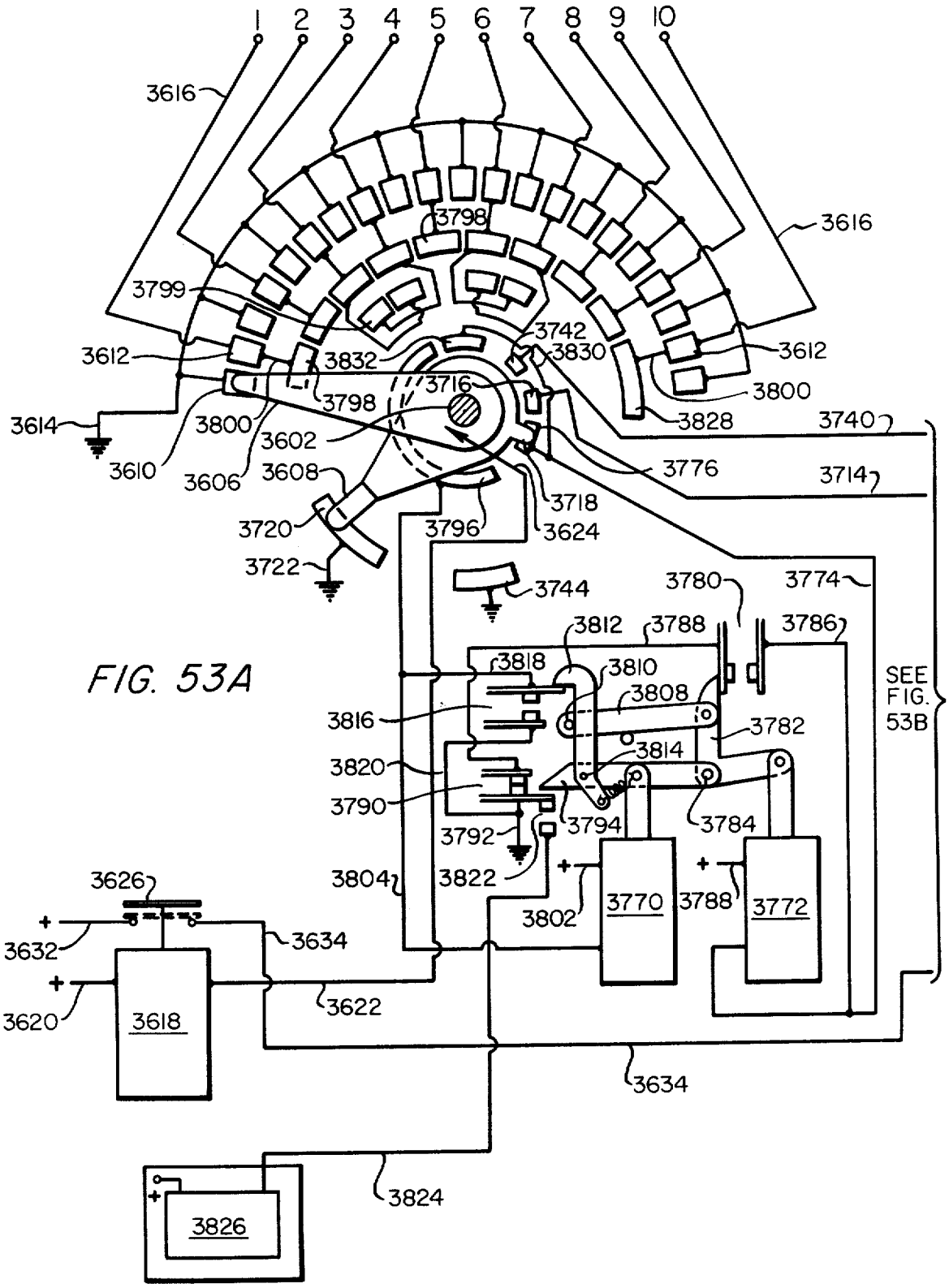

FIG. 14 likewise shows an assembly for controlling the cyclic operation of the machine and is generally taken along the line 14—14 of FIGS. 7, 13 and 17;

FIG. 15 is an enlarged elevational view showing the racks associated with one bowler position;

FIG. 16 shows additional cyclic control means which are operatively connected to the mechanisms shown in FIG. 12;

FIG. 17 is a plan view of a portion of the machine;

FIG. 18 shows the special information rack control;

FIG. 19 shows the means for providing incremental movement to control printing of score values in the proper position;

FIG. 20 likewise shows an additional assembly for controlling the printing position;

FIG. 21 is a side elevational view of the assembly for positioning the print carriage to the proper bowler;

FIG. 22 is a front view of the assembly shown in FIG. 21;

FIG. 23 shows an assembly for controlling tenth frame cycling of the machine;

FIGS. 24A, 24B and 25 show timing charts for the various cams, sensing elements and other controls;

FIG. 26 shows a frame count member for the individual bowlers;

FIG. 27 shows a modification of the latch release means shown in FIG. 20;

FIG. 28 is a plan view, partly in perspective, of a keyboard and programming unit in accordance with the present invention;

FIGS. 29A, 29B, 29C, 29D, 29E, 29F and 29G are a circuit diagram of a programming unit in accordance with the present invention;

FIG. 29H, schematically shows the relationship of FIGS. 29A-29G;

FIG. 30 shows a circuit for alternating the lane sequencing for team bowling;

FIG. 31 is a plan view of means for providing input of information from either lane to two adjacent machines;

FIG. 32 is a view of the information entry means taken substantially along the line 32—32 of FIG. 31;

FIG. 33 is the information transfer assembly for transferring the information to a related scoring apparatus taken substantially along the line 33—33 of FIG. 31;

FIG. 34 is an enlarged view taken along the line 34—34 showing the assembly for moving the slides of the scoring apparatus;

FIG. 35 shows a bistable element for controlling the entry of first or second ball information;

FIG. 36 shows means for controlling the entry of information in the proper lane when a bowler comes in late and catches up using the lanes previously followed by his teammates;

FIG. 37 shows the control element of FIG. 36 in a second position;

FIG. 38 shows the control element of FIG. 36 in a third position;

FIGS. 39A-D show the keyboard circuitry for pinfall entry and pinfall display;

FIG. 40 shows one position of the contact plates of FIGS. 39A-D;

FIG. 41 is a side view of means for controlling the entry of ball information;

FIG. 42 is a front view of the means for controlling the entry of ball information showing another portion of the same;

FIG. 43 shows additional mechanism associated with the ball information control;

FIG. 44 shows the mechanism for clearing entered pinfall information following entry into the calculating portion of the machine;

FIG. 45 shows mechanism associated with the frame back-up key used for correction;

FIG. 46 shows mechanism for entering the correct value into the corresponding register;

FIG. 47 shows the mechanism for controlling the block to allow rack excursion to be limited by the amount required to zero the registers;

FIG. 48 shows means for cycling and controlling the interdependent operations of the machine;

FIG. 49 shows means for controlling the processing of information by the auxiliary program unit;

FIG. 50 shows the lock plate mechanism for locking players' keys;

FIG. 51 shows mechanism for controlling printing of total team score at each successive bowler position;

FIG. 52 shows mechanism for temporarily storing mark count;

FIGS. 53A-B show a pinfall signal generating means adapted to be associated with a pinfall detection system; and FIG. 54 schematically shows a pinfall detection system.

GENERAL DESCRIPTION

A general description of the scoring procedure and also a general description of the machine for handling the automatic scoring and display will be given prior to the detailed description of the mechanism to accomplish the results.

As is well known in bowling, tenpins are set up on a lane at the start of a game and each bowler is allowed to roll two balls in an attempt to knock all of the pins down. After a bowler has thrown two balls, he has completed what is known as a frame, and the completion of ten frames constitutes one game. If a bowler knocks all ten pins down on his first throw, this is known as a strike and a strike completes a frame. If a bowler knocks down all ten pins with two balls, this is known as a spare and also completes a frame. If any remain standing after throwing the second ball, this is known as a miss and a miss completes a frame.

After a bowler has thrown two balls or has knocked down all of the pins on the first ball, then ten pins are again set up on that lane for the next bowler or for the same bowler to continue his game in the following frame.

In scoring, a strike counts ten plus the total number of pins made in the next two balls. A spare counts ten plus the number of pins downed by the next first ball. A miss counts only the number of pins down by both balls. These scores are accumulated as the game progresses and the total accumulated score at each frame is recorded. The apparatus described in my application Ser. No. 697,632, and the continuation thereof above, and the present apparatus automatically maintain the score and are adaptable to printing and displaying the score as soon as a frame is completed.

In team bowling, a team consists of five players, and as one bowler completes a frame, the next bowler on that team completes the same frame. All five bowlers will normally complete a frame before the first bowler on the team starts the next frame. After completion of ten frames by each bowler, the game scores are accumulated and recorded. The apparatus described above prints the accumulated score so that after each man completes his score, the sum of the completed games is displayed, and after the last man on a team has bowled, the team score will be printed and displayed.

In certain league playe, handicaps are give to teams in accordance with the average of the team and such handicaps will be made part of the team's score to show, without further adjustment, which team is the winner. In the case of an absentee bowler, a substitute bowler may be used, but his score does not count in the team's total. In place of the actual score that the substitute bowler makes, there is added to the team's total the individual average of the absentee bowler. In other words, a substitute bowler's score must be kept as the game progresses in the same manner as other players, but at the termination of the game the actual score which the substitute bowler makes will not be added to the team'total.

Figure 1:
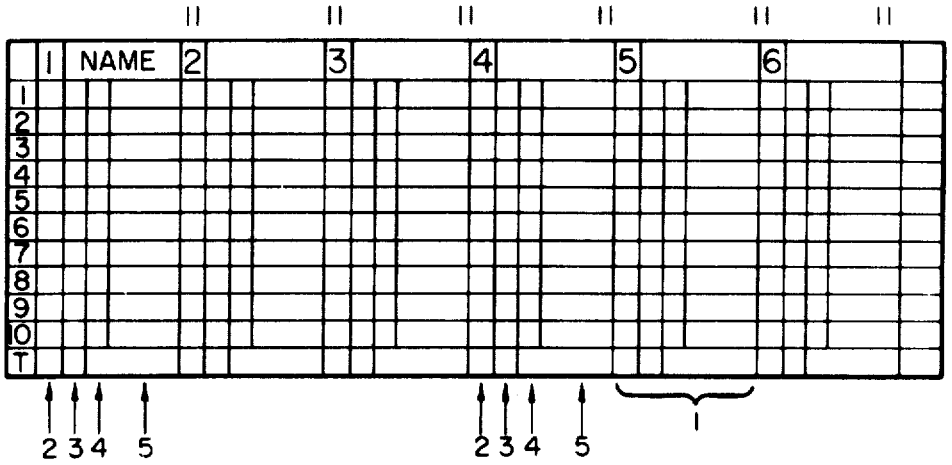
FIG. 1 shows the format of a score sheet used in the apparatus of the present invention.

The score sheet format of the present apparatus is shown in FIG. 1. There are vertical player columns 1 for six players. The numbers on the left of the score sheet indicate the frame. Each vertical player column is divided into four columns 2, 3, 4 and 5. Column 2 is for special symbols such as foul, split, chop or any special designation applied but not necessarily having to do with the score. Column 3 is for first ball pinfall information. Column 4 is for second ball pinfall information, which is total pins downed by both balls. Column 5 is three spaces wide and is provided for printing the completed frame scores in each frame.

MACHINE

General

A conventional adding machine has been modified to compute and print. The machine has been extended laterally to take care of the ball information and the scores of six bowlers in adjacent vertical columns. The mode of operation for addition, sub-total and printing has been revised to afford better control under the conditions imposed by bowling scoring.

Figure 2:
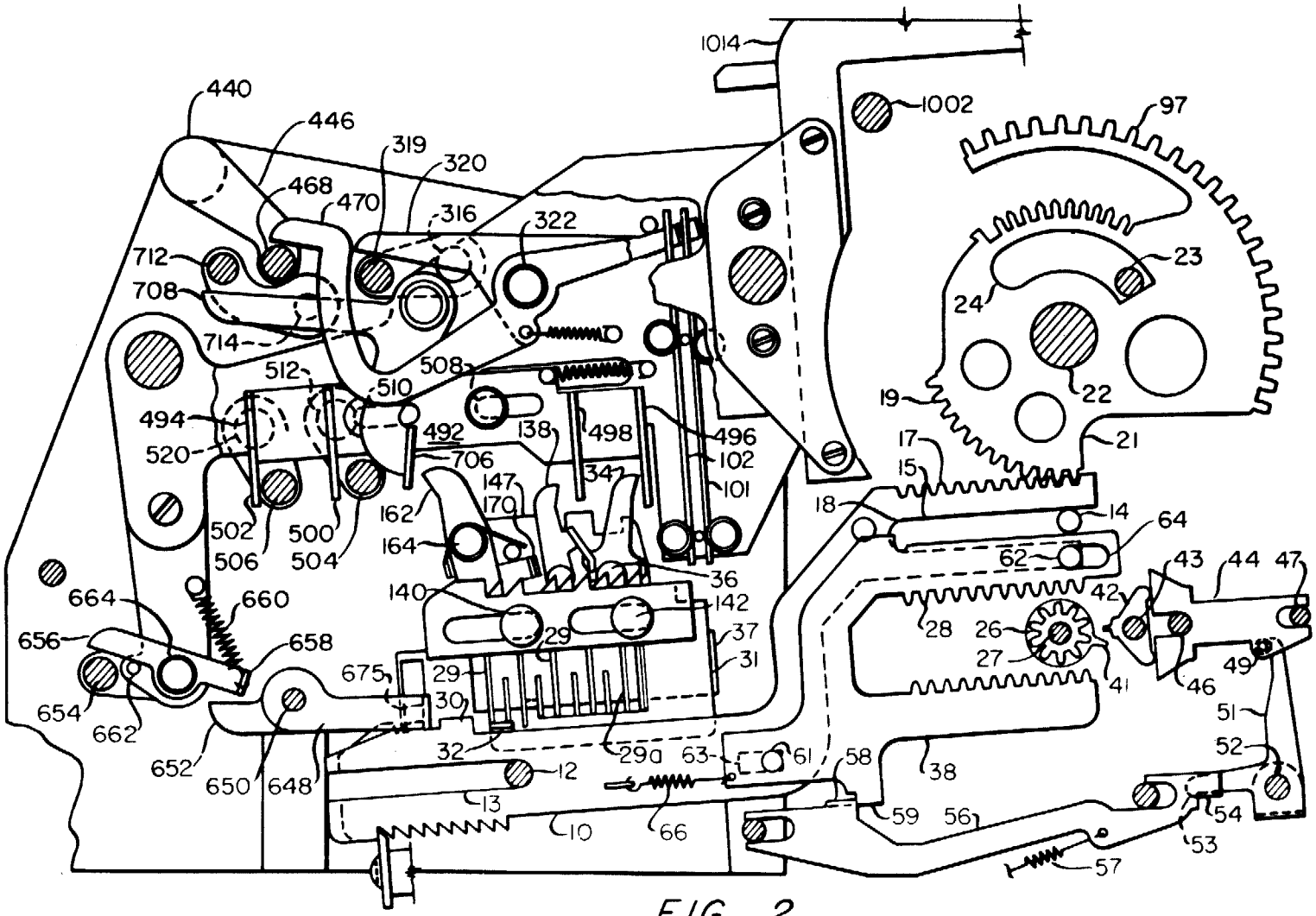
FIG. 2 is a cross-sectional view of the machine with the left side of the drawing representing the front of the machine. The view is taken substantially along line 2—2 of FIG. 17.

FIG. 2 is a cross-section of the machine. The left side of the drawing is the front of the machine. Rack carriers 10 are supported on the front side by a shaft 12 and a slot 13, and at the rear by a shaft 14 in a slot 15. The rack has teeth 17 on the upper side of the arm 18 which engage with teeth 19 of the segment 21 which is capable of rocking on shaft 22. The segment 21 is normally spring urged counter-clockwise by a spring (not shown). It is limited in such counter-clockwise movement by a shaft 23 which extends across the machine and which, during the machine cycle, will rock counter-clockwise and back again for one cycle of operation. Shaft 23 is within an arcuate slot 24 in the segment 21. A line of accumulator gears 26 is supported on a shaft 27 which also extends across the machine. The accumulator gears are capable of engaging the teeth 28 of a rack for purposes of score accumulation, while the segment 21 supported on shaft 22 is for the purpose of adjusting the printing of ball information and score information, to be described in detail hereinafter.

During machine cycling, rotation of shaft 23 counter-clockwise about shaft 22 allows the rack carriers 10 to move rightward, as viewed in the figure, as the segment 21 rocks counter-clockwise. Any one of the rack carriers 10 may be stopped at any intermediate position and, when so stopped, controls either the entry of a score value into the accumulator or the printing of ball information according to the cycling of the machine.

Figure 3:
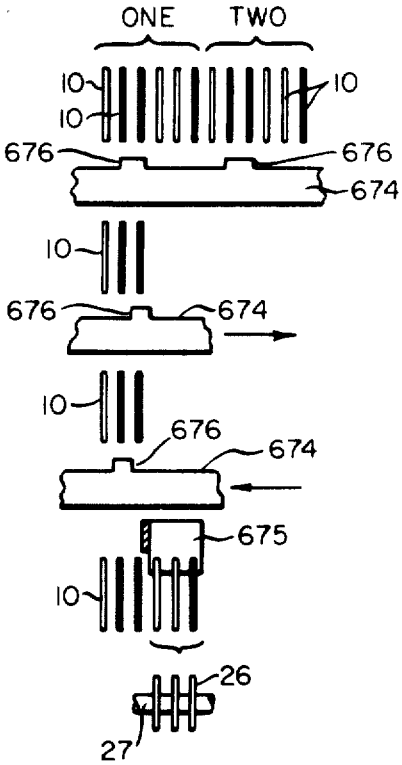
FIG. 3 shows the relationship of the rack carriers for the bowlers 1 and 2 as viewed from the front of the machine.

The relationship of the rack carriers 10 and the score sheet format shown in FIG. 1 is shown in FIG. 3 which shows the relative position of a series of the racks 10 for the bowlers "one" and "two" as viewed from the front of the machine. The left-most group of six rack carriers 10 is associated with the bowler "one"; the next group of six rack carriers is associated with bowler "two." As previously discussed in regard to the format: the first rack carrier in each set of six is associated with the printing of special ball information; the second rack carrier in each set is associated with first ball information printing only; the third rack carrier of each set is associated with the printing of second ball information printing only; and the next three rack carriers of each set are associated with the entry and printing of the score information.

The accumulator gears 26, FIG. 2, are associated with the fourth, fifth and sixth rack carriers of each bowler's set. The stopping of each of the six rack carriers depends on the associated functions of the individual rack. For example, in FIG. 3, the second, third and sixth rack carriers of each set (shown in dark cross sections) are controlled in the amount of rearward movement they may make by any one of the slides 29, FIG. 2. There are nine slides 29 extending across the machine. Each of the slides 29 has downwardly extending ears. Lateral displacement of the slide will bring an ear on that slide into the path of a rack stop 30 on the associated rack carrier 10. Each of the slides 29 has such an ear located so as to be capable of being brought into the path of the second, third and sixth rack carrier 10 in each bowler's position. The ears on the slides 29 are normally out of the path of the respective rack stop 30 which it controls with the exception of the left-most slide 29, FIG. 2, which is the zero stop. The zero stop is brought out of the path of the rack whenever any of the other slides 29 is operated. Operation of the slides is described later. The sixth rack carrier of each bowler's group is the only score entry rack carrier which is controlled by one of the slides 29.

The slides 29 operate as follows: Assume, for example, eight pins were made on a fist ball and the second ball missed the remaining two pins in the first frame of a game, the left-most slide 29 (FIG. 2) would be removed from stopping position of the rack carriers which it controlled. After the first ball had been thrown, the second rack carrier (FIG. 3) would be stopped by an ear on slide 29a (FIG. 2) which is the number "8" slide. This would serve to print "8" as the first ball information. Subsequent cycling of the machine after the second ball would again operate slide 29a which would then control the printing of "8" by the third carrier, which is the total pins for both balls. This would occur during the printing of ball information cycle of the machine. A subsequent cycle would then serve to stop the sixth rack carrier at the number "8" position as again determined by slide 29a (FIG. 2) and this would serve to add 8 pins into the accumulator section.

Figure 4:
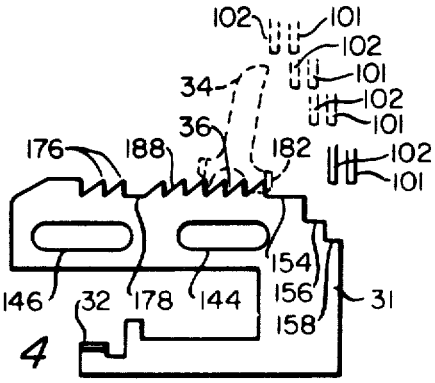
FIG. 4 is a view showing a rack and control of FIG. 2.

The units accumulator, sixth rack carrier, in each bowler's position is used only to enter values of less than 10 into the respective accumulator; namely values 0–9 inclusive. The tens rack carrier, fifth rack carrier, is stopped in each case by a separate control. This separate control 31 (FIG. 2) has an ear 32 which is always in the path of a stop 30 on the tens rack in each order. The shape of the control member 31 is shown in FIG. 4. This member is spring urged rightward and is controlled for stepping rightward by a ratchet 34 pivoted on a stud 36 mounted on a plate on the block 37 which also guides and supports the slide 29. The control member 31 is called a "tens stop" member since it controls the tens entry into the accumulator, but it also serves other functions described later. There is one tens stop member at each of the six bowlers' positions, and each one of them is associated with the respective fifth or "tens" rack carrier of the accumulator for each bowler. In operation, a tens stop member moves rightward, as viewed in FIGS. 2 and 4, one step for each ten to be entered. A maximum value of "30" (three increments) may be entered at any one time as this is the maximum which can be made in one frame for one bowler.

The fourth or "hundreds" rack carrier in each bowler's position is normally stopped by a fixed stop at the zero position. The fixed stop is on the block 37 which carries all of the slides 29. The first or "special information" rack carrier is controlled separately as described later.

Entry into the accumulator of a digit 0–9, inclusive, in the units order of entry of "10," "20" or "30" under control of the tens stop member is accomplished as follows. FIG. 2 shows an accumulator gear 26 which is normally out of mesh with the gear teeth 28 on the rack. Assuming an entry of "8" into the units order of a particular bowler, the subsequent rocking of shaft 23 counter-clockwise will allow rightward movement of the units rack carrier 10 until the stop 30 of the rack carrier stops against the slide 29a. At mid-cycle position of shaft 23, namely at the counter-clockwise limit, the shaft 27 carrying the accumulator gears 26 is brought upwards into engagement with the teeth 28 of the rack carrier 38. During its rightward excursion, the rack carrier 38 is moved rightward a distance of eight teeth and, therefore, the bringing of the accumulator gear 26 into mesh at the mid-cycle position, and subsequently returning the shaft 23 clockwise to the position shown in FIG. 1 would serve to rotate the accumulator gears 26 a distance of eight teeth counter-clockwise. This action of advancing the gear 26 counter-clockwise a distance of eight teeth is "adding" the value "8" into the accumulator.

As any of the gears 26 in the accumulator rotate from a nine position to the zero position, a carry is effected into the next higher order. It will be noted that there is a long tooth 41 associated with each accumulator gear 26. A triangular part 42 pivotally mounted on a shaft 43 is in alignment with the long tooth 41. The accumulator gear 26, shown in FIG. 2, is shown in the number nine position. Therefore, one tooth additional counter-clockwise movement of the gear 26 will serve to rock the triangular member 42 clockwise about shaft 43. This action of the triangular member will serve to move member 44 rightward. Member 44 is supported on spaced shafts 46 and 47 and is slotted to allow this rightward movement. A stud 49 is on the member 44 and rightward movement of member 44 will rock the latch member 51 clockwise about a pivot 52. Member 51 has a latch surface 53 which normally lies in the path of an ear 54 on a member 56 which is spring urged leftward by a spring 57. In the normally latched position of latch surface 53 on ear 54, the member 56 is retained in the position shown. However, clockwise rocking of member 51 through the rightward movement of stud 49 whenever a tens carry occurs will allow leftward movement of member 56. Member 56 has an ear 58 which is in the path of a shoulder 59 on the next higher order rack 38. The rack 38 is mounted on the rack carrier 10 in each order by means of studs 61, 62 in slots 63, 64 to allow a limited movement leftward of the rack 38 one tooth as urged by a spring 66 connected between the rack carrier 10 and the rack 38. The release of latch 53, therefore, allows the member 56 to move leftward and, therefore, the rack 38 of the next higher order will also move leftward as the result of the stop 58 being removed from effective position. It will be remembered that adding is done by the leftward movement of the rack carrier 10 and, therefore, if any latch 53 is released during actuation, the next higher order rack 38 will be allowed to move an extra tooth leftward and, therefore, add an additional tooth movement to the next higher order gear 26.

Printing

Figure 5:
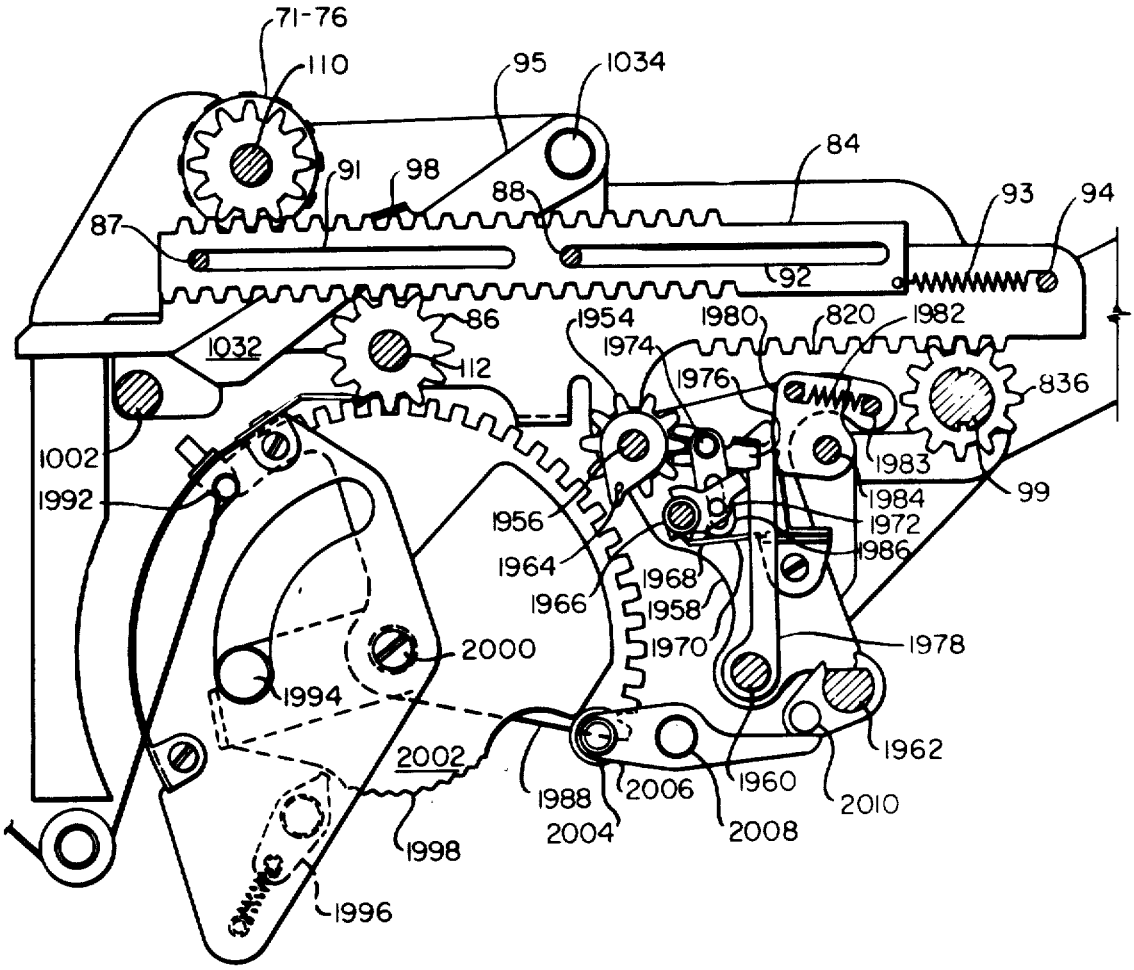
FIG. 5 is a sectional view taken along the line 5—5 of FIG. 7A showing the print assembly.
Figure 6:
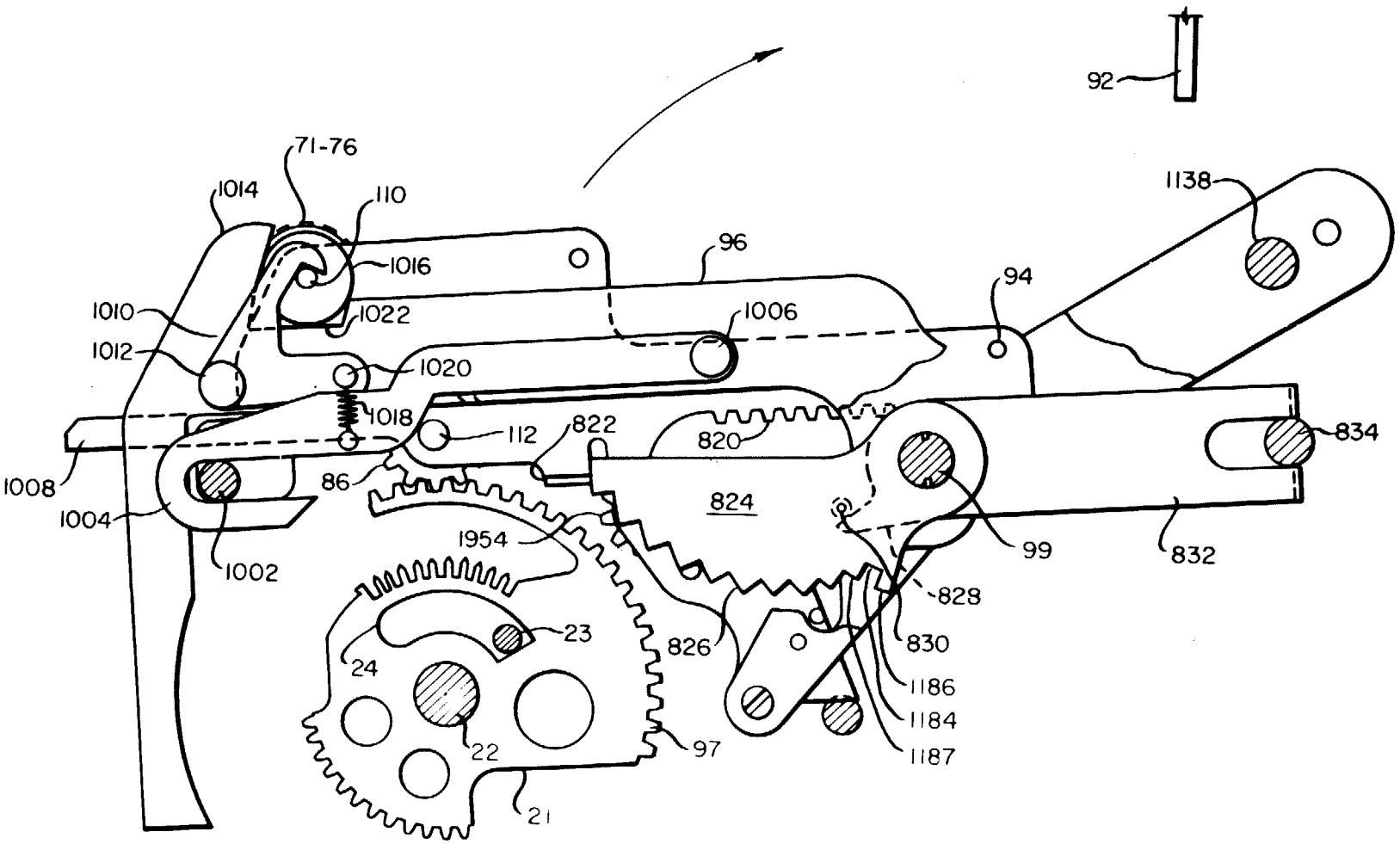
FIG. 6 is a view taken substantially along the line 6—6 of FIG. 7A showing the print assembly.

Printing is under control of the segments 21 so that either input to the accumulator or output from the accumulator may be printed. The means for printing are shown in FIGS. 5, 6 and 7. As shown in FIG. 7A, a set of six print wheels 71, 72, 73, 74, 75 and 76 are mounted on a shaft 110 between the front extensions of two frame members 81 and 82. The back extensions of the members 81 and 82 are spaced by a shaft 83 to which the frame members are peened. The frame structure also supports a series of racks 84, one associated with each of the numeral print wheels 71–76 and also a second set of gears 86 which are permanently engaged with the racks 84.

As shown more clearly in FIG. 5, each rack 84 is supported on spaced shafts 87 and 88 mounted within slots 91 and 92. A spring 93 is attached at one end to the racks 84 tending to pull it rightward as viewed in FIG. 5. The other end of the spring 93 is attached to the shaft 83.

The entire print assembly is supported by frame members 96 (FIG. 7A), mounted for lateral movement on bushings to be described later. This laterally moving carriage not only carries the framework supporting the six print wheels but also carries other sensing and operating mechanisms. The printing mechanism is positioned as shown best in FIG. 6 which is located over and to the rear of the segments 21 described previously in reference to FIG. 2. Referring again to FIG. 6, the gears 86 which remain in mesh with the racks 84 are shown in engagement with teeth 97 of the segment 21. Normally, the gears 86 are out of engagement with the teeth 97 but are brought into engagement at mid-cycle position of the machine in an operation similar to that of positioning the accumulator gears.

In operation, the segment 21 is rocked counter-clockwise a certain number of teeth during the first half cycle, and then the gear 86 is engaged with the teeth 97 before it is rocked clockwise during the last half of the cycle. This positions the gears 86 counter-clockwise by that same number of teeth. Counter-clockwise rotation of the gears 86 moves the rack 84 leftward as viewed in FIG. 5 thereby advancing the associated print wheel clockwise by the same number of teeth. A detent 98 serves to hold the racks 84 in the position so attained. After the print wheel has been set to the value represented by the displacement of the teeth 97 in the segment 21, the frame assembly carrying the print wheels is rotated clockwise and then counter-clockwise about the center 99 by means to be described later. This operation serves to print the amount represented by the advanced print wheel on the score sheet.

Referring to FIG. 2, it will be seen that the teeth 97 of the segment 21 are rocked counter-clockwise whenever the rack carriers are moved rightward by the segment. Since it has been explained that the racks are limited by incoming information, it will be seen that such incoming information may be printed through the mechanism described. The machine, however, not only prints incoming information but is also capable of printing values which are in the accumulator at any given time.

The printing of values from the accumulator is controlled by the accumulator gears which adjust the segments 21 in the normal manner of securing either a total or a sub-total in the adding machine. The machine of the present invention will automatically perform a sub-total operation following every add operation as will be described. As shown in FIG. 2 and previously described in connection with tens carry, each of the accumulator gears has a long tooth 41. In order to adjust the segments to secure a printing of a total or a sub-total, the gears 26 are brought into mesh with the teeth 28 of the rack 38 near the start of the machine cycle. Therefore, as the rack moves rightward during the first half of the machine cycle, the accumulator gear 26 rotates clockwise until it contacts the triangular member 42. It will be remembered that during tens carry, the triangular member 42 was allowed to rock if contacted by the long tooth 41. In the total and sub-total operation however, the shaft 47 is brought leftward, as viewed in FIG. 2, to prevent the rightward movement of member 44 and, therefore, block the member 42 from rocking. This serves to stop the clockwise rotation of the accumulator gear 126 and, therefore, the rightward movement of the rack carrier 10. The rack carrier 10 is, therefore, blocked after it is displaced a number of teeth represented by the distance of the long tooth 41 from the member 42. It will be rememberd that during an add operation, the gear 26 was rotated counter-clockwise to an advanced position during the return of the racks after mid-cycle. Therefore, it will be rocked clockwise on the forward stroke the number of teeth displaced from zero and will then be against the stop 2. The gear, as shown in FIG. 2, is nine teeth away from such a stop and, therefore, the segment 21 and gear teeth 97 will be displaced nine teeth from normal position when this stop becomes effective. The print wheel assembly is then engaged with the teeth 97, and as the shaft 23 rocks clockwise, the print wheels are moved to a position indicative of the values in the accumulator. The accumulator remains in mesh during the return stroke in a sub-total operation and, therefore, the return of the racks leftward will add the values back into the accumulator gears. The values so entered into the print wheels are then printed and, therefore, the accumulated score of an individual bowler is printed for that frame. During total and sub-total operations, the block 37 carrying the normal stops or slides 29 is raised by means described later. Therefore, the stop for entry information is not effective during total and sub-total operation.

Reviewing the printing operation, the shaft 23, FIG. 2, rotates counter-clockwise about center 22 and back again during each machine cycle. In order to print ball information, the ball information racks are allowed to be moved to a stop representative of the value to be printed. The print segments are then engaged to advance the print wheels to the amount determined by the excursions of the racks and a print cycle ensues after each completion of a sensing cycle by the adding machine to print ball information. During this operation, the accumulator wheels are not engaged and, therefore, no adding occurs. Upon completion of a frame, the racks are then allowed to move rightward in order to provide for the value entry into the accumulator. At half cycle, the accumulator gears are engaged and the racks are returned. During this operation, the print wheels are not engaged as it is not desirable to print the information being entered into the accumulator. Immediately following the add operation, however, a sub-total cycle automatically occurs. In this operation, the normal stops 29 and others included in the block 37 are removed, the accumulator is engaged and the accumulator then controls the extent of excursion of the racks. At mid-cycle, the print wheels are engaged with the segments and the amount in the accumulator is transferred to the print wheels and printed on the score sheet.

There are only six printing wheels but since they are mounted in a laterally movable carriage, they may be associated with any group of six racks. The position of this laterally movable carriage depends on the particular bowler who is receiving the score at any particular time.

MACHINE STRIKE—SPARE MEMORY ELEMENTS

It was previously stated that the knocking down of all ten pins with one ball constituted a strike. Since the scoring of a strike involves extra pins are determined by the following two balls, the frame score in which a strike is made is not completed until the next two balls are rolled in the subsequent frame or frames. Therefore, no adding is done into a bowler's register until a frame score is completed and, in the case of a strike, this may be as much as two frames later if two strikes are made in sequence.

Means are therefore, provided which serve as a memory device for subsequent entry. This memory device previously has been referred to as a control member 31, FIG. 4. There is but one member 31 at each bowler's position. This member controls the entry of the tens increment into that particular bowler's position. As shown in FIG. 2 and more clearly in FIG. 4, the member 31 is controlled by a ratchet and is normally spring urged rightward by a spring (not shown). Each time ten is to be added to a bowler's score, the lever 34 is rotated counter-clockwise and allows one step rightward movement of member 31. Also shown in FIGS. 2 and 4 are two sensing elements 101 and 102, shown in FIG. 4 in their normal position, and are also shown in the relative position that they attain as member 31 moves rightward one step, two steps, or three steps, respectively.

Ten is added into the register whenever ten pins are knocked down in a frame whether it is a result of a strike or a spare. Therefore, the tens stop is advanced one increment when either of these conditions occurs. In the case of a spare, it is necessary to count the number of pins made by the next first ball in the next frame and to add such pins into the register for the completion of the frame score in which the spare was made. A strike, on the other hand, requires the registration of the next two balls and in the case of a strike following a strike, no addition into the register is made until the third ball in the following frame has been rolled.

Figure 8:
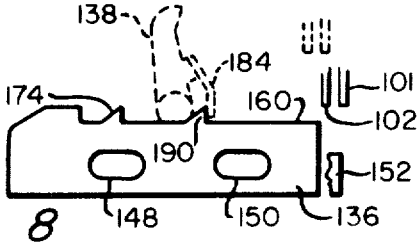
FIG. 8 is a side elevation of the spare latch shown also in FIGS. 2 and 4.

A "count first ball" member is provided to control the entry of first ball values when such should be counted as a result of a spare preceding the first ball and is shown in FIG. 8. The "count first ball" member 136 is spring urged for rightward movement and controlled by a latch 138. The member 136 is adjacent to the tens stop member and moves one increment. Its normal and adjusted relationship to the sensing members 101 and 102 is also shown. The tens stop or control member 31 and the count first ball member 136 in each order are mounted on studs 140 and 142, FIG. 2, carried on a plate 147, FIG. 9, mounted on the block 37. The member 31 has slots 144 and 146 and the spare latch or count first ball member 136 has shorter slots 148 and 150, FIG. 8.

The sensing elements or members 101 and 102, FIGS. 2, 4 and 8, control machine operations. They are mounted on the movable carriage which also carries the print wheels. The sensing elements, therefore, travel from one bowler's position to the next, and the operation of the sensing elements to control machine operation is only associated with the tens stop member 31 and the spare latch 136 associated with the particular bowler determined by the carriage position. These sensing fingers may initiate the cycling of the machine depending on the setting of members 31 and 136. Sensing members 101 serve to control the recycling of the machine under special conditions described later and sensing member 102 serves to cycle the machine on the first ball rolled after a spare or after two strikes.

Referring to FIG. 8, it will be noted that when the spare latch is advanced one step rightward, the sensing element 102 will contact surface 160. This blocking action will cause the machine to cycle on the first ball rolled by mechanisms described later. As previously stated, the occurrence of two strikes also requires that the machine cycle on the first ball rolled after the two strikes and must, therefore, initiate a machine cycle. Referring to FIG. 4, it will be noted that the surface 154 of the tens stop member 31 will be positioned under the sensing finger 102 when the tens stop is adjusted two steps rightward. Since this surface is the same height as the surface 160 on the member 136, the same blocking action will occur to initiate a machine cycle. It can, therefore, be seen that if a spare has been made and the spare latch 136 advanced one increment or if two strikes have been made by an individual bowler, the blocking of sensing element 102 at a particular height by either may be used to control the cycling of the machine to add the value of the first ball rolled.

Figure 9:
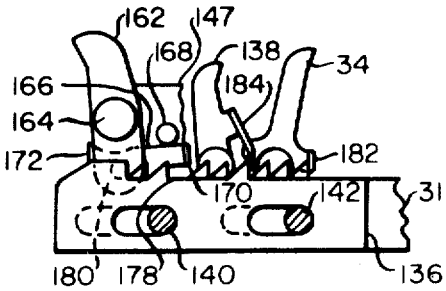
FIG. 9 shows the means to restore the tens stops and the spare latch, also shown in FIG. 2.

Means are provided to restore each tens stop member 31 and the spare latch 136 leftward an increment of one stop at a time. These means are shown in FIGS. 2 and 9. A lever 162 pivoted at 164 carries a live tip member 166 pivoted at 180 on lever 162. The lever 162 is spring urged counter-clockwise by a torsion spring and stopped against rotation by stud 168 on the plate 147. The other end of the torsion spring rests against the ear 172 on the tip member 166, and this serves to hold the tip in a clockwise position with the ear 172 limiting its clockwise movement. The clockwise rocking of lever 162 about pivot 164 by means described later allows the ear 170 of the tip member 166 to contact a tooth 174 on the spare latch 136 if the spare latch 136 is displaced one order rightward. The ear 170 is of such length as to overlie both the spare latch and the tens stop member 31. If the tens stop member 31 is rightward one or more units from the position shown, ear 170 of the restore lever, FIG. 9, will contact one of the teeth 176 of the tens stop member 31 (see also FIG. 4). As shown in FIG. 9, a blank space 178 of one tooth is provided on member 31 in the normal or zero position of this member. For this reason, lever 162 may be rocked clockwise at a particular time in each machine add print sequence, and if the tens stop member 31 is displaced rightward one, two or three steps from the position shown, the rocking of member 162 clockwise will restore the tens stop member one step only. If, however, the tens top 31 in the particular bowler's position is completely restored, then the ear 170 will rock freely in the space 178.

The tens stop is normally held by a ratchet 34, as explained previously, and this leftward movement of the tens stop member 31 allows the rocking of ear 182 over one of the teeth 188. If the spare latch member 136 is rightward at the time of operation of lever 162, it will be brought back that one step by this same action. When brought back, it will be held normally by a contact of ear 184 on lever 138 which normally holds it in restored position. There is one restore lever 162 associated with each bowler's position, as well as a latch 138 and a lever or ratchet 34 at each bowler's position, these members serving to allow the advance of the tens stop 31 and spare latch 136, as previously described.

CYCLIC CONTROL

Figure 10:
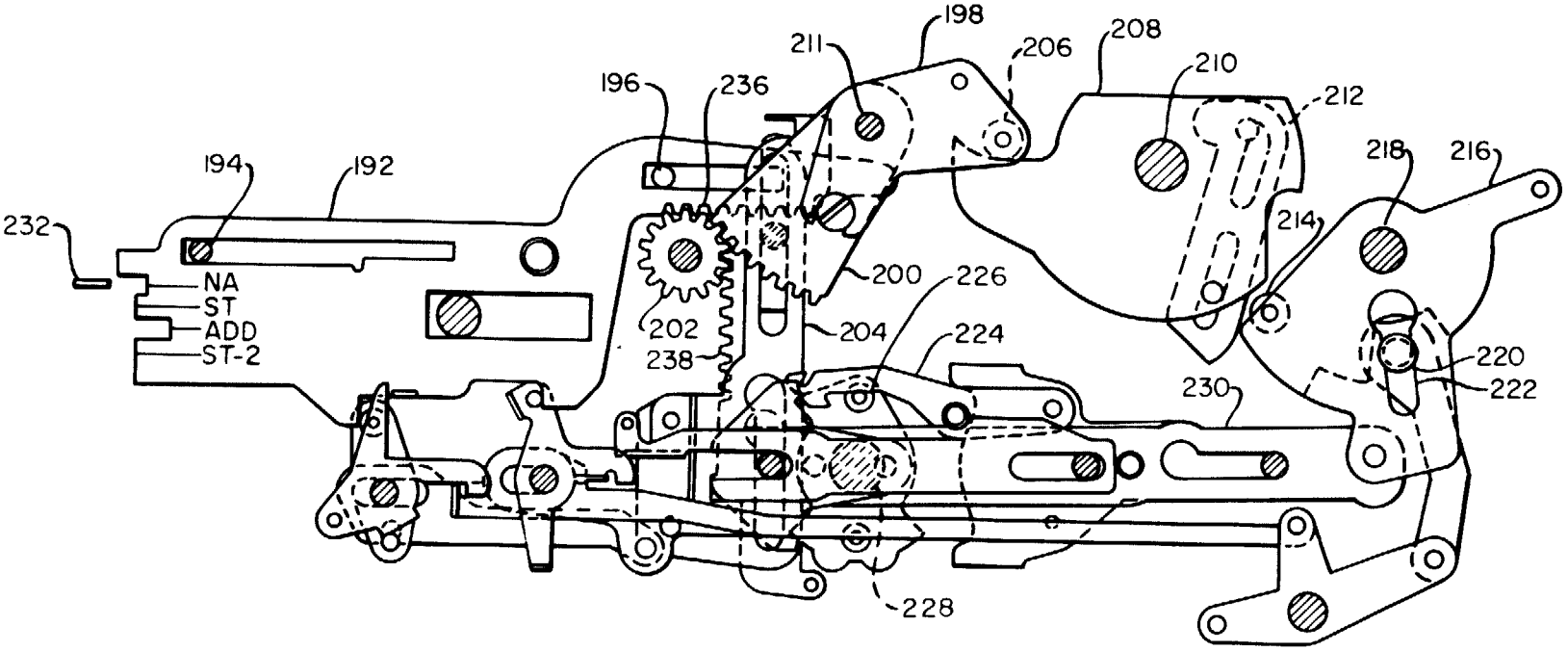
FIG. 10 is a side elevational view showing the cycling control assembly.

The foregoing description has concerned the individual elements necessary for computing, maintaining and printing the scores of each individual bowler. FIG. 10 shows the operating and cyclic control mechanism. The cyclic control mechanism or assembly includes a control plate 192 mounted on spaced studs 194 and 196. The amount of such leftward movement during each machine cycle is limited by an ear 232 which may assume one of several positions to control a non-add cycle of the adding machine, a sub-total cycle, an add cycle or a total cycle, depending upon the position of the ear or stop 232. The ear 232 is adjusted to the position for controlling the correct cycling of the adding machine by means described later.

During each machine cycle, a shaft 210 is rocked counter-clockwise and returned to the position shown. A roller 206 rides on a surface on a member 208 which is pivotally carried by the shaft 210. Roller 206 is on a member 198 which is pivoted at 211 and normally spring urged clockwise about this pivot. Member 198 is integral with a segment 200 which is engaged with gear 202. During the first part of a machine cycle, the member 198 is allowed to move clockwise, thereby rotating the gear 202 counter-clockwise. The gear 202 is in mesh with teeth 238 on a member 204 which moves in a vertical direction. it will be seen that the extent of movement allowed by the stop 232 against the surface of the plate 192 will also serve to control the movement of the vertical member 204 upward to a position determined by the leftward movement of the plate 192. Since this entire operation is spring controlled, the plate 192 limiting against the stop 232 will then control the height of member 204.

A series of clutches 216 mounted on a long stud 218 on the right side of the machine are engaged or disengaged according to the height of the member 204. The clutch drivers carry a roller 214 which contacts a member 212 on the member 208.

A stud 220 is in a slot 222 and is moved upward or downward, and in its upward position will serve as the connection between the clutch 216 and the member 208. In other words, the position of stud 220 within the slot 222 determines whether or not certain members will be moved rightward (rearward) in order to accomplish the necessary functions associated with the particular cycle of the machine. For example, the non-add cycle of the machine is one in which the machine reciprocates for purposes of sensing or printing and the accumulator line is not brought into engagement during this particular cycle.

During an add cycle, however, the accumulator must be brought into engagement with the actuating racks at mid-cycle position as previously stated. For this purpose, a member 230 is connected to one of the driven clutch members 216 and, if engaged with the driver, will be moved rightward allowing a hook member 224 to contact a stud 226 and rock shaft 228 clockwise. All of the necessary operations are so timed that the engagement or disengagement engagement of the accumulator as required will occur at the proper time in the cycle. In the case of a sub-total, for example, the accumulator must be engaged with the rack at the beginning of the cycle and remain engaged with the racks for the entire cycle. On the other hand, during a total cycle, the accumulator racks must be engaged during the outward excursion only and released from such engagement at mid-cycle position. These actions are all controlled by the leftward movement of plate 192 and the consequent raising of the member 204 to provide the engagement or disengagement of the proper clutches 216 on shaft 218 in the normal operation of the adding machine.

The steps on plate 192 have been labelled non-add, sub-total, add, and a second sub-total position. The cycling of the adding machine to operate to compute bowling scores is as follows. A non-add or sensing cycle is initiated each time a ball is rolled. During this cycling, the stop 232 is in the position shown which is normal. The printing of ball information is accomplished during this non-add cycle. Also, the sensing is accomplished which will determine whether or not an add-print cycle should follow the sensing cycle. Add-print operation consists of an addition cycle followed by a sub-total and printing of the accumulated results and may occur during the first ball information registration as previously stated, in which case it is controlled by the count first ball member or the tens stop in an advanced position as previously described. Accordingly, if an add-print cycle is to ensue, the stop 232 will be dropped down to the level marked "add" on the plate 192. For the purpose of computing bowling scores, the adding machine is programmed so that all add cycles are followed by a sub-total cycle accomplished by positioning of the ear 232 which is then moved up one step to the position marked sub-total (ST) on the plate 192, and thereafter moved up to the non-add (NA) position shown in FIG. 10. This is the normal operation which follows the rolling of a ball to complete a score.

There is a time, however, when two add-print cycles will follow the rolling of a single ball and this is in the case of a miss following a strike. As was previously noted, a strike counts ten plus what is made on the next two balls; and as was also previously stated, a frame is completed when a miss occurs, a miss being less than ten pins knocked down with two balls thrown. The score in such a frame, then, preceded by a strike would be registered in two frames since it has completed two frames. Control of this operation will be given later. However, it should be stated here that if during the add cycle in which the stop 232 is in the position to control addition (ADD), it is determined that a second add print cycle should ensue; the proper sequence is established during the first add cycle, at which time the stop 232 drops down to the lower position (ST-2) and a sub-total cycle follows. Stop 232 is moved up one step with each machine cycle and, therefore, the next stop will again be the add position, again followed by a sub-total, and final restoration to non-add position. It will thus be seen that the modified forward end of member 192 in conjunction with the positioning of the stop 232 will serve to control the cycling of the machine for the proper performance sequence for either one or two frame completions as a result of the rolling of a single ball.

Figure 11:
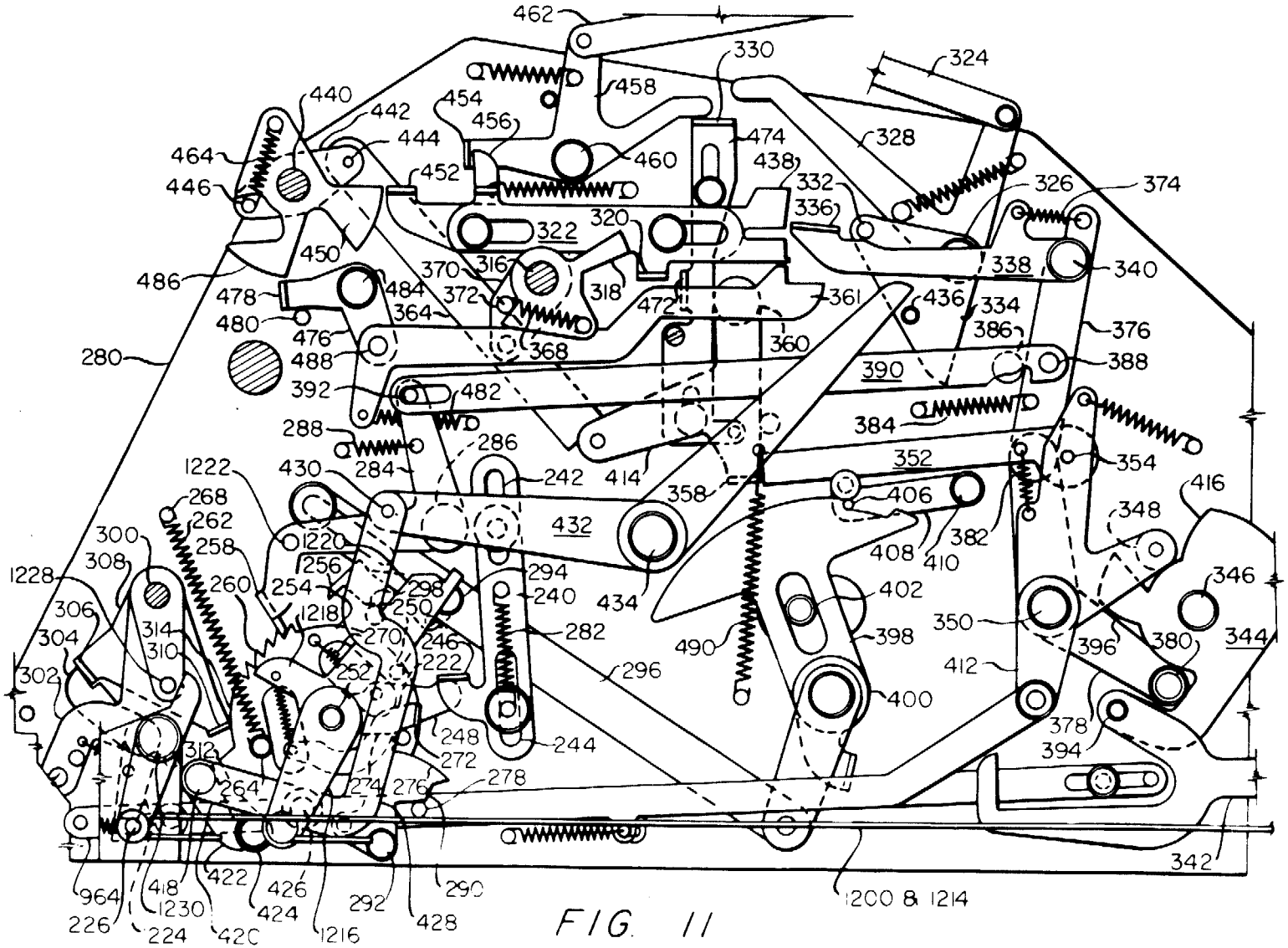
FIG. 11 is a side elevational view of control assemblies mounted on the side of the machine. The view is taken substantially along the line 11—11 of FIG. 17.

Mechanisms to control the position of the stop 232 is shown in FIG. 11 in the lower left-hand portion of the drawing. The entire mechanism shown in FIG. 11 is mounted on a plane on one side of the machine. A sliding member 240 mounted for up and down movement on spaced studs within slots 242 and 244 is urged downwardly by a spring 282. This slide has an ear 246 which directly controls the stop 232 previously mentioned and is, therefore, the equivalent of the stop. In other words, the position of the ear 246 is representative of the stop which controls the cycling of the adding machine for non-add, add, etc., as described.

A segment 254 mounted on a center 252 is spring urged clockwise by a spring 262 connected to a fixed stud 268 and a stud 264 on the segment. Mounted on the center 252 is an arm 248 which is spring urged by a spring 270 against a stud 250 on the segment 254. The arm 248 will, therefore, tend to follow the movement of the segment 254. Arm 248 underlies the ear 246 on the slide 240. The spring 270 is stronger than the spring 282 and, therefore, the ear 246 will be held in a position as governed by the segment 254.

The segment 254 is normally prevented from clockwise movement by an ear 258 in engagement with one of the teeth 260 on the segment. Ear 258 is on a bellcrank 284 mounted on a center 286 and normally held in contact with the teeth 260 by a spring 288. Member 254 will be allowed to rotate clockwise if bellcrank 284 is rotated clockwise to remove tip 258 from engagement with teeth 260. The extent of such clockwise rotation of segment 254 is controlled by a member 290 pivoted at 292 and having two surfaces 274 and 276. Member 290 is shown in a position counter-clockwise from that normally held at the time the ratchet member 254 is released. During the non-add cycle, the member 258 is removed from the teeth 260, the stud 278 is positioned at the right and, therefore, the surface 274 is in the path of an ear 272 on a member pivoted to the segment 254. The ear 272 is very lightly spring urged clockwise relative to the segment 254 but is prevented from movement by a stud on the segment 254. The clockwise rotation of segment 254 is limited by a stud 250 which, when rocked clockwise, contacts the surface of the member which carries ear 272 and, therefore, removal of the ear 258 from the teeth will first limit member 272 on the surface 274 of the member 290 with further clockwise movement of segment 254 allowed until stud 250 contacts the member 222. This movement will control the height of the arm 248 and, therefore, the ear 246 of the slide 240. Normal release of the segment 254, therefore, will position the ear 246 in order to control the subsequent add and sub-total cycling of the machine as previously described in total cycling of the machine as previously described in connection with FIG. 10. It was also stated in connection with FIG. 10 that in the case of a miss following a strike, the stop would be lowered to provide the proper sequence for two complete add-print cycles, each including a sub-total. Under these conditions, the ear 272 will drop down onto lower surface 276 of the member 290. This release of the segment 254 occurs during an add cycle under the conditions described by mechanism explained later.

The segment 254 is returned one step counter-clockwise during each machine cycle by a tip 256 pivotally mounted at 294 on a link 296 which rocks leftward at each machine cycle. Tip 256 is spring urged counter-clockwise relative to the member 296, but is prevented from such movement by a stud 298 which is fixed to the frame. The leftward movement of link 296 will allow the tip 256 to contact a tooth 260 of the segment and return the segment one tooth counter-clockwise for each machine cycle. Thus, the ear 246 is positioned in a particular location throughout each machine cycle but raised one step during said cycling. It might be mentioned that during the particular cycle in which the segment is released, the segment is restored one tooth at the end of that cycle also; therefore, the release position of the segment is one step lower than the starting position. However, once a cycle has been started, the ear 246 remains in the position attained until the end of that cycle. Therefore, at the beginning of the subsequent cycle, the ear is in the correct position to control the type of actuation required. This operation is provided to preclude the necessity of having to disable the restoring means during the cycle in which the segment is set.

It will be seen from the foregoing that the continuous correct sequence of add followed by sub-total is provided by the single stepping upward of the ear 246 following the initiation of add-print cycle sequence as determined during the sensing cycle and as initiated by release of the ear 258 on the bellcrank 284.

The segment 254 also serves to keep the machine cycling until all of the cycling determined by the conditions sensed has been completed. The machine clutch is engaged by rotation of shaft 300 in a clockwise direction. A member 308 is keyed to the shaft 300 and carries an ear 310 which normally rests against the surface 314 of the segment 254 when the segment 254 is completely restored to the position shown. Once the member 308 is rotated clockwise and the segment 254 has also been allowed to rotate clockwise, the member 308 may be released for counter-clockwise movement to stop the machine cycle and disengage the clutch. However, if the segment 254 is positioned clockwise, the surface 312 will be contacted by the ear 310 and counter-clockwise movement of the shaft 300 will, therefore, be prevented until the segment 254 returns to the position shown. Means for opening the clutch initially consist of the lever 302 which is rotatably mounted on the shaft 300 and which carries, pivotally mounted on it, a member 304 which is spring urged clockwise to contact an ear 306 on the member 308. Clockwise rotation of the member 302, therefore, will through member 304 in contact with ear 306 rock the shaft 300 clockwise. However, the member 304 is brought out of engagement with the shoulder 306 during the machine cycle and, therefore, the ear 310 in contact with the surface 312 controls the holding of the clutch engaged until the machine cycling sequence has been completed. This action, once started, will be maintained regardless of whether or not the member 302 is held in its clockwise or counter-clockwise position. In order to restart the clutch, it is necessary to rock the member 302 counter-clockwise to allow the ear 304 to again engage the ear 306 on the member 308. Member 302 is operated through a time delay device to provide an independent, controlled start of the machine.

SENSING OF MEMORY ELEMENTS

It has been previously stated that the condition sensed at each bowler's position representing the previous history of that bowler will determine whether or not an add and a sub-total operation should follow the rolling of the first ball. This sensing was described in connection with FIGS. 2, 4 and 8, as a sensing element 102 which would be blocked by the surface 160 on the spare latch 136 if the spare latch had been released in the previous frame. Similarly, the surface 154 on the member 31 would be contacted by the sensing element 102 if the tens stop were set at a position in which 20 would be added at the start of the cycle. This condition would be present if two strikes had preceded the current frame for a particular bowler.

Referring to FIG. 2, a shaft 316 is rotated by means described later. A shaft 319 supported on arms keyed to the shaft 316 extends across the entire machine. Shaft 319 underlies an arm 320 pivoted at 322 on the carriage which, it will be remembered, travels laterally and is capable of being associated with any one of the bowlers' positions. Arm 320 is connected to sensing element 102. As the shaft 319 is yieldably rocked clockwise during each non-add (sensing) cycle and during each add cycle of the machine, the contacting of the sensing slide 102 on the surface of the spare latch (count first ball member) or the tens stop set at 20 will serve to block the clockwise movement of arm 320 and, therefore, prevent any further movement of shaft 319 clockwise, and consequently prevent further rotation of shaft 316 to which it is secured. It might be pointed out that the rocking of shaft 319 during the add cycle does not effect the normal add operation of the machine and is provided for convenience in performance of other operations which must be determined by the sensing action during the add cycle.

The shaft 316 extends through the plate 280 as shown in FIG. 11. A member 318, FIG. 11, is keyed to shaft 316 and spring urged clockwise by a spring 368 against a stud 372 on a part 370 which is rotatably mounted on shaft 316. Rocking of member 370 moves the member 318 clockwise. However, if the movement of shaft 316 is blocked by the sensing member 102 as described in connection with FIG. 2, the surface of the arm 318, FIG. 11, will be located in the path of an ear 320 on a member 322, the action of which is described later. If the clockwise rotation of the shaft 316 is not limited, the surface of the arm 318 will be positioned below the ear 320 where it will not initiate an add-print cycle. A link 324 connected to a solenoid (not shown) is moved leftward on any first ball operation including the strike. A bellcrank 328 pivoted at 326 is, therefore, rocked counter-clockwise on every first ball operation. A triangular shaped part 334 is rotatably mounted on the center 326 and carries a stud 332 contacting a link 338 which underlies it and which tends to rock clockwise about pivot 340 by means of spring 374. Counter-clockwise rocking of bellcrank 328 will, therefore, position the ear 336 on the member 338 in line with the surface of member 322 which carries the ear 320. Assuming, therefore, that the sensing action has allowed shaft 316 and member 318 to move to a blocked position, then the ear 320 of the member 322 would also be blocked and ear 336 will, therefore, be prevented from moving leftward under these circumstances.

Such blocking will serve to initiate an add-print cycle as follows: During each machine cycle, a link 342 shown in the lower right portion of the drawing of FIG. 11 is pulled rightward (rearward). Link 342 is connected at 394 to a cam 344 pivoted at 346. Cam 344, therefore, rotates counter-clockwise during each machine cycle. A roller 380 on a bellcrank 378 pivoted at 350 will be rocked clockwise when the roller 380 contacts the cam surface 396. A link 376 is connected to the bellcrank 378 by a stud 382. The stud 382 will, therefore, be rocked clockwise about center 350 during each machine cycle. A spring 384 holds the link 376 against a fixed stud 386.

It was previously stated that if the member 338 pivoted at 340 on the link 376 were to be blocked by the blocking of the ear 336 against the member 322 and the ear 320 on the member 322 against the arm 318 as controlled by the sensing mechanism, that an opening of the clutch for an ensuing add and sub-total cycle would result. A link 390 pivoted on the link 376 at 388 is connected at 392 with the bellcrank 284 previously described as releasing the segment 254 for control of add-print operation. It can readily be seen, therefore, that if the stud 340 on the upper end of member 376 is blocked and the bellcrank 378 is rocked clockwise about pivot 350, the resultant action will be to pull link 390 rightward and rock bellcrank 284 clockwise to effect this operation.

It was previously stated that the sensing elements were moved downward during sensing and during add cycles of the machine. Means for accomplishing this are also shown at FIG. 11. An arcuate shaped member 398 is pivoted at 400 and carries a slot in which a stud 402 is located. The stud 402 is on the plate 192 previously described in FIG. 10. A member 408 pivoted at 410 carries a roller and a pin 406 which in the position shown drops down below the high arcuate surface. The lower surface represents the two positions of non-add and add of the adding machine control plate. In these two positions, a member 352 is dropped down into a position to contact an ear 358 on a member 414 which is pivoted at 360. Member 414, when rocked clockwise about its pivot 360, will move the link 364 (see also FIG. 12) upward and as previously described, rock the plate 370 and stud 372 to yieldably rotate the shaft 316 which controls whether or not an add, sub-total cycle will follow.

It was also previously stated that a link 342 in the lower right hand corner, FIG. 11, rocked a cam 344 counter-clockwise above pivot 346 on each machine cycle. A member 412 is pivoted on 350 and carries a roller 348. During the very first counter-clockwise movement of cam 344, the member 412 will be rocked counter-clockwise due to the roller 348 contacting the cam surface 416. The link 352 is pivotally connected at 354 to the member 412 and, therefore, during the early part of the machine cycle, the push link 352 will be moved leftward. Therefore, 352 will contact ear 358 rocking member 414 clockwise about its pivot for the sensing operation. It will be noted that this action occurs prior to the operation of the cam follower 378 which serves to open the clutch as previously described and under the conditions previously described.

It will be seen from the foregoing that the clutch will open for an add-print cycle during the sensing operation when such sensing is associated with the first ball and the first ball should be counted. Cycling of the machine on sensing of second balls should occur if the total pins knocked down are less than ten (not a spare), or if it is a spare and such spare was preceded by a strike. In the event that a strike did precede a spare, the strike would have set the tens stop to ten and, therefore, if there is a ten set into the memory at the time of second ball spare information, this condition of the tens stop is used to indicate the completion of the previous frame and the clutch will be opened by the blocking of the ear 336, FIG. 11, against the second ball control slide 438.

Means for this sensing will now be described. Referring again to FIG. 2, the shaft 440 is yieldably rocked counter-clockwise. Integrally secured to this shaft is a member 466 which carries a shaft 468 extending all the way across the machine. An arm 470 carried by the travelling carriage pivoted at 322 and capable of being associated with an individual bowler's position overlies the shaft 468. The other end of member 470 is connected to the sensing element 101 and this, as previously described in connection with FIGS. 2 and 4, is capable of contacting steps 158 and 156 of the tens stop 31. Step 158 is contacted by sensing element 101 when the tens stop member 31 is advanced one position (in a position to add ten).

Referring now to FIG. 11, it will be seen that shaft 440 extends into the plate 280 and integrally secured to the shaft 440 is a blocking member 450 which is spring urged by a spring 464 against a stud 446 on a plate 442 which is loosely mounted on that shaft. Plate 442 (see also FIG. 12) is pivotally connected at 444 to the link 364 which, as previously described, will move upward during a non-add and an add cycle of the machine by means previously described. Normally, this counter-clockwise rocking of shaft 440 will move to the extent of completely removing the member 450 from the path of the ear 452. If, however, the sensing slide 101, FIG. 2, is blocked at ten, the surface 450, FIG. 11, will block the ear 452 and the blocking slide 438 will be prevented from moving to the left. This will block ear 336 on member 338 and, as previously described in connection with first ball operation, the member 376 being rocked rightward as a result of being blocked will pull link 390 rightward and through stud 392 rock bellcrank 284 clockwise about pivot 286 to release the segment 254 and initiate an add, sub-totaL cycle sequence.

It was previously stated that if the second ball was not a spare that an add-print cycle would ensue. The second ball sensing member 438 has an arm 456 which normally lies in front of an ear 454 and is, therefore, normally blocked so that an add-print cycle will ensue on the second ball. The ear 454, however, is removed from blocking position in the case of a spare through the link 462 which rocks the bellcrank 458 clockwise whenever a spare occurs. It will be seen, therefore, that the slide 438 is blocked on any second ball delivery of less than ten by ear 454 and is blocked in the case of a spare with ear 454 removed, by the ear 452 against surface 450 if there is a ten in the memory during the add cycle. In the case of a spare that is not preceded by a strike, no-add print cycle ensues because member 438 is not blocked by either 450 or 454.

The ear 336 on the part 338 which is positioned against blocking members 322 and 438 under conditions of first and second balls, respectively, only remains in alignment with these two blocking intermediate members during the sensing cycle. At all other times, it is positioned counter-clockwise about pivot 340 below the surface of first ball intermediate member 322 and is normally aligned with the member 361 or more correctly in the position of 361 as shown in the drawings. In the case of operation resulting from first ball, however, it was previously stated that member 328 is rocked counter-clockwise and this contacts an ear 330 on a member 474, moving it downward. Similarly, in the case of a spare, the member 458 is rocked clockwise about 460 and this also moves the member 474 downward. Downward movement of slide 474 will result in the lowering of the member 361 out of the path of the ear 336 by means of a slotted ear 472 on the member 474, which overlies the member 361. By this means, the member 361 is out-of-the-way during any first ball operation or during any spare operation and is only in the position shown in case of a second ball operation of less than ten.

It was previously stated that when a miss followed a strike, two cycles must ensue and it was previouly described that the segment would drop down to a lower position in order to affect two cycles of add, sub-total; one to complete a frame in which a strike was made, and a second one to complete the frame in which a miss occurred. Since the ear 336 is in line with the member 361 under these conditions and the member 376 is rocked in all cycles of the adding machine including the add cycle, the presence of ten in the ten stop member, which will be the case in the event of previous strike, will serve to block the member 338 and open the clutch a second time as follows. The member 361 is pivotally connected at 488 to a member 476 which is pivoted at 484. A spring 482 tends to rock the member 360 counter-clockwise about the pivot 488 and also to hold the member 476 counter-clockwise against a stud 480. An ear 478 is on the member 476 and, as previously described, the shaft 440 is positioned according to the step encountered by the sensing member 101 which is the element which senses the tens stop member in the order of the particular bowler. If the tens stop member is positioned at the tens position during an add cycle, therefore, the surface 486 is not allowed to be rocked counter-clockwise far enough to get out of the path of the ear 478 and the ear 78 will, therefore, be blocked and, therefore, block member 361 and ear 336 to cause the rightward pulling of link 390 as previously described. Under all other circumstances, the member 361 will be out of the path of the ear 336 during add cycles and if there is no ten in the memory, no blocking during the add cycle will occur on second ball of less than ten as the surface 486 will be out of blocking position.

The means to rock the member 338 counter-clockwise about pivot 340 during add cycles out of alignment with either 438 or 322 consists of a member 432 (FIG. 11) pivoted at 434 and normally urged clockwise by a spring 490. A link 428 is pivotally connected to member 432 at 430 and pivotally connected to a member 420 at 426. Member 420 is pivoted at 418 on a fixed pivot and is integrally connected to a member 422 which carries a roller 424 in contact with a surface on the segment 254. When the segment 254 is in home position, the roller 424 is held in the position shown and through arm 420 and link 428, the member 432 is held in the position shown. If the segment 254 is released, however, to control an add and sub-total operation, the member 432 is allowed to rock clockwise about pivot 434 to contact a stud 436 from the triangular member 334 which is pivoted at 326. The counter-clockwise action of the triangular shaped member brings stud 332 downward, therefore positioning the ear 336 below the surface of the stop 322. In this manner, the ear 336 is held out of alignment with either stop 438 or 322 during the add cycles of the machine.

SETTING OF MEMORY ELEMENTS

In describing the operation of the machine with particular reference to the setting of a tens stop member 31 and spare latch 136 as shown in FIGS. 2, 4 and 9, it was stated that the tens stop 31 at a bowler's position would be adjusted to 10 during the sensing cycle which resulted from the making of a strike or a spare and that the spare latch would be released by the making of a spare by a bowler. The mechanism for adjusting these elements is shown in FIGS. 2, 12 and 13. As shown in FIG. 2, the latch 34 which controls the tens stop is adjacent to a formed ear 496 and leftward movement of ear 496 will serve to rock lever 34 counter-clockwise about pivot 36. Similarly, the lever 138 which controls the spare latch is adjacent to an ear 498 and leftward movement of ear 498 will serve to adjust the lever 138 counter-clockwise. The ears 496 and 498 are part of members 492 and 494 and are mounted for leftward movement on studs 508 and 510. The frame members are part of the traveling carriage and are associated with one bowler's position at a time. The member 492 has another formed ear 500 adjacent to a shaft 504 which extends all the way across the machine. The ear 496 which adjusts the tens stop is on a member 494 which has at its left or front end an ear 502 adjacent shaft 506 which extends across the machine. The shaft 506 is pivoted at 520. Clockwise rocking of shaft 506 about its pivot carries the tens stop member to move one increment to the left by action of the ears 502 and 496 which rotate lever 34. Similarly, clockwise rocking of shaft 504 about its pivot 512 will serve to adjust the spare latch for the particular bowler in which the travelling carriage stands by leftward movement of ear 500, and consequently leftward movement of ear 498.

Shafts 504 and 506 for setting the spare latch and tens stop, respectively, are shown in FIG. 12 along with the linkage serving to rock them. The spare latch is operated directly by rearward movement of a link 544 pivotally connected at 514 to arm 516 which is integrally connected to a plate 518 which carries the shaft 504. Rightward pulling of link 544 will, therefore, serve to rock the shaft 504 clockwise about the center 512.

The shaft 506, however, is not rocked directly for reasons explained later but it is connected to a plate 546 which is integral with an arm 530 which has an ear 528. Clockwise rocking of the ear 528 will, therefore, rock the shaft 506 clockwise about the pivot 520. A link 522 is pivoted at 524 to a plate 526 which is loosely pivoted on stud 520. Plate 526 carries a pivot 532 on which is mounted a tip 534. The tip is spring urged clockwise by spring 536 against stud 538 to hold the position shown. The other end of the live tip 542 contacts the ear 528 and, therefore, when the mechanism is shown in the position of FIG. 12, a rightward movement of link 522 will rock the plate 526 clockwise and through the live tip in contact with the ear 528 serve to rock the shaft 506 clockwise to adjust the tens stop one increment.

Normally, the linkage for adjusting the tens stop is not in the position shown but its normal position is somewhat clockwise from that shown. The shaft 506, however, is in this position normally and will return to this position immediately because of the stud 540 which contacts the live tip 534 thereby removing the nose 542 of the live tip from contact with the ear 528 and allowing the shaft 506 to rock to its normal position by means of a spring (not shown) in the figure. The normal operating action provided for the link 522 is first a leftward movement to provide counter-clockwise motion to the plate 526 and allow the live tip to connect with the ear 528, subsequently rocking plate 526 clockwise until released by contact with the fixed stud 540. The linkage 522 is then returned to a mid-position. It can be seen, therefore, that the linkage 522 may be rocked freely rightward without setting a tens stop, but if allowed to move leftward prior to such movement will only at such times be effective to rock the shaft 506 clockwise. This action is provided when a spare or a strike is made to adjust the tens stop.

The means for rocking the links 522 and 544 are shown in FIG. 13. The link 522 which controls the setting of the tens stop will be described first. Link 522 is pivotally connected at 556 to a cam follower arm 557 pivoted at 586 and which carries a roller 558 in contact with a cam 560 on the cam line 562 which makes one turn clockwise with each machine cycle. The cam 560 is shown in its normal home position. It is seen that clockwise rotation of the cam 560 from the normal position would serve to rock the follower 558 counter-clockwise to the low of the cam before rocking it clockwise to its full extent. It is this drop of the cam which allows the counter-clockwise movement of the arm 557 about pivot 586 to provide leftward movement of link 522 to engage or connect with the linkage previously described in connection with FIG. 12 to advance the tens stop one increment.

If, however, the roller 558 is held in the position shown and not allowed to rock counter-clockwise during the cycling of the machine, the subsequent contact of the roller 558 by the high of the cam will not be effective to adjust the tens stop. Means are provided, therefore, to hold the cam follower in the position shown during the first part of every cycle unless the tens stop is to be adjusted to add ten. An arm of the follower 557 carries a pivot 566 on which a latching member 568 is pivoted. A spring 588 connected to the member 568 serves to yieldably hold the latch 568 in the position shown. Further movement of this member is prevented by a fixed stud 580. An ear 572 holds the member 568 by means of a tooth 570. The ear is mounted on a bellcrank 582 pivoted at 578. It will be seen, therefore, that as long as ear 572 is in the position shown, the cam follower 558 will not be allowed to rock to the low of the cam 560. If, however, a ten is to be entered, for example, when a strike has been made, a solenoid 548 pulls the link 552 rightward and serves to rock bellcrank 582 clockwise about pivot 578 and remove the ear 572 from the tooth 570 and, therefore, allow the cam follower 558 to rock counter-clockwise about the pivot 586 and provide the initial leftward movement of the link 522 to engage the ear 528, FIG. 12, for rocking the shaft 506 clockwise during the subsequent clockwise rocking of the follower 558, FIG. 13, during the rise to the high of the cam. In this manner, only those cycles which require the adjustment of the tens stop one increment will provide the motion to the linkage which makes this adjustment at the bowler's position.

The tens stop member will be adjusted to ten also in response to a spare. In this case, the solenoid 550, FIG. 13, pulls a link 554. Link 554 is connected to a slide 590 which is mounted on spaced studs 592 and 594. Rightward pulling of link 554, therefore, moves the slide 590 rightward against the tension of the spring 596. Slide 590 carries a stud 598 which contacts an arm 600 of the latching member 582. Rightward movement of the slide 590, therefore, through the stud 598 serves to rock the latch ear 572 from contact with the tooth 570 on the latch 568. The latch ear 572 is, therefore, removed by either a strike or a spare and serves to adjust the tens stop one increment. The spare solenoid 550 serves also to adjust the spare latch as previously described to initiate a machine cycle on the first ball of the succeeding frame.

The means for pulling the link 544, FIG. 12, to adjust the spare latch are shown in FIG. 13. The link 544 is pivotally connected at 602 to a member 604 freely mounted on the center 586. The frame 604 is spring urged counter-clockwise against a stud 606. The member 604 carries an arm pivoted at 608 and spring urged counter-clockwise against a stud 616 also on the member 604. The member 604, therefore, normally stands in the position shown in FIG. 13. In the case of a spare, however, the solenoid 550 is operated and pulls the link 554 and the slide 590, as previously described. The slide 590 has a stud 618 which contacts member 614. Member 614 is pivotally connected at 619 to the cam follower member 558. In the case of a spare, it was previously stated that the ear 572 would be removed thereby allowing the cam follower 558 to rock counter-clockwise in the first part of the cycle. The stud 618 moves the member 614 clockwise about pivot or stud 619 and, therefore, positions the nose 612 of member 614 in the path of the ear 610 of the spare latch setting mechanism. The subsequent clockwise rocking of the cam follower when the roller 558 moves to the high of the cam, therefore, serves to rock the member 604 clockwise also and pulls the link 544 rightward to set the spare latch.

As previously explained in connection with the setting of the tens stop, FIG. 12, full reciprocation of the member 526 will serve to adjust the tens stop and let it be released prior to the forward clockwise rocking of the member 526. This setting and release of the tens stop when it is to be so adjusted occurs only once during each sensing cycle if it should be set, and the timing is no particular problem since any adjustment to set during the sensing cycle will serve to add in the correct tens increment to the bowlers' score during a subsequent add cycle whether or not the add cycle resulted from setting in the same frame. For example, a strike preceded by two strikes will complete a frame and the adjustment of the tens stop, in this case, is from a 20 to a 30 position. The add cycle in which the 30 is added will result in the restoration of the tens stop back to the 20 position. In the case of a spare, however, the setting of the spare latch may or may not be followed by an add cycle. Setting of the spare latch is for the purpose of counting the first ball in the next frame, however, and should not be reset or adjusted back during the subsequent add cycle if the add cycle initiated by the spare is for the purpose of completing a previous frame. For example, if a spare follows a strike, the spare latch is set during the sensing cycle and since the spare completes the previous frame in which the strike was made, the add-print cycle would serve normally to restore the spare latch. It is, therefore, important to retain this spare latch throughout the complete cycling of the machine in which the spare latch was set and only allow it to be reset during the add cycle of the subsequent frame. Means, are threfore, provided to hold the shaft 504, FIG. 12, clockwise throughout the complete cycling of the machine. These means are shown in FIG. 13. A cam follower 622 is freely pivoted on the center 586. A cam follower 622 is in contact with the cam 620 on the cam line 562. Very shortly after the cam 620 starts rotating clockwise, the follower 622 is rocked clockwise. Pivotally connected to the follower 622 at 638 is a link 634, which is connected to a bellcrank 636 pivoted at 578. Bellcrank 636 has an ear 576 which raises into the position to contact a tooth 574 on the link 568. A similar member 640 connected to the spare latch setting member has a tooth 642 which may also contact latch 576. Clockwise rocking, therefore, of the member 557 which serves to set the tens stop or clockwise rocking of the member 604 will result in either or both being latched in the clockwise position by the latch 576 and they will remain in this position until the latch 576 is removed by the clockwise rocking of the bellcrank 636 about pivot 578. Normally, the return home of the cam 620 on the machine line would, therefore, allow the counter-clockwise return of these two elements.

However, an add-print cycle starts the print clutch line and the cam 632 mounted on the print clutch line 564, once started, will rotate during the entire remaining adding and printing operation. A cam follower 626 with a roller 630 contacts the cam 632 when the print cycle is operating and the follower 626 pivoted at 628 is connected with a link 624 to the latching member which carries the line 634 to enable the latch 576. The link 624 is, therefore, leftward during all machine cycling no matter if it is a single sensing cycle or a plural add-print operation and can only return rightward if both the adding machine clutch and the printing clutch are in home position. It will, therefore, be seen that links 544 and 522 also remain in their extreme adjusted positions during complete machine cycling.

RESTORATION OF MEMORY ELEMENTS

The setting of elements to be sensed and the means for operation of the sensing elements to control the functions of the machine have been described. The restoration of the ten stop one increment and of the spare latch in each order was previously described in connection with FIG. 9 as being accomplished by the clockwise rocking of the lever 162 about pivot 164 with restoration of either or both the ten stop and the spare latch being accomplished through the ear 170. FIG. 2 shows the lever 162 and means to provide this restoration will now be described. A member 708 is pivoted at 710 on a stud located on the travelling carriage. Counter-clockwise rocking of the member 708 will cause ear 706 on this member to contact the arm 162 of the particular bowler as determined by the carriage position and rock this arm clockwise about pivot 164 to restore the tens stop or the spare latch. The member 708 underlies a shaft 712 which extends all the way across the machine. The shaft 712 is connected to a member which is pivoted at 714 and is rocked counter-clockwise to impart counter-clockwise movement to the member 708.

The linkage to rock the shaft 712 is shown in FIG. 12. A support plate 720 and the plate supporting the stud 722 are integral and held in the position shown by spring 718. A link 716 is pivoted at stud 722 to the assembly and rightward movement of link 716 will, therefore, rock the shaft 712 counter-clockwise about the pivot 714. Means for pulling the link 716 rightward (rearward) are shown in FIG. 14. The link 716 is pivoted at 724 to a member 726 freely pivoted on 586. The member 726 has an interponent 732 pivoted on a stud 728 and normally maintained in the position shown by a spring 730 which urges the interponent counter-clockwise but further movement is normally prevented by a stud 734 on the interponent resting against the surface 736 on a member 740 which is also pivoted at 586. The member 726 is rocked counter-clockwise by a driving member which carries a roller 748 in contact with a cam 750 on the adding machine clutch line 562. The driving member has an ear 744 which is capable of contacting a surface 746 on the interponent only at such time that the interponent is positioned counter-clockwise from that position shown and normally, therefore, the ear 744 will not contact the interponent except under such conditions as will now be described.

The operation of link 716 to restore the count first ball (spare latch) or the lens stop member should only occur during the sub-total cycle of the machine. In other words, these elements are set during the sensing cycle and are effective to be used during the sensing cycle and during the add cycle (the ten stop actually controls the amount of tens increments to be added during the add cycle) and, therefore, are restored during the sub-total cycle wherein the amount added into the register plus any accumulation up to that point is being printed out of the register. It was previously stated that there may be two add sub-total total cycles following a sensing operation and therefore, the tens stop may be restored twice during a complete machine cycling sequence. Both of these times, however, will be during the sub-total operation of the machine. Means for enabling the operation by positioning of the interponent are also shown in FIG. 14.

A cam follower 752 is pivoted at 682 and carries a roller 754 which contacts a cam 758 on the print clutch line 564. The cam follower is connected by a link 756 to the pivot 742 on the member 740. Clockwise rocking of the cam follower 752 will, therefore, pull link 756 rightward and impact clockwise movement of member 740 about pivot 586. This removes the surface 736 from limiting the stud 734 on the interponent 732. This allows counter-clockwise rocking of the interponent 732 and allows the surface 746 of the interponent to lie in front of the ear 744 so that subsequent counter-clockwise movement of the roller 748 will serve to rock the member 726 counter-clockwise and pull the link 716. It will be recalled that the adding machine clutch line rotates two revolutions for one revolution of the print clutch line 564, and furthermore that the print clutch line does not start its counter-clockwise rotation until the adding machine clutch line has made a portion of one revolution. The first part of the adding machine clutch line movement, therefore, will serve to rock the ear 744 freely over the top of the interponent 732 and again during the third portion of the second adding machine cycle which is an add cycle, the ear 744 will be positioned over the interponent. During this second cycle of the adding machine line, the print clutch line 564 will have rotated 180° and the cam follower 752 will, therefore, rock rockwise pulling the surface 736 away from the stud 734, but since the roller 748 has already been moved upward, the effective connection of the ear 744 with the surface 746 is not made until the third cycle of the adding machine which is the sub-total and, therefore, the tens stop and spare latch are restored only during a sub-total cycle. If a second add and sub-total cycle is to follow this, the adding machine line and the printing line will both continue to rotate. However, at the end of the third cycle of the adding machine, the roller 754 will have been positioned to the low of the cam on the print line and remove the interponent 732. Before the beginning of the fifth cycle of the adding machine line, however, the high of the cam 758 will have been in contact with the roller and the surface 736 again removed to allow the interponent 732 to be positioned in front of the ear 744. The member 726 will, therefore, be rocked counter-clockwise only during sub-total cycle and the link 716 will be pulled rightward only during such cycle.

COMPUTING AND PRINTING RACKS

Controlling the cycling of the adding machine has been described and also the general organization of the machine to the extent that there are six racks 10 (FIG. 2) in each bowling position and that the selection and control of a particular bowler's score and history entry is through a laterally moving carriage. The leftmost racks in each bowler's position were described as being devoted to the printing of ball information, and the rightmost three racks in each bowler's position devoted to the score entry and printing of score information.

Referring to FIG. 15, the central portion shows the six racks 10 associated with one bowler's position. A ball information print control member 674 extends across the entire machine under the racks 10. This member has an ear 676 in each bowler's position which is capable in its normal position, shown in FIG. 15, of blocking the second and third racks which are the first and second ball printing members. The relationship of the ears 676 to the racks are shown also in FIG. 3. It will be seen that if the ball information control block is in its normal position, it will serve to prevent the reciprocation of either the second or third rack in each order and, as shown schematically in FIG. 3, if the member 674 is pulled rightward, the ear 676 will block the third rack whereas if it is moved leftward, the ear 676 will block the second rack. In either of these displaced positions, the alternate rack will be free to move for printing of ball information. By means described later, this blocking member 674 will be pulled rightward, FIG. 15, during the printing of first ball information and will be pulled leftward during the printing of second ball information. Both of these printing cycles are sensing cycles and during the sensing cycles, the rightmost group of three racks associated with each bowler are independently retained from reciprocating by a latch 675 which is individual to each bowler. The latch 675 is shown schematically in FIG. 3 and is also shown in FIG. 2 as an ear on the member 648 which is supported on a shaft 650 and which has a forwardly extending arm 652.

The score racks normally retained during the sensing cycle are released for reciprocation by a counter-clockwise rocking of the member 648, as shown in FIG. 2, by a lever 656 pivoted at 664 on a stud on the travelling carriage. Lever 656 has an ear 658 which overlies the arm 652 on the particular latch associated with the bowler's position and, therefore, only the latch associated with that bowler will be removed at the proper time by clockwise rocking of 656. The ear 658 is retained in the position shown against the stud 662 by a spring 660. In operation, the shaft 654 which extends all the way across the machine and underlies the member 656 is rocked clockwise on a center concentric with 664.

Means for rocking shaft 654 clockwise are shown in FIGS. 12 and 16. As shown in FIG. 12, a link 670 is connected to a plate 668 which is affixed to the center 666 and which carries the shaft 654. The assembly is held in the normal position by a spring 672 that is connected between plate 668 and link 670. When link 670 is pulled rightward, the shaft 654 will rock clockwise to release the scoring racks at the proper time. Means for pulling the link 670 rightward (rearward) are shown in FIG. 16. A cam follower 678 pivoted at 682 has a roller 684 in contact with a cam 686 on the print clutch line 564. Counter-clockwise rotation of the cam 686 will at the proper time pull link 670 rightward by the counter-clockwise rocking of the cam follower. This action will release the racks for entering of the scores and printing of the score information. The scoring racks should not be released during the ball information or sensing cycle of the adding machine.

The adding machine line 562 rotates some distance before engaging the print clutch (about 135°). There is a ratio between the two cam lines 562 and 564 of 2:1, that is, that the adding machine cam line 562 will make two complete revolutions while the print clutch line 564 makes one revolution. Due to this relative timing, the adding machine line 562 has made one complete revolution before the roller 684 starts up the high of the cam 686. The link 670, is therefore, not pulled rightward until after the completion of the sensing cycle in which the ball information was printed. If the information was such that an add-print cycle did not follow the sensing cycle, then the release of the racks through this linkage is ineffective since the adding machine cycle will have been completed prior to this movement. If, however, the sensing cycle does initiate an add-print cycle, the adding machine continues to cycle for an add followed by a sub-total cycling of the machine. In both of these cases, the racks which control the entry and printing of score information should be free to move. Furthermore, they should be free to move during the entire cycling of the adding machine in such add and sub-total cycle even if followed by a second add and sub-total as previously described on the condition of a miss following a strike. Once the link 670 is pulled rightward, it is maintained in this position throughout the entire cycling of the machine by a latch 690, FIG. 16, which contacts the stud 694 on the link 670 and prevents its rightward return. The latch 690 is pivoted at 692 and normally held disabled as shown. It was previously discussed in connection with FIG. 13 and as related to the strike and spare operation of the machine that a linkage was latched up at the start of an adding machine cycle and maintained in the latched position until all of the machine cycling was complete. This link 624 is shown as connected at 688 to a cam follower 622. This linkage is also shown in FIG. 16 in which the cam 620 is also shown effective upon rotation of the adding machine line 562 will rock the roller 622 clockwise and, therefore, the link pivot 688 clockwise. Link 624 carries another link 696 connected at 698. This second link 696 has a slot 702 in which a stud 700 is located. Stud 700 which is on the latch 690 and a spring 704 tends to hold the latch in ineffective position until the link pivot 688 moves leftward. At this time, the latch 690 is made effective and according to the previous description of the link 624, the latch remains effective until the termination of all machine cycling. It will be seen that the action of making the latch effective occurs in the very first adding machine cycle; however, the link 670 does not move rightward until one complete machine cycle, but once the roller 684 is rocked counter-clockwise, the link 670 will remain effective to prevent its return until all machine cycling is complete. In this manner, the numeral racks are held free to reciprocate during all add and sub-total cycles of the machine.

SUB-TOTAL OPERATION

It was previously stated that the numeral slides 29 of FIG. 2 were effective only during the sensing and add cycle of the machine and that during sub-total (and total) cycles, the block in which the slides 29 are positioned is moved upward so that the surface on the set slides is not effective to limit the movement of the numeral racks. In connection with FIG. 14, it was explained that the member 726 is rocked counter-clockwise only during sub-total cycles. The same driving elements 726 are used also to raise the block to remove the stops during sub-total cycle. A link 760 is pivotally connected to the member 726 at 724. Counter-clockwise rocking of member 726 about pivot 586 will, therefore, pull link 760 rightward. This action raises the block through linkage shown in FIGS. 15 and 17. The link 760 is shown in FIG. 17 as pivotally connected at 762 to a bellcrank 764 pivoted on the frame at 766. The rightward (rearward) pulling of link 760, therefore, rocks the bellcrank 764 counter-clockwise and pulls a link 770 pivoted to it at 768 upward in the drawing which is leftward as related to the machine. The link 770 is shown in FIG. 15 pivotally connected at 772 to a parallel linkage consisting of members 776 and 778 connected by a link 774. The parallel linkage is pivoted in a fixed block on two eccentric studs 780 and 782 which are located under the block 37 which carries the stops. In the position shown in FIG. 15, the eccentrics are rocked to a position rocking the block upward, making the stops ineffective and allowing the slides free movement for the sub-total operation. It will be seen that the ten stop ear 32 and the individual stop 784 on the slides 29 will be removed from effectively stopping the racks even though the slide 29 may be leftward to align the stops 784 with the sixth (units) rack or with the second and third (ball information) racks of the bowler's group.

BALL INFORMATION RACK CONTROL

Racks 10, as previously described (FIGS. 2 and 3), are controlled in extent of movement allowed by one of the slides 29 and in connnection with a single bowler, the second, third and sixth racks represent first ball information, second ball information and units entry information. respectively. It was also explained that the extent of movement of the tens rack, the fifth rack, of each bowler's position is controlled by an individual ear 32 on the tens stop member and that the hundreds rack, the fourth rack, at each bowler's position cam up against a fixed stop on the slide block 37. It was also stated that means are provided to prevent any movement of the numeral racks in the sensing cycle, at which time the slide 674, FIG. 3, is moved either rightward or leftward to allow the appropriate rack to move against the stop for a purpose of printing such ball information. During add and sub-total operations, however, the slide 674 blocks both first and second ball information print control and the score entry racks are free to move during adding and sub-total operations. The five racks, second through sixth inclusive, have, therefore, been explained both as to the elements that control the extent of the actuation movement and the circumstances by which they are held back and not allowed to move rearward during machine cycling.

The first rack, which is a special information print rack, is allowed to reciprocate during all the machine cycling and will be allowed to go the full extent of its excursions at which position the associated print wheel is at a blank position. The leftmost score column is, therefore, normally blank or unprinted. In order to position the special information print wheel at a particular symbol print position, the forward excursion of the rack must be stopped at the correct associated intermediate position. Means for accomplishing this are shown in FIG. 18. Each of the first racks is connected by a link 786 which is pivoted at 788 on a member 790 integral with a shaft 792. The rack 10 moves rightward (rearward) during machine cycling and the link 786 through arm 790 tends to rock the shaft 792 counter-clockwise. If this movement is freely allowed, blank printing will result. Means are provided, however, to stop the counter-clockwise rocking of shaft 792 and thereby limit the rightward movement of the numeral print rack 10. A solenoid operated stop 794 for each symbol is projected laterally into the path of an arm such as 796 which is also secured to the shaft 792. Projection of a stop 794 into the path of the arm 796, therefore, tends to limit the counter-clockwise rocking of the shaft 792. There are several arms such as 796, 798 and 800 all placed so as to represent a limit at a different angular position of the shaft 792, each associated with the printing of the specific symbol associated with that element and each controlled by a stop such as 794.

PRINTING MECHANISM AND FRAME POSITIONING

Previous description of the sensing and control mechanism for machine cycling as shown in FIG. 11 refers to the operation of a cam 344 at the lower right-hand corner which provided these functions and which, it was stated, was operated by a link 342. FIG. 14 shows a portion of this link 342 and also shows the means for pulling this link rightward during each cycle of the adding machine line 562. The link 342 is on the right side of the machine as previously described and is pulled rearward by an arm 816 pivotally connected at 818 to the link 342. The arm 816 is integral with shaft 814. The adding machine cam line 562 is shown in FIG. 14 and is located on the left side of the machine. The shaft 814 extends through the machine and is rocked clockwise with each adding machine cycle by means of a cam follower 802 with a roller 804 in contact with a cam 806 in the adding machine line 562. The cam follower 802 is pivoted at 586 and pivoted to it at 810 is a link 808 which is secured at 812 to an arm integral with the shaft 814. The cam 806, therefore, on the adding machine line serves to rock the follower 802 clockwise and through the link 808 rock the shaft 814 clockwise also to pull the link 342 rearward with the machine cycle.

The printing mechanism has been partially described and included in the general description of the machine operation with the printing mechanism shown in FIGS. 5, 6 and 7. More detailed operation will now be given. The setting of the print wheels 71–76, FIG. 5, during the return excursion of the rack 38, FIG. 2, through the gear 86 and the print head rack 84, as shown in FIG. 5, is controlled through a print clutch operation which performs several functions in the proper sequence. The print clutch line serves to engage the gears 86 at midcycle position with the gear segment 97, as shown in FIG. 6. During the first half of the cycle or rearward movement of the rack, the gears 86 are not engaged and the shaft 23 is rocked counter-clockwise allowing the gear segment 97 to follow until stopped by either one of the numeral stops or numeral wheels (accumulator). If the segment 97 has been allowed to rock counter-clockwise and subsequently gears 86 are engaged with the segment, the clockwise rocking of shaft 23 will positively rotate the gears 86 counter-clockwise to set the print wheels (see also FIG. 5). The position attained by the print wheels is held by a detent described later. The print wheel assembly within the frames 81, 82 (FIG. 7A) is shown in FIG. 5 and is movable both horizontally and arcuately. The frame sides have teeth 820 engaged with the teeth of a gear 836 for the horizontal movement. The gear 836 is keyed to the shaft 99 but is allowed lateral movement with the entire assembly. Rotation of the shaft 99 will impart rotation to the gear 836 and tend to move the print head assembly 81–82 rearward when the shaft 99 is rotated clockwise. The amount of this rearward movement allowed will depend upon the particular score frame which is to be printed (i.e., first frame is top line of score sheet). The extent of such allowed movement is controlled by a stepped plate shown in FIG. 6. The stepped or stepping plate 824 has a series of steps 826, each one representing a score frame position. There are two stepped plates 824 and they are freely mounted on a bushing concentric with shaft 99. It will be noted that as the stepped plate 824 is rocked clockwise, the succeeding steps are located farther away from the ear 822 on the print wheel assembly. Rotation of the shaft 99 clockwise will move the print wheel assembly rightward through the teeth 820 until the ear 822 hits one of the steps on the blocking plate 824. Continued rotation of the shaft 99 after the assembly is blocked by the ear 822 against the plate 824 will cause an arcuate rocking of the entire print head assembly about the shaft 99 as the center. In the position shown in FIG. 6, the radius of this arcuate movement is at its greatest and the printing will, therefore, be on the top line of the print surface which is supported in fixed frame 92 in a plane above the assembly which rotates about the shaft 99 and at 90° from the position of the print head as shown. Reduction of the radius of the arc made by the print head in this 90° movement will cause the printing to be at a lower position on the score sheet. Each step on the plate 824, therefore, controls a line on which the printing occurs and these steps are positioned by arcuate displacement of the plate 824 through a stud 830 and a member 828 secured to a member 832 which carries a slot embracing a shaft 834 which extends all the way across the machine. The selection of a frame is made prior to movement of the ear 822 and is accomplished by the arcuate movement of the shaft 834 about the shaft 99 as a center of means described later.

It will be seen, however, that the positioning of the stepped plate 824 may occur quite independently of the lateral location of the printing assembly except at such times as the print clutch is actually rotating the shaft 99. In the normal position, there is some clearance between ear 822 and the first frame step. It should also be noted that the stepped plates 824 are free to move clockwise after contact by the ear 822 for the 90° arcuate movement as part of the print wheel assembly. The stud 830 leaves the surface of member 828 which controls its initial arcuate position.

Normally, the shaft 834 is carried in a position to control the printing of ball information in the proper frame. Ball information is always prined in the current frame as indicated by the arcuate position of this shaft. However, the scores are sometimes printed in the previous frame or in two frames previous to the current frame and the printing on the proper line, therefore, is related to the frame and will be effected by the counter-clockwise movement of the shaft 834 one or two increments as determined by the condition sensed.

Means for adjusting the shaft 834 counter-clockwise are shown in FIGS. 19 and 20. As shown in FIG. 20, the shaft 834 is mounted in a plate 838 loosely pivoted on shaft 99. A ratchet tooth member 840 is riveted to the plate 838 and the entire assembly is urged clockwise by a spring (not shown). Such clockwise movement, however, is prevented by an ear 844 on a ratchet lever pivoted at 866 on a plate 842 also freely pivoted on the center 99. Clockwise movement of the plate 842 is limited by a stud 864 carried in a slot in member 856. The member 856 is positioned against a fixed stud 854. This assembly is held clockwise against the stud 854 by a spring 862.

Normally, the machine is adjusted to advance from one frame to the next by reciprocating the ratchet member by means of a solenoid 868 which pulls the ratchet counter-clockwise through a link 848 pivoted at 850 on the ratchet member; ear 846 on the ratchet member allows a half-step and when the solenoid is released, the shaft 834 has made one increment or step representing the next frame. When the frame in which the score is to be printed is to be adjusted for such printing to a previous frame position, the shaft 834 is rocked counter-clockwise either one or two increments by rocking the plate 842 the required distance and since the plate 842 carries the ratchet center 866, this movement is imparted to the shaft 834 without disturbing the ratchet position which represents the current frame.

Means to provide this incremental movement for control of the printing of the score in the right place (score frame) are shown in FIG. 19. A cam 870 mounted on a center 872 is rocked counter-clockwise by a link 900 from the print clutch line as is described later. A cam follower link 876 which carries the stud 860 has a roller 902 which rests against the cam 870. The member 876 is supported by a link 904 pivoted on a fixed stud 906. Counter-clockwise rocking of the cam 870 will serve to rock the follower 902 clockwise about the pivot 860. A member 880 is pivoted at 878 at the center of the link follower 876 and clockwise movement of the link 876 will, therefore, move the pivot 878 leftward. The member 880 is normally spring urged by spring 908 against a fixed stud 910. Member 880 has an ear 882 which is normally free to rock leftward when the cam 870 is rocked counter-clockwise. A blocking member 884 pivoted at 892 is provided with two steps 888 and 886. This blocking member is spring urged by a spring 896 clockwise against the stud 894 as shown and may be adjusted to align the notch step 888 in the path of the ear 882 or the step 886 in the path of the ear 882. If the blocking member 884 is positioned so that the step 888 is an alignment with the ear 882 when the cam 870 is rotated counter-clockwise, the leftward movement of the member 880 will be blocked and further counter-clockwise movement of cam 870 will cause the member 876 to pivot about the stud 878 and move the link 856 rightward. The depth of step 888 is sufficient to cause a movement of one increment of the plate 842 and consequently adjust the shaft 834, FIG. 20, one step and control the printing in the frame previous to that for which the machine is adjusted. Similarly, if the step 886 of member 884, FIG. 19, is positioned to block the ear 882, the pivoting of the member 876 about the center 878 will be sufficient to rock the plate 842 counter-clockwise two increments and control the printing of two frames ahead of the current frame.

Means for positioning the plate 824 controlling printing of a score in the proper frame will now be described. The control of the correct printing position is established by the position of the tens stop member in its adjusted position upon receipt of the ball information of the particular frame. In other words, if receipt of ball information completes a frame and the tens stop element is adjusted to add ten exclusive of current ball information, then the score printing is controlled by the sensing to be in the frame previous to the current frame. If the tens stop is adjusted to add 20 at the time current information is received and such information completes a frame, then the printing is adjusted by the sensing of the 20 to print the score two frames ahead of the current frame. Such sensing is done, therefore, in the sensing cycle and prior to the adjustment of the tens stop for the current ball information.

The mechanism for accomplishing this is shown in FIG. 19. A link 898 is connected at 912 to a cam 914. A cam follower 922 pivoted at 920 carries a roller 918 in contact with the cam 914. Follower 922 has a pivot 924 on which is pivoted a member 958 spring urged counter-clockwise about its pivot by a spring 932 and limited by a fixed stud 928. Member 958 carries a stud 930 overlying the member 946 pivoted on the center 892 and spring urged clockwise by a spring 950. The other end of member 958 is connected by a link 926 to a lever 936 freely pivoted on a shaft 316. The other arm of lever 936 terminates in an area 940. It was previously stated in connection with sensing that the shaft 440, FIG. 11, was adjusted by the sensing mechanism to an angular position determined by the step on the tens stop. The shaft 440 has secured to it a plate 956 which has two steps 942 and 944 which may serve to block the car 940 depending upon the angular position of the shaft 440. Clockwise rocking of the cam follower 922 through the roller 918 against the cam surface 914 will tend to pull the center 924 downward. Since the member 958 is normally spring held against the stud 928, the downward pulling of the pivot 924 will pull link 926 downward and rock lever 936 clockwise about the pivot 316. The timing is such that the shaft 440 has been rocked counter-clockwise as much as it will be allowed to rock depending upon the adjusted position of the tens stop before cam 914 is rocked. If the tens stop is at zero, the shaft 440 will have been rocked so that the surface 960 is in alignment with the ear 940 on lever 936, and consequently no blocking of the clockwise rocking of the lever 936 has occurred and the lever 958 has remained against the stud 928. If, however, there is ten in the adjusted position of the tens stop, the shaft 440 will have only been allowed to rock until the surface 944 will be contacted by the ear 940 when the link 936 is rocked. Under these conditions, the blocking of the ear 940 will stop the clockwise rocking of the lever 936 and further movement of the pivot 924 downward will rock the lever 958 clockwise about its pivot. Lever 958 carries a stud 930 against the member 946 and, therefore, the member 946 will be rocked counter-clockwise about the pivot 892. This action serves to adjust the member 884 previously described to a position where the surface 888 is in the path of the ear 882 to control the printing one frame previous to the current frame. If the shaft 440 is blocked by the ten stop at a position wherein there is a 20 in the tens stop at the beginning of the sensing cycle, the surface 942 will block the ear 940 of the lever 936 and the resultant clockwise movement of the lever 958 as the center 924 is pulled downward will rock the plate 946 downward two increments through the stud 930 and this will adjust the surface 886 opposite the ear 882 for controlling the printing two frames previous to the current frame as described.

As was previously stated, the sensing occurs during the sensing cycle and the printing of the ball information occurs during the sensing cycle, whereas the printing of the score information is during the sub-total cycle. At this time, the tens stop may have been adjusted to a different position than that initially sensed due to the current ball information which may be a strike or a spare. The information previously sensed, therefore, must be maintained until utilized by the printing of the sub-total in the correct frame position. For this purpose, a latch 954 pivoted at 956 will be allowed to engage the ear 952 in one of the notches 948 if the plate 946 is so adjusted. Attention is called to the fact that the link 898 and the two associated cams 914 and 870 are not shown in their normal home position in FIG. 19 but shown in a partially operated position for clarity. It was previously stated that the two cams were operated by a cam on the print clutch line and in the position shown in FIG. 19 are in a clockwise extreme position, whereas in the home position of the linkage the cam 870 has been rocked counter-clockwise to a point where roller 902 is on the high of the cam, whereas the roller 918 is still on the low of the cam 914 in this home position. During the print clutch cycle (about 150° of the adding machine clutch cycle position), the link 898 is pulled rightward so that the cam 914 rocks the follower 922 clockwise about pivot 920 to affect the sensing position of the plates 946 and 884. At this time, since the roller 902 is on the high of the cam 870, the ear 882 will be resting on the surface 890 of the member 884 and any counter-clockwise movement of the plate 884 will simply raise the ear 882 and rock the member 880 away from the stud 910. As soon as the adjustment of the plate 946 has been made, the stud 962 on the link 964 which is on the adding machine clutch line will move leftward and allow the latch 954 to become effective to hold the two members 946 an 884 in their adjusted positions. Later in the print clutch cycle, the link 898 moves leftward to the position shown and the rollers 902 are allowed to drop to the low of the cam 870; immediately thereafter, the cam 870 is rocked counter-clockwise to adjust the plate 842 to the correct position for the printing of the score information. Timing is such that two machine cycles have been completed and it is on the second operation of the print clutch that the positioning of the printing is effected to print the scoring in the proper frame position. It will be recalled that the first cycle of the machine is the sensing cycle, and the second cycle of the machine is the add cycle if such follows, and the third cycle of the machine is the sub-total cycle. The print clutch relationship is such that printing occurs with the sensing cycle, whereas the add cycle involves no printing and the third cycle of the machine which is the sub-total cycle is a printing cycle. The above mentioned adjustment is timed therefore such that the information utilized during the sub-total cycle is that which was sensed during the sensing cycle.

The adjustment of the printing element for printing in frames ahead is immediately released once it has been used. Means therefore, are provided to release the latch 954 upon any movement of the plate 842 to adjust the frame position. The latch release means 966 is pivoted at 968 on the plate 842 and any counter-clockwise rocking of this plate would pull link 966 rightward. Link 966 is supported on a stud 970 in a slot and rightward movement of the link 966 will serve to move the ear 972 to release the latch 954 by rocking it counter-clockwise to release the latch 954 by rocking it counter-clockwise out of engagement with the plate 946. The timing of the operation is such that the plate 946 is only adjusted during the sensing cycle.

The shaft 440 which carries the plate 956 is rocked counter-clockwise only on add or non-add cycles of the machine as previously explained. It is, therefore, rocked on the first, second and fourth adding machine cycle (if the fourth should occur). The lever 936, on the other hand, is only rocked by a linkage arm on the cam on the print clutch line and the timing of this clutch is such that the lever 936 will only be rocked clockwise during the first, third and fifth cycles of the adding machine. The coincidental rocking of the shaft 440, therefore, and the lever 936 only occurs on the first adding machine cycle which is the sensing cycle of the machine.

The stud 962 on the link 964 is returned rightward at the termination of the machine cycling and serves to disengage the latch 954 from the plate 946 in the event that the plate is adjusted during a sensing cycle which is not followed by an add-print cycle. The link 964 is connected to a plate integral with the shaft 300, FIG. 11, which it will be recalled, remained clockwise during all the machine cycling, returning counter-clockwise only at the termination of such cycling. Thus, any adjustment of the plate controlling the frame print location will be released whether or not an add, sub-total cycle ensues.

The link 898, FIG. 19, has been described in its action and, as stated, operated by a cam on the print clutch line by link 900. The link 900 is on the right side of the machine and the print clutch assembly is on the left. The of operation of the link 900 is, therefore, through a shaft 976, through the linkage shown in FIG. 20. A cam follower 978 pivoted on a stud 980 located at the left side of the machine carries a roller 982 in contact with a cam 1000 on the print clutch line 564. The follower 978 is connected at 984 to a link 986 which is also pivotally connected to an arm 988 firmly secured to the shaft 976. An arm 990 is firmly secured to the shaft 976 on the right side of the machine and, therefore, follows the movement of the shaft. A plate 992 is freely pivoted on the shaft 976 and connected at 998 to the link 900. A strong spring 996 tends to hold a stud 994 against the arm 990 so that the plate 992 will follow the movement of the arm 990 and in all normal cases of operation these movements will be without yield. The yieldable connection between the plate 992 and the arm 990 is provided to protect against loss of adjustment of the proper relationship of the parts. It will be seen from the shape of the cam 1000 that the movements described in connection with the operation related to the cams 870 and 914, FIG. 19, are provided to this linkage.

PRINTING OPERATION

Operation of the printing mechanism previously described in connection with FIGS. 5, 6 and 7A is controlled from a cam on the print clutch line. As shown in FIG. 6, the gears 86 which engage the rack or segment 97 to control the setting of the print wheel 71 are mounted on shaft 112. The print head frame has an extension 1008 on the forward end which overlies a shaft 1002 which extends across the machine. Shaft 1002 describes a substantially square path in its movement described later, and in the position shown in FIG. 6, is down and to the left of its normal full cycle or home position. A hook member 1004 continually embraces the shaft 1002 and the member 1004 is pivotally connected to the stationary frame 96 at 1006. The shaft 1002 is brought downward at mid-city position of the adding machine cycle (operated by the print clutch however) and this downward movement allows the print head frame 1008 to move downward about the pivot 99 and engage the gears 86 with the segments. In order to assure that such engagement will be held during the transfer operation which adjusts the print wheels 71–76 in accordance with the displacement of the segment 97, a latch member 1010 pivoted at 1012 is spring urged downward by spring 1018 connected to the hook 1004. The latch member 1010 is pivoted at 1012 to the main frame and when rocked clockwise by the spring 1018 will overlie the center shaft 110. Raising of the shaft 1002 from the position shown will, through the contact of stud 1020 with member 1004 remove the latch 1010 from contact with the shaft 110, and further movement upward of the shaft 1002 will then raise the print head assembly 1008 and disengage the gears 86 from the segment 97. Subsequently, the shaft 23 and segment 97 will be rotated clockwise as previously explained to operate the print head.

The print head is brought into engagement by the shaft 1002 as stated and as shown in FIGS. 5 and 6. The normal position of this shaft is displaced 180° from the place shown in FIG. 5. In the position shown in FIG. 5, it can be seen that shaft 1002 is well away from the lower arm 1032 of the detent 95 pivoted at 1034 on the print head assembly. During the setting of the amount into the printing wheels, the detent ear 98 is, therefore, in contact with the teeth of the print wheel rack 84. The rack 84 may move leftward, however, during the setting without interference by ear 98. Once the print wheels are set however, detent ear 98 prevents rightward return of the rack by the action of spring 93 until printing has been completed. As the print head assembly returns, however, the detent arm 1032 contacts the shaft 1002 which at that time will be in the upper right corner of its movement in a square path and the ear 98 will be rocked clockwise about the pivot 1034 and release the racks and allow them to return to home position by spring 93.

The print head is guided and controlled for lateral movement to engage the gears 86 with the segment 97 by a guide rail which is part of the main frame 96 (FIG. 6). The guide rail is contacted by rollers 1016 on either side which are pivoted on the center 110 of the print wheel (see also FIG. 7A). Normally, the rollers ride on the guide rail 96 at a position higher than that shown in FIG. 6, and the guide rail 96 has a notch 1022, FIG. 6, at the forward end to allow the downward movement of the print wheel at that time and in that position. A block is provided by the end 1014 of the frame 96 which serves to locate the print head correctly for the transfer. It is, therefore, only in this position that the gears 86 may be lowered to engage the segments.

Means for controlling the substantially square path movement of the shaft 1002 are shown in FIG. 14. The shaft 1002 is mounted in an essentially square plate 1030 to which is integrally secured a triangular shaped cam 1024. The triangular cam 1024 is confined in a square hole 1026 in a fixed plate 1028. Cam 1024, upon being rotated 90°, will move the shaft 1002 downward from the position shown. Upon rotation of the cam 1024, the second 90° shaft 1002 will be moved leftward. The third 90° movement of the cam 1024 will move the shaft 1002 upward and the fourth 90° movement will return the shaft to the position shown. Due to the shape of the cam 1024 and the confined opening 1026, the square plate 1030 rotates about a fixed center. The square plate 1030 has a stud 1046 at each corner which are contacted in sequence to provide 90° steps of rotation to the plate 1030 through linkage operated by a cam on the print clutch line. A lever 1032 is mounted on a fixed pivot 1034 and carries a lever 1044 pivoted to it at 1040 and spring urged counter-clockwise by spring 1042. The lever 1032 is connected at 1062 to a link 1036. Link 1036 is connected at 1064 to a cam follower 1068 which carries a roller 1070 in contact with a cam 1072 on the print clutch line 564. There are a series of rises 1074 on the cam 1072 (four in all) and each of these rises causes a clockwise movement of the cam follower 1070 about pivot 682. The link 1036 is thereby pulled rightward and through the connection 1062 will rock the lever 1032 clockwise about the pivot 1034. The arm 1044 has a hook on the end adapted to contact one of the studs 1046 on the plate 1030. The extent of its movement provides a 90° rotation of the plate 1030. A detent 1048 pivoted at 1050 is provided with a spring 1052 to hold the detent against whichever one of the studs 1046 has been advanced to the 90° position. Means are provided to prevent overthrow of the plate 1030 and consists of a lever 1054 pivoted at 1056 which carries a stud 1058 against the lower surface of the lever 1032 which has a cam rise 1060. Clockwise rotation of the lever 1032 will rotate the surface 1060 and through the stud 1058 rock the lever 1054 clockwise about the pivot 1056. The nose on the lever 1054 is thereby brought into the path of one of the studs 1046 which will be rotated around to that position. The nose of the lever 1054 is not removed until the link 1036 is moved counter-clockwise by a spring (not shown) and this action also serves to move the hook lever 1044 back into a position to contact the next stud 1046. It will be seen, therefore, that at the proper time the shaft 1002 may be brought down, leftward, and upward again to control the engaging of the printing assembly with the actuating segment of the adding machine. Subsequent to the engagement of the gears 86 with the segment 97, FIG. 6, the shaft 99 is rotated clockwise for the actual printing operation by mechanism shown in FIG. 20. It was previously stated that the shaft 99 (see also FIGS. 5 and 6) would be rotated clockwise until the ear 822 reached one of the steps on the stepped cam 824 and that further clockwise rocking of the shaft 99 would cause the entire print head to rotate 90° in order to affect the printing. These two movements, that is, the movement against the stop and the subsequent 180° movement are controlled by two separate cams on the print clutch line. The positioning of the print assembly against the stop is accomplished by mechanism shown in FIG. 20. A gear 1088 is keyed to the shaft 99 and the teeth of this gear are engaged by a long rack 1086. The long rack is held in engagement with the gear 1088 by two spaced rollers 1090 and 1092 which are mounted on a plate loosely pivoted on the shaft 99. Slight rotation of the plate containing the rollers is allowed, however, and, therefore, the rollers are essentially fixed. Rightward movement of the rack 1086 imparts a clockwise rotation to the shaft 99.

Rightward movement is provided by a cam follower and a yieldable connection. The follower 1076 is pivoted on the shaft 682 and carries a roller 1072 on the surface of the cam 1074 on the print clutch line 564. The cam follower 1076 is connected by spring 1094 to an arm 1082 also loosely mounted on shaft 682. The arm 1082 has a pivotal connection at 1084 to the rack 1086. The spring 1094 tends to pull an ear 1080 against the surface of the arm 1082. Clockwise rocking of the cam follower 1072, therefore, because of the spring 1094 will tend to pull the rack 1086 rightward. The spring 1094 is relatively weak and as soon as the print wheel assembly is blocked, the spring 1094 will yield upon further clockwise movement of the follower 1076.

Subsequent to this positioning of the printing wheel to the proper frame position stop, the shaft 99 will be rocked 90° additional in order to contact the print element with the transparent paper on which the printing is accomplished. A second cam follower 1100 is loosely mounted on the shaft 682 and has a roller 1096 in contact with a cam 1098 also on the print clutch line 564. The upper end of the follower 1100 is connected by link 1102 which is connected at 1104 to a plate 1106 carrying a stud 1108 on which is pivoted a member 1110. Member 1110 is urged clockwise by a spring 1112 that normally positions it against a stud 1116 on the substantially fixed plate previously described and carrying rollers 1090 and 1092. A toothed gear 1118 is keyed to the shaft 99 and the teeth are so spaced that there is one for each step of movement as provided by the rightward movement of the rock 1086 in positioning the print head for printing on the proper frame line. Clockwise rocking of the plate 1106 which is loosely mounted on the shaft 99 will, therefore, lower the ear 1114 into engagement with one of the teeth 1118 and subsequent clockwise rocking of the plate 1106 through the link 1102 will, therefore, rotate the shaft 99 positively for 90°.

The connection between the cam follower 1100 and the link 1102 to provide the 90° rocking of the print mechanism rigidly follows the movement provided by the cam 1098 but is arranged so that it may be disconnected under certain circumstances so that the follower 1100 may freely rock without raising the print head. This disconnectable linkage is as follows. The arm of the follower 1100 brings a stud 1122 in contact with a member 1128 which is pivotally connected at 1124 to a plate 1120 freely mounted on the shaft 682. The plate 1120 is connected at 1130 to a link 1102. Normally, therefore, the link 1102 moves rightward with the cam follower 1100. A spring 1126 holds the interponent 1128 against the stud 1122 on the cam follower. Means controlling the disconnecting of this link are described later.

PRINT CARRIAGE LATERAL CONTROL

As previously stated, the printing carriage may be moved laterally to be associated with any group of six rack carriers 10 for a particular bowler (FIG. 3). As seen in FIG. 7A, the main frame members 96 are supported on a shaft 1138. The frames 96 contain bushings (not shown) for free lateral travel. A plate 1140 is secured to the main frames and extends downward at the rear of the machine. The plate 1140 carries the slot through which a roller 1142 extends.

The roller 1142 and means for positioning are shown in FIGS. 21 and 22. The roller 1142 is on an arm 1144 which is pivoted at 1150 on a base plate. The arm 1144 carries a roller 1152 and is spring urged counter-clockwise against a cam 1154 (spring not shown). The cam 1154 is secured to a large gear 1156 which is driven in a manner described later, by the small gear 1158. The outer periphery of the cam 1154 has a series of arcuate steps progressively higher until the final step position. A single rotation of the gear 1158 will advance the cam counter-clockwise and move the roller 1152, and consequently the arm 1144 one position clockwise about its pivot 1150. It should be noted that in the position shown, the roller 1142 is at the leftmost position and that clockwise rotation of the arm 1144 will position the roller rightward one position. The drawing is shown as representing the bowler in the first position, at which time the print carriage is at the left of the machine as viewed from the front. For every single rotation of the gear 1158, the arm 1144 is moved one step rightward and after it has been positioned at the extreme right, a single rotation of the gear 1158 will position the roller 1152 from the extreme high of the cam to the extreme low as shown in the drawing. A plate 1160 serves to confine the roller to the downward path during this lateral movement in the same manner as a box cam. The gear 1158 is mounted on a clutch plate 1162 which is the driven member of a clutch. A clutch dog 1164 is pivoted on the driven member and counter-clockwise rocking of the lever 1168 about pivot 1170 removes the ear 1166 from the clutch dog and allows it to contact the single tooth on the driving member. Release of the ear 1166, therefore, serves to engage the clutch and allows clockwise driving of the gear 1158.

A separate lever 1172 is also pivoted at 1170 and carries a stud 1174 which is positioned against the surface of the driven member 1162 serving to provide positive positioning of the clutch at home position. The shifting clutch is operated through a solenoid which rocks clutch arm 1168 counter-clockwise and the carriage is positioned from a button on the control panel, or alternatively from an automatic program unit. As will be described later, the carriage may be brought to any particular bowler's position by holding down a particular player's button. For this purpose, the energization of the solenoid is through a plate which is conductive. The plate 1176 is carried around by the cam, but insulated from it, and a series of contact fingers 1180 are located at the relative player's position so that a single wire may be connected to one of these contact fingers 1180. This will serve to hold the clutch engaged by keeping the solenoid energized until the position is reached, at which time it will be noted a cut-out portion in the plate is attained at 1178 in relation to 1180 and the contact finger 1180 is then off of the surface of the conducting plate. The rotation of the gear 1158, therefore, ceases when the solenoid is deenergized and the clutch engaging arm 1168 is allowed to engage the clutch dog. Special operations at any particular position are attained by provision of an extension such as the conducting surfaces 1177 which is extended to a greater radius described later in connection with the keyboard unit operations. It will be seen, therefore, that the carriage may be positioned at any of the bowler's positions by simply closing a switch at the bowler's table and energizing a single wire to this unit. Automatic programming is described later.

TENTH FRAME OPERATION

Tenth frame operation of the machine differs from other operations in that once a ball is rolled in the tenth frame, the end of the game has been reached and it is then necessary to complete the game and to normalize all of the memory elements associated with that bowler, clear the accumulator register, and transfer such total into team total accumulator before proceeding to the next bowler. All of these special operations are performed by a separate tenth frame clutch, the operation of which is initiated upon the actual completion and printing of the tenth frame score for that particular bowler. It will be recalled that a bowler making a strike in any particular frame is entitled to roll two more balls before his tenth frame score is completed. If the bowler makes a spare in the tenth frame, that bowler is entitled to roll one more ball before his tenth frame score is completed. The making of a strike or a spare in the tenth frame may also complete a score in the ninth frame or possibly in the eighth frame in the event of a series of strikes or a spare in the preceding frame or frames. It has been previously stated in connection with the advancement of the frame control mechanism for printing in the proper frame that a solenoid 868, FIG. 20, is energized. This action serves to allow an escapement of one step clockwise of the ratchet 840 and the consequent lowering of shaft 834. As shown in FIG. 6, the lowering of shaft 834 through the member 828 and stud 830 will serve to position the step plate 824 to control the printing position as previously explained. As will be seen in the drawing of the plate 824 of FIG. 6, the plate is provided with twelve steps. The tenth step 1183 controls the printing on the tenth line of the score sheet. The eleventh step 1184 controls printing on the line below, and in this instance, the twelfth step 1186 is in the same height as the tenth step 1182 since it was considered permissible to print the third strike of the tenth frame on the tenth frame line and in the second ball position. It can be readily seen, however, that the strike insignia for the third strike in the tenth frame of a game might be printed on the eleventh or the twelfth line by changing the height of the step 1186.

The control of the machine for tenth frame operation is through electrical circuitry described later, but for the present it may be helpful to know that the angular position of the shaft 834 carries a contacting surface to complete a circuit when the machine steps into the tenth frame position. Upon completion of the frame, that is, the bowling of a strike or a spare, the frame advance solenoid 868, FIG. 20, is energized to allow the plate 824, FIG. 6 to rock one step. In the case of a strike in the tenth frame, the frame is advanced to the eleventh frame, and in the case of a strike in the eleventh frame, it is advanced to the twelfth frame. In the case of a spare in the tenth frame, it is only advanced to the eleventh frame. Through the normal mechanism previously described, if the balls rolled in the tenth and eleventh frame complete previous frames, the printing of such previous frames will be on the correct line. Upon the actual printing of the score in the tenth frame and only upon such printing, the tenth frame clutch is engaged to perform the tenth frame functions and normalize the machine.

The mechanism operated by the tenth frame clutch is shown in FIG. 23. The tenth frame clutch driven member is secured to the shaft 1188 and is timed with the print clutch. The shaft 1188 rotates counter-clockwise and through a gear will drive the shaft 1190 clockwise. The ratio of the gears is such that two rotations counter-clockwise of the shaft 1188 will drive the shaft 1190 one rotation. As will be seen from the timing charts, FIGS. 24 and 25, the tenth frame clutch is opened during the sub-total cycle which is then initiating the printing of the tenth frame score of a bowler. It will be recalled that after the completion of a current frame score, the machine will normally go into a non-add cycle. In the case of the tenth frame, however, the machine is so controlled that the adding machine itself will remain off for that cycle which would normally be an adding cycle. This is then followed by an adding machine cycle in which the machine is adjusted to take a total followed by another off cycle, and a second total cycle. The reason for the two total cycles will become apparent as the tenth frame operations are further explained.

During the first part of the tenth frame cycle, the normal operating controls of the machine are restored and the machine is conditioned so that the following adding machine cycle will be a total cycle. A linkage to control this operation is shown in FIG. 23. The mechanism includes cam 1192 contacted by a roller 1198 on a follower 1194 pivoted at 1196. Rotation of the cam 1192 counter-clockwise will impart counter-clockwise movement to follower 1194 and pull a wire link 1200 rightward. Referring to FIG. 11, the link 1200 is connected to a stud on a member 1216 pivoted on the shaft 252. Rightward movement of the wire link 1200 will, therefore, rock the arm 1216 counter-clockwise. Integral with the arm 1216 is an arm 1218 and an arm 1220. In the counter-clockwise rocking, therefore, the arm 1218 will contact the stud 264 and rock the ratchet 260 counter-clockwise to an extreme position. It will be recalled that the ratchet 260 carries an arm 248 which underlies an ear 246 on the member which controls the cycling of the adding machine for non-add, sub-total, etc. It will also be recalled in FIG. 10 that if the paddle 232 is positioned to its upward position that the cycling of the machine will be a total operation. Referring back to FIG. 11, it is seen that the ear 246 will, by the counter-clockwise rocking of arm 1218, raise the ear to control a total operation of the machine. During this operation, the other arm 1220 integral with arm 1218 will contact the stud 1222, raising the ratchet lever and ear 258 away from contact with the teeth 260. Upon return of the surface 1220 from under the stud 1222, the ratchet ear 258 is positioned in the correct relationship, but the following cycle will be a non-add cycle.

It will be recalled that upon return of the ratchet 260 to normal position, the adding machine clutch will be closed and, therefore, the adding machine does not cycle at this time. Means are provided, however, to initiate the adding machine cycle at the proper time in order to secure the total operations. This mechanism is shown in FIG. 23 and consists of a cam 1202 on the shaft 1190. There are two teeth 1204 and 1206 on this cam each serving to initiate the adding machine cycle at the proper time to secure the total operation. A stud 1208 is on a member pivoted at 1210 and carrying another stud 1212 on which a wire link 1214 is located. Clockwise rotation of the cam 1202 will, therefore, contact stud 1208 and rock the stud 1212 counter-clockwise about the center 1210 thereby pulling the wire link 1214 rightward.

Again referring to FIG. 11, the adding machine clutch operating member previously described is rigidly secured to shaft 300 which, when rocked clockwise, will engage the adding machine clutch. A stud 1228 is on a member rigidly secured to the shaft 300. A lever 1224 pivoted at 1230 carries an arm which engages the stud 1228. Rightward movement of the wire link 1214 is connected to 1224 at 1226 will cause lever 1224 to rock counter-clockwise about the center 1230 and move the stud 1228 leftward which will rock the shaft 300 clockwise and open the adding machine clutch. The cycling of the adding machine during the total cycle serves to restore the tens stop and the spare latch to normal position as previously described, thus normalizing the memory elements associated with the individual bowler.

During tenth frame operation as stated, the frame advance member may have advanced the frame selection to the number 11 or 12 position during the actual tenth frame score accumulation. Means are, therefore, provided to restore the frame advance member to the tenth frame position for the next bowler. This means is controlled by the tenth frame clutch and, as shown in FIG. 23, consists of a cam 1232 on the tenth frame clutch line 1190. A roller 1234 on a cam follower 1260 pivoted at 1236 contacts the cam 1232. Rotation of the shaft 1190 will, therefore, rock the follower 1260 clockwise and pull a link 1240 which is connected at 1238 to the cam follower. The link 1240 is pulled on the left and is guided on a stud 1244 in a slot 1242 on the member 1240. The rise in the cam 1232 is such that the shaft 834 will be rotated counter-clockwise to the tenth position if starting either at 11 or 12 frame position at that time.

Means are also provided to restore the frame count member to the number one position when the last player of a group finishes the tenth frame operation. This is described later.

Due to the fact that there are extra cycles provided in the tenth frame for the purpose of clearing and normalizing the machine, it is not desirable to print information at all times. Means are provided, therefore, to disable the printing of information during such extra cycles, as desired. Such means are also shown on FIG. 23 and consist of a stud 1246 on the arm 1260 of the cam follower. A bifurcated arm 1248 is rigidly secured to the shaft 1252 which extends across the machine. Another arm 1250 is secured to the shaft 1252 and is connected to a link 1254 which is guided by a stud 1256 in a slot in the member. The link 1254 carries a stud 1258 overlying the latch 1128. Counter-clockwise rocking of the member 1248 will rock the interponent 1128 clockwise about pivot 1124 and remove the surface from the stud 1122. This is previously described in connection with the raising of the print head which is accomplished through member 1128 as shown in FIG. 20. It will be recalled that the stud 1122 rocks clockwise by the print clutch to rotate the shaft 99 90° to affect the printing. It will be obvious that the shape of the cam 1232, FIG. 23, may be such that this operation may be disabled during one or both of the total cycles under control of the tenth frame line or that the disabling means may be independently operated.

INDIVIDUAL PLAYERS FRAME CONTROL

As described later in connection with the keyboard, means are provided to move the print carriage to the proper position to associate the mechanism with any one of a group of bowlers. It will be obvious that in team bowling, the members may not all be present at the time of starting and it will be necessary, therefore, to skip a particular bowler and allow that bowler to catch up one or two frames later. Means are, therefore, provided to set the frame position mechanism at the proper position for each bowler. In other words, the team may be bowling in the third frame and the number three bowler having just arrived will, therefore, be bowling in the first frame.

An individual frame count member for each bowler is provided and shown in FIG. 26. A series of six gears 1262 is mounted on a shaft 1264 supported between two plates such as 1338 pivoted freely on shaft 1272 and carrying a bifurcated arm 1276 embracing a shaft 1274. The entire assembly of six gears may be moved laterally and is controlled for the extent of such movement by the arm 1340, FIG. 22, which is integral with arm 1144 and representative of the carriage position at any given time. The movement imparted to this small carriage containing six gears, shown in FIG. 26, is not as great as the movement of the entire printing carriage but nevertheless does have six positions in relation to it. Whichever one of the gears 1262 is aligned with the segment teeth 1332 may be engaged with the segment by counter-clockwise rocking of the carriage 1338 about the shaft 1272 by rocking the shaft 1274 counter-clockwise.

Means for accomplishing this engagement consists of members 1342 freely pivoted on shaft 1272 and connected at 1278 to a link 1280. The link 1280 is connected to a cam follower 1282 normally spring urged counter-clockwise by a spring not shown. Follower 1282 has a roller 1284 in contact with cam 1286 rotated on the center 1288. Counter-clockwise rotation of the cam 1286 will, therefore, rock the follower 1282 clockwise about pivot 1320 and rotate the shaft 1274 counter-clockwise to engage the gear 1262 with the abutment 1332. Shaft 1288 is rotated counter-clockwise by a gear on the shaft 1386 which rotates when the motor which shifts the carriage laterally is operating. A two-position clutch is provided. The clutch dog 1292 is retained to hold the clutch disengaged by an ear 1294. The ear 1294 and the clutch engaging member pivoted on 1296 will allow for rotation of cam 1286 when rocked clockwise by pulling of link 1298. The clutch, however, is a double clutch and carries a second disengaging member 1344 also pivoted on the shaft 1296. The clutch member 1346 has an ear 1302 overlying the clutch member 1344. The two arms are spring urged together by a spring 1328 which tends to rock 1346 counter-clockwise and 1344 clockwise to hold these in the position shown. A spring 1330 holds the clutch 1346 in engagement as shown. Clockwise rocking of the clutch member 1346 will allow the clutch member 1344 to engage the periphery of the clutch and terminate the rotation of the cam line at the 180° point. Release of the pull on the member 1298 will then reengage the clutch and allow the remaining 180° of rotation to the position shown. It will be noted that there is a dwell 1290 in the cam 180° away from the position of the dwell in which the roller 1284 is shown. Therefore, if the clutch is rotated 180° and the cam is stopped at that point, the follower 1282 will be allowed to rock counter-clockwise to disengage the gear 1262 from the segment 1332.

Means are provided to return the segment 1332 to the position shown in the drawing. A cam follower 1318 pivoted on 1320 is provided with a roller (not shown) which contacts the cam 1322 on this line. Rotation of the cam 1322 will rock the follower 1318 clockwise and through a stud 1324 located in a slot 1326 on the link 1316 pulls the link 1316 rightward. Link 1316 is connected at 1314 to a lever 1308 pivoted at 1312. Clockwise rocking of follower 1318 will, therefore, move the lever 1308 clockwise about the shaft center 1312. A roller 1310 is provided on the top of the lever 1308 and positioned to contact the surface 1336 on a member 1334 which is secured to the segment 1332 by a long stud 1348. Clockwise rocking of the lever 1308 will, therefore, return the gear 1332 to the position shown.

The sequence of operation is as follows. Whenever the printing carriage is to be moved from one bowler's position to another, the clutch 1292 is engaged by operation of solenoid 1281 to rotate the cams 1286 and 1322. This action by pulling on link 1280 will engage the proper gear 1262 with the segment 1332. The segment 1332 is then rocked up to the number one position as shown by the roller 1310. At the mid-position, the arm 1344 of the clutch will stop rotation of cam 1286 and the gear will disengage from the segment. The carriage is then moved laterally to the proper bowler's position and means, to be described later, holds the segment in the number one position. When the carriage reaches the position of the proper bowler, the clutch control linkage 1298 is released and during the last half of this clutch rotation, the cam 1286 again engages the gear 1262 with the segment 1332.

A long tooth 1266 is integrally secured to each of the gears 1262 and a stop 1268 is in position to prevent the counter-clockwise rotation of the gear 1262 beyond that stop. During the last half cycle of the clutch, the segment 1332 is allowed to rock downward and in the position shown, the gear 1262 would prevent any downward movement of the segment 1332 and the carriage would remain in the number one frame position. At the end of the cycle, the gear 1262 is rocked clockwise to the position shown and disengaged by the segment, and the control frame positioning is turned over to the mechanism as shown and described in FIG. 20.

It will be seen that, if under this separate control, the segment 1332 will be allowed to rock four places counter-clockwise allowing the shaft 834 to move downward to control the fourth frame position and then the gear 1262 engages the segment 1332 of FIG. 26. A counter-clockwise rocking of the segment by roller 1310 would rotate the gear 1262 four teeth clockwise. The gear 1262 then is disengaged and a detent pawl 1270 will hold the gear for that bowler in the position to which it has advanced. Upon return of the carriage to this position when this bowler is again bowling, the gear 1262 is engaged to the segment 1332 prior to rocking the segment clockwise about the center 99. Thus, if the segment 1332 were in the fourth frame position at the time the carriage was moved from that bowler's position to another bowler's position, then the re-establishment of the same bowler would also position the segment 1332 at that fourth frame position by counter-clockwise rocking of the stop 1266 against the stud 1268. After this positioning, the gear 1262 is disengaged and the normal escapement mechanism is engaged so that the bowler may bowl one or more frames. It will be noted that the frame adjustment as the bowler bowls is made with the gear 1262 disengaged and, therefore, the shaft 834 may be independently rocked for one or more frames and will be returned to this newly established position if the carriage is moved to another bowler in the meantime. Arm 1308 is rocked clockwise about pivot 1312 by link 1313 under control of tenth frame clutch to restore shaft 834 without resetting gear 1262 to advanced frame position and, therefore, it is left at first frame position against stop 1268 for next game.

Means to allow the free movement of the segment 1332 when it is under the control of the mechanism in FIG. 26 is shown in FIG. 27. The escapement members 844 and 846 operate as a single escapement member normally on energization of the solenoid 868 (see also FIG. 20). The ear 844 normally is in engagement with the ratchet and the ear 846 normally disengaged. On operation of the solenoid, however, the ear 846 comes in to retain the ratchet at the half step position. The ear 846 is on a member 1350 which has an ear 1352 resiliently pulled by link 848. A spring 1354 is connected to the ear 1352 and a stud 1356 on the link 848. Normally, the energization of the solenoid 868 will, therefore, pull the link 848 and cause a one step escapement of the plate which controls the frame position. During the operation, however, of the mechanism as described in connection with the frame counting element, it is necessary to allow for free clockwise movement of the ratchet segment. After such free movement, the ear 844 should then be engaged with the ratchet prior to the disengagement of the frame counting element. Means are, therefore, provided to allow free movement in both directions by preventing the ear 846 from moving into engagement with the ratchet teeth, while the ear 844 is removed. An ear 1364 is provided to block a shoulder on the link 1360. This prevents the counter-clockwise movement of the ear 1352 as urged by the spring 1354 when the solenoid 868 is energized. The frame positioning member is, therefore, free to move when the solenoid 868 is energized and the blocking ear 1364 is clockwise from the pivot 1366 which blocks the rightward movement of the link 1360, A stud 1362 mounted on the link 848 in a slot on the member 1360 at one end, also stud 1356 in a slot 1358 at the other end allows the rightward movement of link 848 while retaining link 1360 leftward. This prevents the engagement of ear 846 with the segment which normally controls the frame advance for each bowler.

KEYBOARD AND PROGRAMMING UNIT

The machine described is capable of taking care of six bowlers and there is to be one machine for each lane. Each machine will be associated with a keyboard such as is shown in FIG. 28 on a control panel which contains a series of bowlers activating switches, bowlers positioning keys, ball information keys for manual entry, and indicators provided for observation and control. The machine described may take information from manual entry or from automatic pin scanning equipment as described in application Ser. No. 697,632, and the aforementioned continuation thereof.

In automatic operation, the information as to the number of pins down is the only information that must necessarily come from the pit end of the lane and all other information for automatic sequencing of frames and bowlers is controlled from programming units associated with the keyboard panel.

A series of bowlers activating switches 1368 are settable to three positions. For example, in the center position, the switches are off; and in the up position, the switches condition the machine for league or team play by that bowler; and in the down position, the machine is conditioned for open play or for a substitute bowler on a team.

These switches not only control the type of operation which the machine performs under certain circumstances but also control the automatic sequencing of the machine so that if the bowlers bowl in proper sequence, the correct score will be entered into the bowlers register. For example, if the switches are in the up position to indicate league or team play, the final score of each bowler with the switch so set will enter a team totalizer automatically at the tenth frame to compute a team total. Whereas, if one or more switches in the down position, as shown for switch number "3," the score of that bowler will be computed and displayed as the game progresses, but at the tenth frame, the score of that bowler will not enter the total register. This allows a team to use a substitute bowler without any special attention at the end of the game in securing the correct team total.

In order to activate the machine for a player, it is necessary that the switch 1368 for that player be moved to one or the other of the two "on" positions. If the switch for one player is left in the "off" position, the normal sequencing of the machine to the next bowler's position will skip any of the players whose switch has not been operated. This allows for a bowler who may come in late to start after the other members of the team have rolled one or more frames. The player activates his switch at the time he comes in and this conditions the program unit so that that player will be included in the normal player sequencing. Assuming that player #3 switch is in the "off" position, the machine is set for entry of bowler #1 score at the start of a game; the completion of the frame for bowler #1 automatically positions the machine to accept information for bowler #2. Upon completion of the frame for bowler #2, the machine positions itself to accept the score of bowler #4, then bowler #5 and back to bowler #1. If bowler #3 should show up later or a substitute be put in, the #3 bowler position switch is set at that time and the automatic bowler position sequencing would then control a stop at bowler's #3 position in the normal sequence, and bowler #3 would thereafter be included in this sequence.

A group of bowlers' positions selection keys 1370 is also provided and these keys which serve when depressed to position the machine to enter a score at that particular bowler's position, also serve at all times as indicators to show the position of the machine for entry of information for the bowler indicated. For example, at the start of a frame, the indicator 1370 which has a light beneath the key will light to show bowler #1 and as he completes his frame, the light will show under the bowler #2 key and will continue in such sequence as long as the switches 1368 are set. If one of the keys 1370 is depressed, the machine will be brought to that player's position regardless of the normal sequence. However, if the switch 1368 for that bowler is at the off position, the depression of the key 1370 will be ineffective.

An advance to next bowler key 1372 is provided to be used in the following manner. Assume all bowlers switches set and that in the fifth frame, bowler #2 is not ready to bowl and bowler #3 wishes to bowl. The "next bowler" key 1372 is then depressed and the machine will automatically position for acceptance of score of bowler #3. After bowler #3 completes his fifth frame, the machine will automatically then go to bowler #4. When bowler #4 completes his frame, the machine will automatically set for bowler #5. However, at this time, let us assume that bowler #2 has returned and is now ready to bowl. He then depresses bowler #2 key 1370 and the machine positions itself for that bowler. As soon as bowler #2 completes his frame, the machine will then automatically go back to bowler #5 and the correct sequence will be established and the light "on" under the #5 key will so indicate. In other words, each time a bowler position key 1370 is depressed to condition the machine out of sequence, the completion of the frame for that bowler will automatically put the machine into correct sequence. Therefore, if bowler #2 was out for two frames and wishes again to bowl before #5 bowls, he must again depress bowler #2 key and on completion of that frame, the machine will again automatically go back to bowler #5 which is in the correct sequence.

The numeral keys 1374 are for manual entry of pin information and include the digits zero to nine, a strike symbol, and a spare symbol. In automatic operation, that is, where such information is received from the pit, these numeral keys serve as indicators to show the numerical value of the pin fall being entered. In manual operation, they also serve to indiate to other observers which key has been depressed and the numerical value being entered. Other indicators 1376, first ball pinfall, and 1378, second ball total pins are provided for identifying whether the pin fall is being entered as first ball or second ball pin information. These indicators also serve as guides in manual entry to indicate which information should be entered into the keyboard numeral keys prior to such entry. The control and relationship of these two indicators are described later.

Two other keys 1380 and 1382 labelled "left lane" and "right lane," respectively, are provided to complete the identification of the numeral score entry during automatic operation. As has been previously mention, normal bowling procedure requires that bowlers on a team use alternate lanes and the programming unit automatically performs this alternating lane input control. These indicators, therefore, serve to identify the normal lanes which each bowler should be using. Under certain circumstances such as the case where an automatic pin setter breaks down and cannot be repaired in a reasonable length of time, it is sometimes permissible for a bowler who should normally be bowling on the lane to bowl on the available lane. Under these circumstances, it would be necessary that the ball information from the lane so used be directed to the correct player. Under these circumstances, the depression of either of the keys 1380 or 1382 will serve for correct entry out of normal sequence of the automatic programming device.

Symbol keys which do not affect the score such as split key 1384 and a key for gutter ball 1386 are provided if it is desired to print such information on the score card.

A foul indicator 1388 is provided in combination with a "yes" key 1390 or a "no" key 1392. Automatic equipment on the lanes detects a foul by the detection of an object which moves across the foul line and normally breaks a light beam. A legitimate foul does affect the score as the pin fall made under these circumstances does not count. In the case of a foul on the first ball, a zero pin count should be registered to the score of the player and in the case of a foul on the second ball, the second ball total pin count will be the amount registered on the first ball pin fall for scoring purposes. Very often a foul signal is registered by a package of cigarettes dropping out of the pocket of the bowler, or under other circumstances which do not constitute a legitimate foul when the ball is rolled. The operation of the foul signal, therefore, must be verified and such operations merely suspend the normal acceptance of pin fall information into the machine until the "yes" or "no" button is depressed. If the "yes" button is depressed, the machine will score correctly as a foul; or if the "no" button is depressed under these circumstances, the machine will accept the information as to the actual pin fall count.

In spite of all aids for completely automatic operation of the machine, there will be times when a bowler bowls out of turn, or when pins are knocked down which should not be registered to the particular bowler on the lane. If a bowler should bowl out of turn or on the wrong lane, or if the ball thrown goes down into the gutter and comes back up and knocks down pins, the pins knocked down by the ball should not be counted. A cancel key 1394 is provided which, when depressed, will suspend the normal automatic operation of the machine. Depression of the cancel key 1394 will light up the manual key 1396 indicating that the correct information should be entered manually. The manual key 1396 may be depressed at any time, and when depressed, will cause the manually set pin fall count to enter the register of the particular bowler indicated for receipt of the score. The manual key, when depressed, will prevent the machine from accepting the information as read from the automatic pin fall count mechanism. At times it may be desirable to operate the machine entirely manually, and under such circumstances a manual lock key 1398 is depressed. Depression of the manual lock key 1398 will hold the manual key 1396 down until released. Otherwise, the manual key 1396 will only remain down until a frame is completed for a given bowler. For example, if the manual key is depressed prior to entry of either first ball pin fall or entry of second ball total pins into the keyboard (keys 1374), then entry of first ball pin fall into the keyboard will necessitate the manual entry also of second ball total pins before the machine will cycle and complete a frame. Similarly, if the first ball pin fall is being registered in the machine but not recorded for score entry and the cancel key is depressed, the manual indicator will indicate that first ball pin fall as indicated by indicator 1376 should be entered manually, and also that second ball total pins should be entered manually. If, however, the first ball pin fall has been recorded and entered into a bowler's score and the second ball total pin indicator 1378 is lighted at the time the cancel key has been depressed, then the indicators 1378 will remain on and it will be necessary to enter the second ball total pins manually. Once pin fall has been entered into the machine, it will be impossible to cancel and the indicators 1376 and 1378 will definitely show which information can and must be entered manually due to the fact that the cancel key 1394 was depressed. The cancel key 1394 may be also used to release information set by an erroneously depressed numeral key 1374. There is a slight delay in the entry of information which has been entered manually and, therefore, the depression of the cancel key will release the information set by one or both of the previously depressed manual keys. For example, if the bowler should get credit for five pins and seven pins for first and second balls count, respectively, depression of the cancel key after correctly depressing the five count key for first ball information but erroneous depression of another key instead of a seven for second ball total pin count will effect the cancellation of both the first ball pin fall and second ball pin fall information and the indicator 1376 will indicate that the correct entry of both pin counts should be made. If, however, only the first entry has been made and it is incorrect, then depression of the cancel key will again show that such information should be entered correctly. After the machine starts cycling and first ball pin information has been accepted by the machine but second ball information has not, then the depression of the cancel key will prevent the entry of second ball information and indicator 1378 will indicate the correct second ball total pins should be entered through the keyboard. This arrangement allows for the cancellation of information any time prior to the time that such information is used or absorbed by the machine and actually has entered the bowler's register.

A frame backup key 1400 and a handicap or correction entry key 1402 are provided for entry of correction or handicap values. Individual numerical means for entering of handicap or correction amounts are also provided and will be explained in connection with correction procedure .

PROGRAMMING UNITS

Figure 29B:
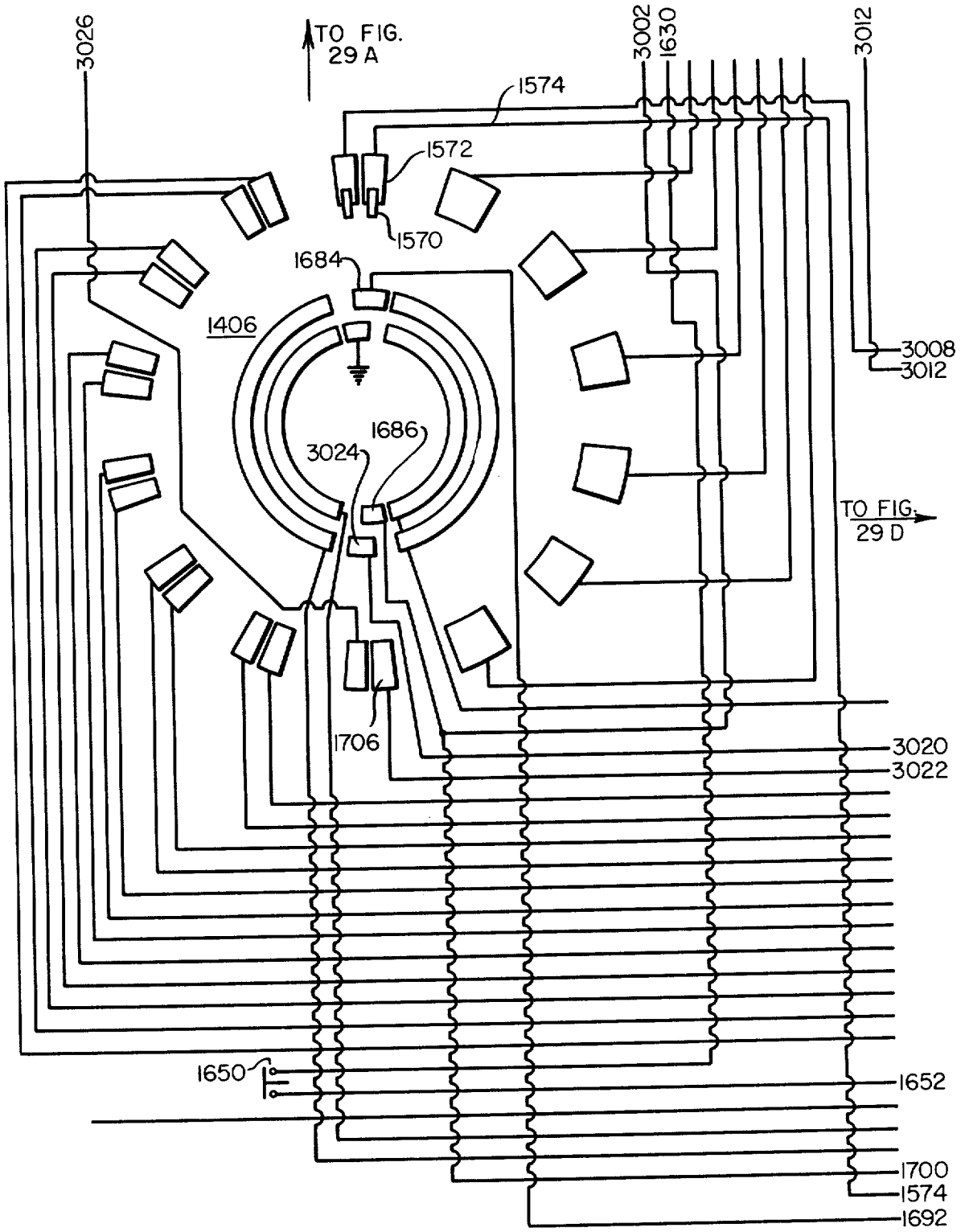
Figure 29C:
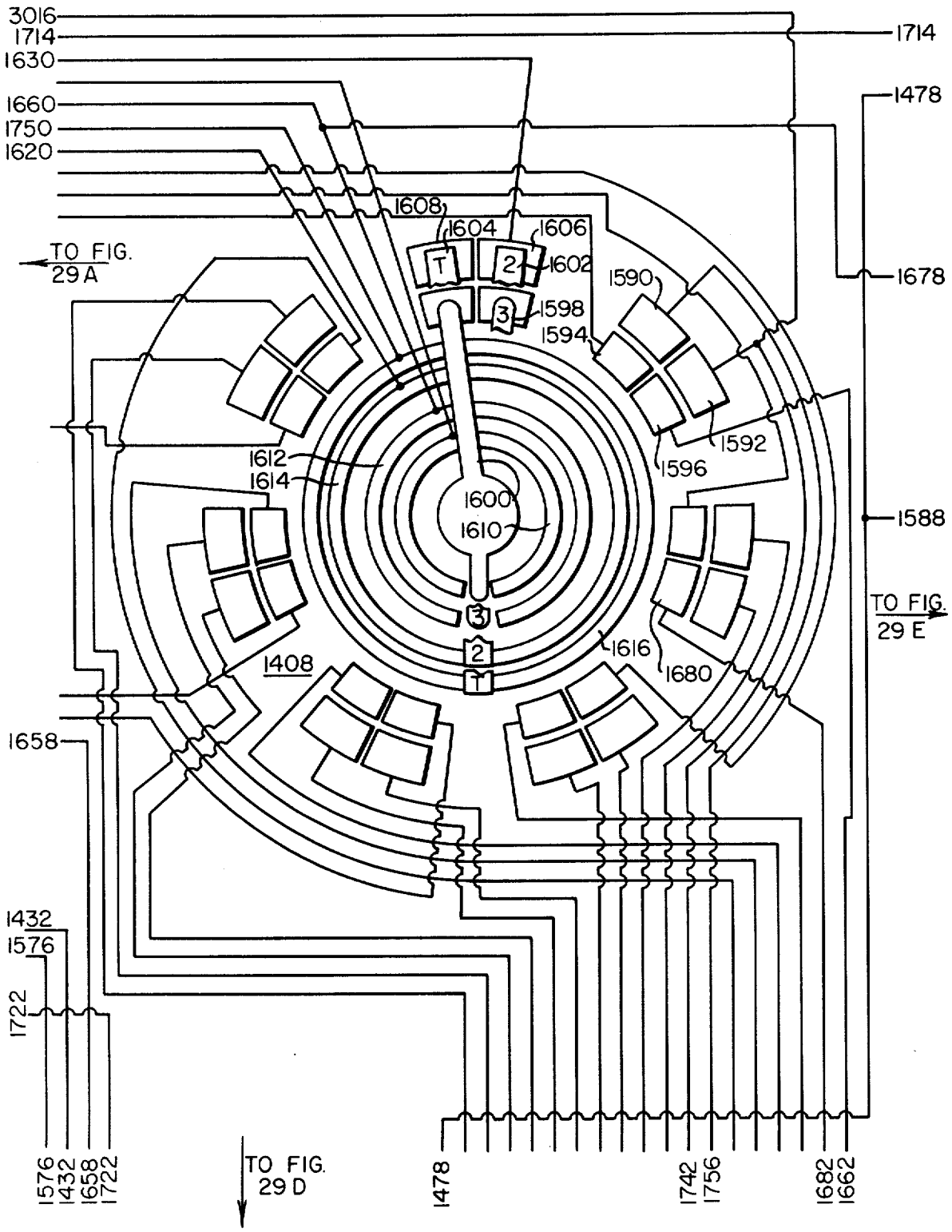
Figure 29D:
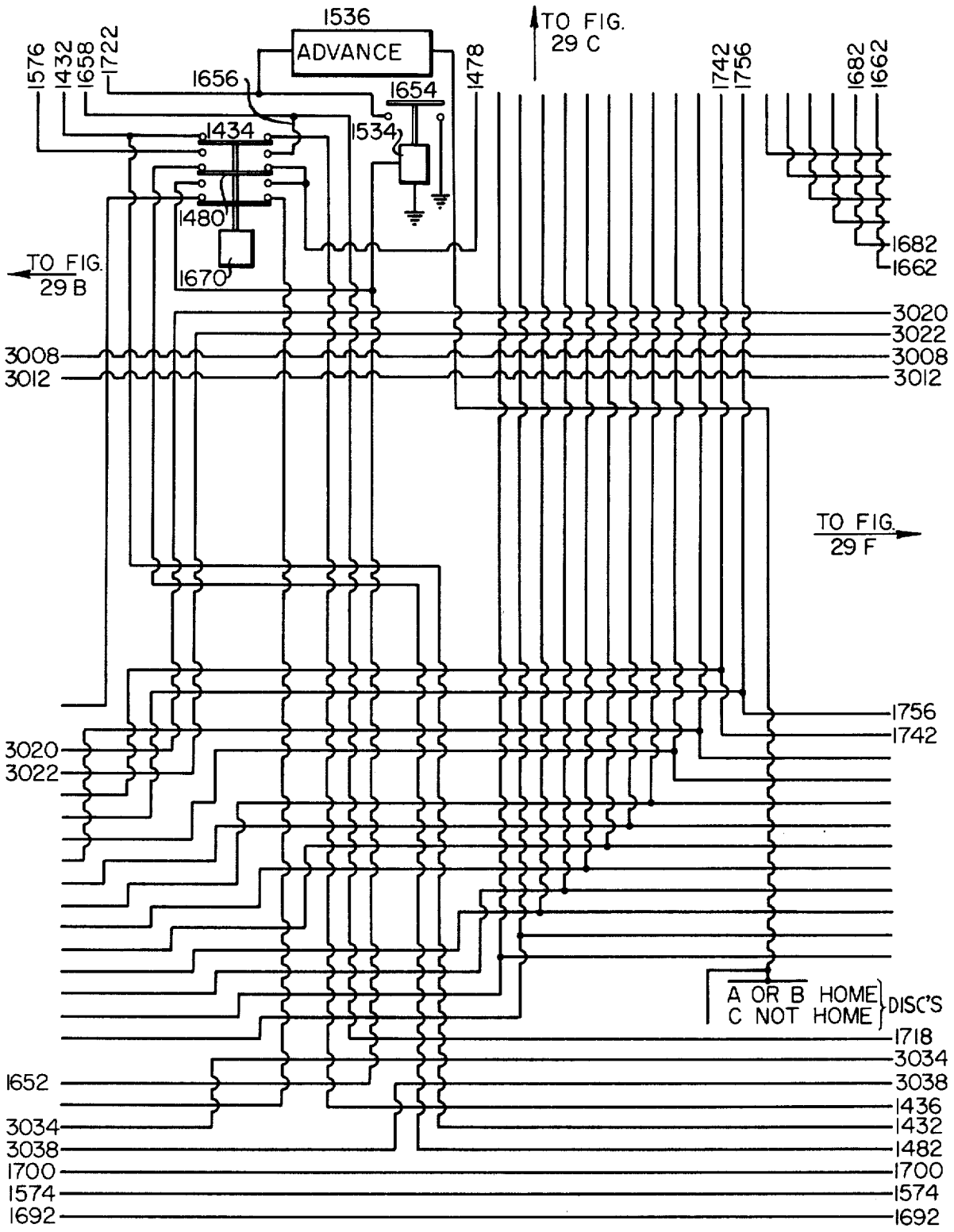
Figure 29E:
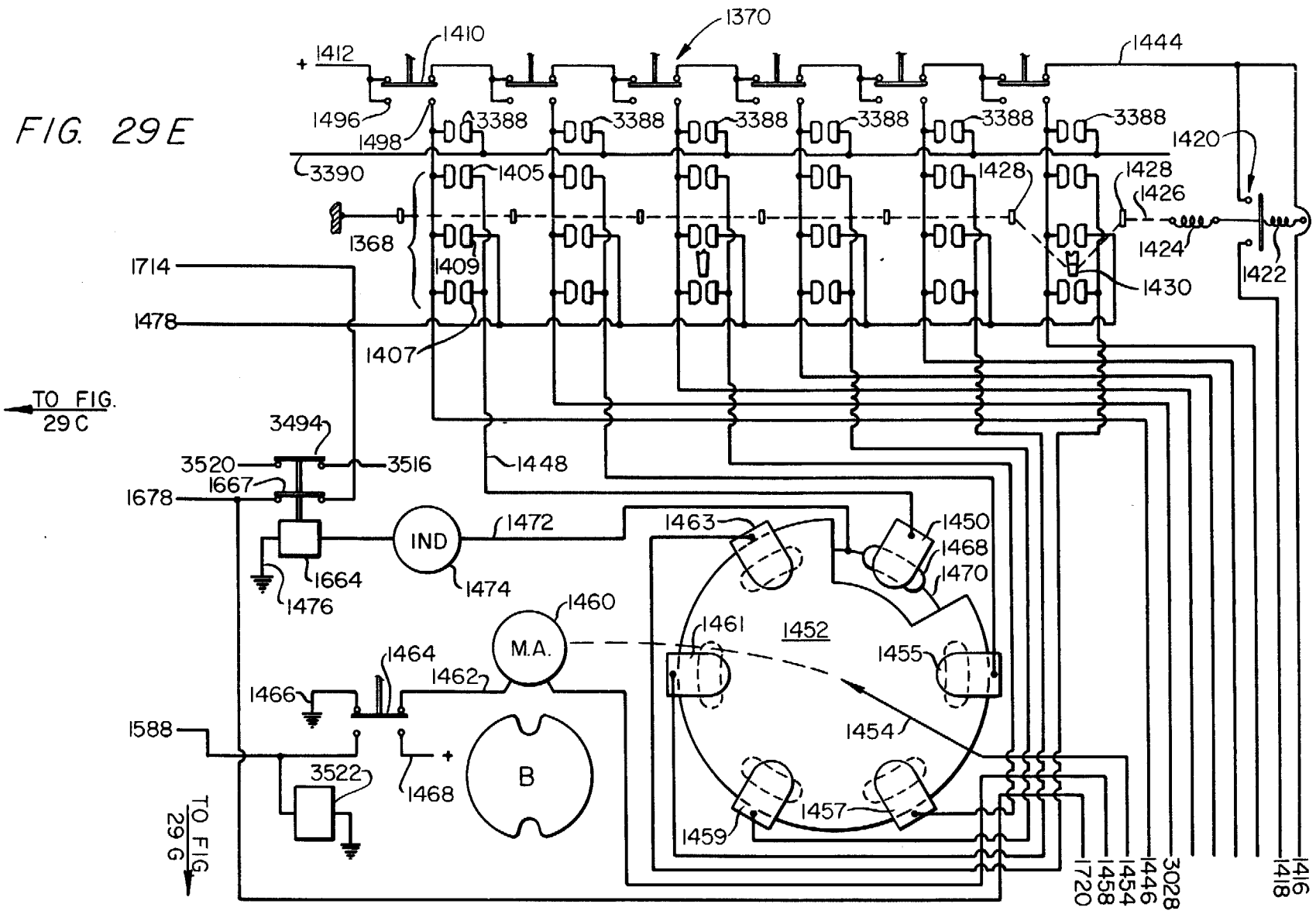

The wiring diagram for the program control unit and the necessary elements are shown schematically in FIGS. 29A–G. The contacts for the bowlers activating switches 1368, FIG. 28, are shown in FIG. 29E as 1368. The upper contact section 1405 representing the team set position of the switch; the center position 1409 representing the "off" position; and the lower position 1407 representing the open play position of the individual switches. The bowler's position switches 1370 are shown in FIG. 29E. The conducting plate 1452 is that plate (modified) which, as previously mentioned (FIG. 22, No. 1176) is indicative of the carriage position and serves to locate the carriage at the proper bowler's position. A program unit 1404 (FIG. 29F), is primarily related to one machine; however, since there is a relationship between the operation of the machines on each lane when they are operated for team bowling, the companion control plate 1406 (FIG. 29B) is also shown in the diagram. Another control plate 1408 (FIG. 29G) similar to the main control plates 1404, 1406, but capable of being operated in conjunction with either of them is provided to take over the control for correct entry of information from the pit when the last members of a team have not completed a game on one lane and the first members of that same team start to bowl in the alternate lanes. Under these conditions, it is necessary to feed the information from both lanes into the one machine.

In operation of the bowler's position keys 1370, FIG. 28, it was stated that depression of one of these keys would be effective to position the machine to that particular bowler's position but doing so would disable the normal automatic sequencing of the machine only while that bowler bowls to complete one frame. A series of switches 1410 (FIG. 29E), therefore, one underlying each of the bowler's buttons 1370 are normally connected in series from the plus supply 1412 to the lead 1414 which supplies the current through the programming unit to the carriage positioning element. Depression of any of the bowler's buttons, therefore, will open the normal current supply from the program unit.

Another condition for the program unit to be operative is that more than one of the player's switches 1368 will be in an "on" position for either team or open play. With only one bowler bowling, it is not desirable to remove the carriage from that bowler's position throughout a game. If however, more than one bowler is bowling, the machine should step from bowler #1 to bowler #2 if there are only two bowlers bowling, and should then go back to #1 again after #2 has completed his frame. In the case of open play bowling, therefore, the machine may be used to operate for three games of a pair of bowlers by positioning of the switches 1368 to the open play position using switches one and two for the first game, then turning these two switches "off" and turning "on" switches 3 and 4 for the second game; then switches 5 and 6 for the third game. In the first game under these conditions, the programming unit will position the carriage to one, then two, then back to one, and during the second game will alternate between 3 and 4 as each frame is completed. Similarly, three bowlers may bowl two games in open play and have their scores printed on one score sheet, whereas in the case of a single bowler he may bowl six games by positioning one switch at a time and leaving it set for an entire game. The power supply 1412, FIG. 29E, is connected by leads 1414 and 1416 through a switch 1420 to the lead 1418 which serves to advance the program unit to thereby control the advance of the carriage. Switch 1420 is normally held open by a spring 1422 and may be resiliently pulled closed by a cord 1426 through a spring 1424 capable of being extended a considerable distance. The cord 1426 passes through a stationary eyelet 1428 and then through another eyelet 1430 which is on the switch arm for the players and through another eyelet. When one of the switches 1368 is set for either team play or open play, the extra slack in the cord 1426 is taken up and the switch 1420 is opened. If, however, more than one switch is operated from its central position, the cord 1426 will pull leftward and through the spring 1424 close the switch 1420. In this manner, operation or setting of more than one of the switches 1368 will serve to make the program unit effective for automatic operation.

Figure 29F:
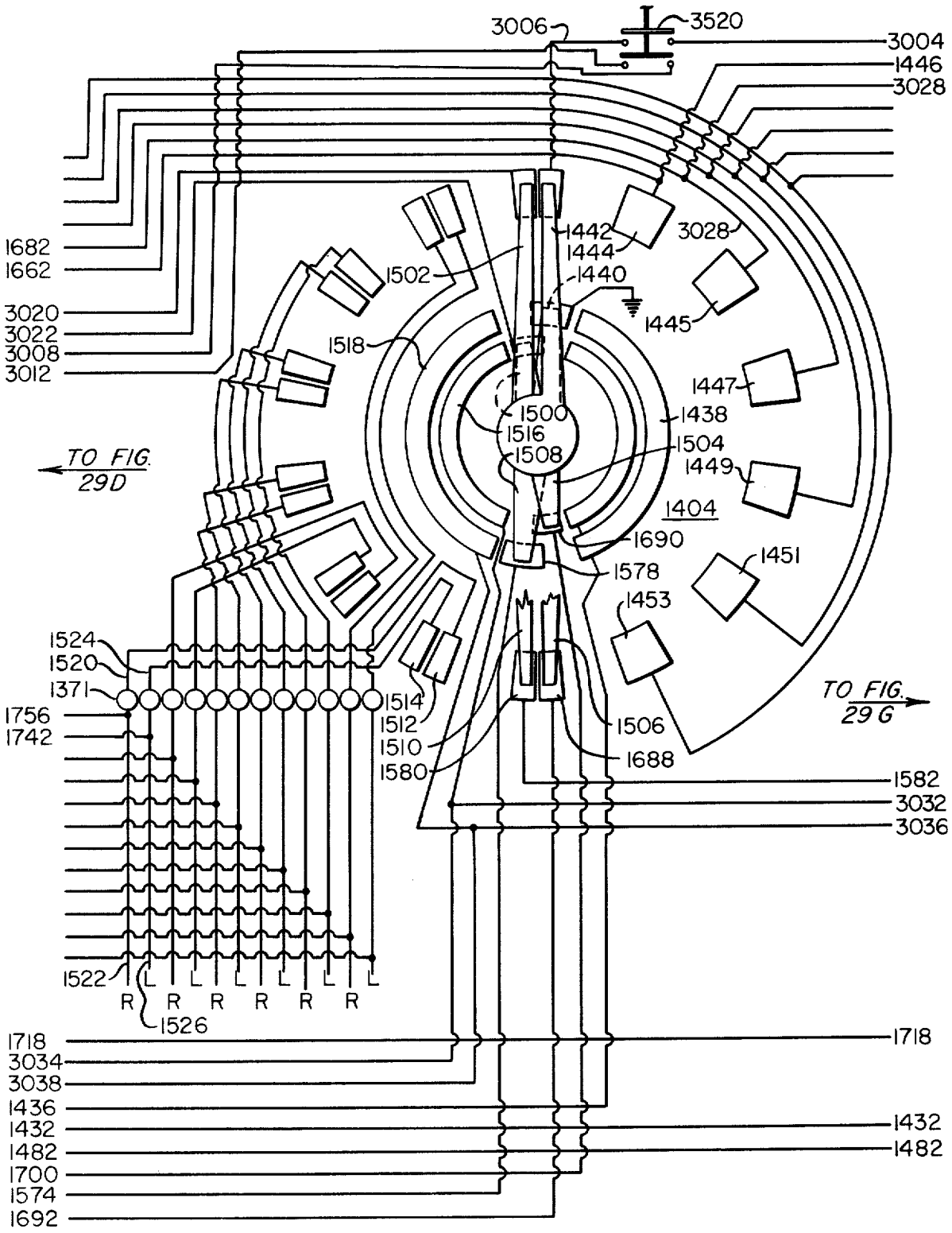

The power supply 1412 is connected by lead 1416 to serve as the power supply for carriage advance. Various conditions must be met for a normal advance of the carriage through the automatic programming unit, but the primary circuit is through the leads 1416–1432 (FIG. 29G), through a switch 1434 (FIG. 29D), to lead 1436. Lead 1436 is connected to a conducting strip 1438 (FIG. 29F) on the program unit 1404. The circuit is then from strip 1438 to a wiper 1440, then through a wiper 1442, in contact with a conducting surface 1444 which is associated with the #1 bowler's position if the rotary contacts 1442 are advanced one step clockwise from the position shown in the drawing. The lead 1446 then completes the circuit up to the contacts of the bowler's position switch 1368 (FIG. 29E). It will be noted that this circuit is complete to any of the three positions of the bowler position switches. If the bowler position switch is at the upper or team section 1405 or at the lower or open play section 1407, the circuit is then completed through either of these switches to a lead 1448 which terminates at the #1 terminal strip 1450. It will be seen that the terminal strip 1450 is shown in the cut-out portion of the conducting disc 1452. In this position, the carriage is at the position as indicated by the program unit 1404 (FIG. 29F) set at #1 conductor 1444. It can be seen, however, that if the carriage were out of the #1 position, that a circuit would be completed from the lead 1448 (FIG. 29E), at the switch (section 1368), wiper 1450, disc 1452, through a wiper 1454, switch 1456 (FIG. 29G), lead 1458 to the motor advance 1460 (FIG. 29E), lead 1462, switch 1464 to ground 1466, and as previously explained, the carriage positioning member would continue to move until the carriage was positioned as indicated by applying a current source to the #1 program conducting surface 1444 (FIG. 29F).

The program unit is stepped independently of the actual carriage positioning and the carriage must be positioned at the correct position as controlled and as indicated before the machine may be operated to enter values into a particular bowler's score. The circuit through the program unit is, therefore, used to control an indicator which will light when the carriage reaches the correct position. This is provided by a conducting element 1468 (FIG. 29E) which may be contacted by the wiper 1450 when the wiper 1450 is at the notched position of the conducting plate 1452. Thus, a circuit is completed between the wiper 1450, conductor 1468, leads 1470, 1472, indicator 1474, relay 1664 and ground 1476. In this manner, the bowlers will know that the carriage has been positioned at the position as indicated by the bowler position indicators 1370 as described.

In operation, the wipers of the program unit 1404 (FIG. 29F) are stepped one increment at a time under control of a switch which operates to advance the control blades. It was previously stated that if one of the player's switches 1368 were in the off position designated as 1409 (FIG. 29E), then the program unit would skip that particular bowler and position the machine to the next bowler's position in which a switch had been set. It will be noted that the current from the conducting section 1444 (FIG. 29F) on the program unit is through lead 1446 which is connected to one side of the switch 1368 (FIG. 29E). If one of the player's switches is in the off position, 1409, the circuit is complete through the lead 1478 through a switch 1480 (FIG. 29D), lead 1482 to ground 1486 (FIG. 29G) to operate a relay 1484. Operation of the relay 1484 closes the contacts 1488 which serve to energize the program unit advance 1490 through the lead 1418, advance 1490, lead 1492, switch 1488 to ground 1494. In this manner, if the player advance steps one increment to the next player's position, and that player's switch is in the "off" position, a circuit completed through the program unit from that player's position will serve to energize the program advance to step the program unit to the next player's position. This stepping will continue until a player switch position is attained wherein that player switch is set for team or open play bowling. In the meantime, however, the energization of the sensing fingers such as 1450 (FIG. 29E) on the plate 1452 will serve to control the positioning of the machine carriage so that the machine carriage will always tend to home to the position as indicated by the angular setting of the program unit.

It was previously stated that the depression of one of the bowler's position keys 1370 would serve to disable or disregard the setting of the program switch but would also serve to position the carriage for acceptance by the machine in that particular bowler's score. For this purpose, switch 1410, which normally supplies the current from the source 1412 to the program unit will close contacts 1496 and 1498 to supply the current directly to the lead 1446 if the #1 player's position key should be depressed. This direct energization of the lead 1446 and the wiper 1450 will then serve to advance the carriage to the correct position as indicated by the player's position key, regardless of the program set. Upon completion of the frame, the player's position key is released at which time the program unit is the re-energized and the carriage will then advance in the normal manner to the position as indicated by the program unit 1404 (FIG. 29F). Depression of a player's position key (1370) at a position where the switch (1368, FIG. 29E) is in the "off" position will not energize the finger 1450, etc., but will energize the lead 1478 which would normally advance the program unit, but the operation of the player's position key cuts off the current to the program advance 1490 (FIG. 29G) as described. Therefore, no action occurs.

It will be seen, therefore, that in normal operation, the program unit will step one increment at a time to position the carriage to the next bowler's position unless the next bowler's position switch is off, in which case the program unit will again set itself so that the net effect will be sequential operation for the correct entry of all bowlers present. This allows for a bowler to come in late and not be included in the program until he operates the bowler's switch 1368 (FIG. 29E), at which time he will be included in the automatic program. Furthermore, if a bowler position key is depressed, the machine will be positioned to accept that bowler's score without disturbing the setting of the program unit. On completion of the frame, the carriage will be positioned to take care of the next bowler in sequence.

It was previously stated that a player advance key 1372 (FIGS. 28 and 29G) was supplied on the keyboard for the purpose of advancing the program unit to the next bowler in case the bowler indicated was not present at that time. The key 1372 closes a switch to supply current to the program advancing unit 1484. This serves to skip the bowler who is not present. This skipping is for one time only, and as previously described, whenever that bowler returns, he need only depress his player's position key 1370, bowl one frame, and the program unit will then control the carriage to be positioned for the next bowler in sequence which will always be that bowler indicated to be up at the time the bowler's position key for the "out of turn" bowler was depressed.

It will be seen from the foregoing that the program, even though automatic, is completely flexible, and will automatically adjust to the correct positioning for the bowlers who are present as indicated by the closed player's activating switches, allows bowlers to catch up if late, to skip one or more frames and bowl the skipped frame or frames out of sequence without disturbing the normal operation. Normal operation without attention is allowed by the provision of complete indication as to what is occurring with automatic advancing and indication of which bowler should be playing as well as indication of which bowler is playing if that bowler is out of turn.

It will be seen from the drawing (FIGS. 29F and B) that each of the program units 1404 and 1406 are essentially divided into two halves with a central position as shown. In the central position, a certain conditioning is attained as described later. However, when the wiping arm assembly rotates clockwise one step from the position shown, the armature 1440 rests on the conducting strip 1438 and establishes a connection through the arm 1442 to the conducting surface 1444, as previously described, for the purpose of controlling the correct positioning of the carriage for each of the bowlers. Each of the conducting strips such as 1444 is connected through a lead such as 1446 to the associated player switch 1368 (FIG. 29E) and back through a lead 1448 to a finger 1450. The conductor 1445 (FIG. 29F), therefore, eventually ends up at wiper contact 1455 (FIG. 29E), 1447 at 1457, 1449 at 1459, 1451 at 1461, and 1453 at 1463. Thus the right-hand section of the program unit 1404 controls the normal positioning of the carriage in the right-hand lane as associated with that particular team.

The left portion of the program plate 1404 (FIG. 29F) serves primarily for indication and for this purpose has two contacts at each bowler's position such as conducting surfaces 1512 and 1514. Conducting surface 1512 is contacted by armature 1506 and establishes a connection between the conducting surface 1516 as contacted by armature 1504 through 1506 to 1512. Similarly, armature 1508 contact conducting surface 1518 and establishes a connection through 1510 to conducting surface 1514. Each of the pairs of armatures 1440, 1442 is separately insulated from any of the other pairs such as 1500 and 1502. The conducting surfaces, therefore, on the left half of the program unit 1404 are independently effective to control indicators as to bowler's positions on either the right or left side of the machine pair. Such indicators may be located at any place convenient to the bowlers so that at a glance they may be able to determine which bowler should be bowling on either lane as determined by the program unit. The bowler associated with the team which is on the right lane in normal sequence will be indicated through the conducting surface 1512 as being next up to bowl on the right-hand lane. Thus, the conducting surface 1512 through the lead 1520 and the lead 1522 (through an indicator 1371 at the bowler's position key) to an indicator which may be on the masking unit at the pit end of the lane to indicate that bowler #1 should bowl on the right-hand lane. The team which normally starts the bowling of the first game on the right-hand lane is designated as team B and the scores are entered into the scoring device on the right-hand side. Therefore, the indicator of bowler #1 together with the indicator B on the right-hand lane will show that bowler #1 of team B should be bowling on that lane, FIG. 28. As a frame is completed by all of the bowlers of team B, the lanes are alternated and the team B bowlers should then bowl on the left lane. In this instance, the conducting surface 1514 will be effective and through the leads 1524 and 1526 control the indication of bowler #1 on the masking unit of the left lane. It will, therefore, be seen that each of the bowlers on the team B, as indicated by the angular position of the armature section of the control unit, will be indicated as being up for bowling on either the right or the left lane as determined by the normal alternate lane sequencing during the bowling of the games in league or team bowling.

Referring to FIG. 30, means for alternating the lane sequencing are through cam 1538 on the B program line and cam 1754 on the A program line. As the B program unit assembly steps clockwise to any of the bowler's positions, the cam 1538 will close the switch 1540 and supply current to the lead 1548. Lead 1548 supplies current through switch 1552 to lead 1554 which serves to operate a solenoid 1556 (FIG. 29G) indicating normal lane control. Switch 1540 (FIG. 30) has a matching switch 1550 operated by a cam 1754 on the left lane section A which also operates through the same lead 1548, the switch 1552, lead 1554, to operate the normal lane control member 1556 (FIG. 29G) so that either the right lane or the left lane program unit being stepped off clockwise in the range of bowlers in the right half of the program unit will set the normal lane control member.

Figure 29G:
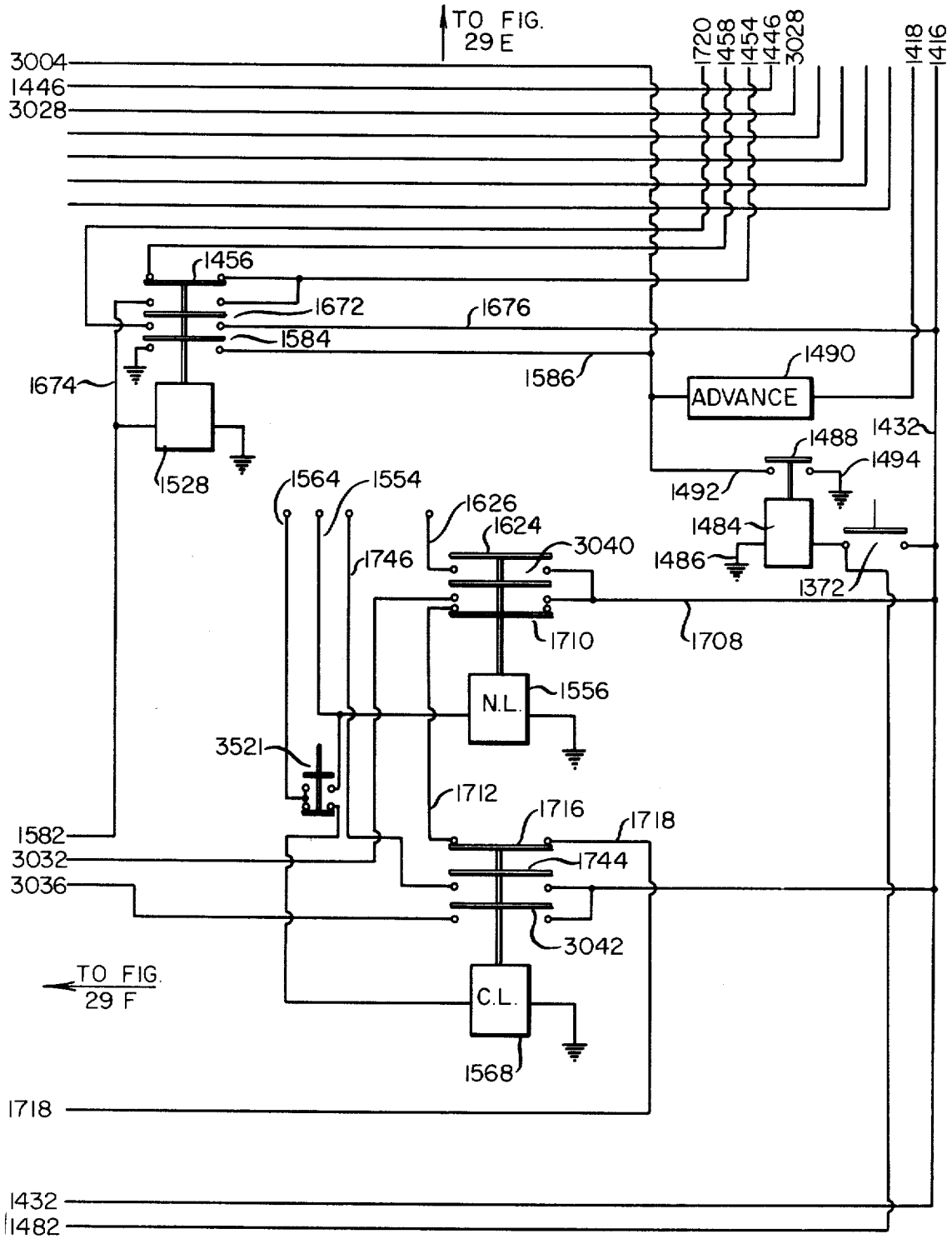

As previously stated, all of the bowlers on a team complete a frame and the following frame is bowled on the opposite lane. Therefore, after the assembly advances through the six possible bowling positions, the cam 1538 (FIG. 30) then closes the switch 1542 after passing the central position, and when the cam 1538 closes the switch 1542, a circuit is completed from the source through the switch 1542 and lead 1558, switch 1562, lead 1564 to cross lanes control of solenoid 1568 (FIG. 29G). A program assembly on the left lane has a similar switch 1560 (FIG. 30) which also shares the lead 1558 through switch 1562, lead 1564 to cross lane control relay 1568 (FIG. 29G). It will be seen, therefore, that the first frame of the first game will set the program element so that information from the right lane will enter the right lane scoring machine and that after the bowlers on the team have completed that frame, the machine will be conditioned for cross lane control for the second frame. After the assembly goes around 180° completing the second frame, the third frame will then be operated with the normal lane control. Completion of ten frames for one or more bowlers through the program unit will always leave the assembly in the position shown wherein the cam 1538 (FIG. 30) is at the starting position shown.

The two program sections A and B are interconnected in such a manner that normally after the completion of one frame for one team, the program unit will not step to condition for the #1 bowler of that same team until the other team has completed one frame. Normal advance of the program unit is under control of the cycling of the machine and is shown schematically in the drawings. A current from source 1468 (FIG. 29E) is supplied through switch 1464 to lead 1588, and through the lead 1478, previously described, to switch 1480 (FIG. 29D), lead 1482, to the relay 1484 (FIG. 29G). The relay 1484 closes the switch 1488 which will serve to ground the advance member 1490.

As previously explained, the member 1490 is not energized unless there are more than one player switches set for play nor is it energized upon depression of one of the player's position keys. Also, as previously stated, if the program unit should advance to one of the positions in which the player switch is off, then through a circuit described, the program unit is advanced past any such "off" switches until it comes to one which is "on". Since the machine does not cycle unless the program unit is on a player's position, and the advance of each program unit is under control of such cycling, one program unit will stop at central position and remain in that position until the other team has completed the current frame for all bowlers and remain until the other program unit reaches central position. Under these conditions, both program units will advance from the central position to the #1 bowler's position for the team. Each program unit in central position will cause the advance of the other program unit only if the other is in central position. This is accomplished by wiper 1570 (FIG. 29B) for the left lane program unit A which in central position is in contact with surface 1572 and completes a circuit through lead 1574 to a conducting surface 1578 (FIG. 29F), wiper arms 1508 and 1510, surface 1580, lead 1582 to operate a relay 1528 (FIG. 29G) which will close switch 1584 to provide a ground through lead 1586 for the program advance unit 1490 to advance the right lane program unit. The left lane program advance from central position under control of the right lane program unit in central position is through similar connectors on the right lane unit B to a relay 1530 (FIG. 29A) to advance the "A" program unit in the same manner so that as both of the program units reach central position at the same time, both will step from that central position and enable both machines to start each frame together through the main program units 1404 (FIG. 29F) and 1406 (FIG. 29B).

Relay 1528 (FIG. 29G) normally operates only momentarily to produce one step of movement but is also used for other control as is described later.

AUXILIARY PROGRAM UNIT

The two main program units 1404 (FIG. 29F) and 1406 (FIG. 29B) will serve to complement one another and condition the machine for proper bowling sequence of both teams providing for both indication and control of correct bowling sequence for the two teams. It very often happens, however, that when a team finishes bowling on one lane, the first man of the other team will immediately follow the last man of first team before his own team completes the frame on the preceding lane. This means, of course, the information from both lanes may have to simultaneously serve to provide the scores for a single team. For example, the #5 bowler on the right lane (team B) may be bowling on the right lane, and the first bowler of the same team be bowling on the left lane for the next frame. For this reason, a separate program control unit 1408 (FIG. 29C) is provided. The program unit 1408 is capable of taking care of bowlers for either team and is conditioned by one or other of the two program units 1404 (FIG. 29F) and 1406 (FIG. 29B) at central position to serve as an interim programmer for the team which has not completed a frame on one lane but nevertheless has started the next frame on the alternate lane. The program unit 1408 (FIG. 29C) is capable of indicating independently of the main program unit and also capable of positioning the carriage of the machine so that the score of the alternate lane may be entered into the correct machine.

The supplemental program unit 1408 normally stands in the position shown in FIG. 29C which is central or ineffective position. It consists of two pairs of rotating arms 1598 and 1600 which, when advanced one step from central position, contacts conducting surfaces 1596 and 1594, respectively. The conducting surface 1596 and the rotating arm 1598 are both associated with the right lane and serve to control the positioning of the machine for team B. The rotating arm 1600 normally contacts the surface 1594 and is associated with the left lane machine and connected in the same manner through the program unit A for operation of the members of team A. Conducting surface 1594 and conducting surface 1596 are associated with the #1 bowler's position only and there are five other pairs of conducting surfaces, one of which is effective at each position of the rotating assembly, other than the central position at which it is shown.

Program sections 1408 only step out of central position when one team has completed a frame on one lane and the other team has not completed that frame on the adjacent lane and a ball is rolled on the lane in which the team has completed the frame. For example, let us assume that team B is bowling on the right lane in the first frame and team A is bowling on the left lane, and team A completes the frame while player #4 on team B is still bowling. The fact that the bowlers on team A have completed the frame will be indicated by the fact that the assembly of team A program unit has reached central position, and because team B has not completed its game, the cam 1538, FIG. 30, will have closed the switch 1540 and through the lead 1548, switch 1552 and lead 1554, operate the normal lane control relay 1556 (FIG. 29G), as previously described. When the normal lane control relay 1556 is on, the switch 1624 is closed and, therefore, the normal plus supply from the right-hand lane is effective through the switch 1624 to the lead 1626 (FIG. 30). Switch 1622 is associated with the program section for team A. Because this is in central position, the switch is closed and the circuit is then effective through the lead 1620 to the conducting surface 1614 (FIG. 29C) on the auxiliary program unit 1408. The circuit on the surface 1614 is completed to conducting arm 1602 which is effective to light the indicator for bowler #1 on the left lane as described later. A circuit is also provided from the conducting surface 1614, the wiper 1602, the conducting surface 1606, lead 1630, to the switch 1650 (FIG. 29B). The switch 1650 closes when ball information is present from the left lane, and thus a circuit is completed through the lead 1652 to energize the advance relay 1534 (FIG. 29D). This closes a switch 1654 which serves to operate the program advance member 1536. It will be seen, therefore, that if the program unit B is not in home position and team B is bowling on the right lane as indicated by the normal lane control relay 1556 (FIG. 29G) operated through switch 1540 (FIG. 30) and there is information in the left lane as indicated by the closing of switch 1650 (FIG. 29B), then the program unit for the supplemental program 1408 (FIG. 29C) will step one increment to the #1 bowler's position. Upon completion of a score by the machine in the right lane, the switch 1434 (FIG. 29D) closes momentarily and if such action starts a cycle will be held in a position to open the circuit between the leads 1432 and 1436 and will close the leads 1576 and 1658. This will serve to position the machine carriage for bowler #1. If the team A or team B armatures are at home position, switch 1736 (FIG. 30) or switch 1738 is closed and relay 1724 is operated thereby closing contact between 1576 and 1432 and, therefore, completed from lead 1432 to lead 1576 (FIG. 29D), switch 1434, lead 1656, lead 1658, lead 1660 (FIG. 29A) conducting surface 1612 (FIG. 29C) arm 1598, conducting surface 1596, lead 1662 which is on the control B section, and lead 1446 (FIG. 29E), either of the "on" switches 1405 or 1407, lead 1448 to the sensing finger of the #1 position 1450.

As was previously described, the switch 1434 (FIG. 29D) in normal position keeps the circuit closed which operates the current to the B control section which keeps the carriage in the position as indicated by the angular position of the wiper assembly of program B. Since the switch 1434 thus opens this circuit, the positioning of the carriage of the machine on the right-hand lane is controlled then through the auxiliary program unit. The carriage will, therefore, move under control of the auxiliary program unit to the #1 bowler's position. As previously assumed, the #4 bowler of the team B was bowling on the right lane, the circuit through the auxiliary unit was ineffective until the completion of the frame, at which time the program unit for team B stepped over to the #5 position. However, in the meantime, the auxiliary program unit had advanced to the #1 player and the cycling of the machine started for player #1 from information as to pin fall on the left lane. At the completion of the cycling of the machine for player #1 on the left lane, the auxiliary program unit will step one position to player #2. At the termination of this cycling, the switch 1434 goes back to normal to connect lead 1432 to lead 1436, and the information for bowler #5 is ready to be processed as soon as the carriage reaches the #5 position, under control of program unit B. Since the switch 1434 broke the circuit connection to the #1 bowler's position, the carriage position control plate 1452 (FIG. 29E) will be energized through the normal connection of the program B conducting surface 1451 (FIG. 29F) to the sensing finger 1461 (FIG. 29E) which is the #5 bowler's position. As soon as the plate 1452 reaches this position, the line 1472 will be energized, as previously explained, to indicate that the carriage is positioned at the proper bowler's position. Located in the circuit for such indicator is a relay 1664 which closes a switch to allow the machine to start operation.

It will be seen, therefore, that through this arrangement, the bowler #1 on the left lane may bowl while a bowler on the right lane on the same team is bowling, and the information for both will be processed correctly. At the termination of each bowler's frame, that is, the processing of two balls having been thrown, a switch 1464 closes a circuit from source 1468 to lead 1588, lead 1478, and switch 1480 (FIG. 29D), lead 1482, to operate the normal program advance solenoid 1484 (FIG. 29G). In the case of the auxiliary program unit 1408 (FIG. 29C), however, it was previously stated that switch 1434 (FIG. 29D) is effective when the auxiliary program unit is in use and the switch 1480 is coupled with the switch 1434 and serves to advance the auxiliary program unit one step by connecting the lead 1478 to the lead 1670 and operate the advance relay 1534 so that at the termination of each frame which is controlled by one of the program units, that program unit will advance one step to the next bowler's position.

In line with the previously assumed condition, we found that after completion of bowler #1 of team B using the left lane, the team B main program unit was on the bowler #5, and after processing of bowler #5, the program unit stepped one step over to bowler #6 position, and due to the fact that the bowler #6 switch was in the off position, the B program unit stepped over to the central position. It was previously explained that when both of the program units were on central position that they would both advance to the #1 bowler's position so that the teams could proceed normally with bowling. It will be remembered, however, that the #1 bowler of team B has completed his game. Means are, therefore, provided to adjust the program unit for team B to the new position as indicated by the next player up after processing of the information from the auxiliary program unit. Furthermore, after the adjustment of the program unit B in this case to the position as indicated by the auxiliary program unit, then the auxiliary program unit 1408 (FIG. 29C) must be adjusted back to zero for possible use with either team completing a frame on a lane and the members of that team starting the next frame on the alternate lane.

The sequence of the operation as related to the auxiliary program unit is as follows. Both of the main program units A and B reach zero positions, and when this occurs, the auxiliary program unit is checked for its being out of home position. If it is out of home position, then the particular player involved, as indicated by the adjusted position of the auxiliary program unit, will have the carriage adjusted to his position. After completion of this carriage adjustment, the wiper assembly of both program units A and B will step to #1 position. When this occurs, the team B program unit is not coincident with the carriage position and, therefore, the program unit B will adjust itself to coincide with the setting of the auxiliary unit. Following this, the auxiliary unit 1408 will then return to home position to be available for the other team as explained.

Means for accomplishing these results will now be described. A cam 1702 (FIG. 30) is integral with the wiper assembly of the auxiliary program unit and in its central position has a notch into which a roller 1704 will drop. If the auxiliary program unit 1408 (FIG. 29C) is in home position, switch 3018 (FIG. 30) will be closed and both of the main program units will step out of central position simultaneously but each controlled by the other. The current for the step to the #1 position is supplied from a current source 1412 (FIG. 29E), through lead 1416 (FIG. 29G), lead 1708, switches 1710 and 1716 (closed when both normal and cross lane relays are deenergized), lead 1718 (FIG. 29D), lead 1658 (FIG. 29A), lead 3000 (FIG. 30), lead 3002 (FIG. 29A) to conducting surface 1686 (FIG. 29B) on unit 1406 and also through lead 1700 to conducting surface 1690 (FIG. 29F) on unit B. The B unit is advanced by a circuit from surface 1690 on program unit B, wiper arm 1504, wiper arm 1506, conducting surface 1688, lead 1692, to the conducting surface 1684 (FIG. 29B) on the program A unit, then through wiper 1570, surface 1572, lead 1574, to surface 1578 (FIG. 29F), wipers 1508 and 1510, surface 1580, lead 1582 to operate relay 1528 (FIG. 29G). Similarly, from surface 1686 (FIG. 29B) and wipers on A unit to lead 3022, wiper 1502 (FIG. 29F), lead 3020, surface 3024 (FIG. 29B), and wipers to surface 1706, lead 3026 to operate relay 1530 (FIG. 29A) to advance the A program unit. The program units A and B are, therefore, interconnected to advance one another from home position when both are at home position and, as now explained, this advance can only apply when a current source is connected to the lead 3002 (FIG. 29B) which connects directly to the conducting surface 1690 (FIG. 29F) of program unit B and the conducting surface 1686 (FIG. 29B) of program unit A which is its counterpart on the A program unit. However, under the assumed conditions, the auxiliary unit is out of home position at this time, and the switch 3018 (FIG. 30) will be open and no current will be supplied to the lead 3002 (FIG. 29B). The A and B program units will, therefore, remain at central position until the player's carriage reaches the position as indicated by the advanced position of the auxiliary program unit.

Means for conditioning this are provided through the normal lane control relay 1556 (FIG. 29G) and the cross control relay 1568. If either program unit A or B is at a player's position, one or the other of these lane control relays will be operated; however, with both program units at central position, both of the relays 1556 and 1568 are in deenergized positions. Under these circumstances, a circuit is completed from the lead 1416, lead 1708, switch 1710 on the normal lane control relay 1556, lead 1712, switch 1716 on the cross lane control relay 1568, lead 1718, lead 1658 (FIG. 29A) of the auxiliary program unit, switch 3030, lead 1660 (FIG. 29C), conducting surface 1612, arm 1598, conducting surface 1680 of the auxiliary program unit which is at the #2 bowler's position, lead 1682 (FIG. 29F), lead 3028 (FIG. 29G) to the #2 carriage control position conductor 1455 on the plate 1452. This completes a circuit through the arm 1454, switch 1456 (FIG. 29G), lead 1458 (FIG. 29E) to the carriage positioning motor 1460. The carriage will, therefore, adjust itself to the position as indicated by the position of the auxiliary control unit which will be the next bowler up for team B in this instance. The carriage position is, therefore, controlled by the auxiliary program unit.

As soon as the carriage does reach the position, contact is made through the lead 1470, 1472, and a relay 1664 which is in series with the indicator light previously described to show that the carriage has reached a proper position. At this time, switch 1666 will close and the current supplied to the lead 1658 (FIG. 29D), because both program units are at central position, as previously described, will, therefore, be through lead 1678 (FIG. 29E), switch 1666 and lead 1714 to the lead 3002 which, as previously described, supplies the current for advancing both program units A and B from central position. This action, as previously described, is through the energization of the relay 1528 (FIG. 29G) which closes switch 1584 to provide the advance of the B program unit. A similar relay 1530 (see also FIG. 29A) is associated with the A program unit but the action of the B program unit at this time will be described because the relay 1528 (FIG. 29G) is used to now advance the B program unit to the position occupied by the carriage and represented by the conducting plate 1452 (FIG. 29E). Operation of the relay 1528 (FIG. 29G) opens switch 1456 which normally operates the motor 1460 (FIG. 29E) for adjusting the player's carriage. The current which would normally perform this positioning is now diverted by switch 1456 (FIG. 29G) to a lead 1674 which serves to maintain the relay 1528 in its operated position once it has been operated. Stepping of the main program unit has operated one or the other of the normal or cross lane control relays thereby breaking the circuit to the auxiliary program unit. However, another switch 1672 closes the circuit through lead 1676 and lead 1720 (FIG. 29E) back through lead 1678, lead 1660 (FIG. 29C), to keep a current supply on the conducting surface 1612. Current is also supplied to the main program unit B through the lead 1432 (FIG. 29G), switch 1434 (FIG. 29D), lead 1436 to the conducting strip 1438 (FIG. 29F) and then through the arm 1440, arm 1442 to the conducting surface 1444, lead 1446 to the #1 (conductor) lead 1450 (FIG. 29E). Since the plate 1452 is so positioned that at the #2 position the circuit will be completed from the conducting strip 1450, plate 1452, wiper 1454, switch 1456 (FIG. 29G), lead 1674 to maintain the advance control relay 1528 operated. This results in a second advance of the program unit, at which time the completed circuit from both the B program unit and the auxiliary program coincide by position of the notch of the plate 1452 (FIG. 29E). Under these circumstances, no current will be supplied to the relay 1528 (FIG. 29G) which is timed with the advance to properly control this action. Both program units A and B are, therefore, adjusted to their proper position for subsequent program control. Both of the relays 1528 and 1530 will be released, and furthermore, neither of the program units is at home position under these circumstances.

When this condition is attained, the auxiliary program unit 1408 (FIG. 29C) will then be moved to home position by the following circuit. The auxiliary advance unit 1536 (FIG. 29D) is operated by connection to ground normally through the switch 1654. However, another ground connection to lead 1722 (FIGS. 29D and 30) is provided through a switch 1532 (FIG. 30) which is closed by the cam 1702 if the auxiliary program unit is out of home position. When the switch 1532 is closed, the circuit is to a switch 1638 (which is only open when either of the main program units A or B is in central position, described later); the circuit is through lead 1726 (FIG. 29A), switch 1640, lead 1728, switch 1642 to ground 1644. From the above, it will be seen that if neither of the program units A nor B is at home position and both have been positioned in accordance with the next player's carriage position as evidenced by relays 1528 (see also FIG. 29G) and 1530 being in unoperated condition, and auxiliary program unit 1408 (FIG. 29C) out of home position (switch 1532, FIG. 30, closed), the circuit will be completed to advance the auxiliary program unit until it reaches home position, at which time switch 1532 (FIG. 30) will open. Relay 1724 is operated when either of the program units A or B is at home position by connection from current source 1694, lead 1734, either of the switches 1736 or 1738, and lead 1740 to relay 1724. Switch 1736 is controlled and closes home position by a cam 1730 on the A control program unit. Switch 1738 is closed when the B program unit is in home position by a cam 1732 on the B program control unit. Auxiliary unit is returned to central position, therefore, only after all other units have been properly adjusted.

Description has been made of how the auxiliary program unit will take over if program unit A is in home position, but program unit B is not, indicating that the team A has completed a frame on one lane before the last bowler of team B finishes and then the first bowler of team B starts on the alternate lane.

Means for determining and holding this control are dependent on which program unit is at home position at the time that the auxiliary program unit steps to the #1 bowler position. It will be recalled that the lead 1658 (FIG. 29A) served to energize lead 1660 (FIG. 29C) and conductor 1612 to control the right lane machine (team B) since it was stated that team B was bowling on the right lane to finish one frame and on the left lane to start a new frame. The A team program unit is at home position. FIG. 29A shows the means for making this connection from lead 1658 through switch 3030 to lead 1660. A solenoid 3050 is operated to close switch 3030 and this was energized as follows: Switch 3044 closes at home position and switch 3046 opens when the B program unit reaches home. Another switch 3048 is on the auxiliary program unit and closes when the auxiliary unit is out of home position. If the A program unit reaches home while the B program unit is not at home and the auxiliary unit steps to the #1 position, then the circuit is closed through switch 3048, lead 3054, lead 3056, switch 3046 on the B unit, switch 3044 on the A unit and lead 3058 to operate relay 3050. The relay 3050, once operated, is held operated until the auxiliary program unit reaches home position by switch 3052 which connects through switch 3048, lead 3054 to lead 3053 to hold the relay "on" even though switch 3046 opens to break the circuit to lead 3058 which originally operated the relay. If the program unit B is home first, switch 3046 opens and even through switch 3044 closes, the relay will not operate, and subsequent closing of switch 3048 will not be effective. It will be seen, therefore, that if A program unit reaches home first (switch 3044 closes) and the auxiliary program is set to a bowler's position (switch 3048 closes), the relay 3050 will be operated; but if the sequence is reversed, the B unit gets home first, the switch 3046 opens and the relay does not operate. The auxiliary unit is, therefore, effective to operate for either the A or B program units depending on which is still effective at the time the auxiliary unit is stepped to the bowler's position. The auxiliary program unit, therefore, takes over for the A team assuming that the B team has completed a frame and the A team is now bowling on two lanes. The operation, under these circumstances, is through the conducting strip 1616 (FIG. 29C) of the auxiliary unit and the conducting strip 1610 which are connected to a current source under these conditions so that arm 1600 is capable of supplying current to the conducting surface 1594 and the arm 1604 operates on conducting surface 1608 and conducting surface 1590, etc. The A program unit would then be advanced in the same manner to coincide with the auxiliary unit position. The auxiliary unit would subsequently be returned to home position in the same manner. It will never be required that the auxiliary unit substitute for programming for both teams at one time. Therefore, the conditions are set up by one or the other of the main program units A or B to determine which is being substituted in auxiliary use.

PROGRAM INDICATORS

As previously stated in the description of the manner in which external indicators are operated on one lane or another, there are six external indicators on each lane to indicate which bowler should be bowling. Under normal conditions, the B program unit, as controlled by its angular position, energizes the correct external indicator on the right lane, whereas the A program unit by its angular position will indicate which bowler is bowling by energization of the correct indicator on the left lane. These indicators, as previously described in connection with program B, are operated by arms 1504 (FIG. 29F), 1506, conducting surface 1512, the #1 indicator 1522 if the B program unit is at the #1 position. The current supply for this indicator is through a conducting surface 1516 which is contacted by the arm 1504. Conductor strip 1516 is energized by contacts on the normal lane control relay 1556 (FIG. 29G). If, however, the frame is such that the team B is bowling on the left lane, then the cross lane control relay 1568 will be operated to apply current to conducting strip 1518 (FIG. 29F) which will then complete a circuit through arms 1508, 1510, conducting surface 1514, leads 1524 and 1526 to energize the #1 external indicator on the left lane.

In the event that the program B unit positioned for normal bowling on the right lane under the condition previously described, the auxiliary unit 1408 (FIG. 29C) will take over for the B unit. In this event, the bowlers from the B team (using the auxiliary program unit) would be bowling on the left lane instead of the right lane. For this reason, the external indicator conducting elements are connected to the opposite external indicators. For example, the conductor strip 1592 for the auxiliary control unit 1408 is connected through lead 1742 (FIG. 29F) to the #1 indicator on the left lane to the lead 1526 (FIG. 29F). Tracing the circuit back from the auxiliary program unit is through arm 1602 (FIG. 29C) and the conducting surface 1614 which is energized whenever the normal lane control element 1556 (FIG. 29G) is energized by program B unit, while program A unit is on central position. This connection is through lead 1620 (FIG. 29C), switch 1622 (FIG. 30) (associated with a program unit), energized through lead 1626 (FIG. 29G) and switch 1624 on a normal lane control relay 1556. If, however, the cross lane control switch 1744 were on and program B unit bowling, then the normal conducting for the external indication from the main program unit B would be through the lead 1746, switch 1748 (FIG. 30) (associated with the A unit) through the lead 1750 (FIG. 29C) to conducting surface 1616, arm 1604, lead 1756, which would then show the bowler's position for program B (auxiliary) indicated on the right lane instead of the left lane.

To review, the cross lane control solenoid 1568 (FIG. 29G) closes switch 1744 and supplies a current through lead 1746 to switch 1748 (FIG. 30), and through lead 1750 (FIG. 29C) energizes the conducting strip 1616 of the auxiliary unit and through the wiper 1604, contacting conducting surface 1590 and completes a circuit through lead 1756 (FIG. 29F) to the #1 right lane external indicator 1522. It will, therefore, be seen that the auxiliary unit may be acting to program team B, and while the main program indicator will show on the correct lane which bowler should be bowling, the auxiliary indicator will show the bowler controlled by the auxiliary program on the opposite lane. Thus, when program B and program A are both operating under normal lane control conditions, each will indicate on its respective lane the angular position of the program unit. If, however, the machine should be on the cross lane control which it will be in alternate frames, then each indicator controlled by A and B will operate respectively the indicator in the opposite lanes which is the normal sequence pattern. In the event, however, that one team completes a frame and the other team starts bowling on the opposite lane prior to the completion of that frame by the other members of the team, then the auxiliary unit takes over and depending on the setting of the main program unit for normal or cross lane control, the indicator for the auxiliary unit will be opposite to that of the main unit for which it is substituting at that moment.

In normal league bowling, team A will start the first game on the left lane, and team B will start the first game on the right lane; and on the completion of the first game, the second game will be started on the opposite lane, namely, team B will start on the left lane and team A will start on the right lane. The third game is started again with team A on the left lane and team B on the right lane. It was previously shown that the B program unit in making tis first step clockwise would close switch 1540 (FIG. 30) and that A program would close switch 1550, and with either of these two program units in that position, the normal lane control would prevail by operating relay 1556 (FIG. 29G).

During the second frame of that game, however, the switch 1542 (FIG. 30) of program unit B and 1560 for program unit A would be closed by the respective cams to energize the cross lane control relay 1568 (FIG. 29G) if either of these program units were advanced from central position. As also explained that at the end of each game or the completion of ten frames, wiper assembly for program units A and B would be in the top central position. Means are, therefore, provided for operation of the cross lane control at the beginning of the second game by closing of switches 1552 (FIG. 30) and 1562 which are operated by the tenth frame totalizing of the first game as described later in the tenth frame operation. The lead 1554 from the normal lane control solenoid 1556 (FIG. 29G) is through lead 1554 (FIG. 30), switch 1552, as described. However, pulling down of switch 1562 will connect the circuit from the switches 1540 and 1550 to the lead 1564 (FIG. 29G) of the cross lane control and similarly connect the switches 1542 (FIG. 30) and 1560 to the normal lane control through switch 1562, contacting lead 1558, closing the circuit to lead 1554 to operate the normal lane control in the second frame and the cross lane control in the first frame. It was previously described that normal lane control element 1556 (FIG. 29G) and the cross lane control 1568 performed all of the conditioning for directing information into the correct machine as well as controlling the indication as which bowler from which team should be bowling on which lane at all times. It should be kept in mind, however, that the control for normal or alternate lane control relates to individual bowlers and, therefore, the indication is distinct from actual operation, i.e., a bowler catching up might be in frame #1 when others of his team are in frame #4. In the third game, the switches 1552 (FIG. 30) and 1562 are brought back to normal so that again program B will be related to the starting position to the right lane and program. A will be related to the starting position in the cross lane. The program unit indicates where normal bowling should be done but the final frame positioning is controlled as described later.

It will be seen from the foregoing, therefore, that the two program units A and B and the auxiliary unit serve to automatically advance from player to player and from lane to lane in the progress of a series. Furthermore, bowlers not present are automatically skipped but are permitted to catch up at a later time and the program unit then including them in the sequence. A bowler bowling out of turn may skip his particular turn at the moment and come back at a later time to position the machine for his game without disturbing the normal sequencing of the other bowlers. Programming also provides that two bowlers from the same team may be bowling on two different lanes with normal sequencing and correct indication on both lanes and automatic adjustment of the main sequencing unit upon completion of the frame during which the first bowlers on that team move to the opposite lane. Furthermore, the auxiliary program unit in substituting for either team will automatically follow the conditioning as set up for the main program unit, namely, such as skipping a bowler who is not present as would be indicated by the player switch being in the central or off position. Switching is such that the program advance unit will advance the main program unit when that bowler has completed a frame and that the auxiliary program unit will advance to the next bowler when the frame is completed from information received for and controlled by the auxiliary program unit. Through switches 1434 (FIG. 29D) and 1480, operation of the auxiliary program unit cuts off the main program unit so that one or the other may be operated at one time and be effected by the same conditioning elements in the system. Once the auxiliary unit has stepped out of normal position, the completion of a frame on one lane will operate the machine to enter the score of that team on the other lane if such scoring information is available, after which the control will go over to the main program unit and enter the score as soon as possible after the completion of a frame by a bowler. The storage of the information as to pins down on both lanes is supplied in such a manner that such information may be absorbed by either machine and will remain stored until actual use at which time the information will be cleared out. In this manner, there will be no delay for the bowlers on either lane when the bowlers from the same team are bowling on two lanes at the same time under the conditions previously described.

AUTOMATIC INPUT AND STORAGE

The means for providing input information from either lane to either machine are shown in FIGS. 31, 32 and 33. The entire input mechanism is mounted on a frame 1760. The frame 1760 is guided and located by fixed studs 1766 and 1768 on the right located in slots 1762 and 1764, respectively, with similar guide members on the left side. The entire assembly is moved rightward under circumstances described later. The left lane input solenoid 1768 and the right lane input solenoid 1770 are centrally located on the movable frame. Input information from either lane will come in the form of a series of individual pulses for each pin down after a ball is thrown. After throwing of the second ball, input pulses will come in for each additional pin downed by the second ball. This information comes from scanning equipment at the pit. As shown in FIG. 32, solenoid 1768 when energized will operate ratchet escapement member 1774 which is pivoted at 1772 and by rocking it clockwise will through the ears 1782 and 1784 in alternate contact with the teeth 1776 on a member 1786 allow a normal one tooth of movement for each reciprocation of the ratchet advance member 1774 as is normal for such devices. The ratchet disc 1786 is spring urged clockwise by a spring, not shown, and mounted on a shaft which, as will be seen from FIG. 31, extends all the way across the base plate.

The plate 1786 is secured to a hub 1788 and through arm 1782 controls the angular position of a bail 1780. The bail 1780, FIG. 31, is also mounted for rotation about shaft 1778 by means of plates 1790 and 1792. Plate 1792 on the left side is integral with the hub 1794 freely mounted on the shaft 1778. Another plate 1796 is integral with the hub and contains an extension 1798 whose function is described later. Similarly, plate 1790 on the right side is integral with the hub 1800 and also carries a plate 1802 with an extension 1804. The bail 1780 and the two hubs with their extensions are, therefore, positioned angularly by operation of the solenoid 1768 in accordance with information coming in from the left lane.

A similar assembly is operated by the right lane input solenoid 1770, FIGS. 31 and 32. Solenoid 1770 operates ratchet advance member 1806 which allows one tooth escapement of plate 1810 which is integral with a hub 1816 which carries arm 1812 and consequently, bail 1814 to an angular position as determined by the number of individual pulses received by the solenoid 1770. The bail 1814 is secured at the right side to a plate 1818 and is integral with a hub 1820 which carries a plate 1822 with an extension 1824. On the left side, bail 1814 is secured to a plate 1826 integral with a hub 1828 which has secured to it a plate 1830 with an extension 1832. This assembly then is free to rotate about the shaft 1778 as indexed by individual pulses received through the solenoid 1770. This assembly extends to the right of the machine to angularly position elements for information to operate the right machine, and also to the left to angularly position elements to control entry into the left machine. The right solenoid 1770, therefore, angularly positions elements for both machines. Similarly, the left lane input solenoid 1768 extends over to the right for control of the information from the left lane to the right machine, and also position angularly elements at the left which are capable of controlling the input into the left machine. Information from both lanes is, therefore, available for controlling numerical pinfall input into both machines at all times.

The input information elements are so located relative to the base plate 1760 that when such plate is in its leftward or normal position as shown, input information from the right lane will be associated with the control input element for the right machine and the left lane information is available to the machine on the left lane. For example, plate 1834 at the right is first ball information plate and plate 1836 is second ball information plate, and these two are associated respectively with first ball information entry mechanism 1838 and second ball information entry mechanism 1840, operation of which is described later. The plates 1834 and 1836 are angularly positioned under control of extension 1824 which, as described, is related to the angular position of the bail 1814 as controlled by the right lane input solenoid 1770. At the same time, the left lane information is represented in plates 1842 which is first ball information and 1844 which is second ball information which are in line with the first ball input mechanism 1846 and the second ball input information mechanism 1848 which is associated with the left machine. The plates 1842 and 1844 are positioned by the extension 1798 which represents the angular position of the bail 1780 operated by the left lane information solenoid 1768. Input members 1846 and 1848 for the left lane machine and 1838 and 1840 for the right lane machine remain stationary laterally relative to the machines. Rightward movement of the base plate 1760, therefore, will position plates 1850 and 1852 in alignment with the members 1838 and 1840, respectively, on the right machine, and this same movement will place plates 1854 and 1856 in alignment with the members 1846 and 1848, respectively, on the left machine. Since plates 1850 and 1852 are angularly positoned by the left lane solenoid 1768 through the extension 1804 as shown, and the plates 1854 and 1856 on the left represent the angular position of the right lane information, operation of the elements 1838 and 1840 of the right lane machine will then be positioned in accordance with left lane information while the operation of the elements 1846 and 1848 of the left lane machine will be positioned according to right lane information. The plate 1760 is controlled for normal or cross lane operation in accordance with the normal and cross lane solenoids previously described. It will be seen, therefore, that the information is available from both lanes to both machines at all times and that the movement of the plate 1760 rightward as allowed by the slot 1764 and stud 1768 will effect the cross lane function, whereas in the position shown, the normal lane functions will prevail.

Each of the plates 1850 and 1852, 1834 and 1836 associated with the right lane, and the four plates 1854, 1856, 1842 and 1844 on the left lane are the same and the detail is shown in FIG. 33. Taking plate 1834 which is associated with the right lane control information and which represents the first ball as an example, the plate is mounted on the shaft 1778 and is spring urged rightward by spring 1886. It is controlled by the extension 1824 which operates in the slot 1825. As the member 1824 rocks clockwise one increment at a time, the plate 1834 will then rock clockwise a similar amount. The plate 1834 has a step section 1850 and an indicating section 1852. In operation, let us assume that five pins were made on the first ball by the bowler on the right hand lane. Solenoid 1770 would then step five increments and through bail 1814, FIG. 31, rock the extension 1824 five increments and plate 1834, FIG. 33, would, therefore, position itself clockwise five steps.

On completion of first ball information for the right lane, a member 1862 which is keyed to a shaft 1860 will rock clockwise and ear 1858 will engage one of the teeth 1856 to prevent further clockwise movement of the plate 1834. After this movement, the indicator section 1852 will show a five through an aperture 1854 in the cover. It will thus be shown that in the right lane, the first ball information set in is a number five. Subsequently, during machine operation, the member 1872, FIG. 33, is rocked counter-clockwise and because of the angular position of the plate 1834, the number five step in the step section 1850 will be in the path of the ear 1838. This action is described later. In the meantime, however, second ball information comes in and extension 1824 rocks clockwise for any pins additionally knocked down by the second ball. The plate 1834, however, is prevented from any further clockwise movement by the lock 1858. However, the second ball information plate 1836 is not stopped and will continue to rock in accordance with the additional movement of the extension 1824. It can be seen, therefore, that both first and second ball information will be indicated by the angular position of the plates 1834 and 1836, FIG. 31, and the same information will be present in the plates 1854 and 1856, respectively, for possible processing by the left machine. The shaft 1860, FIG. 33, extends across the machine and a similar lock to 1862 contacts teeth on the plate 1854 to prevent further clockwise movement of this plate after receipt of first ball information from the right lane.

A similar first ball locking assembly shown in FIG. 33 has shaft 1864 with a member 1878 associated with each of the first ball plates shown in FIG. 31 which are associated with left lane information. These plates are plate 1842 at the left machine and 1850 at the right machine which are controlled during information from the left lane by operation of solenoid 1768. These two shafts 1860 and 1864 are rocked clockwise at completion of first ball information from each lane by a mechanism described later.

INPUT UTILIZATION

Ear 1838 of FIG. 33 is not rocked counter-clockwise to contact the appropriate step 1850 of the disc 1834 until the machine starts to cycle. This car 1838 is shown in FIG. 31 and carries a link 1876 pivoted at 1874, FIG. 33, and, as shown in FIG. 31, the link 1876 is connected to a sliding interponent 1878 which is mounted on a square shaft 1880. The square shaft 1880 is rounded at the end 1882 and is mounted for rotation in a plate 1884. Integrally secured to the square shaft 1880 is an arm 1886 to which is secured a shaft 1888. There are two arms 1886 both secured to the shaft, and the member 1888 serves to make a solid U-shaped member. The interponent 1878 has an extension 1890 (see also FIG. 34) which contacts a downwardly extending ear 1891 on any of the slides 29 with which is happens to be aligned. It will be recalled that the slides 29 are in the block 37 of FIG. 2 and lateral movement of any of the slides 29 will serve to control the extent of rack excursion, for printing of ball information, and for entry of values into the units order. Referring again to FIG. 33, it will be seen that if the member 1872 rocks counter-clockwise until it contacts one of the steps 1850, that the link 1876 will move leftward an amount controlled by the angular position of the plate 1834. Referring again to FIG. 31, this represents a downward movement of the link 1876 which will then associate the interponent 1878 with the correct one of the slides 29 represented by such angular displacement. If the tip 1890 (FIG. 34) of the interponent is positioned in alignment with the slide 29 representing the number five as it would be in the example previously given, then the number five slide will be pulled rightward by clockwise rocking of the square shaft 1880. This clockwise rocking is accomplished by downward movement of the shaft 1888.

A second ball information ear 1840 is associated with the second ball entry for the right machine, as shown in FIG. 31. The link 1892 is connected to interponent 1894 which is slidably mounted on square shaft 1902 similarly supported in plates 1884. The square shaft 1902 (FIG. 34.) may be rotated clockwise by movement of shaft 1898 which is connected through a pair of arms 1900 to the square shaft. Interponent 1894 has an extension 1896 which may also contact any one of the slides 29 and move that slide rightward.

It can be seen, therefore, that information can be stored in the plates 1834, 1836, which is right lane information, or in the plates 1850, 1852, which is left lane information, but on the right side, and that the ears 1838 and 1840 which control first and second ball information into the machine itself are capable of being associated with the other pair for left lane information by simply moving the base plate 1760 rightward as described. Furthermore, the rocking of the elements 1838 and 1840 does not occur until the machine is ready to accept information, and even then the interponents 1878 and 1894 on the square shaft are independently operable when the respective information is to be usd by the machine. For example, if the plate 1834 was set at #5, representing first ball information, and three more pins were knocked down by the second ball, the plate 1836 would be set at eight. The movement in of the ears 1838 and 1840 against the steps would, therefore, place interponent 1878 in a position where it would contact the number five slide, and the interponent 1894 would be set in a position where the ear 1896 would be in alignment with the number eight slide. Subsequent clockwise rocking of the square shaft 1880 that would then control first ball information entry into the machine and rocking of the shaft 1902 would control the correct entry of second ball information into the machine.

FIRST AND SECOND BALL OPERATION

Means to rock square shafts 1880 and 1902 are shown in FIG. 35. A hook member 1904 is capable of either engaging the shaft 1888 under first ball conditions or move rightward to hook 1898 when second ball information is being processed. The member 1904 is pulled downward by means described later. This member is pulled downward during the early part of the cycle as soon as the interponents have been moved against the cams and remains down during the sensing cycle and also during the add cycle if one follows. It is raised up, however, during the subtotal cycle.

It will be seen that the extension 1890 of the interponent will, when square shaft 1880 is rocked clockwise, engage the ear 1891 of the slide 29 with which it is aligned to move the slide 29 rightward and holding the control of printing of the first ball information or the addition of first ball information into the player's register. Similarly, the extension 1896 of the interponent on the square shaft 1902 contacts an ear 1897 on the slide 29 with which it is aligned and the clockwise rocking of the shaft 1902 will, therefore, pull that associated slide rightward to control the printing of second ball information and this wil be held downward during sensing cycles and add cycles but not during sub-total cycles by control of the hook member 1904 which is raised up during sub-total cycles.

Hook member 1904 is normally positioned over the shaft 1888 as shown in FIG. 34, but after processing of first ball information, it is positioned to contact the shaft 1898 for second ball processing. Means to control this positioning of the member 1904 are shown in FIG. 35. The hook member 1904 resiliently moves downward under control of a cam on the adding machine line through a link 1906 which is pivotally connected at 1908 to the member 1904. Member 1906 drops downward to the low of the cam at the start of an adding machine operation and is moved upward when the block moves up by mechanism previously described for sub-total operation and will be moved up at the termination of the machine cycle whether or not an add, subtotal cycle ensues.

Means for positioning the block member 1904 to either the left shaft for first ball engagement or to the right for second ball are controlled by a toggle member. The toggle member 1914 is pivoted at 1916 and held in a toggle position by a spring 1918 on fixed stud 1920 on the frame and stud 1952 on the toggle member. The toggle member is connected at 1952 to a link 1944 which, in turn, is connected to a link 1948 pivoted at 1908 which is the same center as the hook member 1904.

The hook member 1904 tends to follow the link 1948 by means of a spring 1947 which tends to centralize the stud 1946. Spring 1947 is wrapped around the stud 1910 on the member 1904 and positioned on either side of a stud 1912 also on the member 1904. Movement of link 1944, therefore, only tends to urge the member 1904 rightward or leftward depending upon the position of the toggle member 1914. The toggle member 1914 is shown in the position wherein it controls second ball information. It is restored to first ball position which is clockwise from that shown by the following mechanism. Link 1940 is normally spring urged upward from the position shown and is moved downward during the first machine cycling and remains downward for the complete cycling of the machine under control of mechanism previously described. Determination of machine cycling whether it is a single sensing cycle not followed by an add-print cycle, or if it results in more than one cycle which sometimes occurs under conditions previously described, movement of link 1940 upward under condition of machine termination will, therefore, move a member 1936 upward; member 1936 haing two ears 1926 and 1928. In the position shown, car 1926 will contact ear 1924 if member 1926 moves upward and will rock the toggle 1914 clockwise from the position shown. This will then position link 1944 leftward to urge member 1904 counter-clockwise to a position over shaft 1888 to take first ball information on the next machine cycle.

The action of toggle 1914 starts at each time the member 1936 moves downward and then back up. The upward movement will position the toggle to the opposite state in which it was set at the time member 1936 was moved downward. This is controlled by controlling the positioning of the member 1936 by a spring wire 1932 which is freely mounted on the stud 1920. Spring wire 1932 is confined between ears 1930 on the toggle member and ears 1934 on the member 1936. Ears 1930 are above the center of the toggle member 1916 and, therefore, as the toggle swings counter-clockwise it will tend to position the member 1936 as shown under the arm 1924 of the toggle member. The action of the toggle to clockwise position will, through the spring wire 1932, tend to move the member 1936 clockwise. However, nothing will happen until the member 1936 is moved downward as the ear 1926 will be held on the shoulder of arm 1924. In this manner, the hook member 1904 will be in a position to process first ball information for the printing and the addition of this information, and the termination of the machine cycling of toggle 1914 will be moved to the position shown in FIG. 35, and at the termination of machine cycling concerning the second ball information, the toggle will be set to a position to handle first ball information. Toggle 1914 also controls switches for the operation of the proper signals and other controls as related to the first and second ball information. Ear 1950 controlled by the strike solenoid moves to the position shown to hold the member 1936 in a leftward position during the processing of a strike. It will be recalled that a strike is first ball information but does complete a frame so that the following cycling of the machine will be again first ball information for the next frame or the next bowler. It will be seen, therefore, that the mechanism, FIGS. 31-35, is effective for controlling correct sequential operation of the machine under all circumstances regardless of which lane the information is being processed originally.

Switches are closed by the interponents 1878 and 1894 in the position shown in FIG. 31 during the machine cycling to indicate strike or spare, respectively.

TEAM TOTALIZER

It was previously mentioned that a totalizer for a team total is provided to be operated during the tenth frame cycling of the machine to accumulate the total scores of each bowler except substitute bowlers, and also any handicap amount which has been previously set into the machine. The totalizer mechanism was not described. The totalizer is shown in FIG. 5 and is mounted on the travelling carriage so that it may be associated with any of the bowlers' positions previously described. The totalizer consists of four gears 1954 mounted on a shaft 1956. Shaft 1956 is supported on two plates 1958 mounted on a shaft 1960 which serves as a pivot for the plate. Counter-clockwise rocking of plate 1958 about shaft 1960 will allow the gears 1954 to engage the segments associated with that particular bowler. This rocking is accomplished by control of a flat shaft 1962 which is rocked clockwise for such engagement. The shaft 1962 is rocked clockwise under control of the tenth frame clutch to normally engage the segment 97, FIG. 2, at mid-cycling during the total operation previously described, so that clockwise rocking of the segment 97 will rotate the gears 1954, FIG. 5, counter-clockwise by the amount in the register.

The totalizer mechanism has its own tens carry mechanism and this is a shown in FIG. 5 as follows. Each of the gears 1954 has a long tooth 1964 and each has a tens carry trip element 1968 which is rocked clockwise about the pivot 1966 whenever the gear 1954 rotates between 9 and zero. The member 1968 is held in a clockwise position by a centralizer spring 1970 when it is tripped.

The tens carry action, however, does not occur until the shaft 1962 is rotated counter-clockwise back to the position shown and the tens carry advance, therefore, occurs after the disengagement of the totalizer gear from the segments. The latch 1978 on the center 1960 overlies an ear on the member 1980 which is the tens carry advance member. The member 1976 has an upward extension 1980 and is pivoted on stationary pivot 1984. The plate 1980 is normally urged clockwise by a spring 1982 but is also normally latched by 1978 to prevent clockwise movement. Member 1976 has two teeth which engage the gear 1954 when the gear rocks clockwise back to the position shown. Any of the members 1968 which have been tripped during the entry process will then contact the latch 1978 and release the next higher order plate 1980 to rock clockwise about the pivot 1984 thereby imparting another increment of movement to the next higher order gear. If such releasing of the latch causes another carry into the next higher order, the next trip member 1968 will trip the next latch 1978 and, therefore, any carries which have occurred or which are the result of the sum of the amount in the accumulator and the amount being entered from the individual bowler's register will then be represented by the angular position of the gears 1954. Tens carry element so tripped will be restored when the plate 1958 again rocks inward to engage the totalizer gears of segments. This is accomplished by link 1986 pivotally connected to the pivot 1974 and carrying a slot in which a stud 1972 is positioned. The slot is of such length that during the clockwise movement of stud 1974, the trip member 1968 is restored and as the totalizer assembly rocks counter-clockwise to engage the gear segments for the next entry, the shaft 1983 contacts the plate 1980 to rock it counter-clockwise to move the stud 1974 downward to restore the tens carry entering element 1980 which will again be latched up on the latch 1978.

Clearance of the totalizer is accomplished by engaging the totalizer with the gear segments prior to the forward stroke in the same manner as in the accumulator, and under these circumstances, the gear 1954 will be rotating clockwise and will block against the trip member 1968 when this gear hits the zero position. Thus, the rocking of the segments is controlled by the amount in the totalizer which is sub-totalled under the control of the tenth frame clutch in order to print the amount accumulated up to that time and is totalled when the last man has completed his game. The totalling, or clearing, of the totalizer is accomplished by the tenth frame clutch when it is in the sixth bowler's position. The carriage will normally stop at this position in the tenth frame to determine if any handicap is present as all handicap values during team play are entered into the sixth man register since the team normally has only five bowlers. Therefore, during the tenth frame, at the completion of the last bowler whose switch has been operated, the tenth frame clutch will operate to clear the totalizer and print a team total.

CORRECTION AND HANDICAP ENTRY

Entry of handicap amount into the sixth bowler's register is done by mechanism shown in FIG. 5. This mechanism also serves to enter directly an amount for any bowler in that bowler's position. Correction is made for any bowler by positioning the machine at that bowler's position and using the frame makeup button on the keyboard after the carriage has attained that position. The correct score placed in the totalizer by means to be described will then be available for entry into that register after the clearance of that register. After the clearance of the register, the totalizer register will be brought into mesh with the segments and the forward rocking of the segments will clear the totalizer and on the return stroke, this amount will be added into the particular register. Thus, to effect correction, the machine is set at the last correct frame (by the frame backup button) and the amount in the bowler's register is cleared and replaced by the amount which was correct up to that frame and subsequent entries will be made manually unit the bowler gets up to the current frame in which he is bowling. In this manner, corrections may be made on one or any number of frames back and his score be corrected up to the current frame by manual entry of subsequent correct pinfall.

Means to enter a value into the totalizer consists of four special segments 1988, shown in FIG. 5. These segments are located in the right side of the machine which moves the carriage out of the sixth bowler's position for this operation. The segments 1988 are provided on the tip 1992 with a cord operated by manually rotated gears. The location of these segments relative to the machine is fixed and the cord linkage is provided to adjust these segments from the keyboard panel. The correct value to be entered into the accumulator is indexed into the segments 1988 with the machine idle, at which time neither of the gears of the totalizer or the print mechanism are engaged with the segments. The gears 86 are shown in engagement in FIG. 5 for purposes of explaining the printing mechanism as described earlier. After the segments 1988 have been displaced according to their value, the shaft 1994 is rocked clockwise about the center 2000 (linkage may be provided to allow more convenient operation from the keyboard). An anti-backup device is provided and consists of a pawl 1996 and serrated teeth 1998 in a plate 2002 which, when rotated clockwise only slightly, will be prevented from counter-clockwise movement until the plate is rocked completely through an arc capable of bringing the segments 1988 back to a zero position. As the plate 2002 starts to rotate clockwise, a roller 2004 contacting the camming surface on the plate 2002 will rock member 2006 counter-clockwise about pivot 2008. Lever 2006 contacts a stud 2010 which serves to rock the shaft 1962 clockwise and engage the totalizer gears with the segments prior to their being returned clockwise through action of shaft 1994 to zero position. After the amount has been so entered into the totalizer gears, such amount may then be entered into the sixth register, if it represents a handicap, or into any of the other registers if it is being used for correction. The operating sequence for such entry has been described.

INDIVIDUAL FRAME CONTROL

As previously described in connection with the operation of the program units, normal lane control and crosslane control relays 1556 (FIG. 29G) and 1568 were operated by the main program units for both teams, and either of the program units being out of home position would control the setting for normal lane control or cross-lane control. These two relays are utilized not only to control the proper indication of which bowler is to use a lane, but are also used to position the elements shown in FIG. 31 for controlling which "lane information" goes into each machine, and other functions as described. It was also stated that the final control as to both the indication and the machine acceptance of information from each lane would be determined by the particular frame for each bowler.

From previous descriptions it can be readily seen that if the bowlers bowl in normal sequence, and the teams bowl in normal sequence on alternate lanes as provided for in team bowling, the normal positioning of the elements involved for both indication and acceptance of pinfall information for each bowler will be taken care of by the mechanism described. In the case of a bowler coming in late, however, he may be one or two frames behind his teammate and should catch up by using the proper lanes as previously followed by his teammates. In this event, the normal setting of the program units for lane information may or may not coincide with the lane on which the tardy bowler is bowling. Means are provided, therefore, for individual control of the elements for lane selection and indication and such means are shown in FIG. 36.

FIG. 36 (also FIG. 30) shows the switches 1552 and 1562 normally positioned so as to control the normal lane control relay 1556 (FIG. 29G) and the cross-lane control relay 1568 in accordance with the main programming units. When these switches are in down position, the leads are reversed so that the normal lane control and cross-lane control relays will be operated under opposite conditions. This cross-switching is done by operation of a solenoid 2050 in FIG. 36.

In normal operation during the first game, the solenoid 2050 is not operated and the two lane control relays are operated by the main program unit. If a bowler comes in late, however, and the frame selection is made for that bowler with the wrong lane control in operation at that time for that particular bowler, the solenoid 2050 is then operated which will reverse the lane setting.

The means for accomplishing this are shown in FIG. 36, as a lever 2052 freely pivoted on shaft 99 and having an arm 2054 carrying two conducting sensing fingers 2056 and 2058. The sensing finger 2058 is adapted to contact spaced conducting portions of a conducting strip 2060 and the sensing finger 2056 contacts spaced conducting surfaces of a conducting strip 2062. The conducting strips 2060 and 2062 are located on an arcuate plate keyed to the shaft 99 which, it will be remembered, is positioned according to the particular frame for each bowler. Mechanism previously described and shown in FIG. 26 controls the frame positioning for each bowler as his particular game progresses. The conducting strips 2060 (FIG. 36) and 2062 will, therefore, contact either the conducting finger 2058 or 2056 depending on the angular position of the shaft 99. The shaft 99 only reaches the correct angular position for each bowler after the bowler's carriage has been positioned for that bowler and at that particular time either the conducting strip 2060 or 2062 will be energized according to the setting of the normal lane control relay 1556 (FIG. 29G) or the cross-lane control relay 1568 which happens to be in operation at that time.

The conducting surfaces of these two strips are connected so that if the correct relay is on in accordance with the frame selection as represented by the agular position of the conducting strips, no current will flow from the sensing fingers and the relay 2050 will not be operated; but if one of the lane control relays is on which is in error for this particular bowler's frame, then sensing finger 2058 or 2056 will be energized and through leads 2066, 2068 operate the relay 2050. This condition will hold until that bowler completes that frame.

It will be noted that the operation of relay 2050 will not only reverse the switches 1552 and 2562, but will also serve to rock the arm 2052 against the stop 2053 which represents one increment of movement relative to the arcuate plate.

The mode of operation is as follows. Normally, the normal lane control relay 1556 closes a circuit to a contact 2067 in contact with the conducting strip 2062 and the cross-lane control relay 1568, if operated, will close a circuit to lead 2064 in contact with the conducting strip 2060. Normally, during the first game, the first frame is bowled on the lane represented by the team, for example, the team "A" will bowl on the left lane and team "B" will bowl on the right lane for the first frame. During the second frame, each of the teams will bowl on the opposite lane. It will be noted that the conducting finger 2058 is resting on the conducting strip 2060 in the first frame, while the finger 2056 is resting on an insulated surface; and since the conducting strip 2062 is energized under normal lane control, no action will occur. If, however, the team is bowling in its second frame then normally the conducting strip 2060 would be energized, and if a bowler were then to be bowling on Frame 1, a circuit from 2064 through conducting strip 2060, finger 2058, leads 2066 and 2068 would energize the solenoid 2050. This action would reverse the switches 1552 and 1562 to thereby energize the opposite lane control relay, namely, the normal lane control relay 1556. The operation of the solenoid 2050 rocks the arm 2054 counter-clockwise so that the conducting finger 2056 is then on the conducting surface 2 of the conducting strip 2062 and this will, therefore, serve to hold the relay 2050 energized and hold the arm 2054 in this position. At the completion of the frame for that bowler, the lead 2067 or 2064 is deenergized and the arm 2054 will return to normal position. In this manner, the normal program has control over the lane control relays normally but this is checked for each individual bowler as his particular frame is selected and if the lane control relays are correctly positioned for that frame for that bowler then nothing will happen; however, if the lane control relays are not set properly, the solenoid 2050 will be operated to reverse the condition of the solenoids. Attention is called to the fact that if a bowler is catching up and not bowling on the lane that his team is bowling on for that frame, then he will be using the lane on which the other team is bowling and, therefore, no bowler for the other team may be bowling on that lane at that particular time. The other bowlers must, therefore, wait on the other team and this is generally extended as a courtesy.

It was previously stated that the first game is bowled by team "A" on the left lane and team "B" on the right lane for the first frame. During the second game, however, team "B" will bowl the first frame on the left lane and team "A" will bowl the first frame on the right lane, and these conditions are again reversed on the third game so that the first and third games are started on the same lane by each team. Since the conditions are opposite for the game Number 2, solenoid 2050 is normally energized all during the second game to provide that the normal and cross-lane controls will operate in opposite fashion; similarly, the conducting strips 2060 and 2062 are energized in opposite fashion as a result of these relays having been set. For example, during the second game, the conducting strip 2062 is energized whenever the cross-lane control relay is on and conducting strip 2060 will be energized whenever the normal lane control relay is on. During the second game, therefore, the arm 2054 is normally counter-clockwise from the position shown, and in this case in the first frame, the conducting finger 2056 would be on the conducting portion 2 of the conducting strip 2062. The main supply of current during the second game to the solenoid 2050 is then turned off and if the cross-lane control relay is on, the current from the conducting surfae 2062 through the finger 2056 will serve to maintain the relay 2050 in its set position. If, however, the normal machine is set in such a manner that the normal lane control is on when this particular bowler is up during the second game, the conducting strip 2062 will not be energized and, therefore, the solenoid 2050 will be released. This release will then cross the switches 1552 and 1562 in such a manner that the cross-lane control relay will come on and this will then deenergize the conducting strip 2060 so that the solenoid 2050 will remain deenergized through the frame for this bowler.

For this purpose, a single switch member 2070 which has three positions is provided. As shown in FIG. 36, the switch 2070 is in its Number 1 position and in this position, the lead 2074 goes through the switch conductor 2082 and out to lead 2072, and lead 2078 which is from the cross-lane control relay goes through the switch lead 2084 to the lead 2076 which is the normal conditioning for the first game. Rotation of the member 2070 to position Number 2 (FIG. 37) which is one-third of a revolution of this member, will serve to reverse the connection from 2074 through lead 2086 to lead 2076, and lead 2078 will be connected to lead 2072 through the internal connection 2088. FIG. 37 shows position 2, and FIG. 38 shows position 3 of this cross-switching device. It will be noted that in position 3, the connections from the input leads 2074 and 2078 to the output leads 2072 and 2076 are the same as they are in the Number 1 position; therefore, the same conditions will prevail for game Number 1 and game Number 3, whereas cross-connections will be made for game Number 2 only. Switch 2070 will be rotated one-third of a revolution at the completion of each game and after completion of three games will, therefore, be moved back into position Number 1.

It was previously stated that the solenoid 2050 is normally closed during the second game. The connection to operate the solenoid 2050 during the second game is also through the switch 2070 and consists of a conducting strip 2080 which supplies the current to the lead 2068. It will be seen from FIG. 37 that when the switch 2070 is in the Number 2 position, and only in the Number 2 position, a current will be available to the lead 2068 to operate the solenoid.

KEYBOARD CIRCUITRY

The keyboard has been shown in FIG. 28 and previously described as to operation of the various keys. The circuitry concerned with the programming of the players has been described, including bowlers' activiting switches and bowler position switches. The circuitry for pinfall information is shown in FIGS. 39A, 39B and 39C arranged according to FIG. 39D.

Figure 39A:
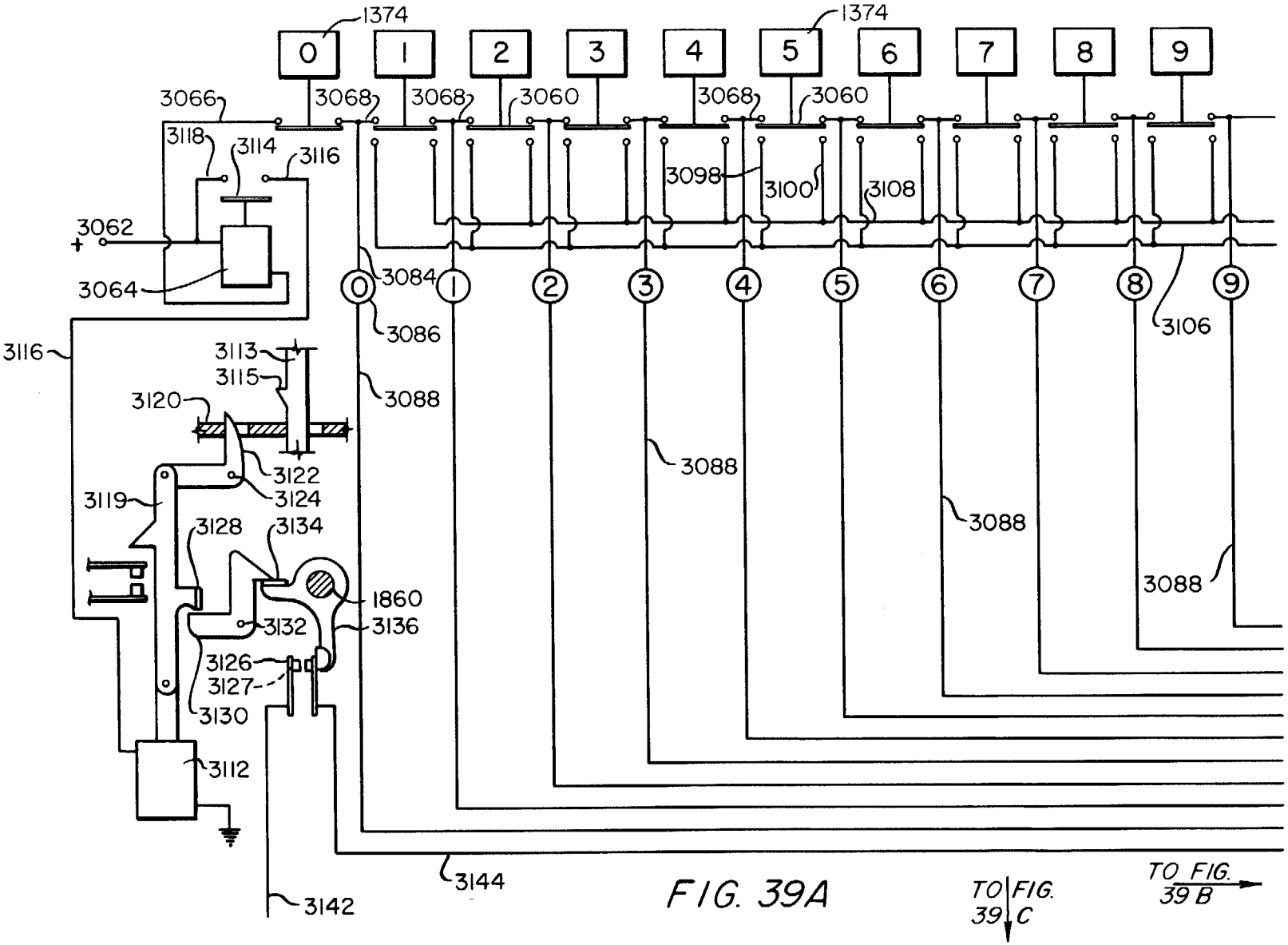
Figure 39B:
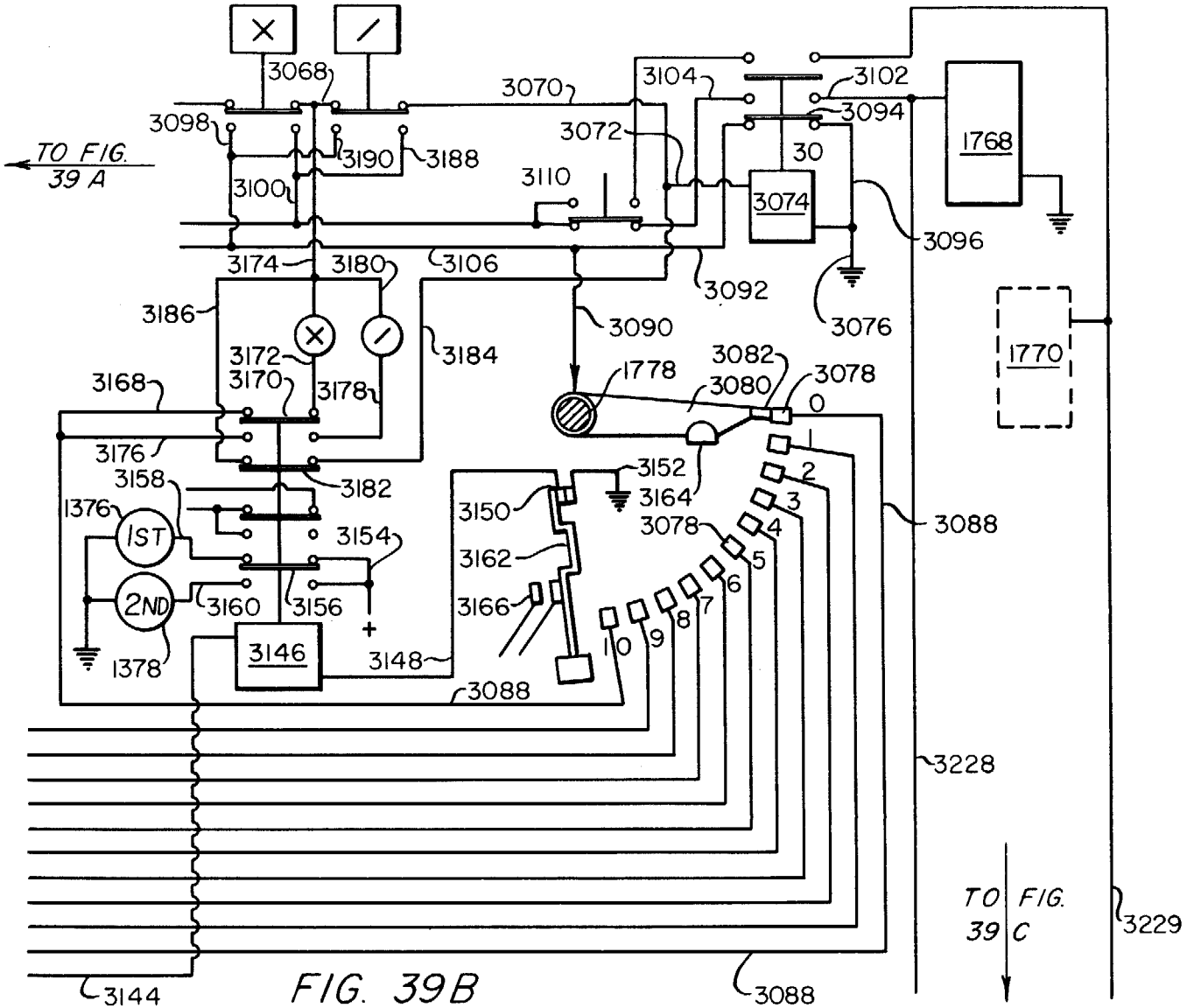
Figure 39C:
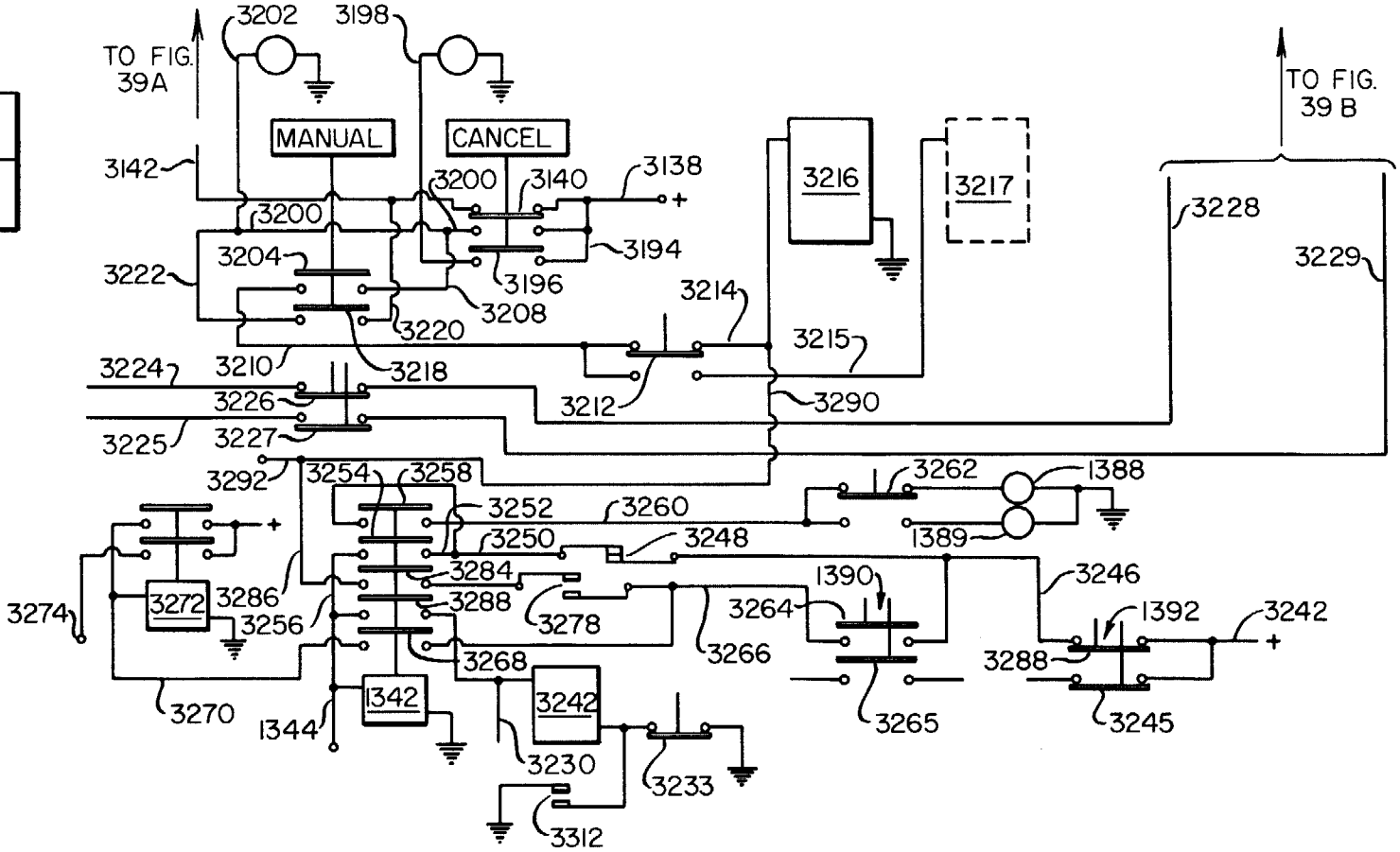
Figure 39D:
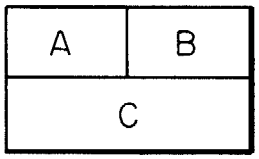

The keys for manual entry 1374, as shown in FIG. 28, are shown in FIG. 39A. Each of the keys 1374 is spring urged upward and controls a switch 3060. All of the switches in their "up" position serve to complete a circuit from the plus source 3062 through a solenoid 3064, lead 3066, switch 3060 bridging lead 3068 associated with each key, lead 3070 (FIG. 39B), 3072, solenoid 3074 to ground 3076. Current is normally supplied to 3062 (FIG. 39A) when the machine is in use and, therefore, it can be seen that if all of the numeral entry keys are in their "up" position, the solenoid 3064 at the left of the diagram and the solenoid 3074, FIG. 39B, at the right of the diagram are both normally energized.

With reference to FIGS. 32 and 33, operation of the solenoid 1768 has been described as receiving pulses to position plates 1834 representative of first and second ball information, respectively, from the right lane, and solenoid 1770 has been shown and described as positioning plates for first and second ball information from the left lane. Two plates representing right lane information are set on the right side of the machine for use by the right machine and two plates representing the same information are set at the same time and under the same control for use by the left lane machine (see also FIG. 31). A similar set of plates are set at both the right and the left lane position from information originating at the left lane but positioned for use by either machine as described.

As previously described, these plates and the solenoids are mounted on a frame which is capable of being moved laterally to associate stored information from either lane with either machine. The keyboard at the right lane position is associated with the right-hand machine and the keyboard at the left lane position is associated with the left-hand machine. Indication as to the information entering the machine, therefore, may be that which is developed in the left lane or the right lane, depending on the normal or cross-lane control elements previously described.

Indication as to pinfall is taken from the two plates which are associated with each machine and this indication is provided as follows: A series of arcuately placed contacts 3078 (FIG. 39B) are associated with the circuitry at each machine and keyboard. Associated with each of the plates, such as 1834, FIGS. 33 and 41, is an arm such as 3080 (FIG. 39B) which is secured to the plate in such a manner as to be positioned in an arcuate position representative of the arcuate position of the plate. Each of the arms 3080 carries a brush 3082 which normally contacts the surface 3078 if it is in alignment with the surface. These contacts 3078 are fixed and wide enough to be contacted by the arm 3080 of only two of the plates at one time.

As shown in FIG. 40, the contacts 3078 are in alignment with the plates 1834 and 1836 which represent first and second ball information from the right lane only. The two plates 1850 and 1852 representing first and second ball information from the left lane are associated with the right lane machine by a lateral movement of the four plates as previously described. This rightward lateral movement will, therefore, associate the plates 1850 and 1852 with the contacts 3078 if the plates are moved rightward for cross-lane control. The circuitry, as shown in FIGS. 39A, 39B and 39C, therefore, is capable of indicating the ball information which is in position to be entered in the right lane machine regardless of whether such information originates from pinfall at the right or left lane. This circuitry is as follows: The arm 3080 (FIG. 39B) is shown as located in the zero position, and in this position a circuit is completed between the current source 3062 (FIG. 39A), lead 3066, switch 3060 under the zero key, lead 3068, lead 3084, indicator 3086 for the zero line, lead 3088 to contact 3078 (FIG. 39B), brush 3082, lead 3090, lead 3092, switch 3094, lead 3096 to ground 3076. It was previously stated that as long as none of the keys were down, the solenoid 3074 would be energized and, therefore, the indicator, such as 3086 in the zero line, will pass a current depending on the arcuate position of the arm 3080. The indicators are under the key tops themselves in a position to light the key tops and the value represented by the lighted keys is ball information from the particular lane which is to be entered into the right-hand machine in this instance, as represented from the position of the plates containing the right-hand lane information in alignment with the contacts 3078.

The circuitry provided in FIGS. 39A, 39B and 39C also serves to position the plates in accordance with the information represented by the particular key being depressed. Again, the plates being positioned will depend on the setting for normal or cross-lane control. The information so set, however, will be used by the right-hand machine since the base holding the plates will be positioned and held for such entry. The means for positioning the plates as a result of key depression are as follows. Let us assume, for example, that the number five key is depressed. Depression of the number five key opens the switch 3060 and, therefore, breaks the circuit to the lead 3070 (FIG. 39B) and deenergizes the solenoid 3074 at the right side of the figure. The switch 3094, therefore, will be released from contact with the leads 3092 and 3096 and will close the contacts between the lines 3102 and 3104. Similarly, the switch 3060 (FIG. 39A) will close the contacts between the lines 3098 and 3100. Assuming that the arm 3080 (FIG. 29B) is at the zero position as shown in the drawing, the circuit will be from the source 3062 (FIG. 39A) through the solenoid 3064, lead 3066, and zero switch 3060, and the line 3068, 3084, 3088 to the contact 3078 at the zero line, lead 3090 (FIG. 39B), lead 3106, and lead 3098 (FIG. 39A) at the number five position, switch 3060 at that position, lead 3100, lead 3108, switch 3110 (FIG. 39B), lead 3104, switch 3094, lead 3102 to operate the solenoid 1768 previously described as the solenoid which advances with information coming from the right lane. The switch 3110 is associated with a normal or cross-lane control element and is shown in the position with normal lane control. The action of the solenoid 1768 has been described as a ratchet type action, and since the arm 3080 follows this movement, the brush 3082 at the half-step position will break the contact releasing the solenoid 1768 but it will be reenergized at the No. 1 line by the same circuitry, except in this case the energization will be through the No. 1 line from the source 3062 (FIG. 39A). Similarly, the No. 2, 3 and 4 lines 3088 will be energized in turn to step the solenoid 1768 and, consequently, the arm 3080 (FIG. 39B). This will continue through the No. 4 contact 3078 but is will be noted that with the No. 5 key down (FIG. 39A), the circuit is broken from the current source to the No. 5 arcuate contact (FIG. 39B) and, therefore, the solenoid will fail to operate after the arm reaches the No. 5 arcuate position indicating that the step plate has been set in accordance with the ball information as represented by the key depressed. When this occurs, the solenoid 3064 (FIG. 39A) is deenergized. Solenoid 3064 is a slow release solenoid and will not be released by the normal stepping of the arm 3080 between one line and another.

If, however, the current fails to flow through the circuit as a result of the connection being broken by depression of a key, then the solenoid 3064 being deenergized closes switch 3114 to connect the plus line 3062, lead 3118, lead 3116, to operate a solenoid 3112. A lock plate 3120 common to all the numeral keys is shown in part in the drawing. The key stem 3113 is latched in a normal manner by the lock plate 3120, being positioned over the shoulder 3115 of a depressed key stem. Operation of the solenoid 3112 as a result of the deenergization of solenoid 3064 will serve to release any key depressed by the link 3119 which rocks the bellcrank 3122 counter-clockwise about the pivot 3124 to move the lockplate 3120 leftward and release the key. Once the key has been releaed, the circuit is again established between the plus source 3062 through all of the key switches to the lead 3070, 3072 (FIG. 39B) to energize the solenoid 3074. When this occurs, the circuit is again normalized and ready to accept second ball information.

Second ball information is established by the closing of switch 3126 (FIG. 39A) in the following manner. Operation of the relay 3112 pulls down link 3119; an ear 3128 overlies a latch 3130 and rocks it counter-clockwise about pivot 3132. The latch 3130 (see also FIG. 41) overlies an ear 3134 on a member 3136. The member 3136 is secured to the shaft 1860 which, it will be recalled, controls the latch 1862 on the plate to hold the plate 1834 on first ball information. The arm of the bellcrank 3136, therefore, closes the switch 3126 (FIG. 39A). Switch 3126, being closed, completes a circuit from plus source 3138 (FIG. 39C), switch 3140 under the "cancel" key, lead 3142, switch 3126 (FIG. 39A), lead 3144, to operate a solenoid 3146 (FIG. 39B) through the lead 3148, switch 3150 to ground 3152. Thus, the switch 3126 (FIG. 39A) being closed, will normally energize solenoid 3146 (FIG. 39B) which controls a number of switches for indication and control of second ball information.

It was previously stated that the indicator 1376 and the indicator 1378 (FIG. 28) would light to show whether first ball or second ball information is being entered into the machine. These are shown in FIG. 39B as being controlled by the solenoid 3146 which, when energized as shown, closes a circuit from the plus supply 3154 through switch 3156 to lead 3158 and through the first ball indicator 1376 to ground. Energization of relay 3146, however, will move the switch 3156 to connect the plus supply 3154 to lead 3160 and through indicator 1378 to ground. It will be recalled that the plates 1834 (FIGS. 33 and 31) are mounted on a base which moves laterally, and the arm 3136 (FIG. 39A) and latch 3130 are mounted on this movable base plate, whereas the switch 3126 is stationary as is the solenoid 3112 and the ear 3128. Lateral movement of the plates to select ball information from the alternate lane will associate the ear 3128 with the bellcrank on the alternate lane first ball shaft and such lateral movement of the plate for alternate lane control will open the switch 3126 for the right lane control and close the switch 3127 with which it will then be aligned. The switch 3127 performs the same function for the left lane machine as 3126 does for the right lane machine and, therefore, the relay 3146 is associated with the ball information coming in at the time regardless of the position of the base which holds the plates. The orientation of the circuitry for the machine is simply one of mechanical displacement of the operating elements. More complete description of this lateral displacement and these actions is given later. Other operations as related to the solenoid 3146 (FIG. 39B) are as follows: A flexible arm 3162 is in alignment with the arm 3080 of the first ball information plate. Whenever the first ball information plate reaches the No. 10 position, an ear 3164 on the arm 3080 contacts the flexible arm 3162 to open switch 3150 and prevent the operation of solenoid 3146 even though the switch 3126 (FIG. 39A) may be closed. Under these conditions, the arm 3080 (FIG. 39B) is at the No. 10 arcuate contact 3078 and through the line 3088, lead 3168, and switch 3170, lead 3172, strike symbol indicator, lead 3174 to the main line, allows current to flow through the brush 3082, line 3090 and to ground to give proper indication of a strike. A switch 3166 is closed under conditions of first ball information being ten to provide for the operation of the strike solenoid in the machine previously described. A similar switch is provided at second ball when the arm reaches 3078 under second ball conditions. In the event that the arm 3080 has reached a No. 10 position under second ball conditions, the relay 3146 is operated and the switch 3170, therefore, connects the circuit from the lead 3088, 3176 through switch 3170, lead 3178, space indicator lead 3180 to the connection at 3068 to provide a current flow from this main line through the brush 3082, arm 3080, line 3090, 3092, switch 3094 to ground. Thus, if the arm positioning is at ten on first ball conditions, the strike symbol will show and under second ball conditions, the spare symbol will show.

Means are also provided to prevent operation of the machine in case of manual depression of the spare key during first ball information. It will be noted that the leads 3098 and 3100 under the strike key are connected to the leads 3190 and 3188, respectively, under the spare key. It was also previously described that the circuit to the solenoid 3074 must be deenergized before a setting of the solenoid 1768 can occur as a result of key depression. Depression of the spare key, therefore, under first ball conditions will not allow the deenergization of the solenoid 3074 since current can flow from the point 3068 at the left of the spare key to lead 3186, switch 3182, lead 3184, lead 3072 to keep the solenoid 3074 energized. Under second ball conditions, however, the switch 3182 is opened by the solenoid 3146 and, therefore, depression of the spare key under second ball conditions will provide for correction operation.

Operation of the means for controlling first and second ball information are more clearly shown in FIGS. 41 and 42. As shown in FIG. 41, latch arm 1862, which has been previously described as secured to shaft 1860 and extending to both sides of the machine for controlling first ball information from the right lane at both positions, is in a position to be released for engagement. The member 3136 has been described as integral with the shaft 1860, normally spring-urged clockwise by spring 3192, has been described as being latched by latch 3130 and capable of being released by ear 3128, as shown in FIG. 39A. It was previously described that the ear 3128 remains stationary while the shaft 1860 is part of the assembly which moves rightward or leftward in accordance with normal or cross-lane control. It can, therefore, be seen that the latch 3130 will be released by downward movement of the car 3128 only if the latch is in alignment with that ear. A similar member is attached to the shaft 1864 which has previously been described as rocking clockwise to hold the first ball information from the left lane. The member 3137 is shown in FIG. 43 and carries its own latch 3131.

FIG. 43 shows that the ear 3128 may contact the latch 3131 of the left lane control since it is in alignment therewith when the assembly is at its cross-lane control position. It will be seen, therefore, that release of the elements controlling first and second ball information will depend on the lateral positioning of the plate which is set for normal or cross-lane control. This arrangement allows utilization of either of the pairs of plates for manual control without disturbing the information which is incoming and being utilized by the other machine.

It was previously stated that the indication as to the number of pins which the machine would receive would be associated with the lane which was receiving the information regardless of the lane from which the information originated. It is evident, therefore, that the operation of the cancel key at the machine should cancel the information which is to enter the machine, and this depends on the lateral positioning of the ball information plate. Operation of the cancel key is, therefore, as follows: A circuit, previously described, shows a plus source 3138 (FIG. 39C) through the cancel key switch 3140, and through the switch 3126 (FIG. 39A), which is the switch associated with the right lane information and machine. In the event that the switch 3126 is closed by one or the other of the members 3136 or 3137 (FIG. 43), then depression of the cancel key will break the circuit from the plus source 3138 (FIG. 39C) to the solenoid 3146 (FIG. 31B) leaving it at first ball position. Operation of the cancel key, however, does not perform any other function except to light the "cancel" and "manual" indicators.

It was previously described that the operation of the manual key (FIG. 39C) must occur following the operation of the cancel key. The cancel key remains down but is released upon depression of the manual key. While the cancel key is down, the switch 3140 connects the plus source 3138 to the lead 3200, the lead 3202 to light the manual indicator. The switch 3196 is also closed connecting the plus line through 3194 to 3198 to light the cancel indicator. Depression of the manual key is necessary to release the cancel key but release of the manual key occurs only upon completion of entry of first and second ball information and such utilization by the machine. The first time the manual key is depressed with the cancel key down, the circuit from the plus source 3138 is then through the switch 3140, the lead 3200, the lead 3208, and the switch 3204, the lead 3210, switch 3212, lead 3214, to operate a solenoid 3216. Solenoid 3216 clears back the right lane information as described later. It is the action of the solenoid 3216 which releases the cancel key and, therefore, as the cancel key raises, after clearing the information from the solenoid in restoring the plates, the switch 3140 then connects the current source 3138 to the normal operation of the machine, and the manual key may remain down without interference from the solenoid 3216.

It will also be seen that the switch 3196 will open upon release of the cancel key and the lead 3198 to the cancel indicator will be broken; however, the manual indicator will remain lighted as long as the manual key is down through the connection from the current source through switch 3140, lead 3220, switch 3218, lead 3222, to the manual indicator lead 3202. The switch 3212 in the line to operate the clearing solenoid 3216 is dependent on the lateral position of the base plate and, therefore, the operation of the manual and cancel keys will serve to clear back and control the operation of the plates representative of left or right lane information depending on the normal or alternate lane control setting.

Depression of the manual key also serve to prevent the external pulses from entering the machine, these external pulses depending on the normal or alternate lane setting. The external pulses from the right lane always enter the lead 3224 and pass through the switch 3226 to the lead 3228 to operate the solenoid 1768 FIG. 39B. The switch 3226 FIG. 39C is provided in the line merely to prevent the receipt of external pulses in the event that the manual key is down. In the normal lane control, the manual key on the right lane will open the line from the external pulses by breaking the switch 3226, whereas if the machine is set on alternate lane control, the mechanical displacement of the base will cause the manual key to open the switch 3227 which breaks the external receipt of pulses from the line 3225. These pulses go through the switch 3227, lead 3229, and directly to operate the left lane control solenoid 1770 FIG. 39B. Similarly, the manual key on the left lane will break the receipt of pulses from the left lane but if the base plate is positioned for alternate lane control, it will break the line which receives pulses from the right lane. In this manner, the external operation of the machine will be provided only from the lane which is not under manual control at the time.

Operation of the release of the latch 3130, FIG. 41, or 3131, FIG. 43, under manual control as indicated by the circuitry of FIGS. 39A, B, and C has been described. Normal operation of these elements, however, under control of ball information from the pit is best shown in FIG. 42. Under normal operating conditions, the first ball release latch is operated directly from information received from the pit.

The scanning of the information from the pit is described in my application Ser. No. 697,632, and the aforementioned continuation thereof, and is, therefore, not included in this application. There is a pulse which indicates that the scanning has been completed each time. This pulse comes through the line 3230 to energize the solenoid 3232. Energization of the solenoid 3232 rocks bellcrank 3234 counter-clockwise about 3236. The collar 3238 is rigidly secured to the shaft 1860 and this lateral movement of the shaft 1860 will pull the ear 3136 from under the latch 3130. This "end of scanning" action occurs each time and release of the solenoid 3232 will allow the shaft 1860 to return to normal under urgency of spring 3240. It should be kept in mind that the shaft 1860 is mounted on the lane control plate as previously described, and that the entire assembly may move laterally in accordance with normal or alternate lane control. The elements as shown in FIG. 42 are mounted on this plate and, therefore, the movement imparted to the shaft 1860 is relative to that plate regardless of its position. Operation of the solenoid 3232, therefore, serves primarily to release the latch 3136 and allow the member 1862 to drop down onto the teeth of the first ball information member 1836 for right lane information. A similar assembly and solenoid is provided for operation in response to the completion of the information from the left lane. The operation of the solenoid 3232 after second ball information serves another purpose (described later).

It will be recalled from FIG. 28 and the description of the key operation that a foul must be verified "yes" or "no" before the machine will operate. The circuitry for control of this operation is shown in FIG. 39C. The foul is normally verified upon its occurrence regardless of which of the machines is to receive the information. The indication of a foul is controlled by a separate foul detecting system on the lanes, which is not a part of this invention. The operation of this external signal, however, operates solenoid 1342 (if it is a right lane foul) by energizing the line 1344. Normally, the foul signal is of short duration. However, once the solenoid 1342 is energized, it will remain energized and control the functions. The solenoid 1342 remains energized through the following circuit: Current source 3242, switch 3244, lead 3246, switch 3248, leao 3250, lead 3252, switch 3254, lead 3256. The energization of the solenoid 1342 will close the switch 3254 to complete the circuit as described. It will also be noted that the switch 3258 closes a contact from the line 3250 to the line 3260 and through the switch 3262 will serve to light the foul indicator 1388 on the right lane. The switch 3262 is dependent on the leftward or rightward position of the plate for regular or alternate lane control and, therefore, this circuit will be completed to the left indicator 1389 if the switch 3262 is set for alternate lane control. Depression of the "no" key 1392 FIG. 28 will break the circuit from the plus source 3242 FIG. 39C, and in the event that the external source is not still operating, the foul solenoid 1342 will be released. If the external timing is set for too long a period of time, the "no" key may also break the circuit to the line 1344. There is a mechanical displacement from the stem of the key 1392 so that normally the switch 3244 will be opened by this key; however, if the base is laterally set out of position, the key 1392 will open the switch 3245 which controls the plus source to the left lane foul solenoid in the same manner. Similarly, the switch 3264 underlying the "yes" button 1390 will be operated under normal lane control conditions, whereas the switch 3265 will be operated if the base plate is set for alternate lane. The action of the two switches is the same and only the operation of the right lane control foul is described.

Depression of the "yes" key 1390 connects the switch 3264 to the plus line 3246 to energize line 3266 and since the solenoid 1342 is energized, the switch 3268 will be closed and energize the line 3270 to operate the relay 3272. The relay 3272 will hold closed by switches, as shown, once it has been energized. This relay controls the printing of the foul symbol and is only released at machine termination. The foul symbol is printed whether or not the information is first ball or second ball foul, and the line 3274 is energized to the foul print symbol previously described.

Operation of first and second ball foul will now be described. Referring again to FIG. 42, a pin 3276 is shown as being positioned to the left of the arm 1862. Operation of the solenoid 3232, however, will move the arm 1862 leftward and release the latch is previously described, allowing the arm 1862 to drop down against the pin 3276. Referring to FIG. 41, it will be seen that if the arm 1862 contacts the pin 3276, it will rock the bellcrank 3282 clockwise and close switch 3278. Referring back to FIG. 39c, it will be seen that with switch 3278 closed and the foul solenoid 1342 operated, a circuit which closes the switch 3264 in response to a "Yes" signal will complete a circuit through the switch 3284, closed as a result of the foul solenoid being operated to the lead 3286, and through the lead 3290 to operate the solenoid 3216 previously described as serving to clear back the ball information by clearing the plates to zero. It will be seen, therefore, that if the foul is a first ball foul, the leftward movement of the arm 1862, FIG. 42, serves to contact the pin 3276 and closes switch 3278 (FIG. 41) by means also shown on FIG. 42. The solenoid 3232 continues to hold the shaft 1860 leftward (FIG. 42) by circuitry shown in FIG. 39c. As previously described, the foul solenoid 1342 must be initially energized externally through lead 1344 and will remain energized until and unless the "no" button is depressed, and through the switch 3288 will also serve to energize the solenoid 3232. The ground to the solenoid 3232 is broken by switch 3233 until the external foul signal is completed; therefore, the release of the first ball plate latch is delayed until after the count of the pinfall. Under these circumstances, the switch 3278 remains closed if it is first ball foul and nothing occurs unless the "yes" button is depressed, at which time the information will be cleared back to zero by operation of solenoid 3216.

The operation of the mechanism for clearing the pinfall back to zero is shown in FIG. 44. The solenoid 3216 which performs this function has already been described as operating as a result of a cancellation and subsequent depression of the manual key and as a result of a first ball foul. It is also operated upon machine completion of the information upon the closing of a switch by mechanism described which connects a current source to the line at 3292, FIG. 39c. This pulse is on the last machine cycle and is of a duration only sufficient to assure the operation of the solenoid 3216. The solenoid, in FIG. 44, is shown fully energized and having pulled down a link 3294 which is pivotally connected at 3296 to an arm 3298 freely mounted on the shaft 1778. The counter-clockwise rocking of the member 3298 about the shaft 1778 serves to raise the bail 1780 which controls the information from the right lane, as previously described. It was also previously stated that the action of restoring ball information plates from a lane would also serve to relatch the first ball latch. This is accomplished in the latter part of the operation of the solenoid 3216 by an ear 3300 which overlies a member 3302 also freely pivoted on the shaft 1778. This counter-clockwise movement will move down link 3304 and through the stud and slot connection at 3306 will rock the shaft 1860 counter-clockwise to relatch the first ball information member. This same action through a nose 3308 on the member 3302 will serve to open switch 3248. Switch 3248 is shown in FIG. 39c and is in the line from the plus source 3242, lead 3246, 3250, which serves among other things to hold the foul solenoid 1342 in operated position. Since this also releases the solenoid 3232, the machine will be normalized after a first ball foul with the ball information at zero and the only thing that will remain set is the foul print symbol, as described.

It was previously stated that the switch 3233 would hold the ground open to prevent immediate operation of the solenoid 3232 in the case of a foul. This is ineffective to serve in this manner in the case of a second ball foul since the ground to the relay 3232 is closed by a switch 3312 which is closed whenever the latch which holds first ball information is down (see FIG. 44) and, therefore, upon receipt of the signal that there is a second ball foul, the shaft 1860 will move leftward immediately (FIG. 42). The external foul signal will be the result of throwing a ball and since the count occurs sometime later, if there is a foul connected with the throwing of the ball, such information will be noted prior to the count. Under these circumstances, the leftward movement of the arm 1862, as seen in FIG. 42, will serve to hold the plate 1834 at whatever position it had attained on first ball count. It will be seen from FIG. 39c circuitry, that once the relay 3232 has been operated, as the result of a foul, it will remain energized until released by depression of the "no" key or will wait until the solenoid which clears the ball information back to zero operates and thereby opens the switch 3248 (see also FIG. 44). Since this does not operate on second ball information, then only the depression of the "no" key can clear this until the machine completes an operation, at which time the information will be cleared back to zero. It can be seen, therefore, that the leftward movement of the shaft 1860 of FIG. 42 will remain in the leftward position through machine operation in case of a second ball foul and, therefore, the first ball information will be picked up and entered into the machine whenever there is a verified second ball foul. This is true even if there is a foul on both the first and second ball, and both verified. A zero entry will be made into the machine for both balls in the event.

From the foregoing explanation of the circuitry in FIGS. 39a, b, and c, it can be seen that the keyboard can be used to control entry into either one of the plates depending on the normal or alternate lane setting of the machine. The keyboard, however, will always control the entry of the information set into the keyboard in the right lane into the right machine. The operation as described in these specifications as to the external functioning of the keyboard of FIG. 28 is, therefore, provided by this circuitry. The split key 1384, or the "G" key for gutter ball, or any other special symbol required will operate the solenoid directly by energization of the solenoids previously described to control printing of this information. This information is printing only and does not enter into the score. The right lane indicator 1382 and the left lane indicator 1380 are controlled by the position of the plate as controlled by alternate or normal lane control. The switches for these, however, are directly on the plate since there are times when this plate will be changed over by means previously described.

Previous description has been made of the manner in which correction values are entered into the machine. There is a linkage (from 1992) on the elements shown in FIG. 5 to the dials at the keyboard to indicate the amount being set into the totalizer register for making the corrections. The manner of making corrections will now be described. Referring to FIG. 28, it can be seen that in order to make a correction a "frame back-up" key must be depressed and also an "enter into register" key must be depressed. The use of these keys does not occur until the information has been entered into the totalizer register, according to previous description. After this occurs, the bowler's position key is depressed to bring the machine into the proper registration for correction of that bowler's score.

Correction may be made as many frames back as is desired and the general operation is as follows: The score at the last correct frame is noted, and it will also be noted after the machine gets to the bowler's position which frame the machine is set for. Depression of the frame back-up key then adjusts the frame position to control the printing at the correct place. The "enter into register" key is then depressed and the value which is in the totalizer at the time will replace the previous score in the bowler's register and this will be printed over the amount already printed on the sheet, and therefore, if it is the same it will be printed over the amount already printed on the sheet, and therefore, if it is the same it will be known that the correct entry is being made. (Erasures, if made should not include the last correct frame as this overprinting provides a check as to accuracy of the amount entered.)

The mechanism for performing in this manner is shown in FIGS. 45 and 46. FIG. 45 shows the mechanism which responds to the depression of the "frame back-up" key. The closing of the key 3312 connects current source 3314 to operate solenoids 3316 and 3318. Solenoid 3316 pulls down lever 3320 which rocks about its pivot and moves the tip 3322 upward to contact the rachet teeth 3326 which is integral with the frame control plate assembly including shaft 834 and pivoted on the shaft 99 (see also FIG. 20). A stud 3324 (FIG. 645) allows the tip 3322 which is spring-urged leftward to contact the teeth and a limit is placed on this movement so that the shaft 99 is backed up on increment counter-clockwise by each depression of the "frame back-up" key. When the "frame back-up" key is released, the tip 3322 does not interfere with the normal operation of the frame positioning control member. The second solenoid 3318 operated by depression of the "frame back-up" key pulls a lever 3328 clockwise about pivot 3330. Link 3328 overlies shaft 712 which, it will be recalled, rocks downward to rock a member 708 (see also FIG. 2) counter-clockwise and restore the count first ball and adjust the "tens" memory element back one space. Operation in this manner allows for the simple clearance of tens entered as a result of an erroneous depression of a spare or a strike key in the previous frame even though such entry did not enter into the score. Moreover, if the error is two frames back, there cannot be more than two tens stored into the tens memory and, therefore, the reestablishment of the conditions which existed at the correct frame are possible with one or two frames back. Further adjustment may be made as far back as is desired however.

Mechanism for controlling the entry of the information in the register are shown in FIG. 46. Depression of the "enter into register" key performs the following functions: Clearance of the players register by total operation, followed by entry of the information which is in the totalizer into the register and a clearance of the totalizer as a result. Depression of the "enter into register" key 1402 results in the key being latched down by latch 3328 as shown. Depression of the key closes switch 3332 connecting the current source 3330 to operate a solenoid 3336. The solenoid 3336 pulls down on link 3338 and link 3338 has a shoulder 3341 overlying an ear which serves to rock the shaft 300 of FIG. 11 and start the machine cycle in the same manner as it would upon receipt of ball information. The link 3338 FIG. 46 pulls down on member 3340 by means of contact with an ear 3342 on the member 3340. The member 3340 is pivoted at 3344 and spring-urged counter-clockwise by spring 3345. This action places nose 3348 of the member 3340 in the path of the total plate previously described, FIG. 10, which controls the operation of the adding machine. This operation is similar to the non-add operation controlled by the paddle 232, as previously described; however a total operation result because of the ear 3348 in the path of the plate at the "total" position. Because the first ball solenoid is not operated (link 324 FIG. 11), the conditions shown in that figure prevail and the ear 336 is blocked to cause further cycling of the machine. This serves to drop the ear 232 (FIG. 46)

downward by mechanism previously described and conditions causes the machine to go through an add cycle and a sub-total cycle before restoring. A member 3350 is brought rightward with each machine cycle by linkage not shown. On the first cycle of the machine, this rightward movement of the member 3350 places the ear 3352 under the nose 3354 to allow only a partial return of the member 3340 counter-clockwise. This same action, through the ear 3356, moves the link 3338 rightward to release the first notch from the ear 3342. Thus, the ear 3348 on the member 3340 is moved out of the path of the slide and the first operation will serve only to clear the register and set the machine for an add and a sub-total cycle. Upward movement of the link 3340 one step positions a member 3358, which is suspended from the member 3340 on a pivot as shown, into the path of the ear 3356; therefore, on the second operation of the machine, the member 3358 is rocked rightward to rock a bellcrank 3360 clockwise. This action pulls a link 3362 downward to release the "enter into register" key. This action, therefore, raises the link 3338 and the machine will terminate after the sub-total cycle.

Means are provided to raise the block as previously described to allow for the control of the rack excursion to be positioned, first by control of the total operation, and next to be limited by the amount in the totalizer register being brought back to zero. This action is provided by a shoulder 3363 on the link 3338 which moves an arm of a bellcrank 3364 downward. FIG. 47 shows the shoulder 3363 and the bellcrank 3364. Counter-clockwise rocking of the bellcrank 3364 about pivot 3366 serves to rotate the linkage, as described in FIG. 15, to rock the shafts 782 to raise up the block and allow the rack excursion to be controlled externally. Means are provided through switch 3334, FIG. 46 which is also closed by the "enter register" key, and a supplementary switch 3370 in series, to operate a solenoid 3372 under control of a cam 3376 on the normal adding machine line which closes switch 3374 to bring the totalizer into engagement with the racks at the proper time. It will be noted that the switch 3370 is open during the total stroke and, therefore, this action will not occur during the first machine cycle. It will close during the second machine cycle, which is the add cycle, and during the sub-total cycle will not operate as the key 1402 will be released and the switch 3334 open.

The normal machine cycle cam 3376 will close switch 3374 each time but will be ineffective unless the conditions above described are set by "enter into register" key.

Means are also shown in FIG. 46 to engage the totalizer at the proper time under control of the tenth frame operation. A cam 3378 on the tenth frame clutch line closes switch 3380 to provide this operation. Normally, the switch 3384 is closed and the action will be a sub-total of the totalizer; however, a switch 3386 is closed with the machine in sixth bowler position and at the midcycle under control of the tenth frame clutch, a switch 3388 is closed to operate relay 3382 to open switch 3384 and release solenoid 3372. This serves to totalize the totalizer at the No. 6 bowler's position to prepare the machine for the next game.

As previously explained, the operation of engagement of the totalizer under control of the tenth frame operation is dependent on the bowler's activating switch being set at a position for team bowling. These switches are shown in FIG. 29E and serve to connect a lead at the bowler's position such as 1446 to a lead 3390 when the switch is closed. The lead 3390 provides the current for operation of the totalizer engaging means and, therefore, if a bowler position switch is not set at the team position (in order to close the switch 3388 of FIG. 29E), the means for engaging the totalizer as shown in FIG. 46 will not operate at that particular bowler's position. The substitute bowler's score, therefore, will not enter into the totalizer during the tenth frame operation.

Reference has been made throughout the specifications to means for control of operations at a particular time, or for the prevention or delay of such operation until such time as the machine may correctly operate to compute the score fore each bowler. For example, on FIG. 29E I have shown a switch 1464 which provides for the advance of the bowler 's position carriage by connection with the line 1462 and ground 1466, and in a second position connects the line 1468 to the line 1588 to provide correct operation for the program advancing as described previously. It will be obvious, therefore, that the advance of the program unit and the actual positioning of the carriage cannot occur simultaneously, and furthermore, the advance of the carriage positioning member will not occur when the machine is cycling.

FIG. 48 shows means for controlling this operation and other interdependent operations having to do with machine cycling and control under various conditions. Switch 1464 is shown in FIG. 48 as operated by a solenoid 3392. A switch 3394 is closed as soon as the machine starts to cycle and serves to connect the plus source 3396, and through lead 3398, switch 3394 to operate the solenoid. A member 3400 is freely pivoted on a stud 3402 and has a former ear 3404 and a second ear 3406 in alignment with cams 3408 and 3410, respectively. The cam 3408 is on the adding machine clutch line 562, and the cam 3410 is on the print clutch line 564. It was previously explained that these lines operate out of phase and, therefore, the only time that the two notches in the cams 3408 and 3410 are aligned with the ears 3404 and 3406 is when both of these lines are in home position. Thus, the plate 3400 will rock clockwise as soon as the machine starts to operate and will not be able to rock counter-clockwise until the machine has completed its cycling. The switch 3394, therefore, will be closed the entire time that the machine is cycling.

A solenoid 3392 must be operated at the time the pulse comes in to advance the program unit through the lead 1588, as previously described (FIG. 29E). The operation of the program advance to the next bowler should occur only upon frame completion by a bowler. Frame completion depends on the ball information, whether or not that ball information produces a frame score at the time. It was previously described how ball information is taken from the lanes and stored until used by the machines, and also previously described that certain solenoids were operated at the time that the machine operates to give proper indication of the information being processed. For example, a strike solenoid is provided on the machine itself to indicate that the machine is processing a strike.

As shown in FIG. 48, a switch 3414 is closed by the strike mechanism whenever the machine is processing a strike. A strike completes a frame, and the closing of switch 3414 operates a solenoid by closing the circuit from source 3418 to the lead 3420. The operation of the solenoid 3416 serves to close the contacts 3422. The switch 3422 is in series from the plus source 3396 with switches 3424 and 3426, which connect the lead 3428 through the switch 3422, and lead 3430 and another switch 3432 to lead 3434, 3436, switch 1464, and lead 1588. As previously described, it only takes a short pulse to advance a program unit, and this must be done only once during a machine operation even though the ball information which comes in may serve to complete two frames and, therefore, go through two complete cycles of operation.

The timing charts show that, regardless of the continuing cycling of the machine, the operation of the print clutch itself will not be completed until after the main cycling of the machine has been completed. This is true under all conditions of operation, whether or not the particular ball information results in a completion of, and a printing of, a score. The switches 3424 and 3426 are closed by cams on the adding machine line and the printing clutch line, respectively, as follows: The switch 3424 is opened by the adding machine line out of home position and remains open for the entire cycling of the adding machine line. The switch 3426 is normally opened and is closed late in the print clutch cycle and only closed long enough to provide the pulse to advance the program unit. It will be seen, therefore, that the switch 3426 may be closed several times during the processing of ball information but will only be effective to provide the pulse during the last operation since the switch 3424 will be open at all other times.

The program will only be advanced, therefore, under the following conditions: that the machine is processing a strike, thereby closing switch 3414, or second ball information, which closes switch 3438 at the machine, that the adding machine line will be terminated thereby closing switch 3424, and the switch 3426 will be closed by the print clutch line to provide the pulse from the source 3396 through the switches 3424, 3426, 3422 and the lead 3430. A switch 3432 is also in series and is normally closed, connecting the lead 3430 to the lead 3434 and through the switch 1464, as described. The switch 3432 is provided to prevent operation of the program advance during the tenth frame operation. A separate switch 3440, which is normally open, is closed at the proper time during the tenth frame operation to provide for the program advance during the tenth frame. It will be recalled that the arcuate position of the shaft 99 to position the plate 824 (FIG. 6) and the shaft 834 by the member 832, is part of the assembly which controls the frame printing. The arcuate position of the member 832 in the tenth frame position (or beyond) will serve to hold the switch 3432 open.

It will be seen from the above, therefore, that the line 1588 will be pulsed to advance the program unit only when the ball information completes a frame. Similarly, the frame advance solenoid 868 (FIG. 27) should be operated each time a frame is completed. The frame advance solenoid 868 is shown in FIG. 48 and will operate upon frame completion at all times, including the tenth frame. This solenoid is operated under all conditions, previously described, from source 3396, switches 3424, 3426 and 3422, but is not dependent on switch 3432 which is opened at the tenth frame position. As was previously described, the ball information coming in at tenth frame may require bowling of one or two extra balls and this advances the frame to what might be the equivalent of the eleventh or twelfth frame of a game. The information so processed, however, will only serve to complete the tenth frame, and the tenth frame, therefore, is only completed when the information being processed completes the score of the tenth frame. At this time, the tenth frame clutch is opened, and means for opening the tenth frame clutch are shown in FIG. 48.

A plate 3440 is integral with 832 mounted on the shaft 99 and has a nose 3442, which will close a switch 3444 when the assembly is at the tenth frame position. The switch 3444 provides current to line 3446 and a pair of switches 3448 and 3450 must be closed to energize a solenoid 3452. The solenoid 3452, when energized, pulls down on the link 3454 to open the tenth frame clutch. The switch 3448 is on the print clutch line, and the switch 3450 is on the linkage which pulls up the block which allows free movement of the racks for a sub-total cycle, previously described. It will, therefore, be seen that the solenoid 3452 is only energized when the machine is printing a score on the tenth frame line.

Other switches controlled by the member 3400, which is clockwise during the time the machine is operating, are switches 3456, 3458 and 3460. The switch 3456 is provided to keep the motor of the machine running after release of the clutches until the machine has come completely home. The arm 3412, in clockwise position as shown, keeps the switch closed, and also switch 3458. The switch 3460 is closed only when the machine has quite operating and the arm 3412 moves rightward.

The purpose of the switches 3458 and 3460 will now be described. It was previously stated that the auxiliary program unit would serve to substitute for either machine and the wiring diagram showed a solenoid 1670, FIG. 29D, which was explained as being energized whenever the machine is processing information from the opposite lane from that being processed by the regular program unit. It was stated that the solenoid 1670 would be energized only during the processing of that information and would then go back to normal operation when such information processing was completed. To review, if the right lane machine is receiving information from the right lane, as would be indicated by the normal lane control, and the team on the left lane had completed the frame, then the bowlers on the right lane team would start bowling on the left lane, and the auxiliary program unit would come into use, processing right lane information for the corect bowler on the right lane and left lane information for members of the same team who would then be starting the next frame. All of this has been previously described and FIG. 49 shows the means for operating the solenoid 1670 to control the processing of information by the auxiliary unit. FIG. 30 shows a cam 1702 operating a roller 1704 on an arm which opens and closes a number of switches when the auxiliary program unit steps out of home position. One of these switches 3048 will close a circuit to a plus source whenever the auxiliary program unit is out of home position. This is shown in FIG. 49 and closes a line 3462 to lead 3464, lead 3466, conducting surface 3467, lead 3468, switch 3470, lead 3472 (FIG. 48), switch 3460, lead 3474 (FIG. 49) to operate a solenoid 3476. The conducting surface 3467 is on the plate which carries the ball information and which, it will be recalled, is moved laterally so that it assumes one position when information is being taken from normal lane, and moves to a second position when the machine is taking information from cross lane. The switch 3470 in this line is closed whenever ball information is in the from the left lane.

It was previously explained that completion of ball information would close a switch, and this switch 3480 operates the relay 3478 to close the switch 3470. Therefore, if the auxiliary program unit is out of home position, the switch 3048 is closed, and if the machine is set at normal, the conducting surface 3467 closes contact to 3468, and if the ball information is in the left lane, and if the machine is not operating, switch 3460 (FIG. 48) will be closed and energize the lead 3474 (FIG. 49) to operate the solenoid 3476. It is only under these conditions, therefore, that the solenoid 3476 will be operated, and if the conditions are attained to close all the other switches and the machine is operating, the switch 3460 (FIG. 48) will be open and upon completion of the current cycling of the machine, the solenoid 3476 (FIG. 49) will then operate. Solenoid 3476, once operated, will remain operated until completion of the following machine cycle. As soon as the machine starts to cycle again, the switch 3458 (FIG. 48) will be closed. This closing of the switch 3458 occurs just prior to the opening of the switch 3460. With the solenoid 3476 (FIG. 49) operated, the switch 3482 is closed, and with the closing of the switch 3482 and the switch 3458 (FIG. 48) closed, the circuit is then through switch 3048 (FIG. 49), lead 3462, lead 3484 (to FIG. 48) switch 3458, lead 3486 (to FIG. 49), switch 3482, to keep the solenoid energized. Upon completion of the ball information at machine termination, the switch 3470 is opened and the solenoid 3476 will be released. Moreover, during processing of such information, the contact 3467 will be removed from contact with 3468. It is, therefore, only the condition that attains prior to the machine cycling which controls the setting of the relay 3476. The solenoid 3476, when energized, closes switch 3488. Switch 3488 closes circuit through switch 3048, lead 3462, lead 3490, switch 3488, lead 3492, to operate the solenoid 1670 which, as explained in connection with FIG. 29D, will cause the machine to process information and control the operation of the machine in accordance with the setting of the auxiliary program unit, and upon completion of this processing will go back to the regular program unit for processing of that information.

It will be seen that if the machine were set for cross lane control at the time of the other conditions being attained, then the conducting surface 3496 would be at the dotted line position 3497, and the lead 3464 would be closed to the line 3498, and the switch 3500 closed by the relay 3504 indicating ball information from the right lane to lead 3502 and lead 3472 to also operate the relay 3476. In the same manner, it will, therefore, be seen that if the right lane program unit is processing information from the right lane and information comes into the left lane for the same team, as indicated by the auxiliary program unit being out of home position, then the left lane information will be processed. However, if the right lane machine is processing information from the left lane, then ball information on the right lane will be processed through the auxiliary unit, as previously described.

The ball information relays 3478 and 3504 will also serve to provide the current for opening of the clutch on the machine by the circuit as shown. This circuit is from source 3510 and, with the machine set in normal, through the contact 3496, lead 3518, switch 3506, lead 3516, and switch 3494. Thus, with the ball information plate at normal position, as indicated by the normal lane control solenoid, then ball information from the right lane will provide the current for opening the clutch through the time delay relay on the right machine provided that the switch 3494 is closed. The switch 3494 is operated by the solenoid 1664 which, as shown in FIG. 29E, is operated only if the carriage is positioned in the position as set and controlled by either depression of the bowler's position keys or by the program unit. If the machine is set for cross lane control, the conducting surface 3467 (FIG. 49) will be at the dotted line position 3469 and the circuit will be from 3510 through 3512, 3469, 3514, switch 3508, lead 3516, switch 3494, to open the clutch. Thus, if the machine is set for cross lane control, ball information in from the left lane will cause the right lane machine to operate.

It was previously stated that the machine may be used independently of the automatic operation provided. For this purpose, a switch 3520, FIG. 29F, connects line 3006 to 3004, to ground the advance when the right lane program unit reaches the central or home position to position the unit for the first bowler. Switch 3520 also closes lines 3008 and 3012 to provide for the advance of the left lane program unit when it reaches home position: thus, the machines may be operated independently, in which case the normal lane control prevails by disconnecting the line 1564, FIG. 29G, and connecting to line 1554 through the same switch assembly 3521.

It was previously stated that a bowler's position key, when depressed, remains depressed until the complete cycling of the machine for that bowler. The bowler's position keys are locked down by a lock plate shown in FIG. 50. The bowler's position key stem 1371 has an extension 3528 with a shoulder which normally lies above the lock plate 3524; depression of any bowler's position key will, therefore, cam the plate leftward, and when the key is fully depressed, the lockplate 3524 will be over the shoulder to hold the key down as in normal with lockplates of this type. Operation of the solenoid 3522 will serve to rock bellcrank 3526 counter-clockwise and release any depressed bowler's position key. The solenoid 3522 is also shown in FIGS. 29E and 48.

The circuitry for operation is best shown in FIG. 48 since the energization of the line 1588 is dependent on several conditions, as described. These are the same conditions which operate to advance the program unit to the next bowler, and therefore, depression of any other bowler's position key 1370 will establish conditions as described and hold those conditions until completion of the frame for that particular bowler. The actual advance of the program unit, however, does not occur when the machine is used with a bowler's position switch depressed, as previously described. It will be recalled in accordance with FIG. 29G, the energization of the advance solenoid 1490 is through a lead 1418, which is not energized unless more than one person is bowling and no bowler's position keys are depressed. The closing of switch 1488, therefore, to advance the program unit through operation of solenoid 1484 of FIG. 29G is ineffective to advance the program unit, but if any bowler's position key is down, it will be released by operation of solenoid 3522, FIG. 48.

Under tenth frame clutch operation, it was stated that the tenth frame would serve to restore the machine to its normal cleared state. Operation of the tenth frame to clear the registers has been described and other operations associated with the tenth frame operation. The restoration, however, of the frame count mechanism has not been described as related to the tenth frame operation. FIG. 26 shows the mechanism for associating the frame count at each bowler's position, and it will be recalled that operation of the mechanism to change from one bowler's position to another would serve to rock the arcuate plate 1334 counter-clockwise while the frame count gears 1262 are in engagement. This was described as serving to rock the frame count gear 1262 clockwise to establish the initial position of the segment 1332 at the time of such change. The member 1310 serves to rock the shaft 834 counter-clockwise to restore it to the first frame position. A link 1313 is on the tenth frame clutch line and the latter part of the clutch operation serves to move this link leftward and rock the member 1308 clockwise about the pivot 1312 to restore the frame count member to the first frame count. It will be recalled that the gears 1262 are against a stop 1268 whenever the machine is processing information for a bowler and, therefore, the action of rocking the member 1334 counter-clockwise as a result of operation of the mechanism of FIG. 26 to set the machine for first frame operation upon advance to next bowler will be in first frame position when the carriage advances to the next bowler. In other words, engagement of the gear 1262 with the segment 1332 will occur with the segment in first position after a tenth frame operation instead of the segment in the tenth frame position.

Also in connection with tenth frame operation, in FIG. 23 is shown the means for disabling the printing of the score information during tenth frame operation. The means, as described, will disable the printing for both of the machine total cycles during open play or for substitute bowlers. During team play, however, the total for each bowler who is a member of the team will be printed on the line just below the bowler's game, which is the equivalent of the eleventh line. FIG. 51 shows means for providing this operation. A solenoid 3530 is provided to rock a link 3532 clockwise about the pivot 1252. The member 3532 is spring-urged counter-clockwise and carries the pivot 1256 engaged in the slot of the member 1254, which disables the operation of the print as described. This disabling previously described as being effective through the last two total cycles during the tenth frame operation will be made ineffective during the final total cycle of the machine by energization of the solenoid 3530, FIG. 51. A switch 3542 is closed at the proper time by a cam 3544 on the tenth frame clutch line 1190, and the current source is from the line 3390, FIG. 29E, which is energized only when a bowler's position team switch is on; therefore, if the bowler's activating switch is on team position, the solenoid 3530 will be operated during the last cycle of the adding machine. This is normally a total cycle of the adding machine by virtue of the member 1194 of FIG. 23 pulling rightward on the link 1200 which, as shown in FIG. 11, serves to rock a member 1216 rightward and set the machine for a total operation. It will be recalled, however, that the resultant raising of the ear 232, as shown in FIG. 10, is through resilient linkage.

As shown in FIG. 51, a wire link 3534 is attached to the arm 3532 and a latch member 3536 is spring-urged counter-clockwise about pivot 3537. Spring 3540 is very light, and clockwise rocking of the member 3532 will allow the latch 3536 to limit the upward movement of the ear 232 to provide that the machine cycle will be a non-add cycle at this time. Energization of the line which operates the solenoid 3530 will also operate a solenoid 3548 which pulls on a lever 3546 overlying the arm 3364 of the bellcrank, as shown in FIG. 46, to raise the block containing the stop slides. The operation of the shaft 1962, FIG. 5, to engage the totalizer at the proper time under the tenth frame operation is shown in FIG. 46 and previously described. The operation of the machine, therefore, in the final total operation is one in which the totalizer is brought into engagement at the proper time, but the normal bowler's registers are not brought into engagement and, therefore, the final total operation as shown in the timing charts of FIG. 25 is a normal sub-total operation of the totalizer mechanism and, as previously explained in the sixth bowler's position, will be a total operation. The values thus established as determined by the sub-totalling of the totalizer, will serve to print the accumulated amount after such an amount has been transferred under control of the tenth frame cycling to enter the value in the bowler's register at that time into the totalizer, and subsequently printing this total on the eleventh line under control of mechanism previously described.

As shown in FIG. 31, the solenoid 3548 is operated under conditions of cross-lane control, by means previously described. The spring 3550 tends to hold the block in its leftward position, as shown, and this would be normal lane control. The keys 1380 and 1382 (FIG. 28) show left lane and right lane, respectively, and it was previously stated that depression of one of these keys would set the machine for operation from information from either of these lanes. The right lane key, therefore, on the right machine would say that this is a normal condition and, therefore, the key 1382 will break the circuit to the solenoid 3548 of FIG. 31, whereas the left lane key 1380 will energize the solenoid 3548. These keys, however, are not effective as long as the machine is running and, therefore, the current source to these keys is dependent on the machine being in home position at the time. The keys 1380 and 1382 are reversed in internal functioning at the left lane machine.

Means are provided to lock the plate 1760, FIG. 31, as long as the machine is running, to provide that whatever ball information is being accepted by either machine, such operation will be completed before the conditions can be changed. A solenoid 3552 is energized as long as the machine is running. This rocks a bellcrank 3558 counter-clockwise and a block 3554 positions itself either to the right or to the left of an ear 3556. It can be seen, therefore, that if the machine is operating, the plate 1760 will maintain the position at which it started until all information is competed. Energization or release of the solenoid 3548 will not be effective as long as the stop 3554 is in position to prevent lateral movement of the plate 1760 in either direction.

A "mark counting" device is associated with this machine. The mark count is continuously displayed and is energized for count as follows: A strike will count one mark, and a spare will count one mark. A strike following a strike will count two marks. The mode of operation provided herein is, therefore, as follows: Energization of the strike solenoid closes a switch which energizes a line only during the sensing cycle of the adding machine. The switch on the line energized by the strike solenoid closes twice to provide two counts. The second of these counts is timed to coincide with the positioning of the mechanism as shown in FIG. 19. A switch 3560 is in series with this line and the second pulse is not registered if the switch 3560 is open. It will be recalled that the shaft 440 rotates counter-clockwise and if not stopped because of a ten in the memory at the time of sensing, it will go to its extreme position. In this position, an arm 3562 will be positioned to block an ear 3564 on a member pivoted at 3566. Similarly, the shaft 316 will be blocked when count first ball is set and in this position the arm 3570 on the shaft 316 is positioned in front of an ear 3568 on the member pivoted at 3566. The bellcrank containing the ears 3568 and 3564 carries a member 3572 pivoted at 3574. The entire assembly is free to rock counter-clockwise about pivot 3566 unless blocked by either the ear 3562 or the ear 3570. If the bellcrank is blocked, the rocking of arm 3576 about the pivot 920 will rock the member 3572 counter-clockwise about its pivot and serve to open the switch 3560. Therefore, under conditions where a strike comes in following a spare, the ear 3570 will block, and where a strike comes in with no ten previously set, the ear 3562 will block the ear 3564 and the switch 3560 will be open to effect only a single count for that strike. Another switch is paralleled with the switch 3560 and is operated directly by the shaft 440 so that when it is in a position in which twenty is in the memory at the time of the strike, the parallel switch wll be closed and the opening of switch 3560 will not be effective to block the second pulse as the result of a strike. This bypass switch is necessary because under conditions where there are two strikes, the count first ball member will be blocked and thus result in the opening of the switch 3560. Thus, a strike will count one mark unless preceded by a strike, and no more than two marks will be registered in the case of a strike following a strike even if such should be one of a number of strikes in succession in excess of two. A similar mark counter is described in my application Ser. No. 697,632, and the aforementioned continuation thereof. This one differs, however, in that display only includes the marks of the team up to the current frame with marks being made during any particular frame not being displayed until all the bowlers of a team have completed the frame.

The mechanism for temporarily storing the mark count is shown in FIG. 52. The frame count display member 3582 is engaged with a gear 3580 which is integral with a ratchet tooth element 3578. The ratchet tooth element 3578 is engaged to be driven in one direction by a ratchet 3588 pivoted on an arm 3586 on a member 3584 concentric with the member 3578. The member 3584 has ratchet teeth 3590 and is spring-urged counter-clockwise by a spring 3583. Operation of a solenoid 3596 moves an arm counter-clockwise about pivot 3594. A member 3592 engages the teeth 3590 of the ratchet segment 3584. Each operation of the count mechanism will energize the solenoid 3596 and advance the member 3584 clockwise one tooth. The member 3584 is prevented from rocking counter-clockwise by a member 3600. A solenoid 3598, when energized, pulls the member 3600 out of contact with the ratchet teeth 3590 and the subsequent counter-clockwise rocking of the member 3584 will serve to advance the member 3578 counter-clockwise by the amount of displacement of the member 3584. Solenoid 3598 is energized when the programming unit passes the central position for a team by circuitry previously described as operating the advance of the program units from central position. No more than ten marks can be make in one frame and, therefore, the maximum rocking of the member 3584 will be ten units. It will be seen, therefore, that the display unit 3582 for the mark count will remain stationary until completion of a frame, and all of the marks made by the bowlers on a team during the ensuing frame will be built up by the clockwise positioning of the member 3584, and at the end of that frame the amount of this displacement will be used to advance the mark count totalizer continuous display 3582 to the new value represented by the completed team marks for that frame. The counter 3582 only goes up to 99 and is cleared by moving the dial forward to the zero position. It is properly detented to hold position attained so that it will not be disturbed during the operation of the solenoid 3596. Such detenting is common in similar counter displays and is not shown.

PULSE GENERATOR

It was previously described that in automatic operation, the solenoids 1770 and 1768, FIG. 32, receive from the pit pulses representative of pins knocked down developed by a scanning equipment. This operation was described as responding to a number of pulses received as a result of the pins downed by the first ball and on the second ball information, if any additional pins were downed, such additional count would be received from the lane associated with the receiving solenoid, such as 1770. FIGS. 53A, 53B and 54 show such pulse generating equipment.

My application Ser. No. 697,632 and the aforementioned continuation thereof shows a series of switches and means for closing each switch if a pin remains standing, and means for subsequently scanning the switches to determine the number of pins which remain standing after a ball is thrown.

The generating equipment of the present application includes a shaft 3602, FIG. 53A, which rotates once for a scanning operation. FIG. 54 shows switches 3604, one of which is closed for each pin remaining standing after a ball is thrown, the switches being closed in the manner as described in the previous application.

FIG. 54 shows the switches in the location of the pins on the pin deck; however, the sequence of scanning is numbered from 1 to 10 as shown and the same points are shown in FIG. 53A in association with the scanning shaft 3602. There are two scanning arms on the shaft 3602, arm 3606 and arm 3608, each of which is insulated from the shaft and from one another. The arm 3606 contacts a series of conducting surfaces 3610 and 3612. Each of the conducting surfaces 3610 is connected to a common ground 3614, and each of the conducting surfaces 3612 is connected to an individual line 3616 in which is included the switch 3604 as shown in FIG. 54.

A solenoid 3618, FIG. 53A, is operated from a power supply 3620 and has a ground lead 3622 which terminates in a contact 3624 on the arm 3606. The arm 3606 is shown in FIG. 53A in a partially rotated position, such rotation being in a clockwise direction. In the position shown, the solenoid 3618 would be energized although it is not shown in energized position. The solenoid 3618 would be operated from the power source 3620 through the leads 3622, contact 3624, arm 3606, conductor 3610 and ground 3614. This first operation of the solenoid 3618 is not effective to generate a pulse to the pin counting system as described later. As the arm 3606 advances to the conducting surface 3612, the solenoid 3618 will be reached if the switch 3604 of FIG. 54 is opened indicating the absence of a pin on the pin deck in that position. If the switch 3604 is closed, however, the relay 3618 will remain operated through the ground lead 3622, arm 3606, conducting surface 3612, lead 3616 of FIG. 53A and the switch 3604, FIG. 54, ground lead 3628 to ground 3630. The next step in the scanning is another conducting surface 3610 which will ground the relay through the connection to the ground 3614.

It will be seen that as the arm 3606 advances clockwise, relay 3618, FIG. 53A, will be operated whenever one of the contacts 3610 is in contact with the arm 3606 and will be released at the position of a contact 3612 whenever the respective switch 3604, FIG. 54, is open. The pulses are generated through the switch 3626, FIG. 53A. The switch 3626 closes to connect the pulse source 3632 to a line 3634 to operate solenoid 3636 to ground 3638, FIG. 53B. The pulses to the machine are through the operation of the solenoid 3636 as described later. It will be seen,therefore, that for every pin knocked down, the switch 3604, FIG. 54, will be open and, therefore, the solenoid 3618, FIG. 53A, will be released and then operate again to generate one pulse for each pin down in one scanning operation.

Means are provided to generate a pulse which is sent to the scoring device for each pin knocked down on the first ball and also to send pulses to the machine for only additional pins knocked down by the second ball. These are shown in FIG. 53B. The main operating elements are two plates mounted on a shaft 3640 for independent rotation on that shaft. These plates are 3642 and 3644. The plate 3642 has a series of teeth 3646 and is held in any position it attains by means of a ratchet retainer 3652 mounted on pivot 3654 and spring-urged clockwise by spring 3656. The plate 3644 has a series of ratchet teeth 3648 and is retained in any position it attains clockwise by a ratchet retaining member 3660 pivoted at 3662. Both members are advanced one step, or tooth, each time the solenoid 3636 operates and release.

Solenoid 3636 has an arm connected to a bellcrank 3664 pivoted at 3668 and through an ear 3666 on an arm pivoted on the bellcrank 3664, contact is made with one of the teeth by the ear 3666 to advance the plate 3642 one step clockwise. The plate 3644 is also advanced one step clockwise through an ear 3650 on the plate 3644 which is contacted by the nose 3670 on the plate 3642. Both of these plates are spring-urged counter-clockwise by springs (not shown) and, therefore, will be held in position by the ratchet retainers described.

In operation, during the first ball entry, both plates move clockwise together one step for each pulse received. At the termination of machine operation, the plate 3642 is released by counter-clockwise operation of the retainer 3652 by a solenoid 3670; the plate 3644, however, will be retained in the position of first ball count by the retainer 3660. After utilization of the information for second ball, both of the plates 3642 and 3644 will be returned to home position as shown by operation of both the solenoid 3670 and the solenoid 3672.

Since the scanning operation will operate the solenoid 3636 for each pin down during both of the scanning operations, means are provided to provide a pulse to the counting equipment only when the plates 3642 and 3644 are in the relative position shown in FIG. 53B, namely, the ear 3650 is contacted by the nose 3670. These means will now be described. A switch 3674 is closed by contact of a nose 3676 on the plate 3642. The switch 3674 is mounted on the plate 3644 with an insulating material and the switch arms wipe on the conducting surfaces 3680 and 3678 which are on a stationary plate and are shown by the cut-away section of the plate 3644. The switch 3674, therefore, is closed only when the nose 3670 is contacting the ear 3650 and moving the plate 3644 clockwise. Both plates remain in the position set until the termination of the machine operation which utilizes the ball information; then the plate 3642 rocks back to home position. The switch 3674 will remain open during the second ball scanning for the entire first ball count, and only if it steps any additional steps on second ball count will the switch 3674 be closed for these additional steps.

The pulses to operate the solenoids, previously described, for stepping the plates in the machine for ball information is from a current source 3682. A switch 3684 is closed each time the solenoid 3636 operates through the clockwise rocking of the bellcrank 3664, another switch 3688 is connected in series with the switch 3684 through the lead 3686, (the switch 3688 closes whenever the plate 3642 has stepped one step clockwise as it was previously stated that the solenoid 3636 would operate once to start the operation). From switch 3688, the lead 3690 is to conducting surface 3678 and switch 3674 to conducting surface 3680, the lead 3692 will then carry a pulse through the lead 3694 to operate the machine solenoid. It can be seen, therefore, that will each pulse for the operation of solenoid 3636 after the plate after the plate 3642 has moved one step clockwise, closing of switch 3684 will produce a pulse to the lead 3694 provided that the switch 3674 is closed. During second ball operation, therefore, no pulses are provided to the lead 3694 until the plate 3642 again catches up with the plate 3644 and then only the additional pulses for pins knocked down on second ball will go to the lead 3694. A solenoid 3696 is operated during the first ball operation and is maintained operated throughout the entire operation.

Means for operating the solenoid 3696 will now be described. The plate 3644 has an arm 3700 which forms a conducting bridge from a strip 3704 to a conducting surface 3706. During the first ball operation, the arm 3700 will be in the position shown prior to the first advance. Current is, therefore, from the plus source 3702, conducting surface 3704, arm 3700, conducting surface 3706, lead 3708, solenoid 3696, lead 3712, lead 3714, to conducting surface 3716, FIG. 53A. It was stated that the scanning equipment was shown in FIG. 53A as being advanced from its starting or home, position. Prior to attaining the position shown, therefore, the arm 3718 will be on the conducting surface 3716, the arm 3718 is integral with the arm 3608 and at the time the arm 3718 is on the conducting surface 3716, the arm 3608 is on the conducting surface 3720; therefore, there will be a connection from the conducting surface 3716 to the ground 3722, and under these conditions, the solenoid 3696, FIG. 53B, will operate during the first part of the scanning and prior to any advance of the plate 3644.

The solenoid 3696 will be energized and will remain energized until the scanning for the second ball by the following circuit; Operation of solenoid 3696 closes switch 3726 and the circuit is then from the plus source 3702, lead 3724, switch 3726, lead 3728, to the solenoid. The ground is maintained through the switch 3730 from the lead 3712 through the switch 3730, to lead 3732, lead 3734, switch 3736 to ground 3738. Switch 3736 is opened on operation of solenoid 3670 which is operated at the termination of the machine's utilization of the information as described. It can be seen, therefore, that if the solenoid 3696 is once operated, that it will remain operated throughout the scanning sequence. It was stated that the operation of solenoid 3670 would open switch 3736 which will normally serve to release the solenoid 3696. A lead 3739, however, goes (through switch 3762 and the lead 3740) to a conducting strip 3742, FIG. 53A, at which the arm 3718 rests when the scanning equipment is at home position, and in this position the arm 3608 contacts the conducting surface 3744 and maintains the ground connections to maintain the relay 3696, FIG. 53B, in its operated position until the start of the second scanning. Switch 3736 is maintained open by switch 3737 when plate 3642 is in position shown by connecting plus source 3739 to lead 3741 through the switch 3743 to operate solenoid 3670. Therefore, as soon as the arm 3608. FIG. 53A, leaves the conducting surface 3644, this relay will release, and this is in the first part of the scanning cycle for second ball information. The relay 3696 thus holds the information that the first ball information has been scanned and that the next scanning will be second ball information.

At second ball information, even if no pins are down on the first ball, the arm 3700, FIG. 53B, of the plate 3644 will be off of the conducting surface 3706 and the relay 3696 will not operate for a second ball. It was previously stated that a pulse from the machine would operate the relay 3670 at the termination of the machine utilization of the information. This signal has been described previously and comes into the lead 3746, lead 3748, to operate the solenoid 3670. If the solenoid 3696 is not operated, this pulse source also goes through lead 3750, switch 3752, lead 3754, to operate the solenoid 3672 tc release the plate 3644. Thus, the switch 3752 will serve to provide the release of the plate 3644 so that both plates 3642 and 3644 will return to normal position at the termination of the machine utilization of second ball information. A switch 3756 is also operated by the solenoid 3696 and serves as follows. If the arm 3700 reaches the tenth position, it will bridge the contact 3758 which leads to the switch 3756. If the first ball solenoid 3696 is operated, the switch 3756 will be connected to the lead 3764 and through the lead 3768 operate a relay 3760. Relay 3760 opens switch 3762 which is to the ground lead 3740, as previously described, to hold the first ball solenoid 3696 operated even after the machine utilizes the information by operation of the solenoid 3670 and opening of the switch 3736. In the event of a strike, therefore, the first ball solenoid 3696 will be released as soon as the machine has utilized the information. Operation of relay 3670 also serve to directly operate relay 3672 by energization of 3758 through switch 3756, lead 3768, switch 3762, lead 3770, lead 3754, to relay 3672. Holding the retainer 3660 out of contact with the teeth 3648 will no serve to release the plate 3644 until the plate 3642 returns by operation of the relay 3670. Thus, in the event of a strike, the plates 3642 and 3644 will be returned and the solenoid 3696 will be released so that the next ball will be first ball.

Switch 3756, when solenoid 3696 is in its unoperated position, will serve to connect the current source through conducting surface 3758 to lead 3766 to operate the spare symbol and the spare operation of the machine, as previously described. Other conducting surfaces such as 3758 may be placed in each position to indicate or check back on the response position of the plates at the machine.

Means are provided to automatically determine and register the occurrence of a "split". A split does not affect the score in any way but it is desirable to have the occurrence of a split marked on the score sheet at the frame in which it occurs. The pins are normally numbered in sequence in accordance with their location as the bowler faces the pins. For example, as shown in FIG. 54, the top pin would be pin No. 1, and in the second horizontal row the switches are shown as located above the No. 2 and the No. 3 pins reading in the figure from left to right. The third horizontal row shows the switches located above the pins 4, 5 and 6, again reading from left to right in the figure. In the now at the bottom of the diagram are shown switches located above the pins 7, 8, 9 and 10. The lines leading to the switches in FIG. 54 show the order of scanning and are not necessarily related to the number of the pins, e.g., the line number 1 actually is associated with the No. 10 pin, whereas line 10 is connected to No. 1 pin. It will be noted that as the bowler faces the pin as shown in the diagram, the pins are placed in what might be considered vertical rows in the diagram. A split occurs when a pin is present in two of these vertical rows but not adjacent to one another. For example, the No. 10 pin may be standing and scanned in line one of the FIG. 54, and the No. 7 pin may be standing which is scanned by line nine in the diagram, and if all other pins are down this would be known as a split. The split is detected by the mechanism of FIGS. 53A and 54 by providing a sequence of scanning in which the absence of a pin between two pins will provide the indication of a split. For example, if we have a No. 10 pin standing, the No. 6 pin missing, and either the 3 or the 9 pin standing, then a split should be indicated. The order of scanning, therefore, is No. 1—ten-pin, No. 2—six-pin, and Nos. 3 and 4—nine-pin and three-pin, respectively. The exception to the rule is that if the head-pin remains standing regardless of the separation of pins, there is no split involved.

Means for detecting the presence of a split include two solenoids 3770 and 3772, FIG. 53A. Solenoid 3772 is operated at the start of the scanning sequence by the following circuit: Source 3778, solenoid 3772, ground lead 3774, conducting element 3776, arm 3718, arm 3608, and ground 3722. Positon of the arm 3608, it will be recalled, is attained very shortly after the start of the scanning process in which the arm 3608 rotates clockwise. After the solenoid 3772 is operated in this manner, it is maintained in an operated position through the following circuit: Source 3778, ground lead 3786, switch 3780, lead 3788, switch 3790, to ground 3792. The switch 3780 is closed upon operation of the solenoid 3772 by the bellcrank 3782 which is on a fixed pivot 3784. Operation of solenoid 3770 will release the solenoid 3772 by the arm 3794 also pivoted on the pivot 3784 and serves to open the switch 3790. The solenoid 3770 is operated normally when a pin is standing by the following circuit: Source 3802, solenoid 3770, ground lead 3804–3806, conducting strip 3796 which will be contacted by arm 3718 when arm 3608 reaches the conducting portion 3798 which completes the circuit through lead 3800 and conducting portion 3612, lead 3616 to the No. 1 switch in FIG. 53A, switch 3604 (closed if No. 10 pin remains standing), lead 3628 to ground 3630. The conducting portions 3798, it will be noted, are associated with each of the lead lines 3616 in sequence, and it will be noted that the surfaces are close enough together so that if two pins remain standing as indicated by the closed switches, the solenoid 3770 will remain in an operated position. If one of these switches is open, however, the solenoid 3770 will be released.

The mode of operation is as follows. At the start of the scanning process, the solenoid 3772 will operate and remain down, as described previously. Operation of the relay 3772 rocks bellcrank 3782 clockwise and through a link 3808 and a stud 3810 will move a hook 3812 clockwise about pivot 3814 on the arm 3794. The first time that the solenoid 3770 operates as a result of a pin standing, the action of the operation of the solenoid 3770 only serves to release the solenoid 3772 by opening of the switch 3790. If the solenoid 3770 operates once and remains in an operated position through one or more of the switches being closed in the scanning sequence, it will be released at the end of the scanning sequence or at the first of a series of open switches. This would be the case if all of the pins remaining standing were in one group. If, however,the solenoid 3770 operates once and then is released by the absence of a standing pin in the scanning sequence and then it is operated a second time, the following condition will prevail. The hook member 3812 will be positioned as shown in FIG. 53A over the switch leaf 3816 to close the switch 3816. This will complete the circuit to maintain the solenoid 3770 operated through the following circuit: Source 3802, ground lead 3804, 3818, switch 3816, lead 3820 to ground 3792. Thus, the second the solenoid 3770 operates, it will remain in an operated condition even though the circuit is opened up at the end of the scanning sequence or by the absence of further pins. If the scanning sequence is completed and the solenoid 3770 remains down, a split will be indicated through the switch 3822 which connects to ground lead 3824 through the solenoid 3826. The solenoid 3826 is in the machine and controls the indication and the printing of the split symbol as previously described in connection with printing of special symbols.

It was previously stated that if the No. 1 pin (which is the last in the scanning sequence, remains standing then there is no split. After the actual scanning of the pins for sending out the counting pulses, the arm 3608 will contact the conducting surface 3828 and the arm 3718 will be on the conducting surface 3832. Thus, if the switch 3604, FIG. 54, associated with the No. 1 pin, is closed, the solenoid 3772 will operate through the following circuit: Source 3778, solenoid 3772, lead 3774, lead 3830, conducting surface 3832, arm 3718, arm 3608, conducting surface 3828, connection 3800 to conductor 3612, associated with the tenth scanning surface, lead 3616 to the switch 3604 associated with the No. 1 pin and to the ground 3630. This operation of the solenoid 3772, if the No. 1 pin is standing, will serve to release the solenoid 3770 if it is down at that time, by removing the latch 3812 from the switch 3816 and breaking the holding circuit previously described. Thus, if the No. 1 pin is standing, no split will be indicated since the switch 3822 will open.

It will be noted that the conducting surface 3798 associated with the fourth scanning position is connected to a conducting surface 3799 in the No. 3 position. Similarly, a secondary conducting surface connected to the No. 3 scanning position is located in the No. 4 scanning position. When the scanning arm 3608 is in position, either 3 or 4, and a pin is standing in either the third or fourth position, no break will be indicated to release the solenoid 3770. These positions, 3 and 4, present the No. 9 and the No. 3 pin, respectively. Similar auxiliary conducting portions are cross-connected at the No. 6 and No. 7 scanning positions which scan the No. 8 and No. 2 pins, respectively. Therefore, we may have the Nos. 10, and 6 and 9 pins remaining standing, or the 10, 6 and 3 pins reamining standing without getting a split indication because of the absence of the 9-pin which is scanned in the No. 3 sequence, but if the No. 6 pin is absent with the presence of the 10-pin and either the 3 or the 9, a split will be indicated. A similar auxiliary conducting surface is associated with scanning sequence positions No. 6 and 7 representing the 8- and 2-pin, respectively.

I claim:

1. A machine for calculating and printing score information of a bowling game wherein balls are bowled to knock down pins during each of a succession of scoring frames comprising: a plurality of accumulators, each corresponding to a bowler, adapted to receive, accumulative and store score values for the corresponding bowlers; a plurality of groups of elements positionable to represent score information, each group corresponding to a bowler; predetermined ones of said elements in each said group adapted to selectively enter score values into the accumulator for the corresponding bowler; means for printing score information and score values including a plurality of positionable printing members each carrying a plurality of score indicia adapted to be selectively positioned; means for selectively entering into the printing means score information from the elements to position the corresponding printing members to print corresponding score information; means for entering into the printing means score values from the accumulator to position the corresponding printing members to print score values; and means for actuating said printing means for printing the score information and score values entered in said printing means.

2. A machine as in claim 1 wherein there is provided a single printing means; and means for bringing said printing means into cooperative relationship with the positionable element group of a selected bowler.

3. A machine as in claim 2 wherein said positionable element groups are in side-by-side relationship and said printing means is moved transversely across the same for cooperation with the selected group.

4. A machine as in claim 2 wherein said accumulators include accumulator gears; and wherein said positionable elements comprise a plurality of groups of rack carriers positionable to represent score information, predetermined ones of said rack carriers including accumulator racks and all of said carriers including information racks; accumulator racks in each group adapted to selectively enter score values into the corresponding accumulator by engaging the accumulator gears; and means for selectively engaging the information racks to enter into the printing means information carried by the rack carriers to position the printing members to print corresponding score information.

5. A machine as in claim 1 including means adapted to carry a score sheet: and means for controlling the relative position of the score sheet and printing members whereby the score information is correctly positioned by frame on the sheet.

6. A machine as in claim 1 in which said positionable elements comprise a plurality of groups of rack carriers, each group corresponding to a bowler; and in which said printing means is carried on a movable carriage adapted to bring the printing means into cooperative relationship with the rack carrier group of a selected bowler to be positioned by the corresponding positionable rack carrier.

7. A machine as in claim 1 in which the score information is printed on a score sheet by moving the printing means in an arc about a pivot point and means are provided for controlling the radial position of said printing means with respect to the pivot point to print score information in the correct frame position.

8. A machine as in claim 7 in which said printing means are mounted for linear movement with respect to the pivot point and a stop means is provided for controlling the position of the printing means linearly.

9. A machine as in claim 8 wherein said printing means is normally positioned to print information in the frame being bowled, and means are provided for moving the stop means to print score information two frame positions back for the first ball following two successive strikes and serve to position the stop means to print score information one frame back for the first ball following a spare or the second ball following a strike.

10. A machine as in claim 7 in which said printing means is normally in a position to print information in the current frame, and wherein means are provided for translation of said printing means to print two frames back if the frame score so requires and one frame back if the frame score so requires.

11. A machine for calculating and printing scores of a bowling game wherein balls are bowled to knock down pins during each of a succession of scoring frames comprising: six elements positionable to represent score values; said elements including a special information element, first ball and second ball elements and accumulator elements; means responsive to special information for controlling the position of the special element; means responsive to first and second ball information for controlling the positioning of the first and second ball elements and at least one of said accumulator elements; a plurality of accumulators each corresponding to a bowler adapted to receive, accumulate and store score values of a corresponding bowler, said accumulator elements adapted to selectively enter score values into the accumulators; means for printing score information and score values including six printing members each adapted to be selectively positioned to print indicia, the first of said printing members serving to print special information, the second and third of said printing members serving to print first and second ball information, and the other of said printing members serving to print score values; means for selectively connecting said elements to said members and driving said members to position the printing members to print indicia corresponding to the scoring information and score values; and means for printing indicia from said printing members.

12. A machine for calculating and printing on a score sheet score information of a bowling game wherein balls are bowled to knock down pins during each of a succession of scoring frames comprising: a plurality of elements mounted for movement including at least a first ball element and a second ball element; means responsive to first and second ball information for controlling the movement of the first and second ball elements; an accumulator for a bowler adapted to receive, accumulate and store score values for the bowler; predetermined ones of said plurality of elements adapted to selectively enter score values into the accumulator; means for printing score information corresponding to first and second ball information; means for selectively driving said printing means in response to movement of said first and second ball elements to enter first and second ball information into the printing means to print indicia corresponding to first and second ball information; a translatable and rotatable means adapted to carry said printing means; means for translating said last named means relative to the axis of rotation to position the printing means to print in a correct frame position; and means for rotating said printing means about a pivot to swing through an arc to bring the printing means into cooperative relationship with the score sheet to print score values thereon.

13. A machine as in claim 12 including a plurality of groups of said elements, each element comprising a rack carrier, a plurality of said accumulators each corresponding to a bowler, and a carriage serving to carry said printing means and adapted to be moved whereby it is placed in cooperative relationship with a selected group of rack carriers.

14. A machine for calculating scores of a bowling game wherein normally first and second balls are bowled to knock down pins during each of a succession of scoring frames comprising: a plurality of groups of six rack carriers mounted for movement, said groups of rack carriers including a special information rack carrier, first and second ball rack carriers and accumulator rack carriers; slides extending [tansversely] *transversely* of said groups of rack carriers responsive to special information for controlling the movement of the special rack carrier of each group and responsive to first and second ball information for controlling the movement of the first and second ball rack carriers of each group, and at least one of said accumulator rack carriers; and a plurality of accumulators each corresponding to a bowler adapted to receive, accumulate and store score values of a corresponding bowler, said accumulator rack carriers adapted to selectively enter score values into the accumulator.

15. A machine as in claim 14 in which there are provided means responsive to entry of score information for positioning said slides.

16. In an apparatus for computing scores of a bowling game wherein balls are rolled by each of a plurality of players during each of successive scoring frames to earn cumulative score values based upon *each player's* pinfall resulting from the rolling of said balls *by the respective player*, means for selecting predetermined players *to bowl in a sequence*, means for computing and registering the score of selected players, means for entering pinfall information into the apparatus, means for automatically conditioning the apparatus to compute and register the score of the next selected player *in said sequence based on the next selected player's pinfall* as each player completes a frame, and *manual* means for overriding said selecting means whereby to condition the apparatus to compute *and register* the frame score of a particular [bowler] *player based on the particular player's pinfall, to allow the particular player to bowl out of said sequence*, said automatic conditioning means [conditioning] *without manual intervention automatically causing* the apparatus to compute and register the score of the next selected [bowler] *player in said sequence based on said next selected player's pinfall as a result of operation of said manual means so as to cause automatic return of said apparatus to said sequence* following the computation of the particular [bowler] *player's* score.

17. An apparatus as in claim 16 further including a team score totalizer; said means for selecting predetermined players and said overriding means comprising player switches each corresponding to a bowler and settable to condition the apparatus for team scoring wherein a player's cumulative scores are applied to the team score totalizer, and open player or substitute bowler scoring wherein player cumulative scores are not applied to the team score totalizer, said player switches further being settable to bypass a player.

18. A bowling score system of the type adapted to compute scores of a bowling game in response to pinfall information resulting from the rolling of balls by one or more players during a succession of scoring frames including means for detecting the pinfall resulting from the rolling of balls and forming a signal representative of the pinfall, computing means, programming means including a keyboard for controlling the operation of and entry of pinfall signals into the computing means, said keyboard including a plurality of player activating switches positionable to control the operation of the computing system, each of said switches having a first position for selecting players and conditioning the system for entry of selected bowlers pinfall signals in sequence into the computing means for computing a player's cumulative score, a team totalizer, the cumulative score of a bowler corresponding to a switch in the first position being entered in the totalizing means, each of said switches having a second position where a player is bypassed, and each of said switches having a third position for entry of substitute bowlers pinfall signals into the computing means to compute the players' cumulative score but inhibiting entry of the score into the team totalizer.

19. A computing system as in claim 18 wherein successive frames of a bowler are bowled in adjacent alleys and successive games are bowled normal and cross-lane *in which said programming means includes additionally* means for indicating normal or cross-lane to a returning [in which said programming means includes additionally] bypassed bowler.

20. A system for scoring bowling games wherein balls are rolled during each of a succession of scoring frames to earn cumulative score values based upon pinfall resulting from rolling of balls, in combination, means for establishing pinfall values resulting from the rolling of balls, means responsive to said value-establishing means for automatically computing successive cumulative frame-by-frame scores resulting from the pinfall value, means for detecting the occurrence of a foul and providing a foul signal, means responsive to the foul signal for stopping the computation means pending verification of the foul, manually operable means for alternatively verifying or denying the validity of the foul signal, and means responsive to the verification means for setting the computation means into operation in response to either a foul verification or a foul denial signal.

21. In an apparatus for computing and recording scores of a bowling game wherein balls are rolled by a plurality of bowlers during successive scoring frames to earm cumulative scores corresponding to completion of the frames based upon pinfall resulting from the rolling of said balls, in combination, means for establishing pinfall values, means responsive to the value-establishing means for computing cumulative scores bowler by bowler based upon pinfall values, means for supporting a score sheet having a plurality of parallel bowler lines each having a plurality of frame spaces each including a cumulative score area and first and second ball pinfall values areas means responsive to the value-establishing means and to the computing means for printing first and second ball pinfall values in the first and second ball pinfall value areas and for printing cumulative scores in the cumulative score areas, and means mounting the printing means for movement to register the same with the frame spaces of successive bowler lines in a frame.

22. A combination as defined in claim 21, including a carriage supporting the printing means, means mounting the carriage to swing about a pivot axis to print information on the score sheet, and means mounting the carriage for adjustment longitudinally of the pivot axis to register the printing means with successive bowler lines in a frame.

23. In an apparatus for computing and recording scores of a bowling game wherein balls are rolled during successive scoring frames to earn cumulative scores corresponding to completion of the frames based upon pinfall resulting from the rolling of said balls, in combination, means for establishing pinfall values, means responsive to the value-establishing means for computing cumulative scores frame by frame based upon pinfall values, means for supporting a score sheet having a plurality of parallel bowler lines each having a plurality of frame spaces each including a cumulative score area and first and second pinfall value areas, means responsive to the computing means for printing first and second ball pinfall values in the first and second pinfall areas and for printing cumulative scores, and means mounting the printing means for movement to register the same with successive frame spaces in a bowler line.

24. A combination as defined in claim 23 including a carriage supporting the printing means, means mounting the carriage to swing about a pivot axis for printing information on the score sheet, and means mounting the carriage for adjustment radially of the pivot axis to register the printing means with successive frame spaces in a bowler line.

25. In an apparatus for computing and recording scores of a bowling game wherein balls are rolled by a plurality of bowlers during successive scoring frames to earn cumulative scores corresponding to completion of the frames based upon pinfall resulting from the rolling of said balls, in combination, means for establishing pinfall values, means responsive to the value-establishing means for computing cumulative scores frame by frame based upon pinfall values, means for supporting a score sheet having a plurality of parallel bowler lines each having a plurality of frame spaces each including a cumulative score area and first and second ball pinfall value areas, means responsive to the value-establishing means and to the computing means for printing first and second ball pinfall values in the first and second ball pinfall value areas and for printing cumulative scores in the cumulative score areas, means mounting the printing means for movement to register the same with successive bowler lines, and means mounting the printing means for movement to register the printing means with successive frame spaces in a bowler line.

26. A combination as defined in claim 25 including a carriage supporting the printing means, means mounting the carriage to swing about a pivot axis to print information on the score sheet, means mounting the carriage for adjustment longitudinally of the pivot axis to register the pinning means with successive bowler lines, and means mounting the carriage for adjustment radially of the pivot axis to register the printing means with successive frame spaces in a bowler line.

27. In an apparatus for scoring bowling games wherein balls are rolled during each of successive scoring frames to earn cumulative score values based upon pinfall resulting from the rolling of said balls, in combination, means for computing the cumulative frame scores resulting from a player's pinfall, pin detecting means providing a signal representative of pinfall, means for entering into the computing means said signal representing pinfall, means for canceling erroneous pinfall information entered into said apparatus, means for manually entering correct frame score information, and means for inhibiting the entry of pinfall information during cancellation and until pinfall has been manually entered.

28. In an apparatus for computing the bowling scores for a plurality of bowlers bowling as a team and for computing a score of the team, the combination of: means for receiving pinfall information relative to each of said plurality of bowlers and for computing bowling scores therefrom; and manually and selectively operable means for alternatively providing error correction information to said receiving and computing means for correcting an error in a bowling score computed thereby and for providing handicap information to said receiving and computing means whereby a handicap value will be included in a team score computed thereby, said manually and selectively operable means comprising means for providing cumulative score information, means for providing frame information, and means for providing pinfall information, said cumulative score information providing means being usable to provide handicap information: and printing means responsive to said receiving and computing means and said manually and selectively operable means for printing pinfall information and cumulative scores computed by said receiving and computing means.

29. The bowling scoring apparatus of claim 28 wherein said printing means is operable to print bowling scores at different locations on a score sheet, each location corresponding to one of said plurality of bowlers, and said manually and selectively operable means further includes means for causing said printing means to be placed in readiness to print at the location corresponding to the bowler whose bowling score is to be corrected.

30. In a bowling scoring system, the combination comprising:

(a) means for supporting a bowling score sheet having at least one vertically oriented player column which has a plurality of frame spaces arranged from top to bottom on the sheet each including a cumulative score area and first and second pinfall value areas;

(b) means for receiving pinfall information;

(c) means responsive to said receiving means for computing a bowler's successive cumulative scores for each frame in a bowling game, including bonus values for [strikes] *strikes* and spares;

(d) printing means reponsive to said computing means for printing first and second ball pinfall values in the first and second pinfall areas and for printing the computed cumulative scores in tabular form on said cumulative score areas on the score sheet;

(e) means for relatively moving said supporting means and said printing means in a direction to relatively advance the printing means and supporting means parallel to said column; and (f) control means for said moving means to cause relative positioning of said printing means and said supporting means whereby the printing of successive cumulative scores in the successive cumulative score areas may be effected.

31. A bowling scoring system according to claim 30 adapted to compute and print the scores of a plurality of players on a score sheet having a plurality of additional player columns parallel to said one player column wherein said computing means is further operative to compute cumulative scores for each of the plurality of players and said printing means includes means whereby cumulative scores may be printed in any of said player columns; said system further including means for causing the printing means to selectively print cumulative scores in successive player columns.

32. The bowling scoring system of claim 30 wherein said supporting means is stationary mounted and said printing means is movably mounted.

33. A bowling scoring system according to claim 30 wherein said printing means includes at least one printer mounted for pivotal movement toward said supporting means about an axis parallel to the score sheet and transverse to the column to print on said score sheet, said printer including type means for printing at least a three-digit cumulative score in a cumulative score area on said score sheet with the digits of a cumulative score being arranged consecutively in a line parallel to said pivot axis; and means for pivoting said printer toward said score sheet.

* * * * *